(12) United States Patent
O'Malley

(10) Patent No.: US 8,799,220 B2
(45) Date of Patent: Aug. 5, 2014

(54) CONTENT CREATION, DISTRIBUTION, INTERACTION, AND MONITORING SYSTEM

(76) Inventor: Matt O'Malley, Lake Balboa, CA (US)

( * ) Notice: Subject to any disclaimer, the term of this patent is extended or adjusted under 35 U.S.C. 154(b) by 287 days.

(21) Appl. No.: 11/930,136

(22) Filed: Oct. 31, 2007

(65) Prior Publication Data

US 2009/0006418 A1 Jan. 1, 2009

Related U.S. Application Data

(62) Division of application No. 10/538,698, filed as application No. PCT/US03/39237 on Dec. 10, 2003.

(60) Provisional application No. 60/432,808, filed on Dec. 10, 2002.

(51) Int. Cl.
*G06F 17/00* (2006.01)
*G06F 7/00* (2006.01)

(52) U.S. Cl.
USPC .......................................... 707/627; 707/694

(58) Field of Classification Search
USPC ......................................................... 707/627
See application file for complete search history.

(56) References Cited

U.S. PATENT DOCUMENTS

| | | | | |
|---|---|---|---|---|
| 5,684,990 A * | 11/1997 | Boothby | ................ | 707/999.203 |
| 5,875,108 A | 2/1999 | Hoffberg et al. | | |
| 5,887,271 A | 3/1999 | Powell | | |
| 5,913,210 A * | 6/1999 | Call | ................... | 707/4 |
| 5,970,474 A | 10/1999 | LeRoy et al. | | |
| 6,199,099 B1 * | 3/2001 | Gershman et al. | ............ | 709/203 |
| 6,356,905 B1 * | 3/2002 | Gershman et al. | ....... | 707/999.01 |
| 6,405,218 B1 * | 6/2002 | Boothby | ................ | 707/999.201 |
| 6,442,530 B1 | 8/2002 | Miller | | |
| 6,571,279 B1 * | 5/2003 | Herz et al. | .................... | 709/217 |
| 6,587,835 B1 * | 7/2003 | Treyz et al. | ................ | 705/14.64 |
| 6,804,674 B2 * | 10/2004 | Hsiao et al. | ............ | 707/999.003 |
| 6,810,527 B1 * | 10/2004 | Conrad et al. | .................. | 725/76 |
| 7,617,317 B2 * | 11/2009 | Jones et al. | .................... | 709/227 |
| 2002/0178013 A1 | 11/2002 | Hoffman et al. | | |
| 2003/0018624 A1 * | 1/2003 | Hsiao et al. | ........................ | 707/3 |
| 2003/0040850 A1 | 2/2003 | Najmi et al. | | |

(Continued)

FOREIGN PATENT DOCUMENTS

WO 2004053651 6/2004

OTHER PUBLICATIONS

Jasmin, International Search Report, PCT/US03/39237 (WO 2004/053651 above), Jul. 14, 2004, 2 pages, PCT/ISA/210, Alexandria, VA, USA.

(Continued)

Primary Examiner — Pavan Mamillapalli

(57) ABSTRACT

A system for managing an end-user's request for information and entertainment. This information can be retrieved using a kiosk with a computer, using software over the Internet with a hardwired computer-like device, or using software with a wireless handheld device. Applications include any areas including commercial, industrial, and government where groups of people congregate such as trade shows, retail stores, restaurants, offices, manufacturing plants, and governmental buildings. The system provides both audio and text information and entertainment from a plurality of sources. These sources include information and entertainment from the local environment or 'on-site' information, and from a remote environment. These locations can also retrieve information from the end-user. This information can be product feedback, customer service opinions, product information requests, or the like.

17 Claims, 81 Drawing Sheets

(56) References Cited

U.S. PATENT DOCUMENTS

2004/0128163 A1    7/2004  Goodman et al.
2005/0060324 A1*   3/2005  Johnson et al. ............... 707/100
2006/0184540 A1*   8/2006  Kung et al. .................... 707/10
2007/0090185 A1*   4/2007  Lewkowitz et al. .......... 235/383

OTHER PUBLICATIONS

Glass, Final Office Action for U.S. Appl. No. 11/930,127, which is a related continuation to present case, Jul. 7, 2010, 9 pages, USPTO, Alexandria, VA, USA.

Glass, Non-Final Office Action for U.S. Appl. No. 11/930,127, which is a related continuation to present case, Aug. 18, 2009, 7 pages, USPTO, Alexandria, VA, USA.

Shaawat, Final Office Action for U.S. Appl. No. 10/538,698, which is a related parent application to present continuation case, Oct. 31, 2011, 14 pages, USPTO, Alexandria, VA, USA.

Shaawat, Non-Final Office Action for U.S. Appl. No. 10/538,698, which is a related parent application to present continuation case, Mar. 17, 2011, 12 pages, USPTO, Alexandria, VA, USA.

Shaawat, Final Office Action for U.S. Appl. No. 10/538,698, which is a related parent application to present continuation case, Jul. 1, 2009, 14 pages, USPTO, Alexandria, VA, USA.

Shaawat, Non-Final Office Action for U.S. Appl. No. 10/538,698, which is a related parent application to present continuation case, Nov. 13, 2008, 12 pages, USPTO, Alexandria, VA, USA.

Mamillapalli, Non-Final Office Action for U.S. Appl. No. 11/930,126, which is a related to present application, Dec. 19, 2011, 14 pages, USPTO, Alexandria, VA, USA.

Mamillapalli, Final Office Action for U.S. Appl. No. 11/930,126, which is a related to present application, Jul. 6, 2010, 19 pages, USPTO, Alexandria, VA, USA.

Mamillapalli, Non-Final Office Action for U.S. Appl. No. 11/930,126, which is a related to present application, Dec. 9, 2009, 17 pages, USPTO, Alexandria, VA, USA.

* cited by examiner

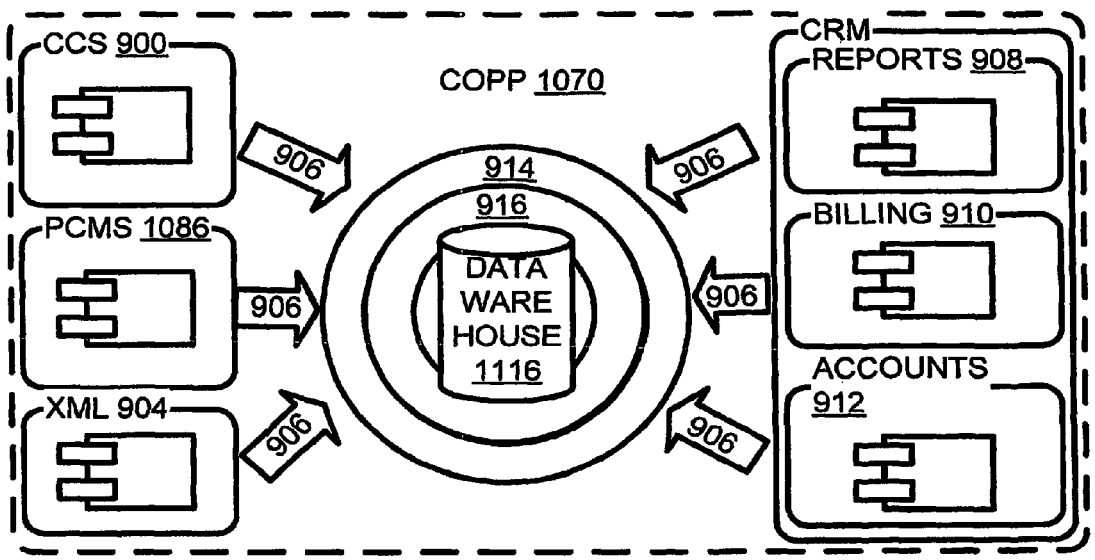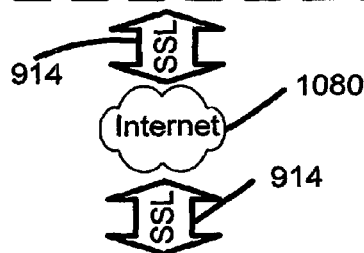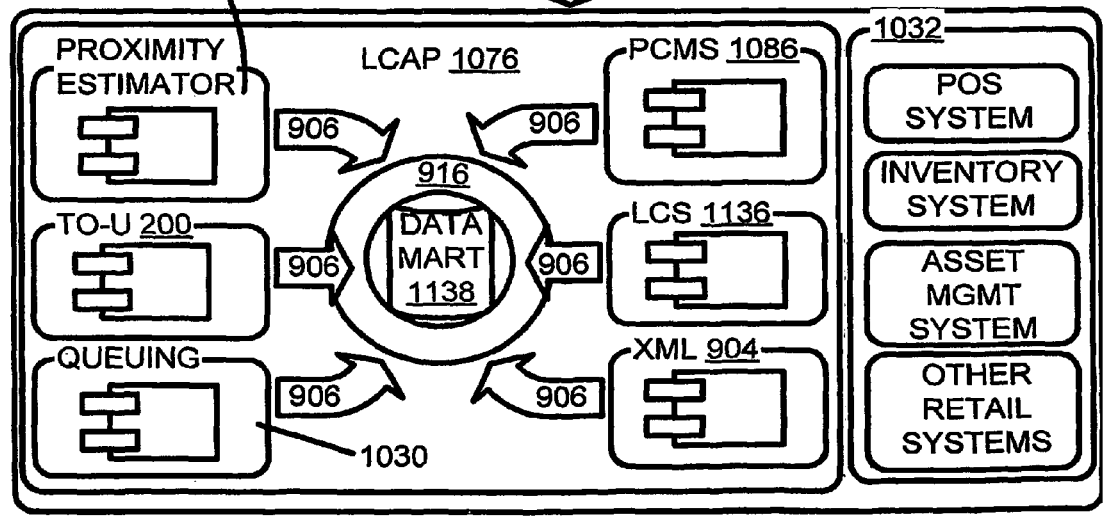
Fig. 6

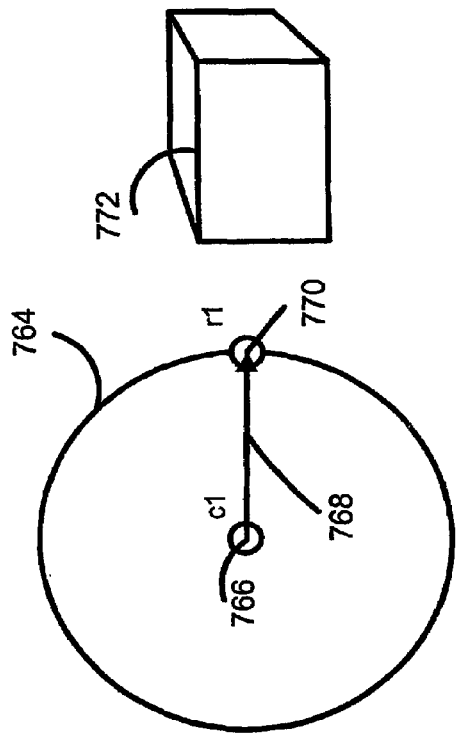
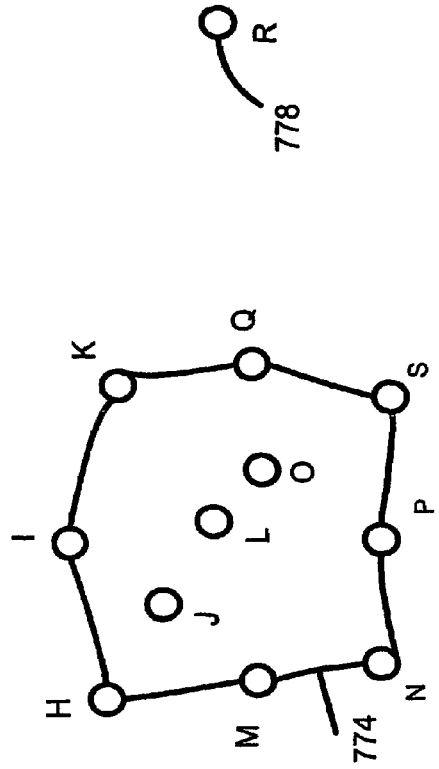
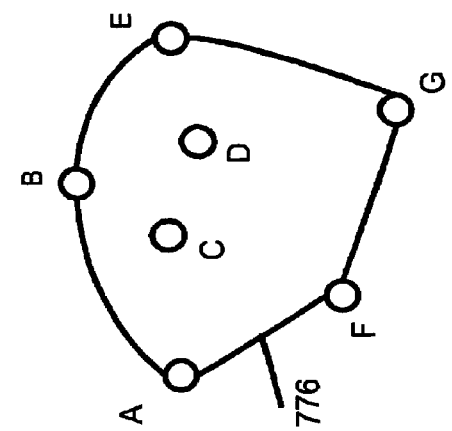
Fig. 25
Fig. 26
Fig. 27
Fig. 28

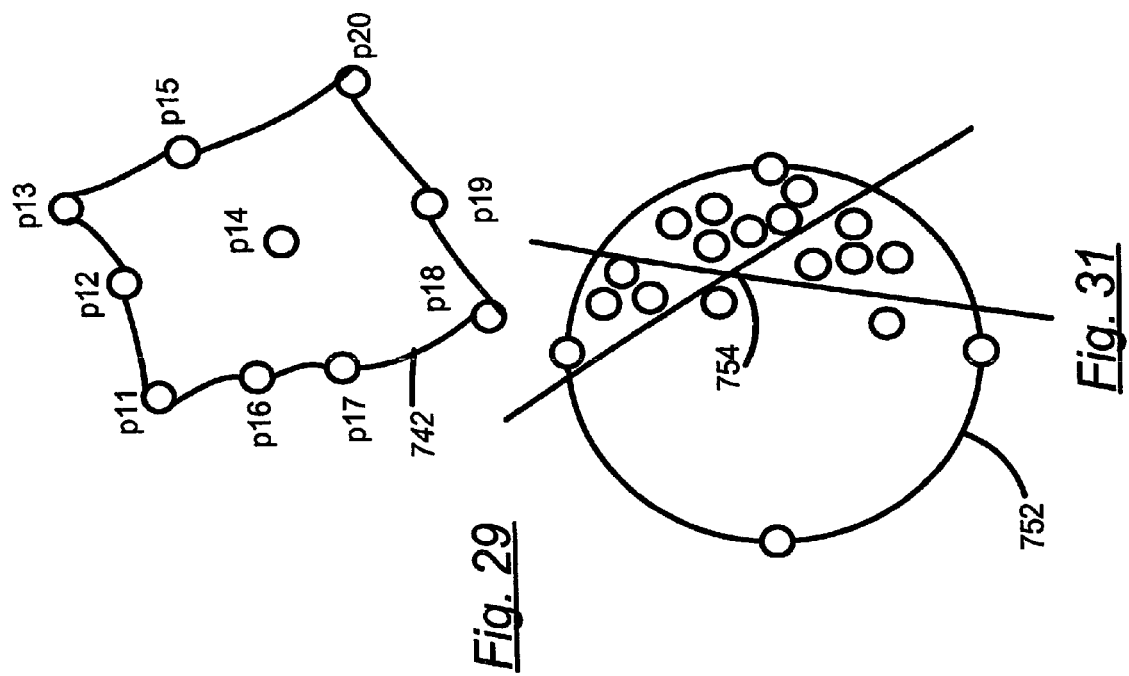
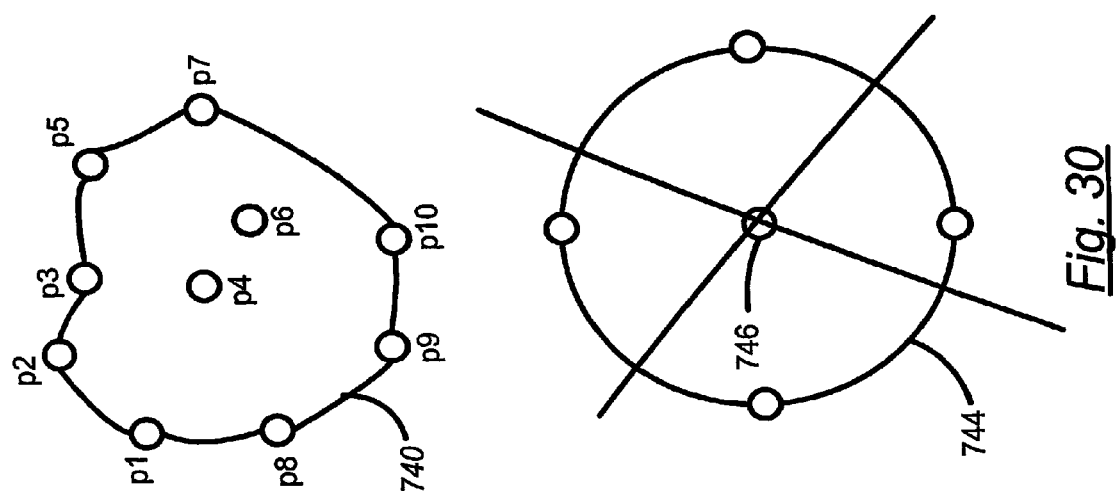
Fig. 29
Fig. 31
Fig. 30

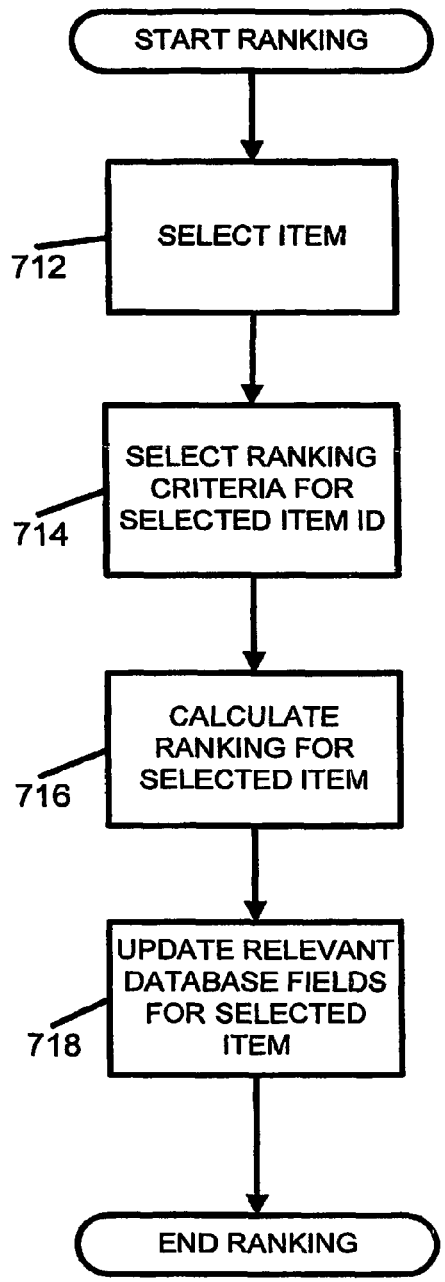
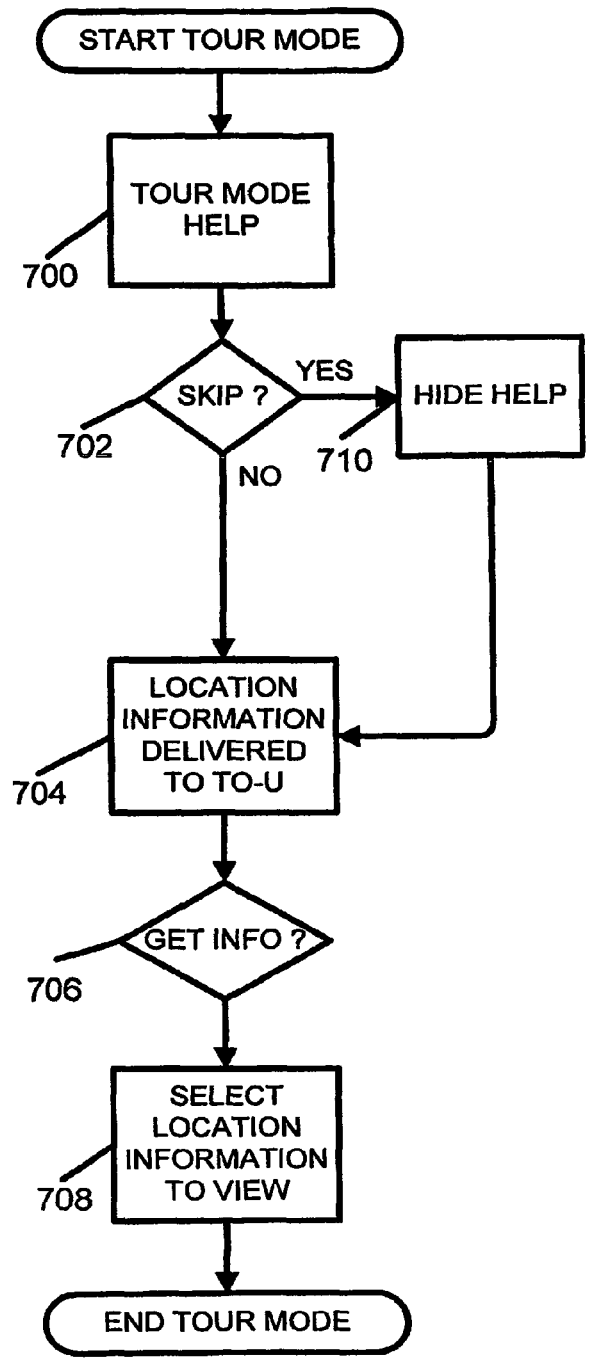
Fig. 43
Fig. 44

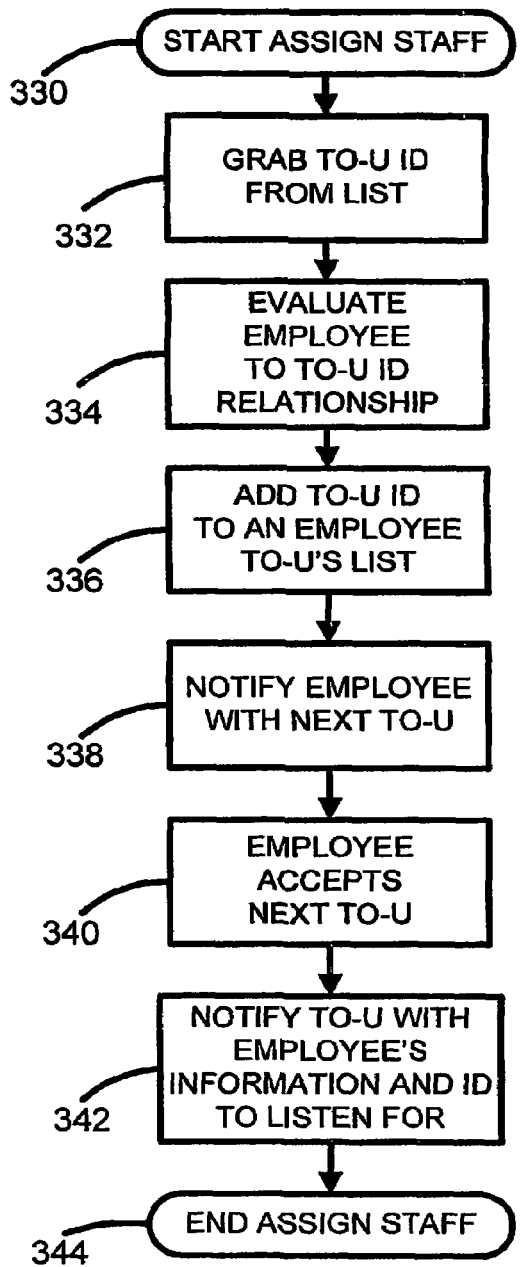
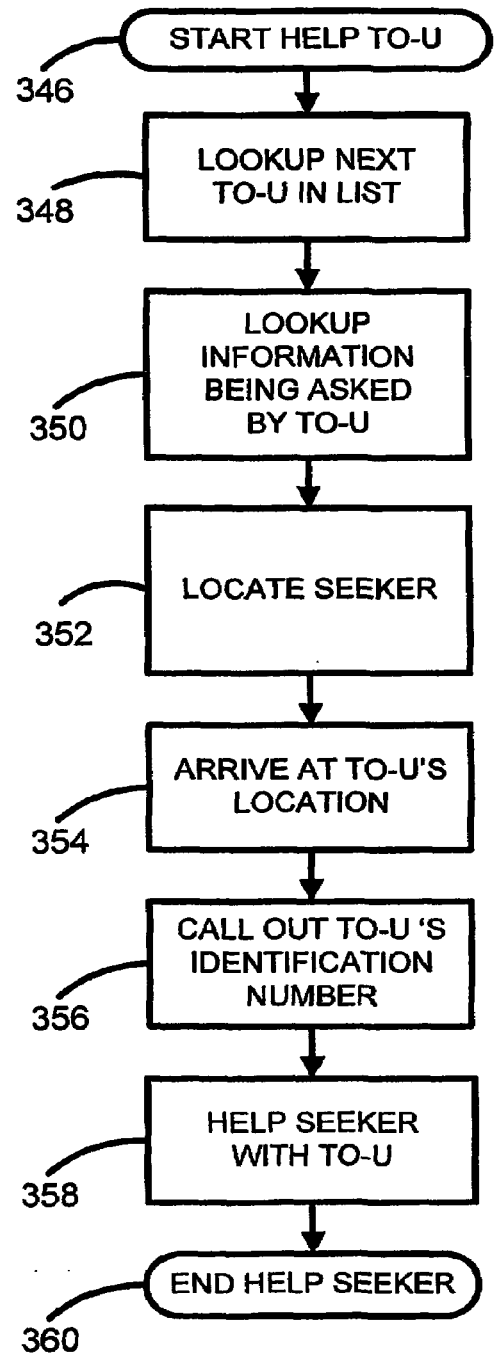
Fig. 48
Fig. 49

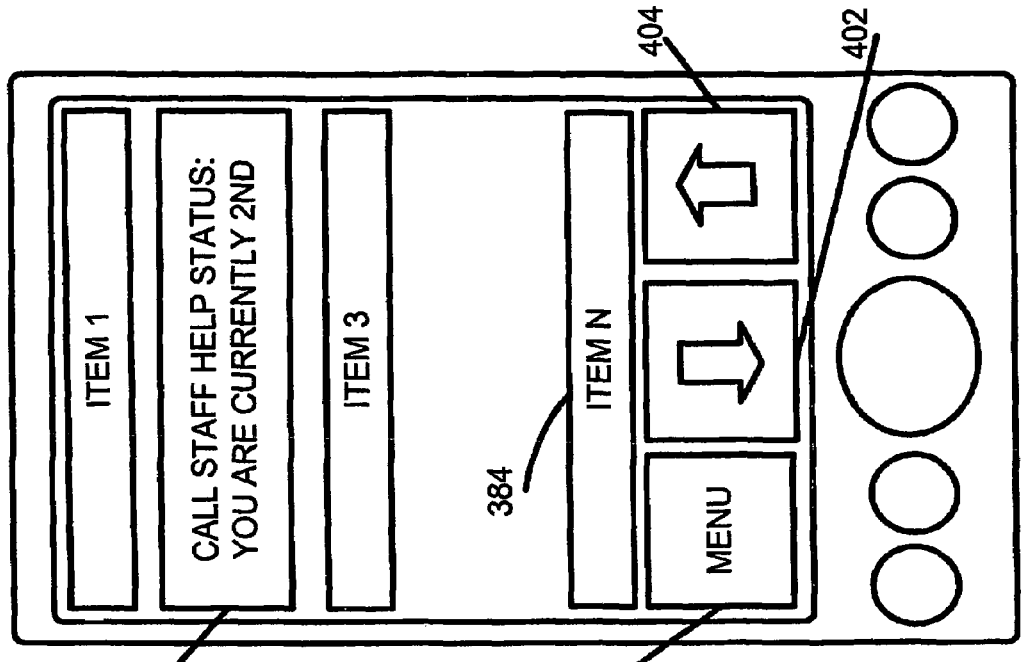
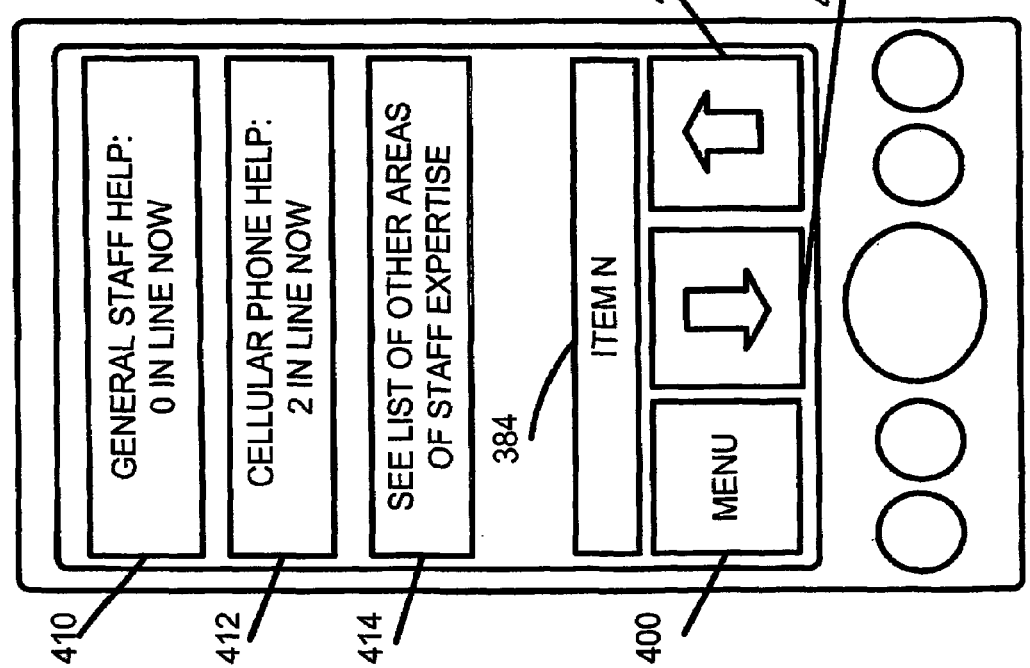

CONTENT CREATION, DISTRIBUTION, INTERACTION, AND MONITORING SYSTEM

RELATED APPLICATIONS

This divisional application claims priority to non-provisional application Ser. No. 10/538,698, filed Jun. 10, 2005, PCT application PCT/US2003/39237, filed Dec. 10, 2003, and provisional application No. 60/432,808, filed Dec. 10, 2002.

FIELD OF THE INVENTION

The present invention relates to content creation, distribution, interaction, and monitoring and, more particularly, to content creation, distribution, interaction, and monitoring along a supply chain that allows direct dialog between all parties in a supply chain and the end-consumer.

BACKGROUND OF THE INVENTION

Product manufacturers struggle to educate potential buyers about their product's benefits through various means. Their success if often dependent on printed material or inexperienced sales staff. This problem extends along the entire supply chain from inventor, manufacturer, marketers, resellers, retailers, and ultimately the end-consumer. Retailers are among the largest employers in the United States and spend enormous sums of money training new staff, yet they experience large employee turnover. With thousands of product suppliers pouring out thousands of new products, retailers often become overwhelmed when consumers demand better and faster service. In addition, shoppers have little feedback opportunities in what products, services, and/or employees they like or dislike.

Recently a wide range of interactive devices have been developed to provide information to consumers. These interactive devices include, for example, computers connected to various computer online services, interactive kiosks, interactive television systems, wireless communication systems and the like. These systems are designed to provide a wide variety of information which may be specific to particular products that the customer is interested in or alternatively, may have a wider scope and relate to various services or information about places and events which may be of interest to the user.

Most often the information provided to the customer may be obtained over the Internet and is usually information related to a particular product or similar such products that are available in a particular local or by way of shopping utilizing a website. The information provided to the consumer may be in a form to be utilized on the consumer's personal computer (PC) or a handheld device such as a cellular phone or a personal digital assistant (PDA).

Various prior art patents disclose systems of the type above referred to and those which appear to Applicants' to be most pertinent are disclosed below.

PRIOR ART

U.S. Pat. No. 6,134,548 to E. Gottsman et al., entitled "System, Method and Article of Manufacture for Advanced Mobile Bargain Shopping," is directed to a system and method for facilitating WWW-based comparison shopping in non-web retail environments. A wireless transceiver with Internet Protocol capability is combined with a miniature barcode reader, so that a user can transmit a definitive product identifier code to a remote server that then queries supplier websites to find availability, price, and shipping information.

U.S. Pat. No. 6,091,956 to D. D. Hollenberg, entitled "Situation Information System," is directed to a wireless system for providing time-critical situation information about places and events to people in vehicles equipped with a computer and a Global Positioning System (GPS) receiver. Sources of information are databases of local information and information from other users. FIGS. 1 and 2 show, respectively, the main components of such a system for a physically defined area such as a shopping area, and a basic read-out device with graphical display showing a retail store floorplan.

U.S. Pat. No. 5,995,015 to W. C. DeTemple et al., entitled "Remote Electronic Information Display Systems for Retail Facility," is directed to a wireless system for communicating between an on-site computer and locations in the aisles of a retail facility. A hard-wired grid, preferably infrared, connects the computer to transceivers located in zones throughout the facility. The transceivers establish a wireless link to the locations that may be fixed information display terminals such as price-displaying shelf tags of shopping carts or baskets.

U.S. Pat. No. 5,933,811 to P. D. Angles et al., entitled "System and Method for Delivering Customized Advertisements Within Interactive Communication Systems," is directed to an Internet-based system and method for delivering customized advertisements to users of interactive devices, specifically computers. The system includes at least three different entities that communicate with each other via the WWW, viz., a content provider, an advertisement provider, and a consumer.

U.S. Pat. No. 5,918,211 to M. A. Sloane, entitled "Method and Apparatus for Promoting Products and Influencing Consumer Purchasing Decisions at the Point-of-Purchase," is directed to a system and method wherein a consumer in a retail store uses a portable barcode scanner to scan products. The scanner is in wireless communication with an on-site computer controller. If a scanned product is currently under a sales promotion, the controller alerts the scanner. The idea is to influence buying decisions while the person is standing in an aisle with products in front of him. In another embodiment, a consumer is identified before he begins shopping so that the computer/controller can utilize his past purchase history to offer promotional discounts.

U.S. Pat. No. 4,882,770 to R. T. Miyahira et al., entitled "Wireless Optical Communication System," is directed to a wireless full-duplex, optical short-range communication system operating as an intercom. The system can be used in fast-food restaurants or other commercial facilities where two-way voice communication between a central station and multiple remote units is useful.

U.S. Pat. No. 6,636,835 to Deloris Ragsdle-Elliott et al., entitled "Wireless Maitre d' System for Restaurants," discloses a method for providing interactive two-way communications between patrons and restaurant service personnel who have direct interaction with the patrons during restaurant encounters. The system includes the utilization of first and second wireless devices and the two-way wireless communication includes an order for a retail item from the patron to the restaurant service personnel.

U.S. Pat. No. 6,647,304 to T. Tsukishma et al., entitled "Product Management Method and System," discloses a system for managing each of the component parts included in a product from a manufacturer of the product, the provider of the various parts which go into the product, the service provision for the product, and the consumer. This management is accomplished by making the information and services regarding the product and the parts available to the customer who possesses the product, the parties concerned in the sales of the product, manufacturing and maintenance of the product, as well as others such as public organizations who may have an interest in the product.

U.S. Pat. No. 4,959,828 to L. C. Austin, entitled "Multi-Channel Infrared Cableless Communication System," discloses a system for simultaneously transmitting a plurality of audio signals into a specified space to one or more reception points. For example, the system is particularly adapted for providing simultaneous language translations at a conference or similar application.

U.S. Pat. No. 6,641,037 to P. Williams, entitled "Method and System for Interactively Providing Product Related Information on Demand and Providing Personalized Transactional Benefits at a Point of Purchase," discloses a system which provides interactively product information to a user based upon the product identification such as a UPC code and allows the user to engage in various transactions related to the product such as the ability to efficiently purchase the product or service of interest.

What is needed is an integrated system in which content from a multiplicity of sources both related to a specific venue as well as of a more general nature can be collected so that the content is available to a user upon demand. The system must also operate to distribute the collected content to the user upon demand as well as allowing interactions between the user and the content. The system must also provide the ability for the specific venue administration to monitor the usage of the content by the user.

SUMMARY OF THE INVENTION

The present invention is directed to a system for providing information to a user and includes a first database, a means for generating a first predetermined content for storage in the first database, a second database, means for generating a second predetermined content for storage and the second database, a server, means for interconnecting the first and second databases to the server, a plurality of transceivers, means providing access by each of the transceivers to the server and selector means on each of the transceivers for selectively accessing said first and second content.

BRIEF DESCRIPTION OF THE DRAWINGS

A complete understanding of the present invention may be obtained by reference to the accompanying drawings, when considered in conjunction with the subsequent, detailed description, in which:

FIG. 6 is a block diagram depicting system level components broken down by COPP 1070 and LCAP 1076;

FIG. 19 illustrates an Add SKU Information Pages such as, Text Info screens within the PCMS 1086;

FIG. 20 illustrates an Add SKU Information Pages such as, for Compare and Visuals, within the PCMS 1086;

FIG. 22 illustrates a Scheduling & Distribution screen within the PCMS 1086;

FIG. 25 is a block diagram depicting RING 182 can be two dimensional and three dimensional shapes;

FIG. 26 is a block diagram depicting the ability to reference the PBI of similar product categories with such data as, the coordinates x, y, and z;

FIG. 27 is a block diagram depicting the creation of a RING 182 using multiple points;

FIG. 28 is a block diagram depicting the creation of a RING 182 using conditions to exclude points;

FIG. 29 is a block diagram depicting the creation of a RING 182 made up of separate shapes due to pre-established conditions;

FIG. 30 is a block diagram depicting a RING 182 where the RING center is about the origin of said circle;

FIG. 31 is a block diagram depicting a RING 182 where the RING center is offset by concentration of points;

FIG. 43 is a flow chart depicting a Ranking process of a number of Seekers' Requests;

FIG. 44 is a flow chart depicting a Tour Mode process;

FIG. 48 is a flow chart depicting a process of assigning an employee to Seekers within Help Queuing;

FIG. 49 is a flow chart depicting a process of an employee helping a Seeker 999 within Help Queuing;

FIG. 55 is a block diagram depicting an employee's 198 TO-U 200 GO-UI 199 help options within Help Queuing;

FIG. 56 is a block diagram depicting a seeker's TO-U 200 GO-UI 199 number in-line;

DETAILED DESCRIPTION OF THE INVENTION

Figure 1:
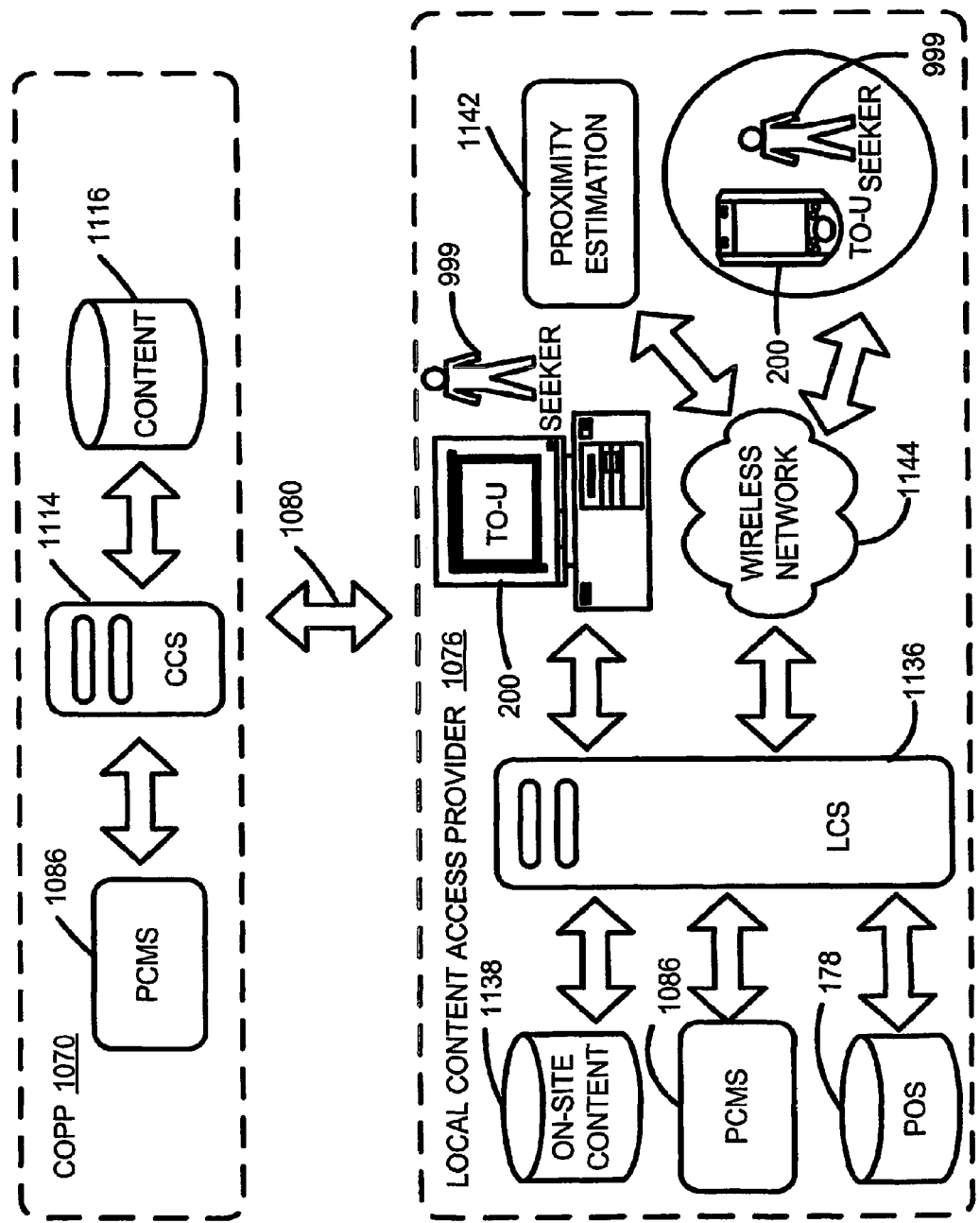
FIG. 1 is a block diagram depicting the Central Office Production and Processing (COPP 1070) and Local Content Access Provider (LCAP 1076)

The invention is an end-to-end system that collects, aggregates, tags, and delivers Content. This Content can be made available with an enabled environment or venue, and is both interactive and can be relevant to one's mobile location within the environment. The Content available to the end-user or "Seeker" 999 could include product information at the point-of-purchase, interactive marketing messages, news, entertainment, media, expert opinions, and other customers' feedback. The usage of the system and of the Content is then tracked to create more measurements and improve the systems effectiveness. The system allows for adjustments remotely and in near real-time by any party with permission, including parties along the supply chain, such as a product's OEM (original equipment manufacturer), inventor, advertising agency, sales force, supplier, VARs (value-added-resellers), trade show exhibitor, the venue's own marketing department, corporate headquarters, and/or on-site by the venue's location manager.

Almost all publicly-available real-time Content flows in one direction—from the top down or for example, from the seller to the buyer: A supplier-to-retail buyer, a retail buyer-to-store manager, a store manager-to-store employee 198 (also sometimes referred to as "staff"), a store employee-to-shopper. This highly inefficient system forces the shopper and store employee to use only what information is available or dictated from above, not necessarily what may be most productive, beneficial, or desired. Critical, popular, timely, and/or helpful information that is made available or provided to one customer, does not necessarily mean the same information will be available to the next Seeker 999.

Subsystems

The overall system has four basic information Subsystems:
1. The Content Source Subsystem
2. The Distribution Subsystem
3. The Interaction Subsystem, and
4. The Monitoring Subsystem.

Each of these four Subsystems contains transceivers that have the ability to receive and send information and operate with both hardware and software. The transceivers used for the Content Source, Distribution, and Monitoring Subsystems could be stationary, while the transceiver for the end-user or Seeker 999, FIG. 1 (or the Interaction Subsystem)

could allow for wireless mobility, but it also could be a stationary device such as a computer kiosk.

An installation could function on a single Content Source and Monitoring Subsystem combined on a single computer that is connected to a Distribution Subsystem comprising of a single transceiver, and still be organized to work with an Interaction Subsystem comprised of a few or tens, hundreds, or even thousands of Seekers 999 at any given time. On the other hand, another installation could have a number of Content Source Subsystems, a Distribution Subsystem comprised of a number of networked distribution transceivers and Monitoring Subsystems, while still supplying a Seeker 999 population that is expected to be in a continuous state of change.

Figure 3:
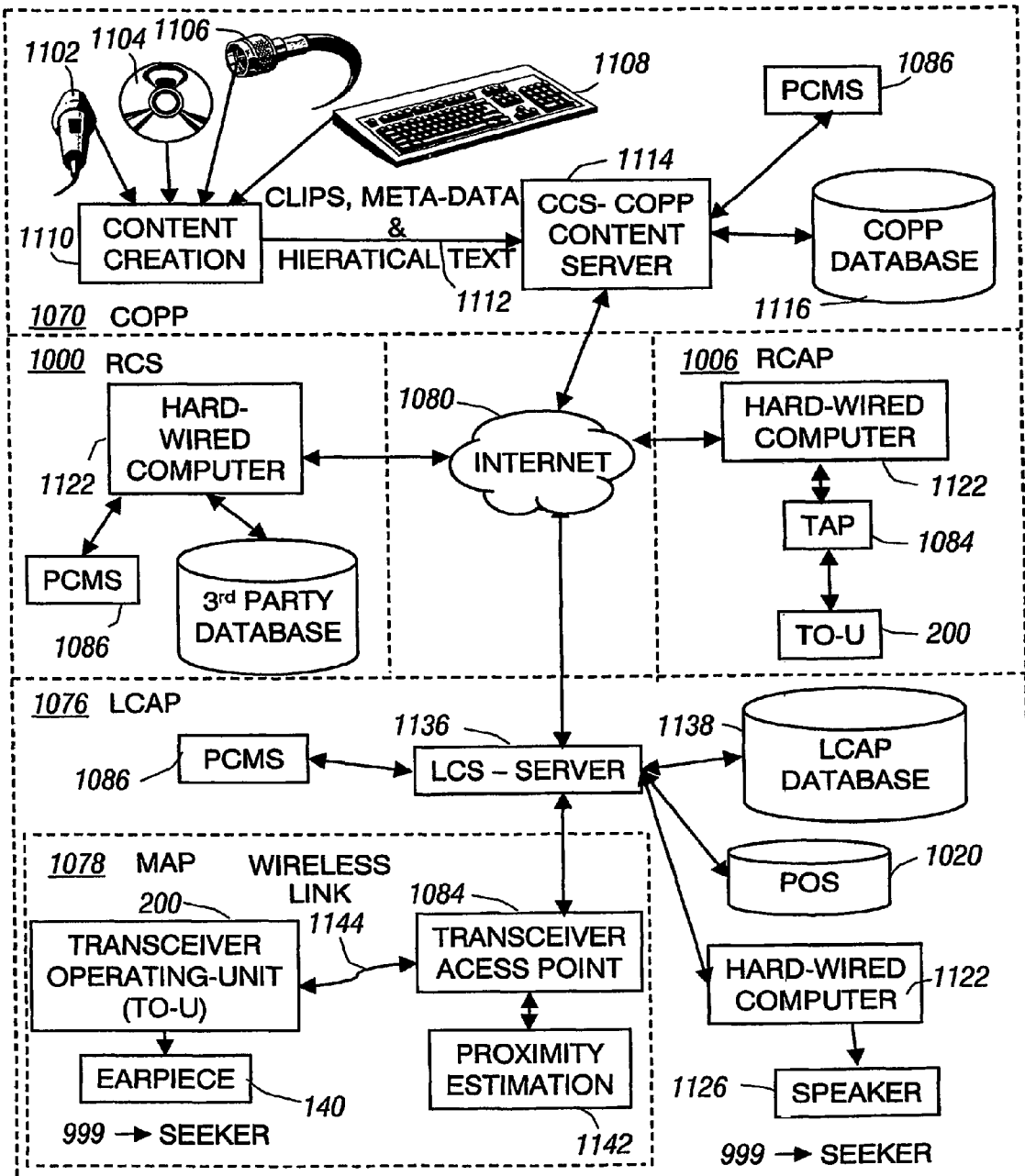
FIG. 3 is a block diagram depicting content sources and various sub-systems.
Figure 4:
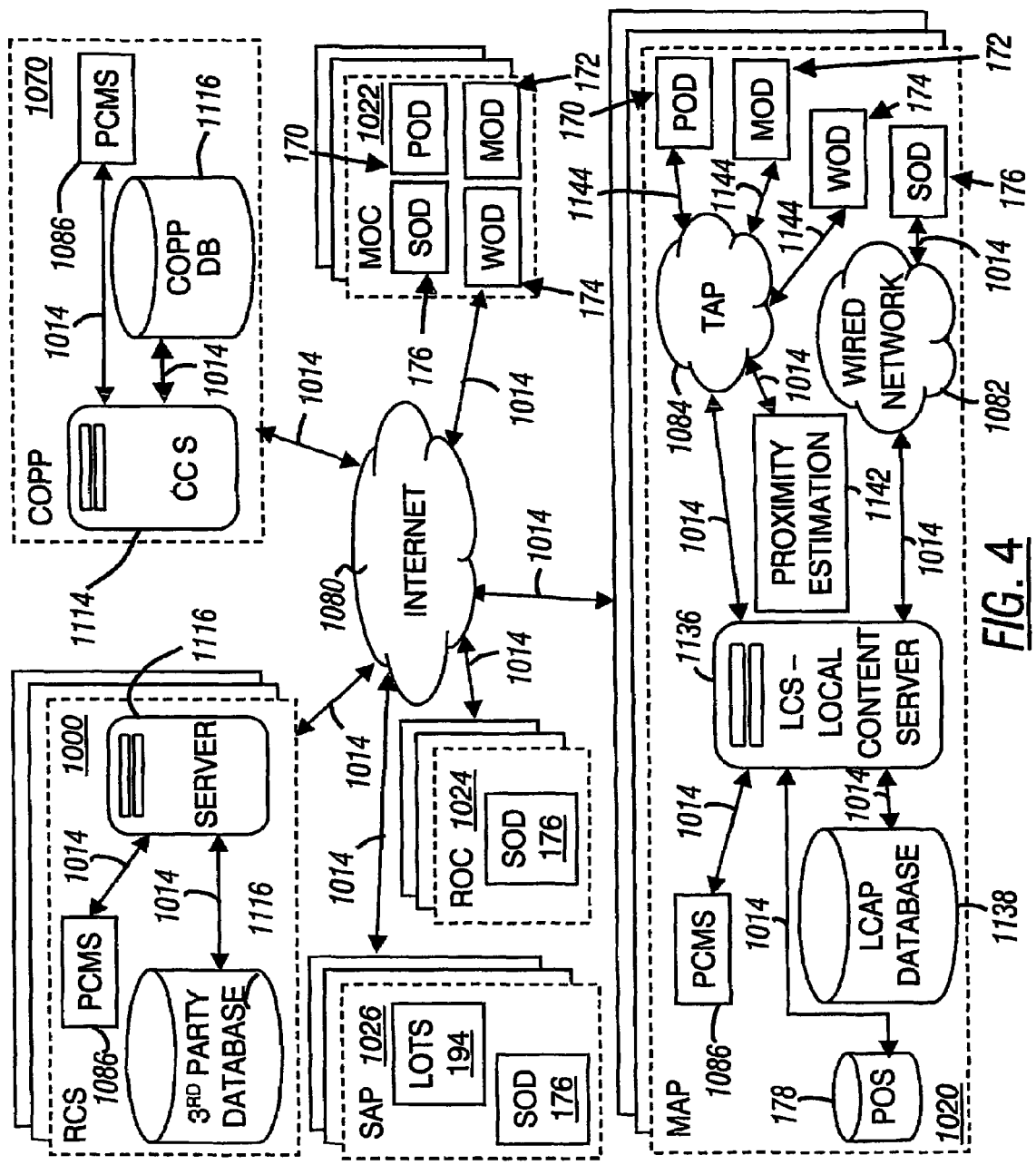
FIG. 4 is a block diagram depicting groupings of sub-systems and communications among them.

FIG. 4 shows that the overall system allows for a number of information or Content producers, editors, monitors, and consumers, called "RCS" or Remote Content Sources 1000. All these parties can be in the same location or they can interact from separate locations. Content could include among other things, audio, voice, music, text, text-to-speech, speech-to-text, graphics, charts, data, maps, and video. FIG. 3 shows that Content could include such things as live content 102, a prerecorded medium 1104, a live feed 1106, and/or manually inputted content 1108.

Figure 2:
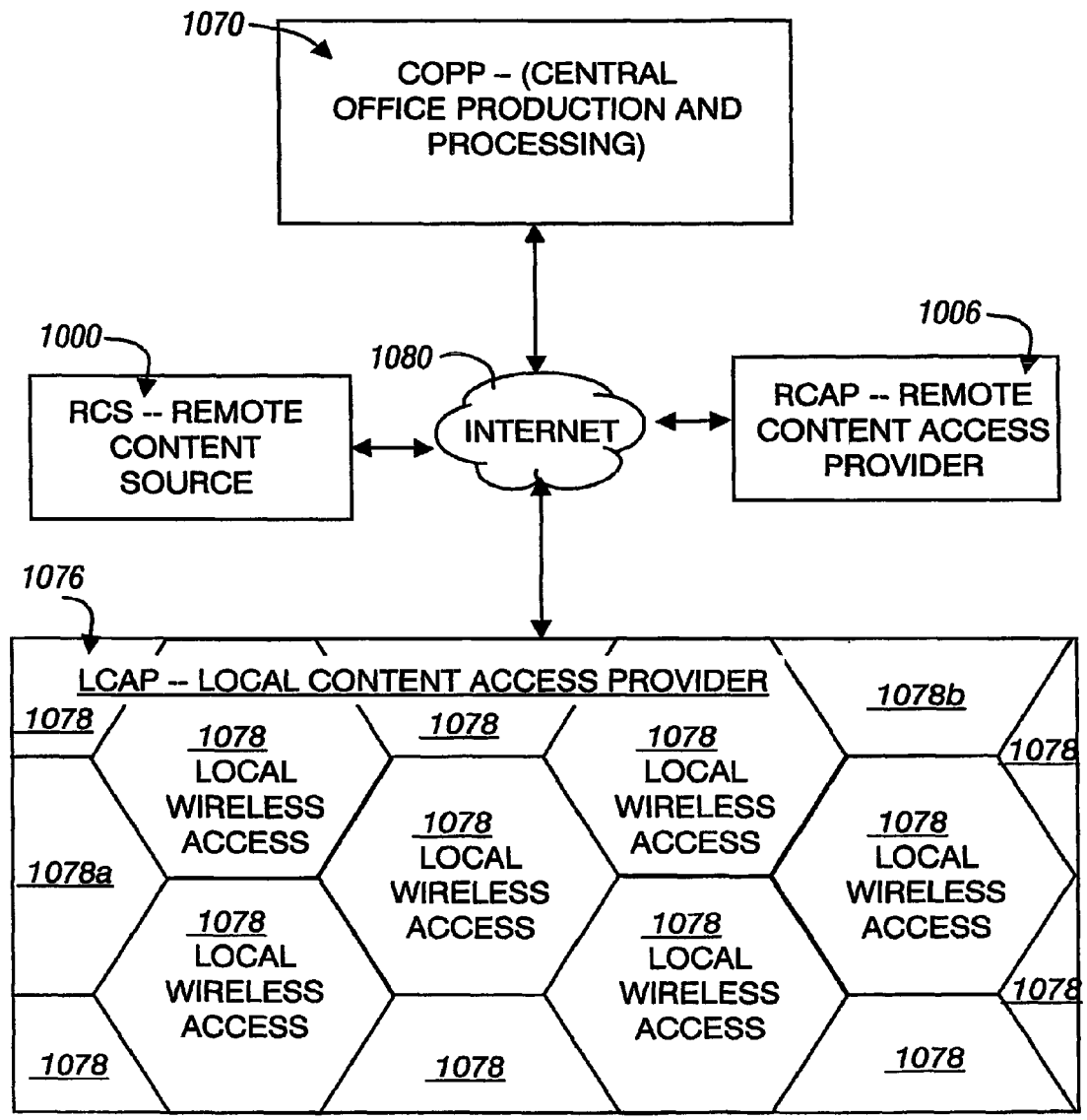
FIG. 2 is a block diagram depicting the four types of participants in the system.

FIG. 2 shows that Content goes through a "COPP" or the Central Office Production and Processing 1070, and is sent to a "CAP" or Content Access Provider 1004 through a network connection, such as the Internet 1080. A CAP 1004 location that contributes and redistributes local Content using "PCMS" or Proprietary Content Management Software 1086, FIG. 1 is a "LCAP" or Local Content Access Provider 1076, FIG. 1. A CAP 1004 without local Content redistribution is a "RCAP" or Remote Content Access Provider 1006, FIG. 2.

A Seeker 999

An end-user of the above Content is a Seeker 999, FIG. 1. This Seeker 999 obtains and interacts with Content at a CAP 1004 using software referred to as the "GO-UI" or Graphical Operating-Unit Interface 199, FIG. 20, on enabled-hardware called a "TO-U" or Transceiver Operating-Unit 200, FIG. 1. These enabled devices or TO-Us 200 could include such things as computers, kiosks, handhelds, tablet devices, mobile personal devices, and mobile phones among other devices.

PCMS—Proprietary Content Management Software

"PCMS" or Proprietary Content Management Software 1086, FIG. 1, is an application that allows Content contributors, editors, and other third parties to create, modify, and monitor Content, Content usage, and system usage patterns. Content deliveries and exchanges on the system can be restricted, delayed, made in near real-time, or live.

PCMS 1086 allows each Content provider the ability to update their own Content either on-site at the LCAP 1076 or remotely. At a trade show in Las Vegas for example, Content such as product details, upcoming events, or training information could be maintained and updated several ways. This trade show information could be maintained by: 1) an internal creative agency 2) by the venue provider (such as the Las Vegas Convention Center) 3) by the event sponsor (such as the Consumer Electronics Association) 4) by the exhibitors or VARs such as Ingram-Micro, 5) by the OEMs such as SONY, 6) from "ACS" 188 (Automated Computerized Sensors, explained later), or 7) any combination of the previous six.

Continuing the trade show example, the internal creative agency could acquire, load, and maintain the majority of the information for the event using the PCMS 1086 at the LCAP 1076. This information might include specific product details for any given trade show booth, and the locator information for the nearest cash machine or payphone. The LCAP 1076, FIG. 3 could provide Seekers 999 access to Content, such as sports, music, games, weather, entertainment, and news for both Las Vegas and other remote locations that arrives from Remote Content Sources 1000 through the Internet, after said Content has been aggregated and distributed by the COPP 1070, FIG. 3.

FIG. 3 shows that the Las Vegas Convention Center (or venue provider) and the Consumer Electronics Association (or event sponsor) would be able to access and update information such as any changes to on-site conferences or booth locations using the PCMS 1086, from either an on-site PCMS 1086 station at the LCAP 1076 or from a RCS or Remote Content Source 1000. Exhibitors, VARs, and OEMs would also be able to update information, either at the LCAP 1076 or from a RCS 1000. For example, SONY could make information updates using PCMS 1086 on-site at their booth and/or from their company's headquarters in Japan via a network connection such as the Internet 1080. Seekers 999 can obtain the Content from a LCAP 1076, FIG. 3 or off-site within a RCAP 1006.

The Content Source Subsystem

The Content Source Subsystem is comprised of three high-level Content contributors:

1. A "COPP" or Central Office Production and Processing, 1070, FIG. 4—is the location for the "CCS" or COPP Content Server 1114 and the facility for collecting, examining, modifying, and policing all Content. This Content can come from an "RCS" or Remote Content Source 1000, a LCAP 1076, the COPP 1070 itself, and/or a Seeker 999 at a RCAP 1006.

Information or Content that gets modified, aggregated, or tagged is called "TAC" 184 or Tagged and Aggregated Content. Content at the COPP 1070 generally gets processed and has the appropriate TAC 184 added before it's distribution to CAPs 1004. Additional TAC 184 can be added at the CAP 1004. Examples of TAC 184 would be creating "FLT" 186 or Foreign Language Translations, "D-FACS" 874 or Data-From Automated Computer Sensors, "MUN" 878 or Match-Up Notifications, or location-aware data called "PBI" 180 or Proximity-Based Information (see "More on Content Source Subsystem" later).

2. An "RCS" or Remote Content Sources, 1000, FIG. 4—defines remote third-party Content contributors, such as retailers, manufacturers, news feeds, advertisers, and other commercial entities that do NOT provide on-site public access to their internal Content or third-party database 1116. Some RCS 1000 locations strictly provide Content, while RCS 1000 providers also make modifications and/or monitor Content usage. Internal Content modifications at a RCS 1000 are typically synchronized with the COPP 1070.

3. A "CAP" or Content Access Provider 1004—is any location that distributes Content to an Interaction Subsystem of Seekers 999, but a CAP 1004 can also collect Content from the environment and from the Seeker's 999 usage. FIG. 4 shows some of the different types of CAPs 1004 (a MAP or Mobile Access Provider 1020, a MOC or Mobile Online Connection 1022, a ROC or Remote Online Connection 1024, and a SAP or Stationary Access Provider 1026). Both a MAP 1020 and SAP are LCAPs 1076. A LCAP 1076 generally stores and distributes Content that resides on a "LCS" 1136 or Local Content Server, but these servers can also accept or create new Content, new modifications, and monitor Content locally using the PCMS 1086. Content modifications made on-site are stamped as "local modifications" and are typically synchronized with the COPP 1070 as needed. A CAP 1004 receives Content that has been allocated by the COPP 1070 for its specific CAP-type (MAP 1020, MOC 1022, ROC 1024, or SAP, explained more later).

Figure 5:
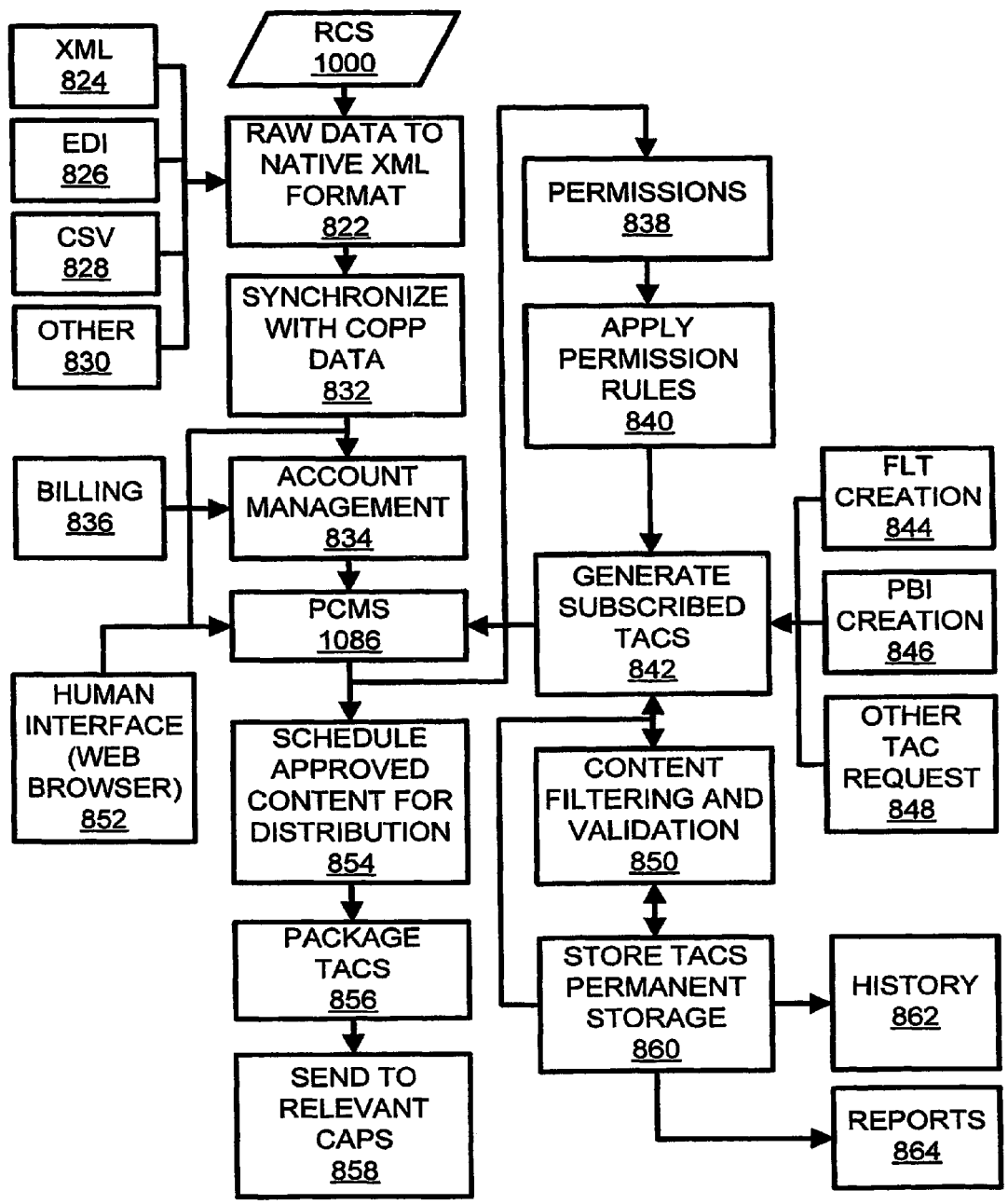
FIG. 5 is a flow chart depicting raw data from the RCS 1000 through the COPP 1070 sub-system.

FIG. 5 is a flowchart showing one embodiment of how data from retailers and manufactures is received via an Internet connection at the COPP 1070, updated and expanded at the COPP 1070, and sent to assigned CAPs 1004. RCS 1000 data is received or collected via the Internet in XML 824, EDI 826, CSV 828, or Other 830 formats and the raw data is then converted 822 to a proprietary format of XML. One example of data from the RCS 1000 would be raw inventory data. This inventory data could represent a multitude of stores within a single chain or a multitude of sources within an organization. The incoming raw data to proprietary XML format data 822 is then synchronized with the existing COPP data 832.

Data can be received and/or modified using a Standard Web Browser with Internet Access 852, using PCMS 1086. This data along with the raw data for the RCS 1000 then moves on to the Account Management 834. Account Management 834 will retrieve information from billing 836 to check conditions on the specific RCS 1000 account or account logged in from the Human Interface 852 to determine if said account is in good standing. Such conditions could include such items as the financial standing of the account, proper grammar usage, spelling, the number of characters within a particular field, price verifications, and many other conditions can be run against the new and updated Content. In addition, accounts or content that were found not to be correct or in good financial standing could be flagged, warned, and/or notified for collection. If the account content is in good standing the data is then passed on to the PCMS 1086.

PCMS 1086 will then check permissions 838 for the account, as to what type of data can be updated such as the descriptions, pictures, audio clips, video clips, and other elements. Once permission levels are established permission rules 840 are applied to the data.

The TACs 184 are then generated 842 from FLT creation 844, PBI Creation 846, and Other TAC Request 848. The TACs 184 then moves on to Content Filtering and Validation 850 to ensure proper content conditions, such as grammar, spelling, the number of characters within a particular field, price verifications, and many other conditions have been met. This information can be run against the new and updated content.

The TACs 184 are then submitted to permanent storage 860. Once in permanent storage the history database is updated 862 and reporting 864 is made ready to include this new data in any new reports generated. The PCMS 1086 will use Generate Subscribed TACs 842 to pull TACs 184 from Permanent Storage 860. The TACs 184 are then scheduled for distribution 854. TACs 184 generated from the Human Interface 852 will be scheduled according to the user's input or those pre-established by those with proper permissions. TACs 184 generated from the RCS 1000 data will be scheduled according to a predetermined schedule set in place by the LCAP 1076 (i.e. weekly or daily). According to schedules the individual TACs are Packaged 856 together in one file, and sent to the relevant CAPs 858.

FIG. 6 describes a high-level component set of a COPP 1070 and an LCAP 1076. COPP 1070 and LCAP 1076 are a combination of programs written in a standard Object Oriented Programming language such as Java, C++, or any other similar language. Resulting programs can run on an industry standard application server. An example of such an application server can be BEA's WebLogic server, IBM's WebSphere, JBOSS Server, or Apache Tomcat. COPP 1070 programs consists of CCS 1114, PCMS 1086, XML 904, Reports 908, Billing 910, Accounts 912, Permissions Layer 914, and a Persistence Layer 916. In addition an enterprise level database program is used to store content. These various components communicate among each other using an industry standard TCP/IP protocol 906 or a similar protocol.

LCAP 1076 programs consists of Proximity Estimator 1142, Queuing 1030, PCMS 1086, LCS 1136, XML 904, Persistence Layer, Database system, and communicates with third party systems available on-site. In addition, TO-U 200 communication transceivers are also LCAP 1076 components. An example of third party systems can be a POS 178 (Point-of-Sale), INVENTORY System, Asset Management System and other systems. These various programs also communicate between each other using an industry standard TCP/IP protocol 906 or a similar protocol.

COPP 1070 and LCAP 1076 are two separate systems with an established relationship. COPP 1070 could communicate with LCAP 1076 using a standard encrypted SSL 914 communications link via the Internet 1080. SSL 914 over Internet 1080 transport protocol allows for two systems to communicate with each other securely in a standard industry known manner. Other secure transport means could be used to secure communication data. Securely, typically means data traveling over the Internet 1080 is not available for someone to read in plain text.

Communications between COPP 1070 and LCAP 1076 allow for both components to synchronize their data For example, if a Remote Content Provider 1000 updates product information within COPP 1070, depending on scheduling mechanisms, this updated product information is delivered to LCAP 1076, therefore keeping both COPP 1070 and LCAP 1076 in sync. Received product information will be stored using commercial database software 1138 with the help of a Persistence Layer 916. This product information, now residing at the LCAP 1076 commercial database software 1138 is available via PCMS 1086 for distribution to Seeker 199.

On the other hand, a Content Provider at the LCAP 1076 could update product information as well. In this situation LCAP 1076 will communicate such changes back to the COPP 1070 based on LCAP's 1076 synchronization mechanisms. Similarly product information transmitted to COPP 1070 will be stored within the commercial database software 1116 with the help of a Persistence Layer 916.

COPP 1070 components CCS 1114, PCMS 1086, XML 904, Reports 908, Billing 910, Accounts 912, and others are independent programs residing externally to a commercial location. LCAP 1076 components Proximity Estimator 1142, TO-U 200, Queuing 1030, Persistence Layer 916, PCMS 1086, LCS 1136, XML 904, internal systems on-site 1032, and others reside within a commercial location.

Figure 7:
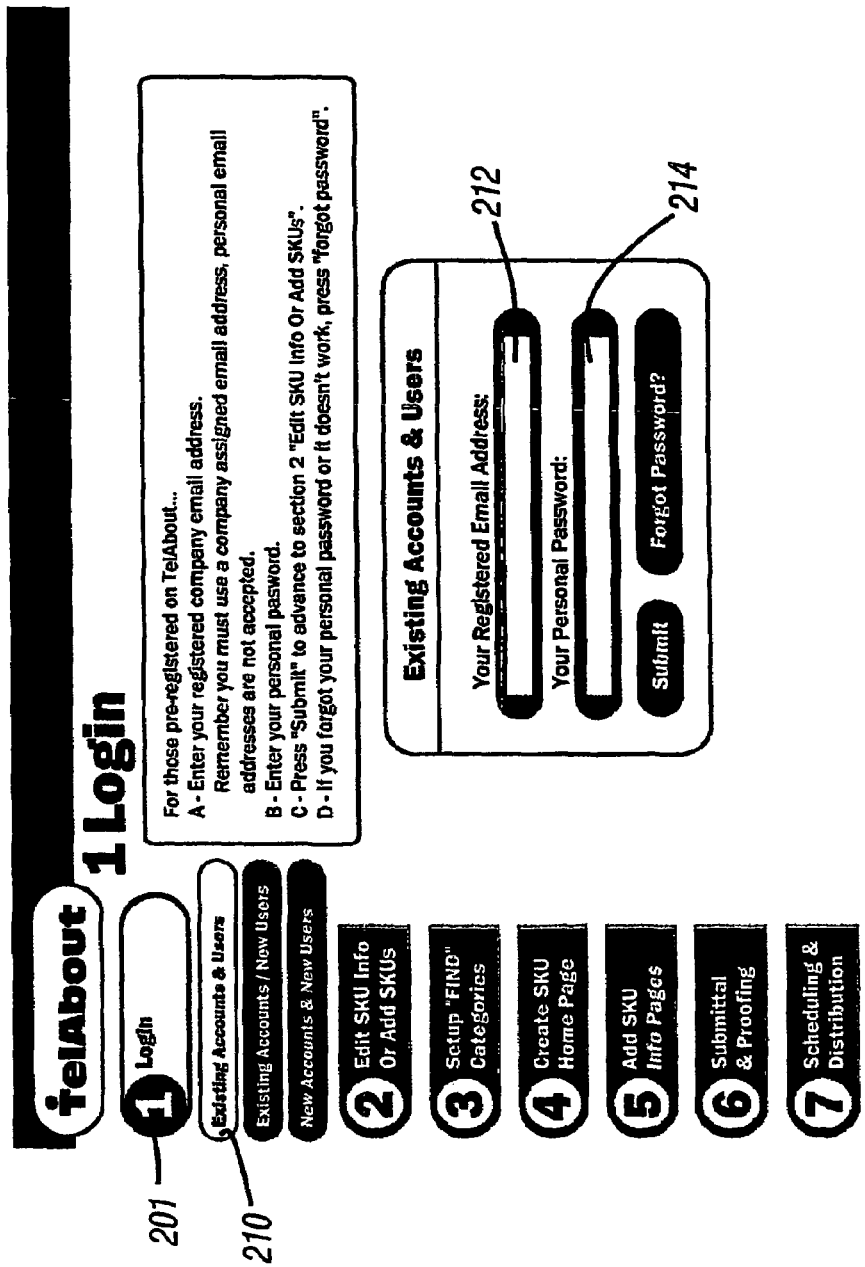
FIG. 7 illustrates a Login screen for PCMS 1086.

FIG. 7 shows the portal a Mfr. or manufacturer would use to create, upload, modify, and/or monitor content. This portal the Mfr. logs into provides the Mfr. access to the PCMS 1086, FIG. 5.

Figure 8:
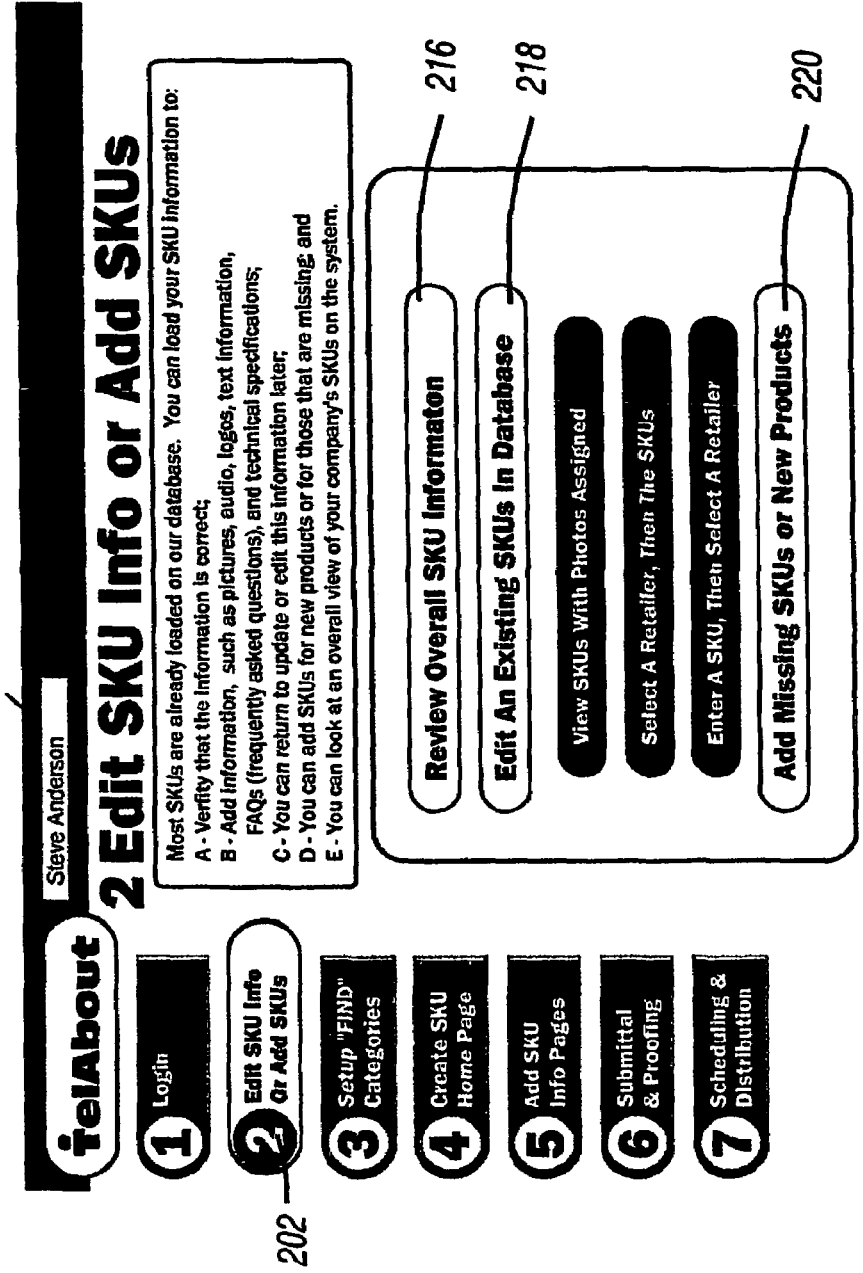
FIG. 8 illustrates an Edit SKU entry screen using the PCMS 1086.

For example, the Mfr. could go online remotely via the Internet and select the appropriate login, such as an "Existing Accounts & Users" button 210 FIG. 7, and logs in to the PCMS 1086 with their company assigned email 212 and an authorized password 214. Functions and capabilities are assigned per login type and per user. FIG. 8 shows the user's name 274 appears at the top after logging in. The PCMS 1086 can perform many functions. These functions depend on who is logged-in.

A Mfr. can choose between many functions with the PCMS 1086, such as a list of retail stores, a list of SKUs or Stock Keeping Units, their billing status, their PCMS 1086 usage history, and Seeker 999 usage of their Content. From FIG. 8, the Mfr. could select the "Edit An Existing SKU(s) in Database" button 218 to edit an SKU's Home Page (see below) or the Mfr. could select the "Add Missing SKU(s) or New Products" button 220 to potentially add new SKUs to the database.

SKU Home Page

Figure 15:
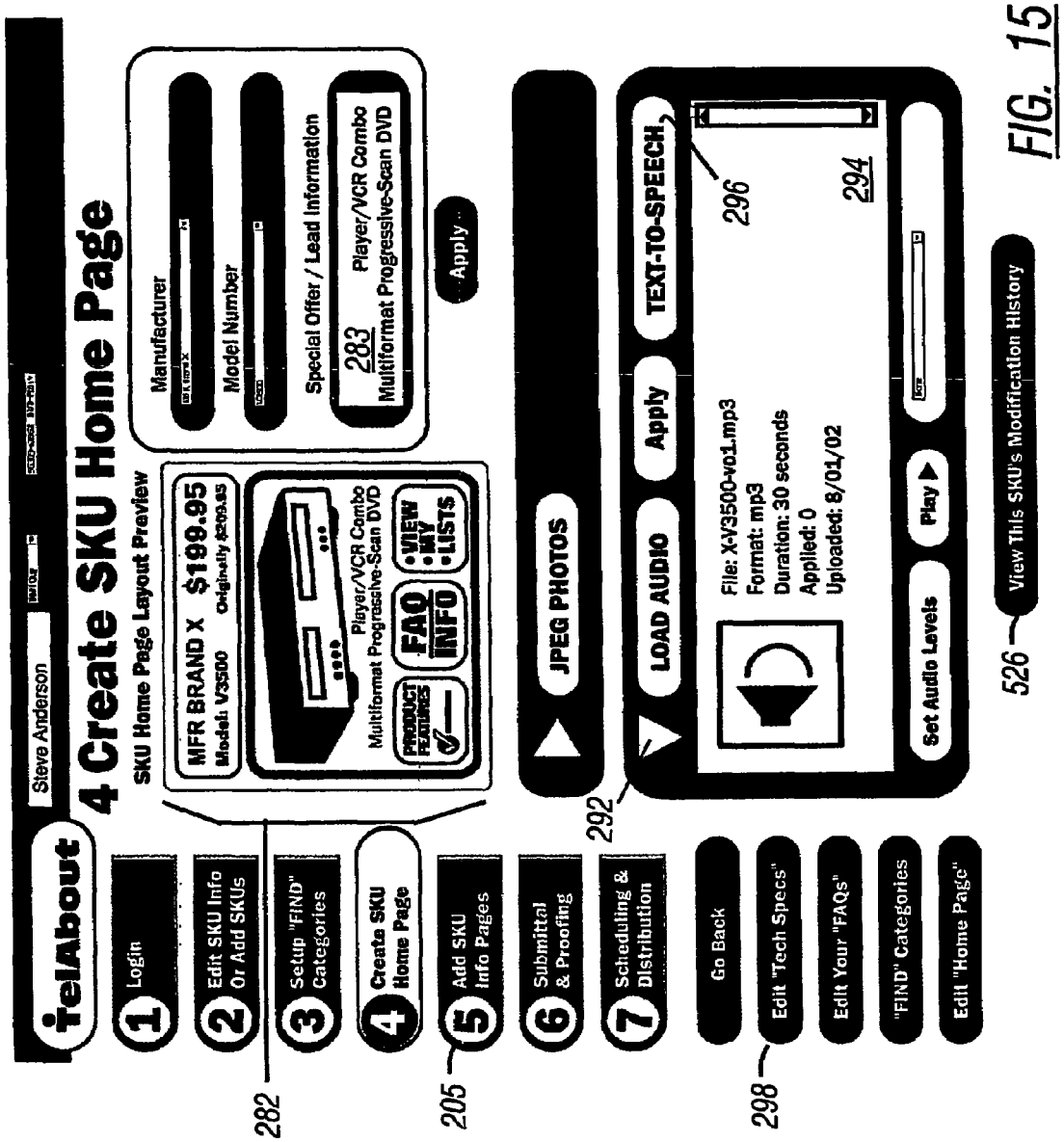
FIG. 15 illustrates a Create SKU Home Page for adding multimedia such as, Audio within the PCMS 1086.

A SKU's home page is typically the first page that a Seeker 999 brings up when using the GO-UI 199 on his TO-U 200 for said SKU while within a LCAP. FIG. 15 show a "SKU Home Page Layout Preview" 282. A Seeker 999 can bring up a SKU home page by a number of means, such as with a bar code scanner or other methodology developed now or in the future or by manually entering a code. Typically a SKU home page can be generated from data pulled from a retailer's database without any Mfr. participation, but the Mfr. can create new Content, modify existing Content, remove Content, and/or monitor Seeker 999 usage using the PCMS 1086 from an RCS 1000.

Figure 9:
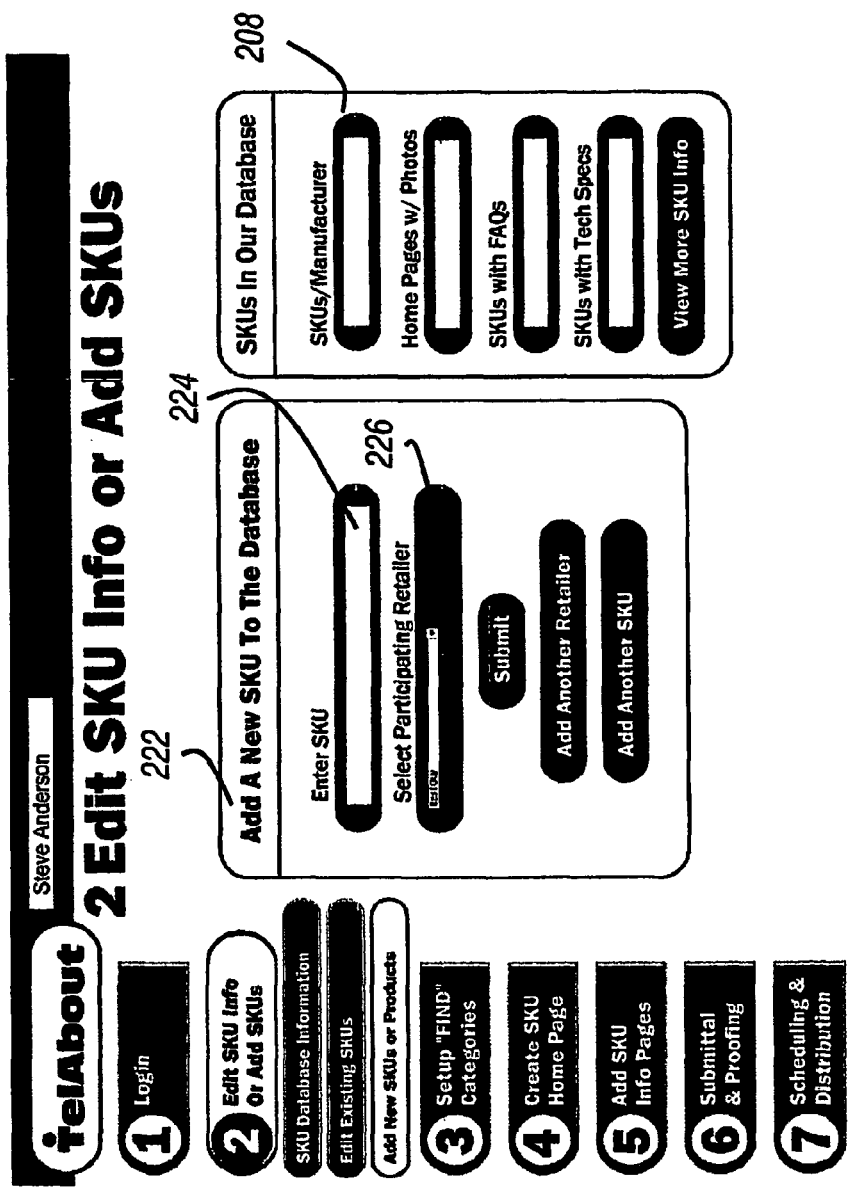
FIG. 9 illustrates an Edit New SKU editing screen using the PCMS 1086.

FIG. 9 shows the number of SKU per Manufacturer 208, depends on what is selected under "Select Participating Retailer" 226. With all retailers in the database selected, the number in the "SKUs/Manufacturer" field 208 would be all the SKUs in the database for the logged-in Mfr. Whereas, if the Mfr. selected a particular retailer using the "Select Participating Retailer" drop down menu 226, the number of SKUs/Manufacturer results field 208 would be those known SKUs in the database for the designated retailer.

FIG. 8, shows Section 2, "Edit SKU Info or Add SKU" button 202. From here, a Mfr. can select the "Review Overall SKU Information" 216, "Edit An Existing SKU(s) in Database" 218, and, for this example, select "Add Missing SKUs or New Products" 220. FIG. 9, shows the menu entitled "Add A New SKU To The Database" 222, where the Mfr. can enter a SKU 224 to see if it is in the database or the Mfr. can "submit" the SKU to add it to the database.

This ability for the Mfr. to enter SKUs might occur with new products that are not in the retailer's database yet. If retailers wanted, they could allow a Mfr. to provide in-store Seekers 999 information regarding new products, even before the product is available within the stores. By the Mfr. submitting a SKU that is not in the database, the COPP 1070 can review it based on a list of conditions set by a retailer and/or the COPP 1070 could forward it to the appropriate retailer for database inclusion permission.

Figure 10:
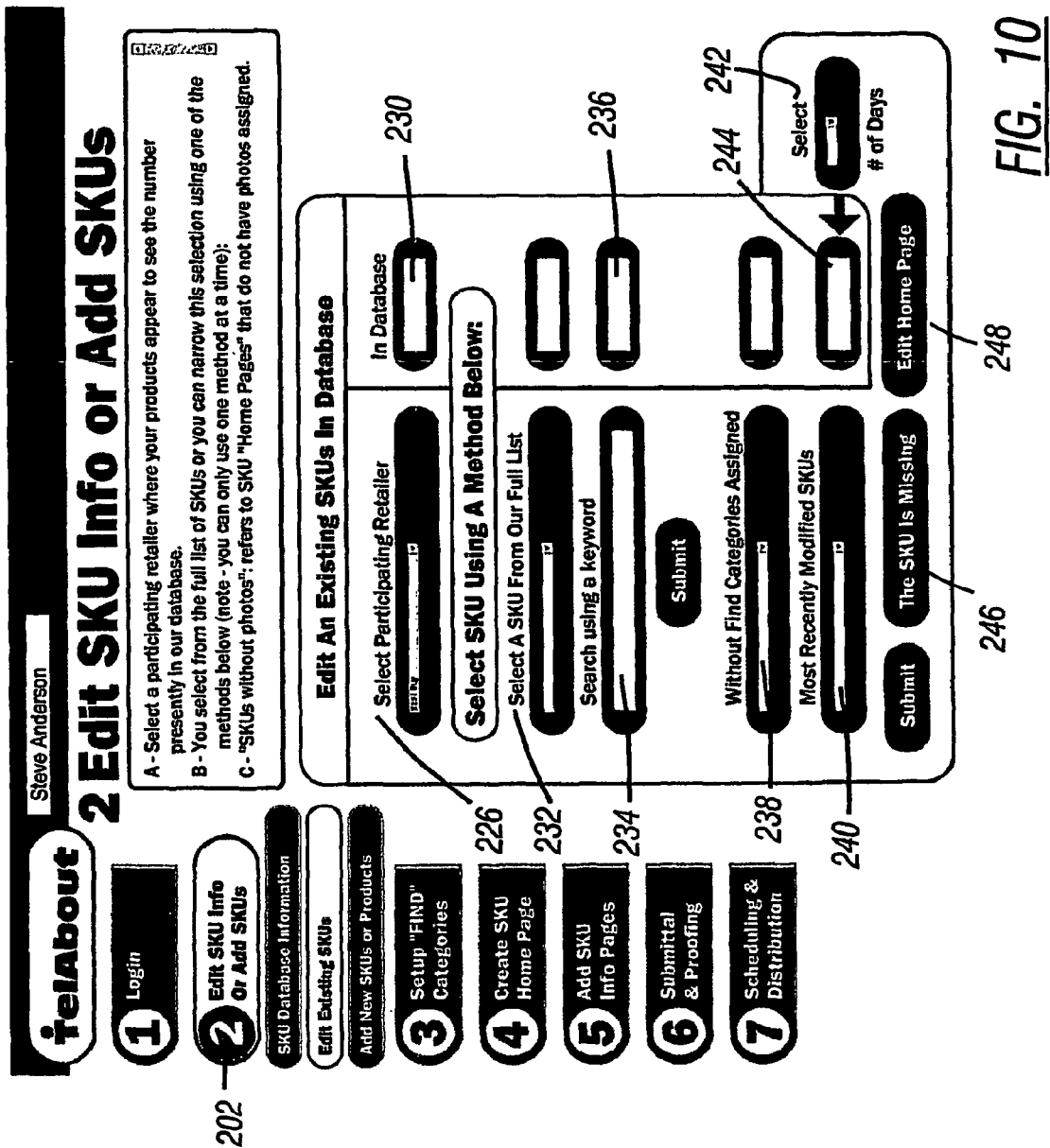
FIG. 10 illustrates an Edit Existing SKU editing screen using the PCMS 1086.

If the Mfr.'s SKU was already in the database and available from the PCMS 1086, the Mfr. could select the button "Edit An Existing SKU(s) in Database" 218, back on FIG. 8. FIG. 10 shows the next screen where the Mfr. could then use the "Select Participating Retailer" search 226 to see a list of SKUs for that particular retailer. For example, the Mfr. could select a single electronic retail chain that sells the Mfr's refrigerators from the drop down menu. After the selection, the Mfr. would see the number of SKUs within that the retailers chain that are known to belong to the Mfr. by looking at the "SKUs/Manufacturer" field 230.

The Mfr. could then use the pull down menu "Select A SKU From Our Full List" 232 or the Mfr could narrow the search by using the "Search Using a Keyword" field 234, ideally, using keywords that would likely appear in the database and that are assigned to a particular SKU that the Mfr. would like to retrieve. The database contains several terms including short product descriptions. For example, by entering "DVD" and pressing "submit" the Mfr. would see the number of SKUs in the Database that met that criterion in the window 236.

Figure 11:
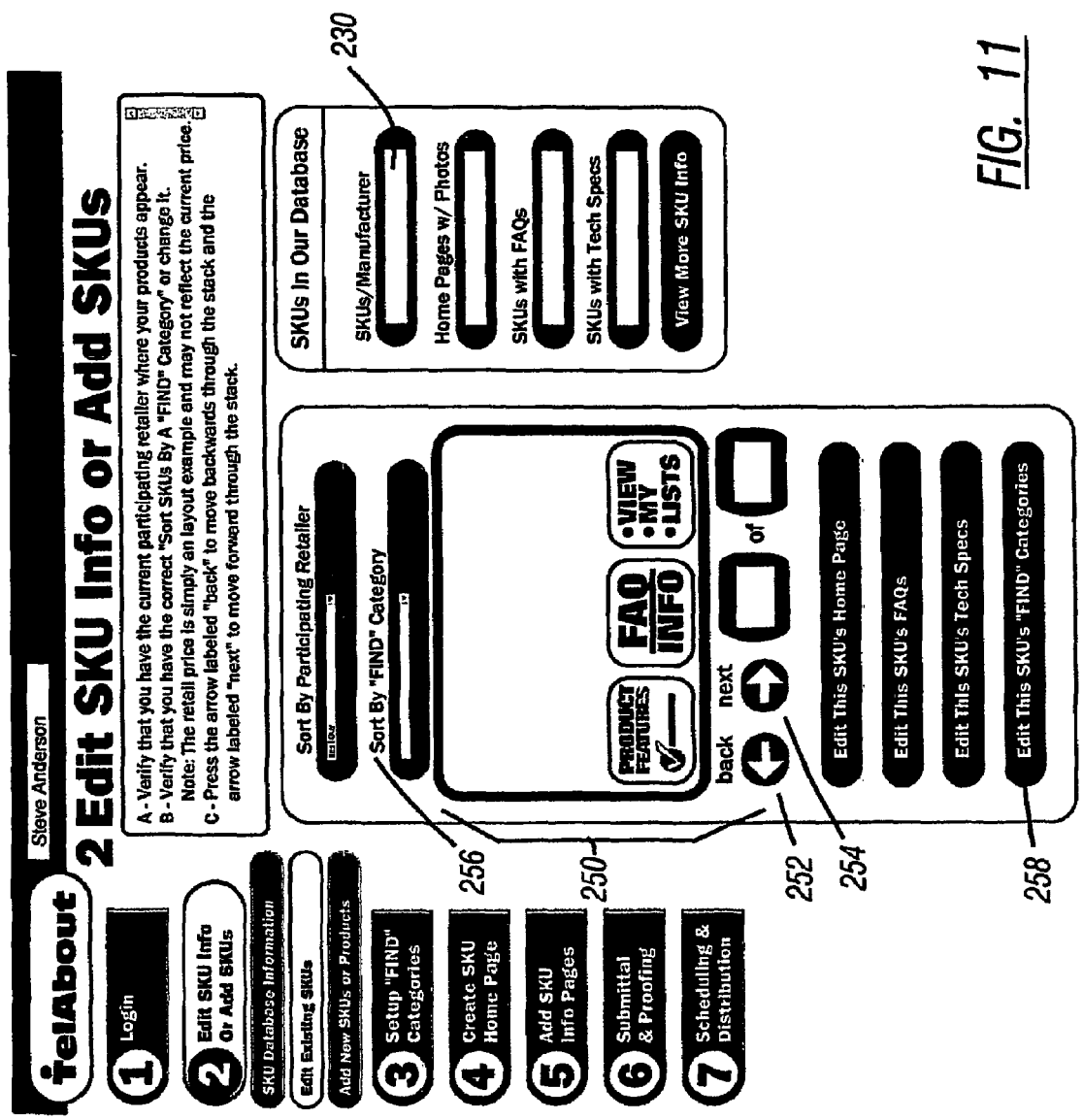
FIG. 11 illustrates an ability to search for an SKU visually using the SKUs Home Page within the PCMS 1086.

If the desired SKU is missing the Mfr. can press "The SKU is Missing" 246 button or enter the SKU with the procedure outlined above under select "Add Missing SKUs or New Products" 220. If the Mfr. found a specific SKU the Mfr. wanted to edit, the Mfr. could select "Edit Home Page" 248, FIG. 10 (explained later). If the Mfr. wanted to see the list of SKUs created from one of the above-neared searches, the Mfr. would press "Submit" and see a browser window 250, FIG. 11.

Using the "Back" 252 arrow and the "Next" 254 arrow, the Mfr. can navigate from a list of SKUs visually. This browser window 250 would show the Mfr. which photo are assigned to the SKUs the Mfr. selected in the previous section and which SKUs do not have photos assigned to them. The Mfr. can narrow the search using "Sort By 'FIND" Category" 256. Once the Mfr. selects a SKU that the Mfr. would like to modify the Mfr. can use the buttons below the browser window 250, such as "Edit This SKU's FIND Categories" 258.

"Find Mode" Categories

Figure 12:
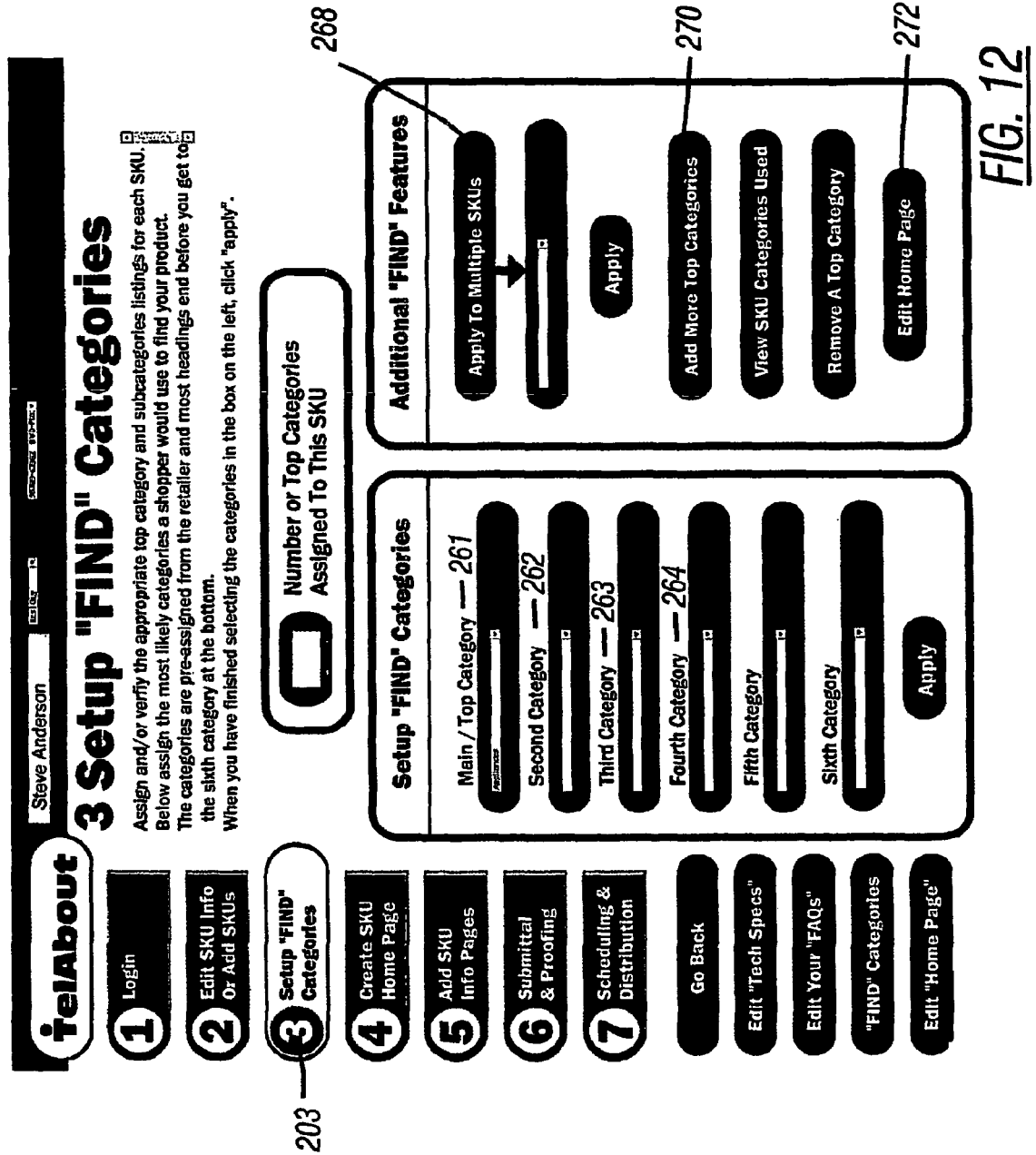
FIG. 12 illustrates a Setup Find Categories screen within the PCMS 1086.

The Mfr. can assign or modify the "Find Mode" categories in section 3 or the "Setup FIND Categories" 203 section, FIG. 12, for any of their SKUs that reside in the database. The "Find Mode" categories are those subject headings used by a Seeker 999 when navigating the GO-UI 199 hierarchy for product categories at a CAP 1004 or a retail store. For example, a refrigerator Mfr. could assign the "Main/Top Category" 261 to a specific refrigerator that the Mfr. manufactured as "Home Appliances", the subsequent or secondary category 262 to "Kitchen Appliances", and the third category 263 to "Refrigerators".

The retailer would typically predetermine these "Find Mode" categories, so that the Mfr. can simply select from a list of pull-down options that best describe the appropriate category and any subsequent levels. Ideally, the Mfr. would assign these "Find Mode" categories until the categories were exhausted. So if there was a subsequent or fourth category 264, for further breaking down refrigerator types by something such as the door styles, the Mfr. could make that selection as well.

If on the other hand, the fourth category 264 was unavailable, the Mfr. could assume that they had exhausted the "Find Mode" categories at three for this product. If the "Find Mode" Categories assigned to one SKU also applied to others, the Mfr. could use the "Apply To Multiple SKUs" 268 to use the setting on the appropriate SKUs.

If more than one category can describe a product/SKU, the Mfr. could list the SKU under multiple "Find Mode" categories by using "Add More Top Categories" 270. For example, a multi-function printer/fax/phone could appear under the "Find Mode" categories of electronics/peripherals/printers; while also appearing under the "Find Mode" category phones/fax machines/multi-functional devices. Once the Mfr. was satisfied with the "Find Mode" categories for a particular SKU, the Mfr. could select "Edit Home Page" 272, to edit the SKU's home page.

Figure 13:
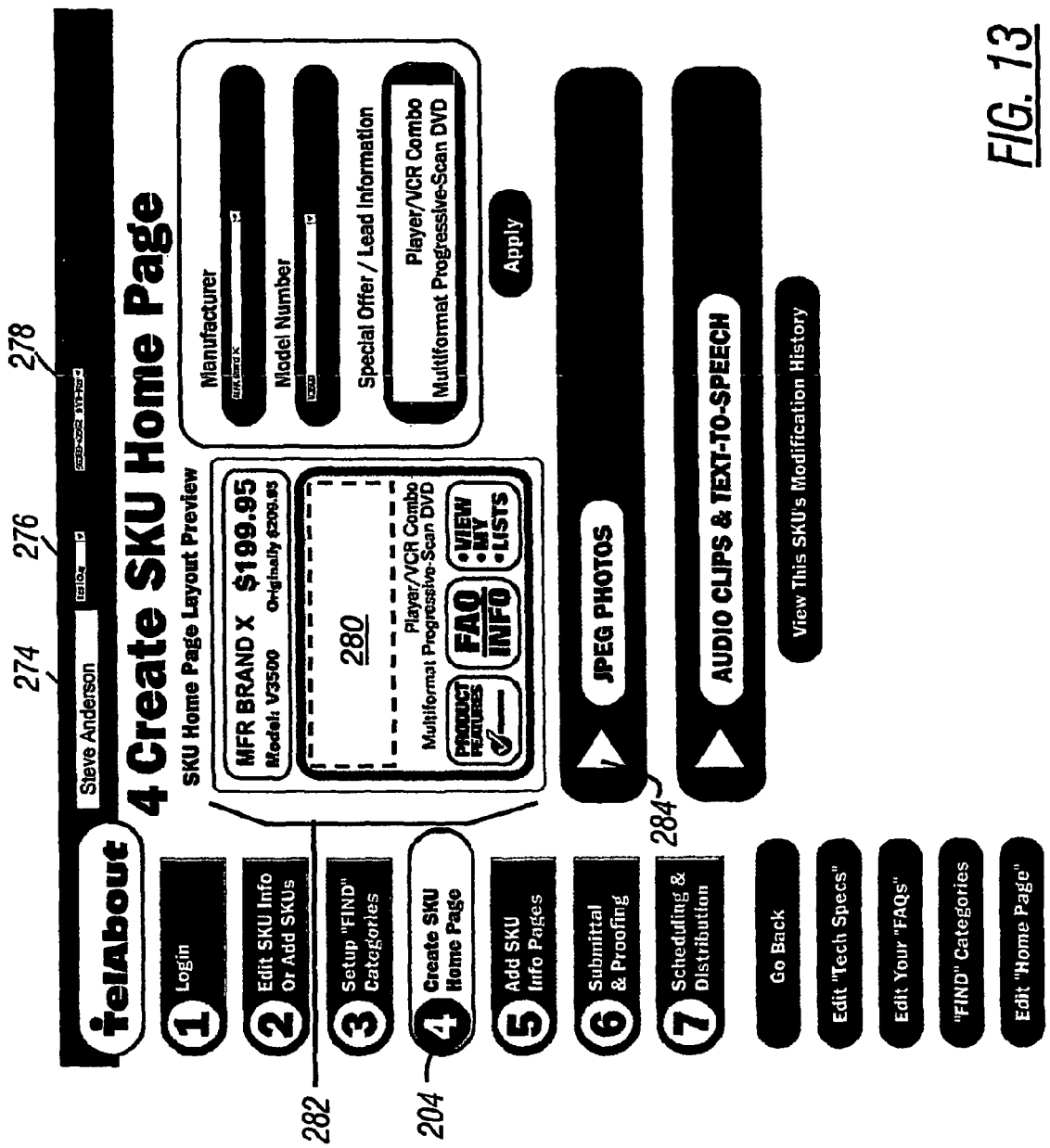
FIG. 13 illustrates a Create SKU Home Page within the PCMS 1086.

FIG. 13, PCMS 1086 section 4, "Create SKU Home Page" 204, is where the Mfr. can create a new SKU home page or modify an existing SKU home page. At the top of the page is the name of the logged-in user 274, a retailer 276 where the SKU is currently being or going to be sold, and the actual SKU 278 number. If no image has been assigned to the SKU yet, there is no image in the dotted-line area, the area-reserved-for-images 280 in the "SKU Home Page Layout Preview" 282. The Mfr. can add an image using the "JPEG Photos" button 284 to browse images the Mfr. has access to on his network.

Figure 14:
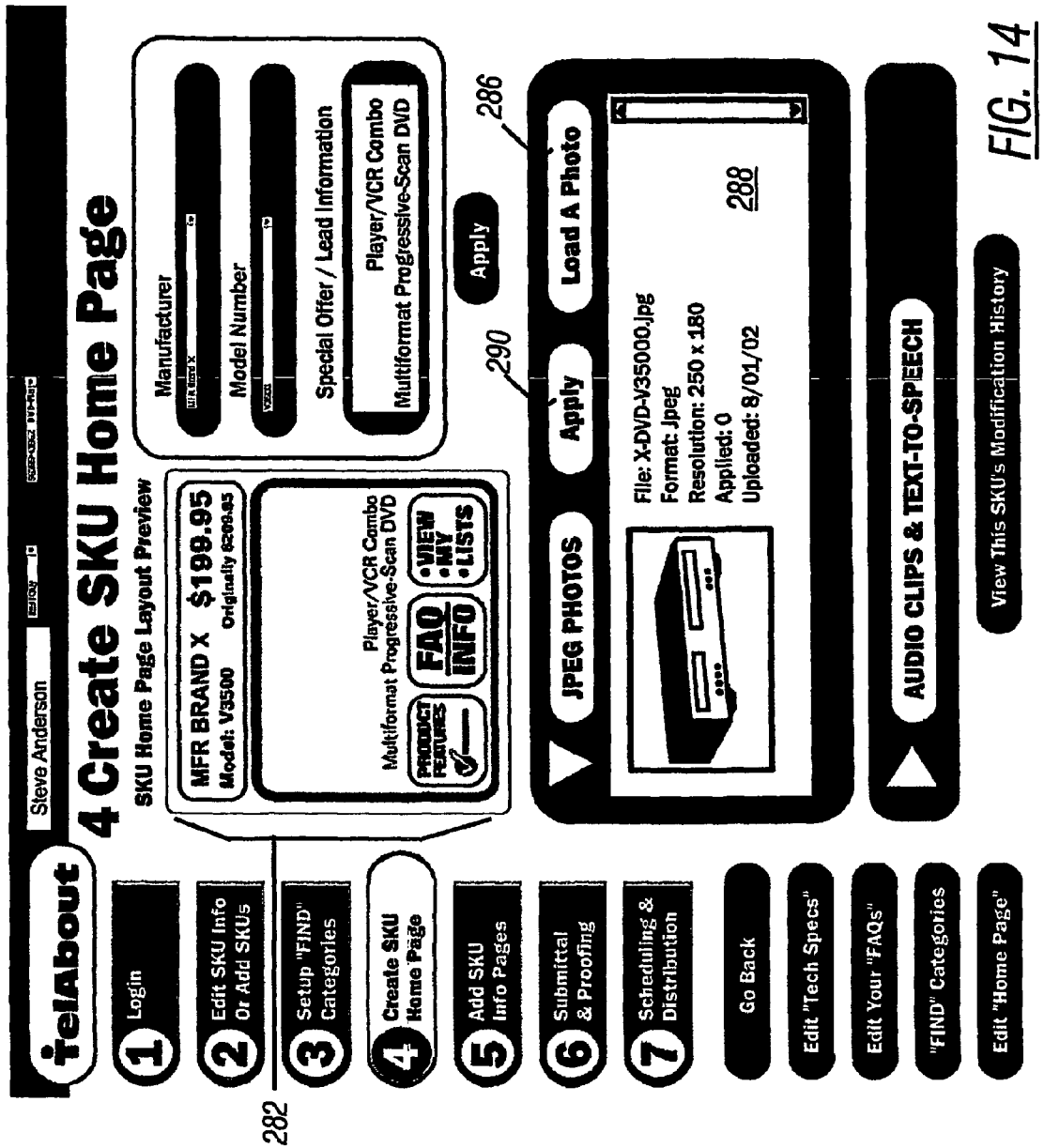
FIG. 14 illustrates a Create SKU Home Page for adding multimedia such as, Photos within the PCMS 1086.

The Mfr. can use the "Load A Photo" 286, FIG. 14, button to load an image that the Mfr. has created in advance or select any images that appear in the drop down 288 area that have been preloaded. When the Mfr. uses the "Load A Photo" 286 button, the images the Mfr. selects will also appear in the drop down 288 area. The Mfr. uses the "Apply" 290 button to update the "SKU Home Page Layout Preview" 282 area.

The Mfr. can also use the "Load Audio" 292, FIG. 15, button to load an audio clip that the Mfr. has created in advance or he may select any audio clips that appear in the drop down 294 area that have been preloaded. When the Mfr. uses the "Load Audio" 292 button, the audio clips the Mfr. selects will also appear in the drop down 294 area. The Mfr. can also select "Text-To-Speech" 296 to type in a text message that will get converted to audio. The audio the Mfr. selects can play automatically or be available for the Seeker 999 to select when the Seeker 999 is viewing the SKU home page while at a CAP 1004.

In the "Special Offer/Lead Information" box 283, the Mfr. can modify the text descriptions, such as the "Player/VCR Combo Multi-format Progressive Scan DVD" text that currently appears in the "SKU Home Page Preview" 282. This data may originally have been pulled from the retailer's database, but can be changed or modified by the Mfr. by typing in the "Special Offer/Lead Information" box 283. The Mfr. can use the menu entitled "View This SKU's Modification History" 526, FIG. 15 to see which SKUs in the database have been modified and by whom. The Mfr. can also create additional SKU information pages by pressing the page 5 button "Add SKU Info Pages" 205.

Figure 16:
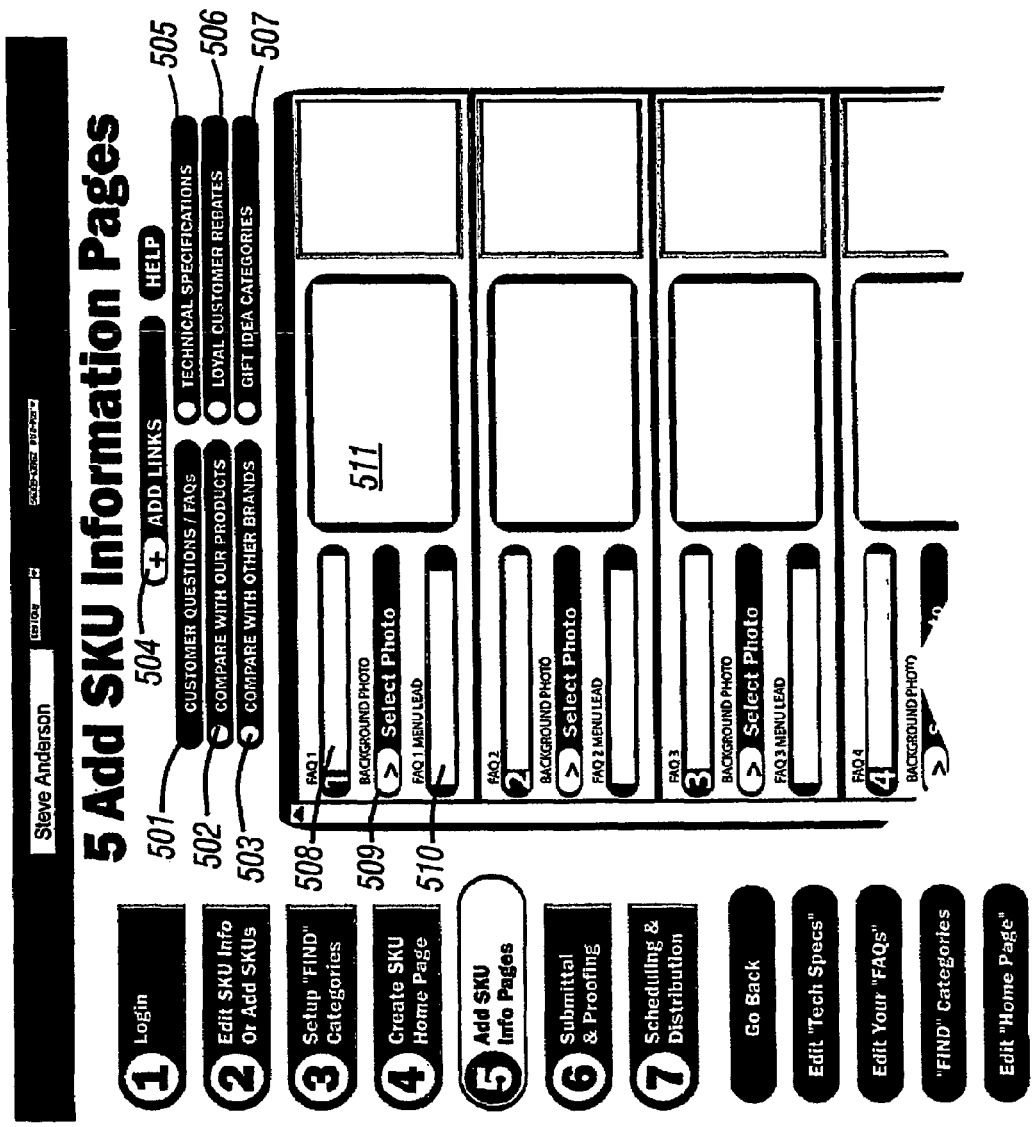
FIG. 16 illustrates an Add SKU Information Pages such as FAQ within the PCMS 1086.

In section 5 of the PCMS 1086 or "Add SKU Info Pages" 205, FIG. 16, the Mfr. can create, delete, review, and/or modify the "Customers Questions or FAQs" (Frequently Asked Questions) 501, "Compare with Our Products" 502, "Compare with Other Brands" 503, "Add Links" 504, "Technical Specifications" 505, "Loyal Customer Rebates" 506, and "Gift Idea Categories" 507 that are associated with a particular SKU's home page. Using the FAQs 501 for example, a car Mfr. could create a list of FAQs that would be available from the SKU home page of a particular car model X, at a CAP 1004 or system-enabled car dealership LCAP 1076. This list can be based on conditions set by the COPP 1070 and the LCAP 1076 and/or as large a list as the Mfr. is willing to pay for.

Today, FAQ (Frequently Asked Questions) postings found on many manufacturers' websites lack validity as sources of reliable information. Often there are no standards for posting FAQs and some sites try to disguise suggestive sales efforts as FAQs. Consequently, consumers are often left questioning the source, validity, and the popularity order of the FAQs on many websites. In addition, it is rare that the consumer can add their own FAQs or feedback to these sites.

Using the PCMS 1086, ideally the Mfr. would initially create a list of FAQs that they believe will best help Seekers 999 understand the Mfr.'s product(s). For example, the car Mfr. could create an FAQ list starting with question number one that reads, "What is the base price of the car?" The car Mfr. could then input the answer, "$25,408" and a potential lead question that would guide the Seeker 999 to additional information such as a price breakdown of additional features. The car Mfr. could continue these four components: 1) the question 508, 2) the answer 511, 3) associated media 509, and 4) the menu/lead question 510 that leads a Seeker 999 to additional information or a series of related questions. The Mfr. could then be assessed a fee, for example, based on the number of questions and/or the amount of information.

Figure 18:
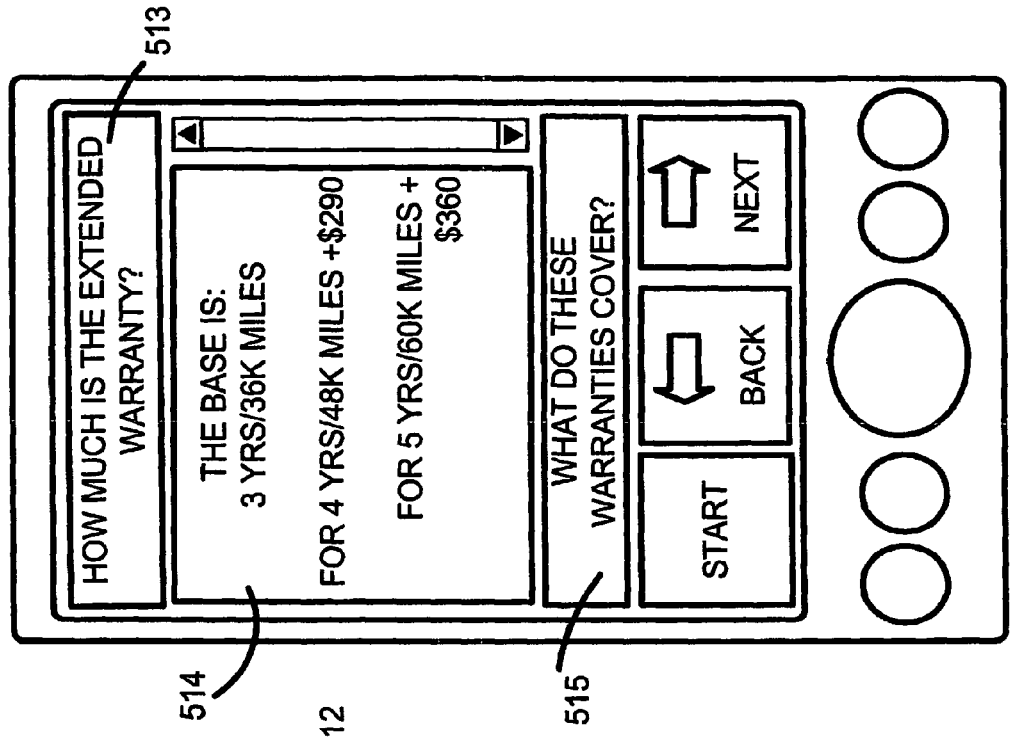
FIG. 18 illustrates a GO-UI 199 FAQ Answer page.
Figure 17:
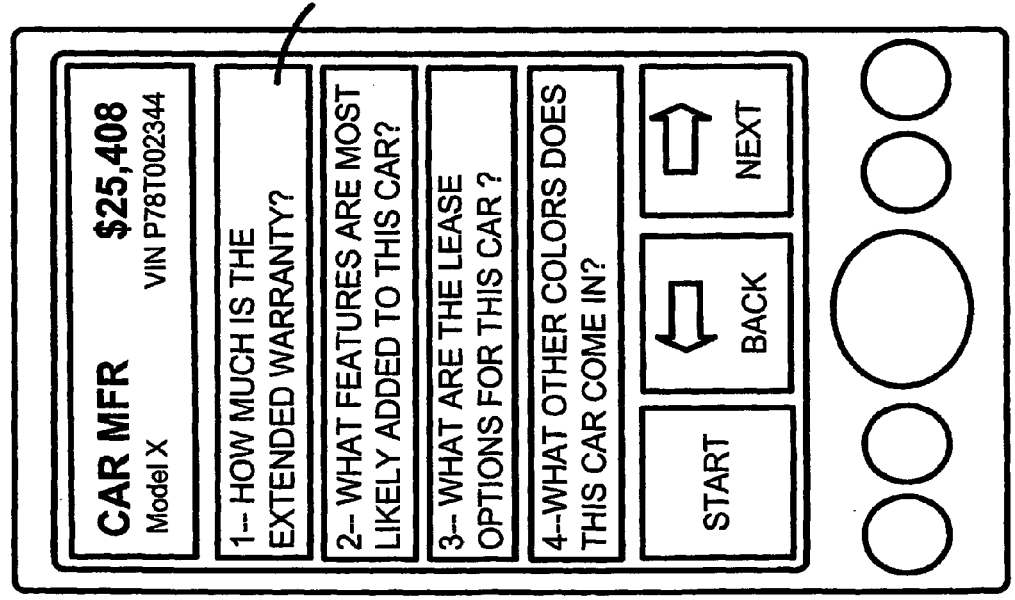
FIG. 17 illustrates a GO-UI 199 FAQ Questions page.

The Seeker 999 usage could dictate the order that the FAQs appear on the GO-UI 199 on the TO-U 200. For example, if the car Mfr. had a FAQ that said, "How much is the extended warranty?" placed at FAQ number four, but it was the most popular requested FAQ among Seekers 999, the FAQ could move up to number one as in FIG. 17, "GO-UI FAQ 1" 512 which illustrates the GO-UI 199 that would appear on the Seeker's TO-U 200. The Seeker 999 could press this button "GO-UI FAQ 1" 512 and bring up the answer that appears in FIG. 18. The FAQ that the Seeker 999 requested appears at the top as button 513, the answer details appear in the scroll area 514, and the menu/lead question on the GO-UI 199 appears as button 515.

There could be a number of conditions placed on the ordering of the FAQs. The order of the FAQs for a particular item or product could be based on a number of factors, such as the number of requests made by Seekers 999 nationwide, Seekers 999 locally, or Seekers 999 within that particular car dealership. The order could also be based on historical information, such as the popularity of the FAQs when compared to last year, last week, some specific moment in time, or some selected time interval. A Seeker 999 could request the popularity order of the FAQs for a particular item over a select period of time. Such methods could allow the Seeker 999 to determine current popularity trends. For example the Seeker 999 may wish to know the popularity of a particular video release over the last two days opposed to the popularity since the video was released.

Additional conditions could be set that require a minimum number of Seeker 999 requests be made before reordering the FAQ order. This could help prevent misleading the Seeker 999 with popularity information that has an insufficient sampling size. For example, if the FAQs were simply rearranged based only on three Seekers' 999 usage, depending on the product, the next Seeker 999 could be looking at a list of FAQs that had been rearranged from an insufficient sampling. Consequently, the sampling rate could be set at a minimum number before rearranging the order of FAQs. This minimum number could vary by product.

Other parties beside the Mfr. could be allowed to include additional FAQs to the overall list, such as FAQs created by the retail headquarters, a retail manager, a retail employee, a Seeker 999, and/or other members of the Mfr.'s supply chain. For example, a retailer could add a FAQ that offers Seekers 999 the ability to learn about and purchase an extended warranty that reads, "How much for an extended warranty?"

Seekers 999 that have questions that are not on the FAQ list could give an employee of the retailer the question to input into the PCMS 1086, the retailer could allow the Seekers 999 themselves to add FAQs while in the store or from a computer anywhere online. Ideally, the Seeker 999 would look at a list of FAQ suggestions made by other Seekers 999 before adding their own. These suggestions could be voted on and added when they hit a certain threshold of requests. If a Seeker 999 did not see their question on the suggestion list, they could add it, but it would not necessarily appear until others also voted that it was needed.

Ideally, each suggested FAQ addition would be succinct so that other Seekers 999 would not be simply rewording the same question. It may be in the Seekers' 999 best interest to add votes to a suggested FAQ than to create a competing suggestion. For example, if a Seeker 999 would like to see a FAQ added that tells Seekers 999, "What is the life span of a particular cell phone's battery?" but another Seeker 999 has already suggested adding the question that says, "What is the talk time of this particular cell phone?" the Seeker 999 would have to decide if these questions were similar enough to add a vote to the "talk time" suggestion or create a new "life span" question that would be competing with this suggestion for other Seekers' 999 votes.

This system could be simplified if handled by the retailer's employees and may require conditions be met, such as additional approvals by the Mfr. and/or the retailer. Fees could be applied to this Seeker 999 FAQ input feature that not only improves the database for other Seekers 999, but also generates feedback that is highly localized. For example, the Mfr. might learn that Seekers 999 have different needs and different questions not only city-to-city, but at different locations within the same city.

The goal would be to create the perfect FAQ list that truly represents both the most frequently asked questions by other Seekers 999 and in the order that best represents their popularity. Ideally this list would be dynamic and the FAQ answers would be succinct and of the most benefit to the Seekers 999. In addition, Seekers 999 could leave feedback regarding the quality of the information and the answers that were made available. This feedback could also be made available to other Seekers 999 in many forms, such as in text, audio, emoticon scores, bar charts, and/or numeric scores.

Tech Specs

Figure 19:
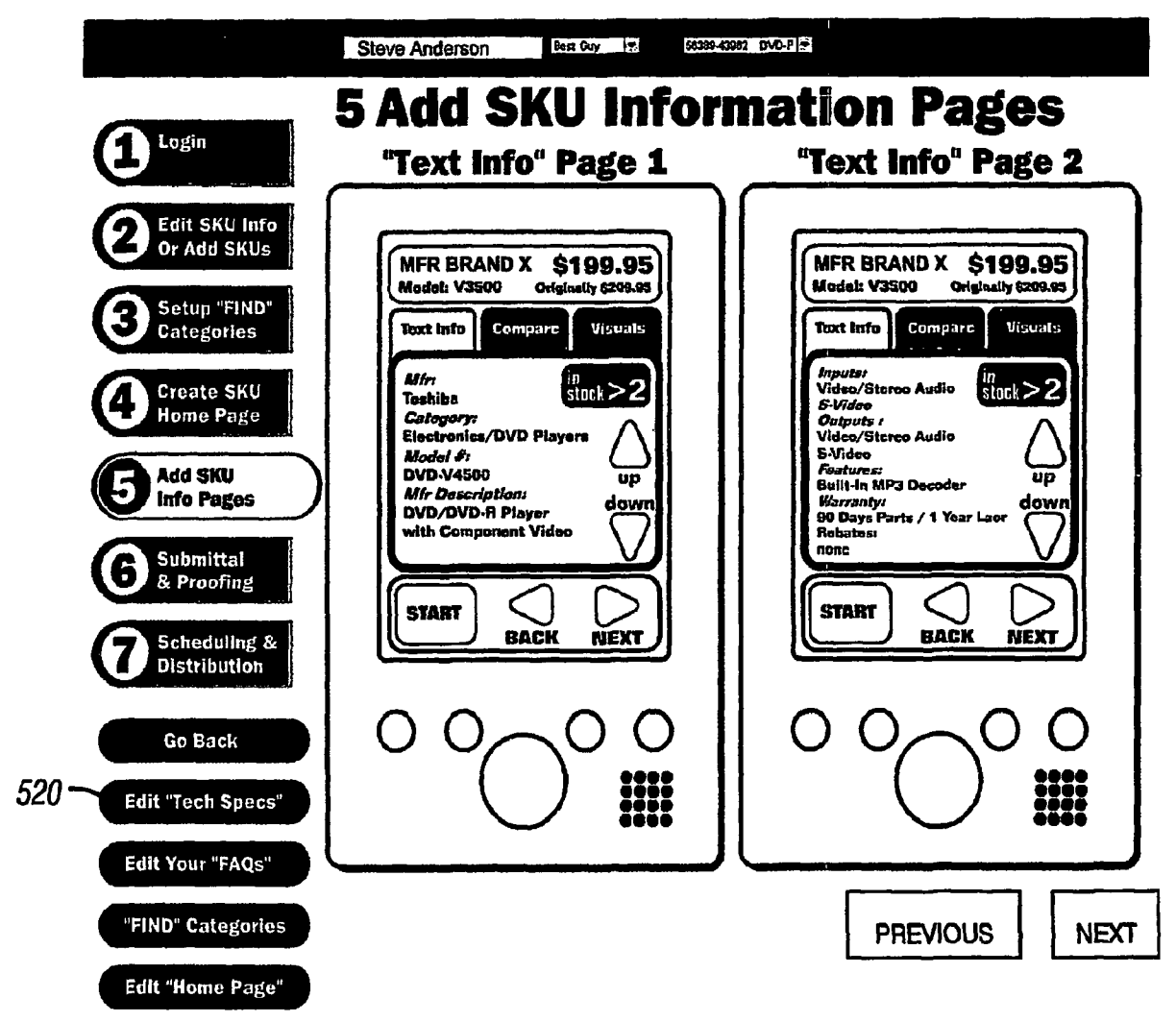
Figure 20:
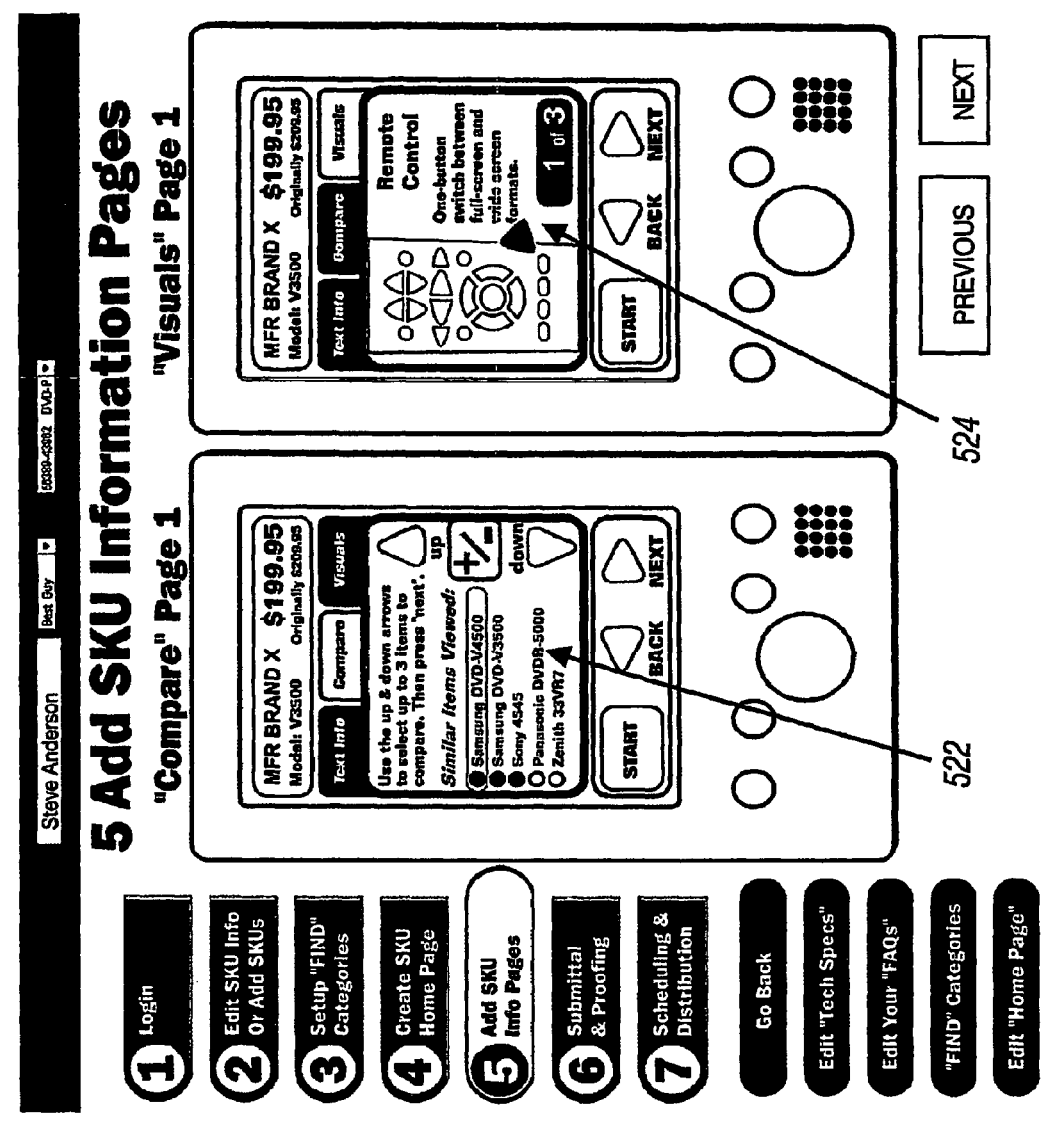

"Tech Specs" can include such things as detailed technical specifications in text form, the ability to do side-by-side comparison of other products, and other features that the Mfr. would like to highlight. These highlights could be such things as audio descriptions that could guide the Seeker 999 through a series of product features. FIG. 19, shows textual information that the Mfr. can add or modify using "Edit Tech Specs" 520. FIG. 20, screen 522, allows the Mfr. to build "Compare" functionality for the SKU and screen 524, allows the Mfr. to add visual and audio multi-media to the SKU, such as a slide show, video clips, and/or audio clips.

Submittal and Proofing

Figure 21:
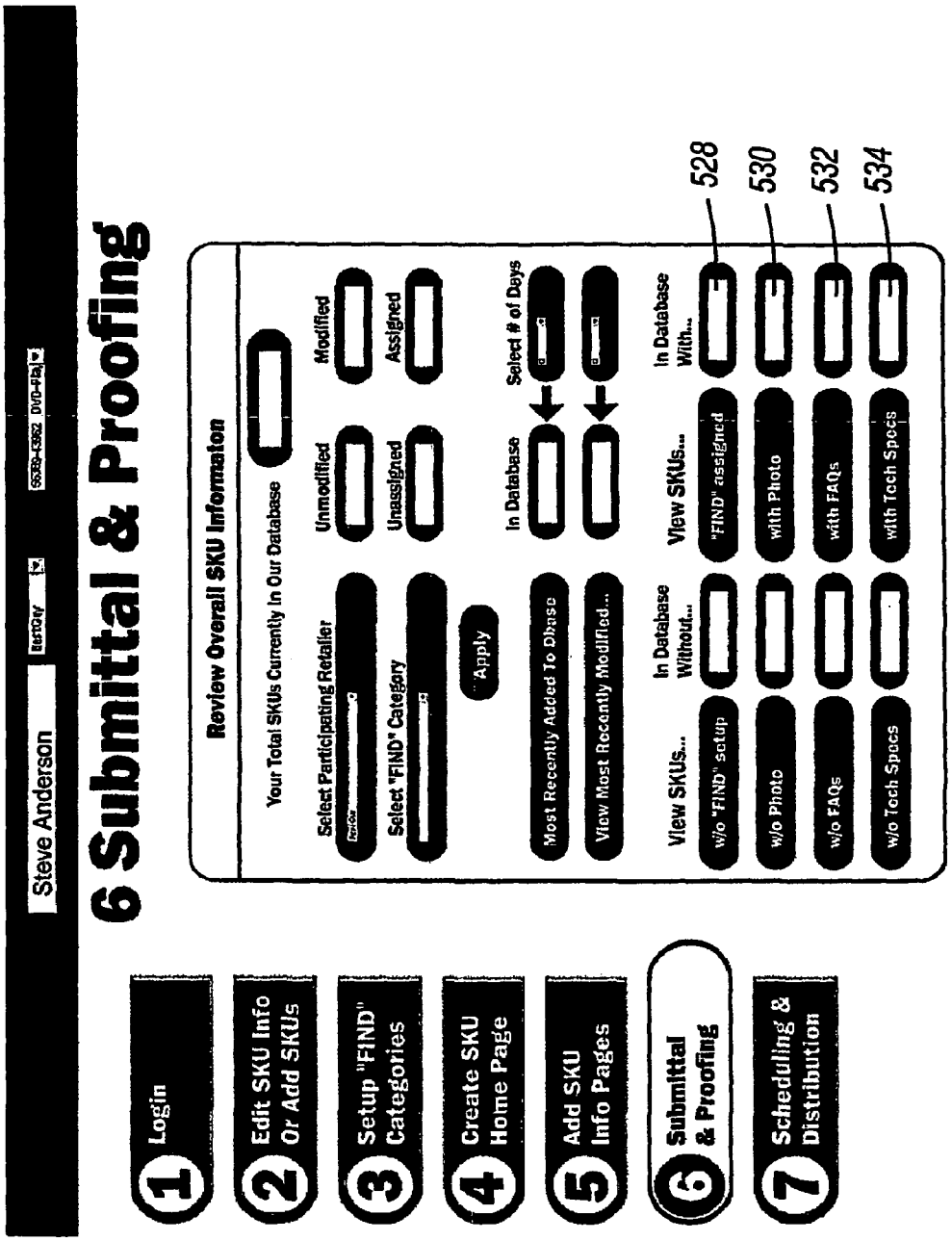
FIG. 21 illustrates a Submittal & Proofing screen within the PCMS 1086.

FIG. 21, modifications made within the PCMS 1086 could go through a series of conditions that can be established by such parties as the Mfr., the retailer, and/or other third parties. The "Review Overall SKU Information" section tells the Mfr. which SKUs have been modified and which have not. The Mfr. can bring up a list of SKUs that have been added to the COPP 1070 from the last time the Mfr. had logged-in to the PCMS 1086. The appearance of the list of new SKUs could appear similar to a list of emails that differentiates between messages that have been read and messages that are in bold because they have not been read.

The "Review Overall SKU Information" section also tells the Mfr. which SKUs have multi-media associated with them, such as photos 530, logos, audio, text-to-speech, speech-to-text, maps, video, and/or text. This multi-media information can include the quality and/or resolution of the media, file format, the size of the file, who added the Content, when the Content was added, and any fees associated with posting the Content, among other information. For example, a JPEG photo that is 100-499 kbps in size could require one fee, while a JPEG photo that is 500-999 kbps could require a different fee. The system could also establish standards for media and Content quality, so the Mfr. could see if any of their Content violates the standards.

Besides multi-media and SKU associations, the "Review Overall SKU Information" section tells the Mfr. which SKUs have "Find" 528 assigned, "FAQs" 532, and "Tech Specs" 534 associated with them. The Mfr. can also bring up a list of those SKU home pages that they have most recently been modified. The appearance of the list of modified SKUs could appear and then be sorted, similar to a list of modified files in a typical file structure that differentiates between files, not strictly by their "creation dates", but also based on when they were "last modified." This makes it easier for the Mfr. to review the history of their modifications versus when the SKUs first appeared on the system.

"Submittal and Proofing" also tracks what restrictions if any are on the Content. Restrictions can be set for a number of parties and can vary depending on the party. For example, restrictions on what changes can be made to the Content could originally be set by each retailer. The retailer could determine how many accounts the Mfr. would have, what time of time day the changes would take effect or if they would happen in near-real-time, what fields in the database the Mfr. could adjust, and if the Mfr. could reassign responsibilities to other third parties.

The Mfr. may want to assign responsibilities to maintain accurate information to other parties in the supply chain to the retailer, such as to a marketing group, an advertising agency, or a Webmaster. These assignments can be for full responsibilities or as needed. Each restrictions can be imposed retailer by retailer, store by store with a retail chain.

Scheduling

Figure 22:
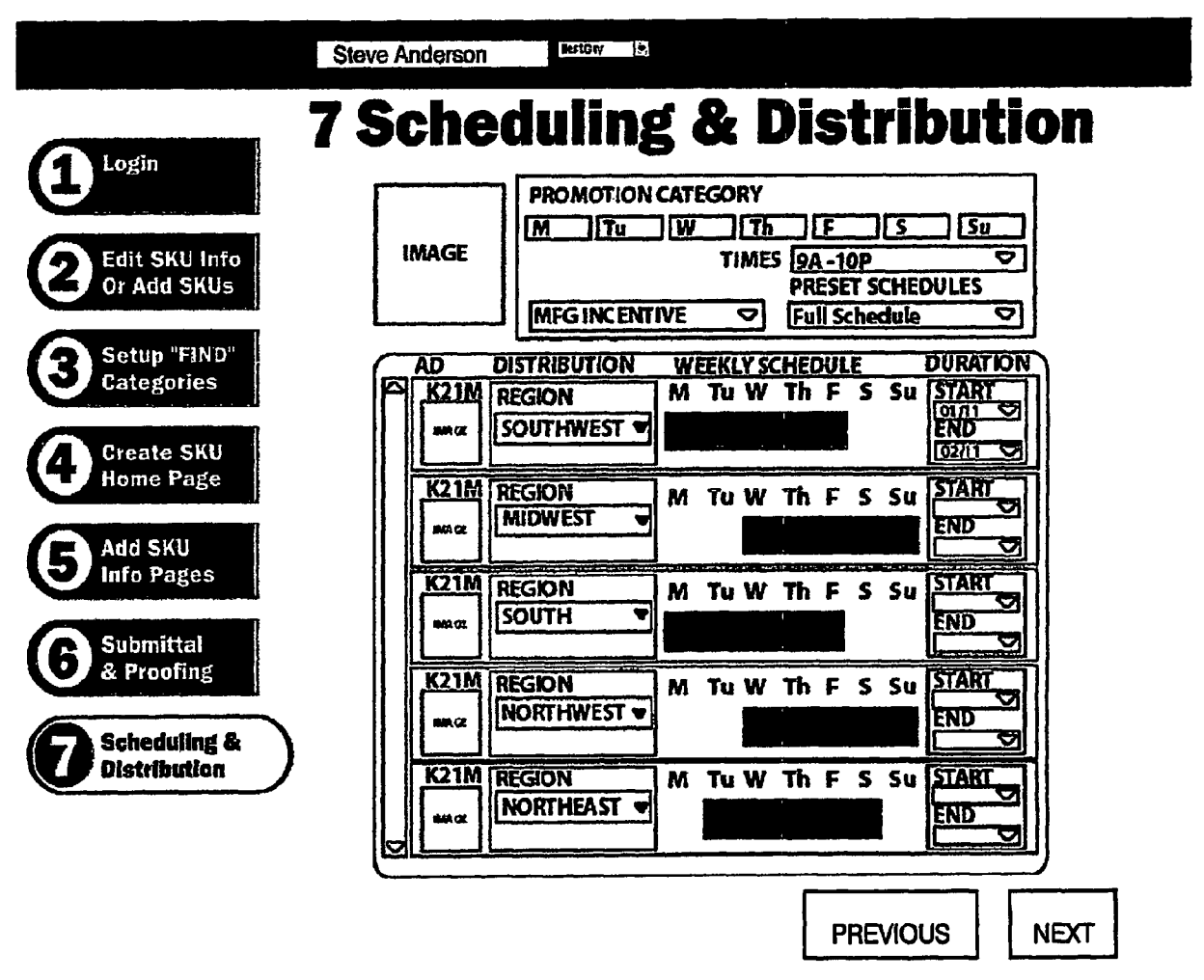

FIG. 22, "Scheduling and Distribution" allows the Mfr. to create different Content for different locations and/or for different times of day. The number of retail stores shown per retailer would be dependent on those locations that have LCAPs 1076. For example, a refrigerator Mfr. who logs into the PCMS 1086 may have a list of five different retail chains that their refrigerators are sold at that are all listed on PCMS 1086. These five retailers could be made up of two electronic stores, two hardware stores, and a warehouse distributor. Each retailer chain could be identified by their unique brand name. Not all stores within the retailer's chain would necessarily have to have a LCAPs 1076.

The PCMS 1086 would allow the Mfr. to adjust conditions to affect when and how ads run. In addition, the system could adjust rebates or retailer pricing, if the retailer desired. A Mfr. could set up conditions such as 1) Stock On-Hand, 2) Temporal conditions, and 3) Locations. For example, if the Mfr.'s inventory was over 5 units of a particular SKU, between the hours of 9 am and 3 pm on a Saturday or Sunday, the system could trigger a rebate for all stores within a retailer's chain that were west of the Mississippi. The Mfr. could set the location to just the top 10 stores and vary the rebate on initial customer response automatically.

Content usage can be restricted depending on conditions set by the retailer and the system administrator for such as things as an account's payment history. The Mfr. can also select delivery conditions on Content for such things as near real-time or hold until a certain time. Some Content can be live.

COPP 1070 Modified Content

"PBI" 180—Proximity-Based Information

Location-sensitive information is referred to as "PBI" 180 or Proximity-Based Information. PBI 180 is information that has validity and/or value primarily in the immediate physical vicinity where the person seeking the information is currently located. There can be many types of PBI 180. PBI 180 assigned to a location will typically become less valuable the further away the Seeker 999 travels from a particular location.

Figure 23:
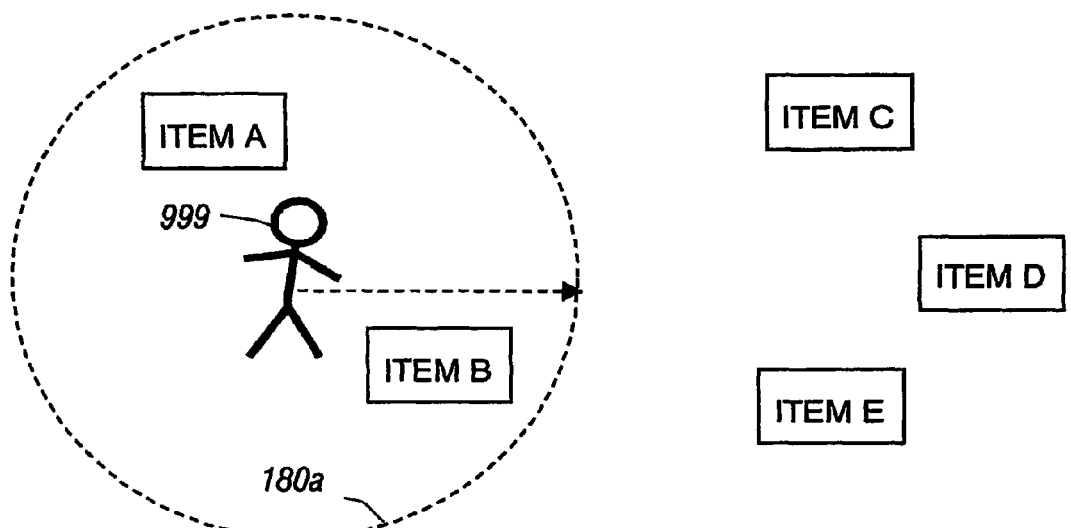
FIG. 23 is a block diagram depicting PBI 180 from a seeker.

In FIG. 23, for example, a Seeker 999/shopper within a retail environment could request product information only about those products within a certain requested proximity of the Seeker's 999 current location. This distance can be pre-defined or specifically requested by the Seeker 999. This shrinks the number of products searched within the database to only those items within the Seeker's 999 immediate area or requested area.

Figure 24:
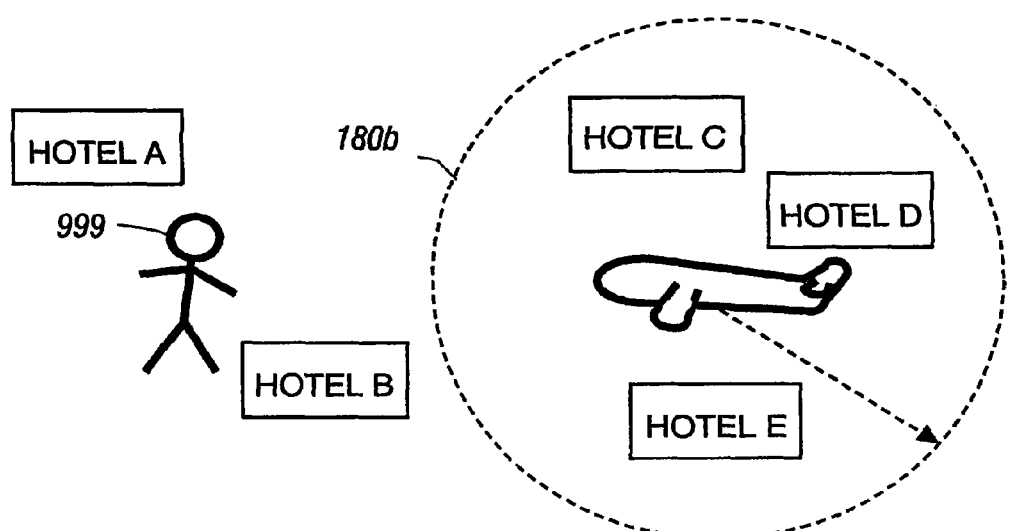
FIG. 24 is a block diagram depicting PBI 180 from an item.

On the other hand, some PBI 180 allows Seekers 999 to learn about information that is relevant to a different location. In this case, PBI 180 could lead a Seeker 999 from their present location to a product or service outside the Seeker's 999 immediate area. In FIG. 24, for example, a Seeker 999 could request information for all hotels within a certain proximity to an airport, while this Seeker 999 was in another location or city.

Consequently, there can be many different sources of PBI 180 in any given environment and not all information available to the Seeker 999 is PBI 180. Other sources of information could be such content as, local, regional (or even global), and all information can be static or dynamic.

The need for PBI 180 has been ever present in the realm of human existence. For outdoor applications, many devices employ Global Positioning Satellites or GPS technology for tracking a specific location, but this technology is relatively expensive and on its own, can be unusable for many indoor applications.

Whether indoors or outdoors, getting on-site and/or location-sensitive information can be difficult. Usually the Seeker 999 of this information needs to rely upon the information that is currently within their line of sight and was posted or made available by a manager, promoter, or owner of the location site. These sources of information could be signs, pamphlets, product packaging, kiosks, video displays, audio speakers, TVs, VCRs, DVDs, radios, and other similar devices, or, as in many cases, sales people, docents, guides, random people within your proximity, and/or other people made available by the information providers.

To be of the most value to the Seeker 999, all of these sources of information should be knowledgeable, sometimes predictive, timely, accurate, cost-aware, trend-aware, and in the Seeker's 999 native language. What the Seeker 999 really needs is the perfect information booth. This booth would be managed by someone who is an expert on everything, who is always available to the Seeker 999, not a stationary booth, but one that goes wherever the Seeker 999 needs. Ideally this information-booth-expert would promptly provide information that is accurate and appropriate at each new location. With a LCAP 1076 connected to the Internet, a Seeker 999 with an enabled device (TO-U) would have the means to retrieve this appropriate global, local, and PBI 180 as needed and/or on demand.

Not all valuable PBI 180 is product related. In some cases, PBI 180 provides convenience, entertainment, or added safety to the Seeker 999, but it also could supply disability assistance or foreign language interpretation. LCAP 1076 provides the means for the transmittal of global, local, and PBI 180 in any appropriate environment according to the goals of the PBI 180 provider and the entertainment, convenience, and safety of the PBI 180 Seeker 999.

All forms of information can be further enhanced with other metrics, such as cost, age, popularity, capabilities, and features. For example, a Seeker 999 could select product information regarding digital cameras based on selecting a range for price, the number of days the camera has been on the market, the length of the product's warranty, and its current popularity rating.

"RING" 182—Regional Information within a Network Grid

To create location-defined PBI 180, one can delineate areas that relate to the level of relevance of information within an environment. An area of relevance is called a "RING" 182 or Regional Information within a Network Grid. A RING 182 defines an area where something is either inside the RING 182 or outside the RING 182. RINGs 182 can be any shape, not necessarily oval or rectangular. A RING 182 can have as few as two points, c1 766 for the center and r1 770 for the radius, FIG. 25, or have as many points as necessary to describe an enclosed area in two dimensional space, a RING can also exist as a three dimensional shape 772, FIG. 25.

Environments such as retail stores can create a X and Y coordinate system, an X, Y, and Z coordinate system, or a X, Y, and floor number coordinate system to identify points within the environment. Once the environment establishes a 0, 0, 0 origin location, such as one of the four corners of the store or the center of the store, the store can accumulate coordinates defining other locations within the environment. These coordinates are stored in the database and can be associated with such things as Seekers 999, time, location, popularity, specific products, categories, and usage demand.

These three dimensional points can define the perimeter of a RING 182. Those items with coordinates located within a defined area are said to be within that RING 182. These points that define the perimeter of a RING 182 can be input into a database using a number of methods. These points can be entered manually, by such methods as employees or Seekers 999 with keypads and using some means of determining a number of X, Y, and Z coordinates relative to the origin.

A number of collected points can create an area associated to an item category such as a product region, product aisle, or department For example, a RING 182 associated with a product could simply be the X, Y, Z coordinate of the product's location on the shelf and a predetermined radius in a 2-dimensional plane that runs on the same plane as the floor. Similar to manually entering the data, the X, Y, Z coordinates, these coordinates could also be generated from a known wireless tracking system and/or RFID system or (Radio Frequency Identification readers and RFID tags).

Still another method could employ mobile devices, such as mobile TO-Us 200 that also have location tracking capabilities. For example, the X, Y, and Z coordinates of the mobile TO-U's 200 locations can be collected as it is used and moves throughout the environment.

These coordinate collections can be based on several factors. One factor could be based on time intervals, so that moment-by-moment time comparisons of a Seeker's 999 usage could be compared. Another factor could be the exact location of the mobile TO-U 200 when the Seeker 999 actually requested information. So when a Seeker 999 requests information regarding a particular item, an X, Y, Z coordinate is saved in the database that is associated with that particular item. A Seeker's 999 request for information could be made through a number of means, such as entering a code associated with a product, using a barcode scanner, using an RFID reader, taking a photograph of a product and using image recognition capabilities to determine a product in the database, and/or selecting from items that appear on the TO-U's 200 GO-UI 199.

The Seeker's 999 usage can continually improve the accuracy and sophistication of the database. At a LCAP 1076 with Seekers A and B and Refrigerators D and E for example, a Seeker A, requests information regarding a Refrigerator D. This request would generate an X, Y, and Z coordinate of the physical location of the mobile TO-U 200 at the time of a request. This X, Y, and Z coordinate would be stored in the database in association with Refrigerator D as shown in FIG. 26 as (10, 20, 0).

If a Seeker B did not know the location of a specific refrigerator called Refrigerator E, and the database did not presently contain a X, Y, Z coordinate 794 for Refrigerator E, the database could search for the X, Y, Z coordinates of products that resided in the same product category. In this example, Refrigerator B is in the same category 'Refrigerators' as Refrigerator D. Consequently the system could give Seeker B the X, Y, Z coordinate of Refrigerator D as a general location for Refrigerator E.

This general location could be explained to the Seeker's 999 current relative location, a point on a map, or some other means of discerning the refrigerator's location. The system could average the X, Y, Z coordinates of all products within a department until actual X, Y, Z coordinates were generated by an actual Seeker 999 request. The accuracy of these averages and assumptions would likely increase when more Seekers 999 use mobile TO-Us 200 with tracking capabilities within the environment. Over time there could be tens, hundreds, thousands, even millions of X, Y, Z coordinates associated with Seeker 999 usage and Seeker 999 request locations.

Note: For FIGS. 27-40 that are drawn two dimensionally, each described point could represent just X and Y and/or X, Y, and Z; wherein the Z dimension could be zero or the same value for all the points associated within the same Figure.

FIG. 27 shows an overhead view of a range of points meeting certain conditions can also create a RING 182. Connecting the outer most points from a set of points that meet an established condition could create a RING 182. By using Points A, B, C, D, E, F, and G; to represent the X, Y, Z coordinate representing the locations for each request made by a Seeker or Seekers 999, one can create a RING 182 by connecting the outer points of A to B to E to G to F and back to A. Points C and D are located inside the range or inside the RING 182.

Depending on the conditions associated with these points, this RING 182 could represent many such things such as a group of products or a department. These points could also represent unrelated products or departments. These points could be tied to a Seeker's 999 shopping history, demographic, psycho-graphic, and/or the temporal information.

For example, a RING 182 could represent the most popular products viewed and/or purchased if the database is tied to the Point-Of-Sale system within the environment. A RING 182 could also represent the most popular products viewed or purchased by Seekers 999 meeting certain demographic or psycho-graphic conditions, such as adults between the ages of 24 and 29, assuming the mobile TO-U 200 Seeker 999 has his birth date saved in the database.

A RING 182 could also represent the most popular products requested within a time interval, such as within the last day, when the database calculates the number of requests associated with all points in the database over the last day. A RING 182 could also represent the most popular products over a temporal condition such as today compared to yesterday.

FIG. 28 shows that conditions can be placed on collected coordinates to improve the accuracy or value of the RING 182. When a RING 182 has a new point collected, that point either falls within the RING 182, or outside the RING 182. If the point fell outside the RING 182, the RING 182 would grow by changing the perimeter and including this point if the point met a number of conditions. Using points H, I, J, K, L, M, N, O, P, Q, R, and S; one could create a RING 182 by connecting HI, IK, KQ, QS, SP, PN, NM, and MH; and omit certain points, such as point R 778 if it meets certain conditions or fails certain conditions.

These conditions could be temporal, such as only include new points on Mondays and Saturdays between the hours of 9 am and 5 pm, and/or a condition of distance, such as include all points that are within a certain distance of the current center of the area and/or include all points that are within a certain distance of a perimeter.

This could prevent the RING 182 shape from changing simply due to a RING 182 associated item being scanned far from its traditional shelf location. For example, a Seeker 999 who picked up a Rock genre music CD, could carry it to an area well outside the RING 182 that presently defines the area for Rock genre CD's within the store and request information about it without destroying or changing the current RING 182 shape that defines the Rock genre area, for this example called the "Rock RING". The stray coordinate could be saved in the database so that if the Rock music section had been moved to a new location within the store, subsequent coordinates collected could meet a condition to redefine the Rock RING and/or the RING for the Rock CD.

For example, if coordinates for a particular Rock CD were being generated frequently in an area outside the Rock RING, this would create a new RING 182 for this particular product but not necessarily a new Rock RING. An example of this might be an area in the front of the store for popular CD titles that is not located within the Rock RING. If on the other hand, the occurrence of rock music requests in this new region grew to cover a significant number of Rock titles, then the Rock RING could be modified to include this new area.

Conditions could be set within the database so that the first Rock RING could add this second area without the two areas being connected into one large area, but rather as separate areas. These conditions could be determined by the lack of activity in certain regions or the distance between points.

FIG. 29 shows one method to accomplish this, could be only connect those points around the perimeter that are within a certain distance of each other. Using points p1, p2, p3, p4, p5, p6, p7, p8, p9, p10, p11, p12, p13, p14, p15, p16, p17, p18, p19, and p20, a condition could be included so that a perimeter must only connect points that are within a certain distance and/or that are within a certain range of some other number of points. With this condition it is possible to create several separate perimeters. In FIG. 29, where the distance between p7 and p11 is too wide to make a single enclosure. These two separate perimeters would combine to create one Rock RING. If the activity in either of these separate perimeters dropped off significantly or completely, conditions could be established to remove one or both of these areas from the Rock RING.

Conditions associated with occurrences could also track the actual location of the last request made for a particular product. For example, a store employee/Seeker 198 may wish to see where the last known location was for a particular item that cannot be found at its assigned shelf location.

To create conditions that are associated with an existing shape, size, and/or a center point of a RING 182, calculations need to be made to define these components. These components would more than likely be dynamic and/or could be weighted based on such things as occurrences. In FIG. 30, for example, the center of the RING 182 would also be the center of the circle, whereas is in FIG. 31 the center of the RING 182 could be shifted to the right when the number of Seeker-request-occurrences are factored in to calculate the RING center 754.

PBI 180 can have a variety of RINGs 182 associated to it. So instead of having PBI 180 strictly associated to the Seeker's 999 location, a RING 182 can also be associated with items.

Figure 32:
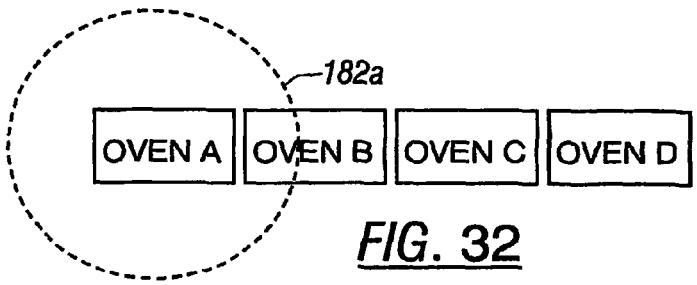
FIG. 32 is a block diagram depicting a RING 182a around a single item such as, a product in a store.
Figure 33:
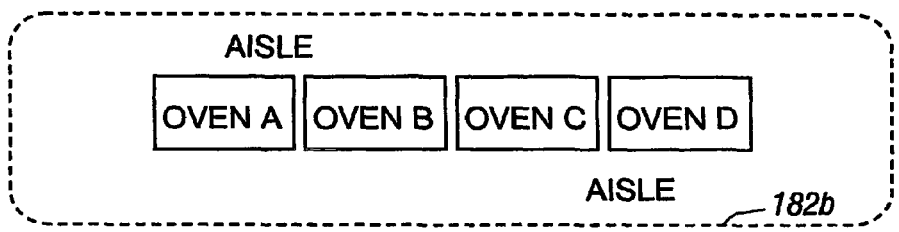
FIG. 33 is a block diagram depicting a RING 182b around an aisle of similar products such as, ovens.
Figure 34:
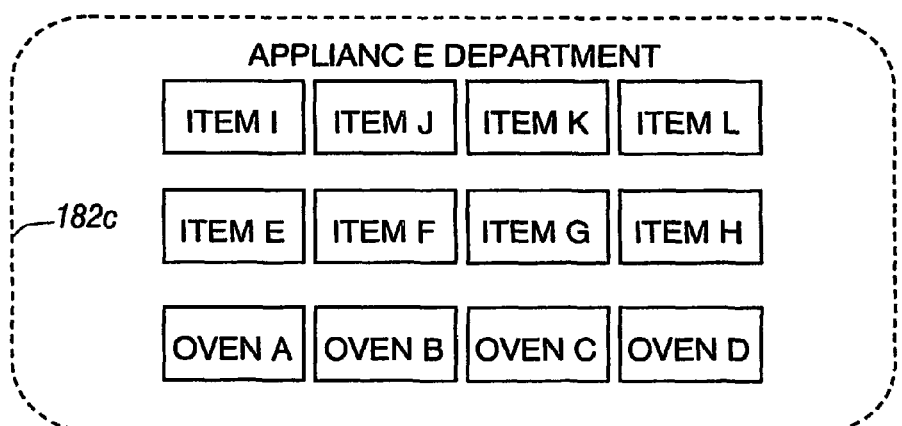
FIG. 34 is a block diagram depicting a RING 182c around an appliance department.

In FIG. 32, for example, a microwave oven on the shelf within a retail store could have a RING 182a that creates a small radius around the product, so a Seeker/shopper 999 could request information within a certain distance of where the Seeker 999 is presently standing. That same microwave oven could have another RING 182b, FIG. 33, the shape of the aisle where all microwaves are located, and it could have another RING 182c, FIG. 34, for the appliance department within the store.

Figure 35:
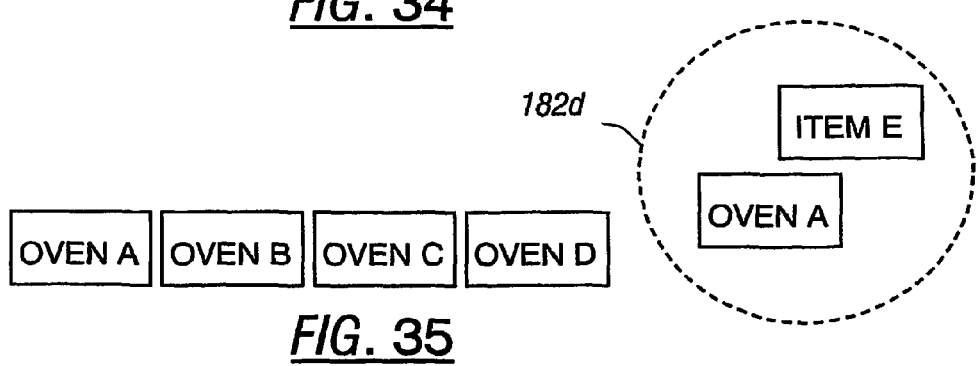
FIG. 35 is a block diagram depicting a RING 182d around a product and an item within a special condition.

The same type of microwave may have another RING 182d, FIG. 35, for products that have been placed in a particular area of the department because the items were registered as part of a wedding registry, or a defined area for new products. The association of a Seeker's 999 location and the RING 182 criteria the Seeker 999 has requested determines what items are pulled from the database.

A single RING 182 for defining PBI 180 might range from just a few feet to hundreds of feet, depending upon the type of information and the current conditions within that environment. For example, the most commonly used RING 182 for a product displayed in a retail store, might stretch a few feet around the object or product where a customer would stand, while another RING 182 that helps Seekers 999 locate that same product might encompass the entire store or shopping mall. The RING 182 for locating the nearest restroom in a store might encompass the entire store, if there is only one restroom. If on the other hand, there were two restrooms, each located at opposite ends of the store, then there could be separate RINGs 182 defined for locating each. The nearest restroom would be relevant to the Seeker's 999 current location or which RING said Seeker was within.

A Seeker's 999 request for all microwaves within a certain price range could result in a large number of ovens, say twenty. This Seeker 999 could request that the GO-UI 199 only display those ovens from the first search result that are within a certain distance of the Seeker 999, say forty feet. Now, there may be fewer ovens, especially if the store or mall has multiple locations for ovens.

"DOT"—Data Over Time

Some coordinates could be generated without the Seeker 999 requesting information. So even if a Seeker 999 moves throughout the environment and never makes a request, this time interval data and appropriate location coordinate could still be collected. Each collected coordinate is a special point called a "DOT" or Data Over Time. Mobile tracking applications that collect user information that also provide Content, generally require the Seeker 999 to login for Content. With at least one embodiment of the system invention, a Seeker 999 could move about the environment benefiting from TAC 184 such as PBI 180 without having to enter his identity. This data collection of Seekers 999 over time also improves the integrity of RINGs 182 for future Seekers 999.

For example, in an environment with multiple Seekers 999 carrying mobile TO-U's 200 with tracking capabilities, the system could collect the X, Y, and Z coordinates of each of the TO-Us 200 at selected time intervals, each point creating a DOT. This would create RING 756 and RING 760 that define densities of Seekers 999 at a given time.

Figure 36:
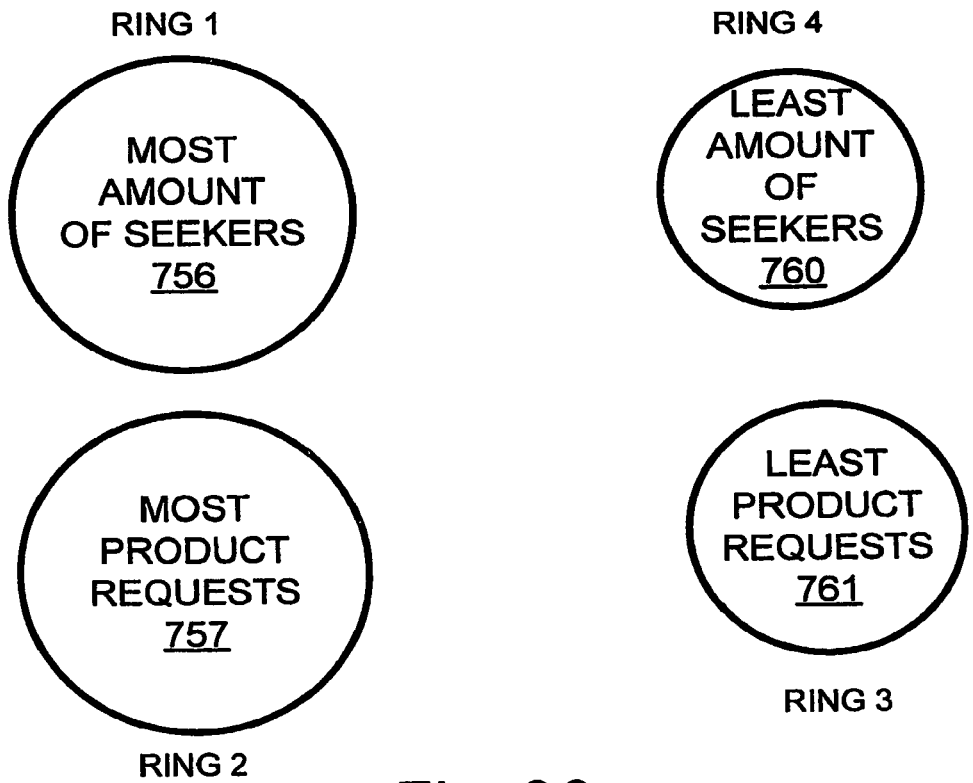
FIG. 36 is a block diagram depicting conditions that create multiple RINGs 182 that create separate distinct regions.

In cases where the RING for illustrating the Seeker 999 population at a given moment created separate perimeters as shown in FIG. 36, these separate perimeters could create new RINGs. These new RINGs could be further compared by such things as the types of Seekers 999 within each RING or the number of Seekers 999 within each RING.

In FIG. 36, for example, RING 756 could represent the RING with the most amount of Seekers 999 or the RING 757 with the most amount of product requests at a given moment in time, while RING 760 could represent the RING with the least amount of Seekers 999, or the RING 761 with the least amount of product requests. These RING patterns can be cross referenced against over patterns in the database that could also be tied to such things as sales volumes or potential theft problems. These patterns could create alerts that would be sent to predetermined parties such as security, on-site management, or to someone at the retailer's headquarters.

Using Seeker 999 demographics, such as employees versus shoppers, more specific RINGs 182 can be created. RINGs 182 could also be created to differentiate relative movement of a Seeker 999 within the environment. Using historical data, RINGs 182 could be created that differentiate a particular Seeker's 999 movement, such as by departments, by their relative speed, and/or by comparison to previous paths or paces.

"DOT Path"—Data Over Time Path

Figure 37:
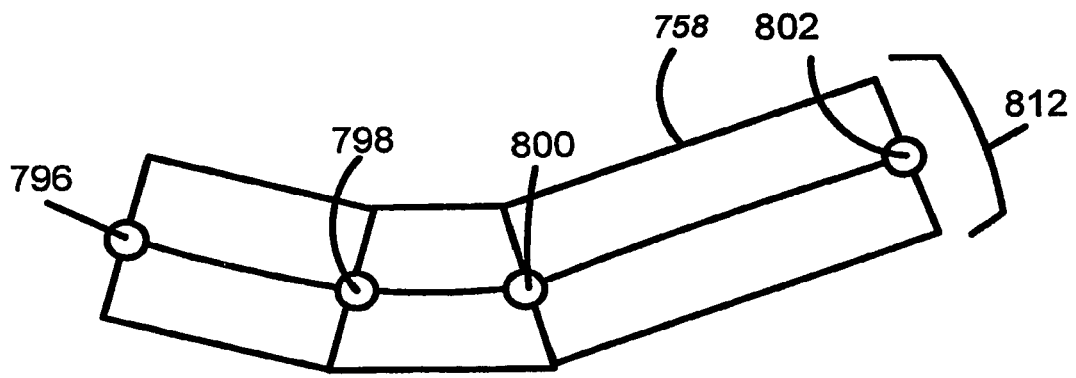
FIG. 37 is a block diagram depicting a series of points that produce Data Over Time Path or DOT Path representing a Seeker's path.

As the Seekers 999 move through an environment each DOT adds to the path. This path is called a "DOT Path". FIG. 37 shows a perimeter of a RING 182 that was created by assigning a width 812, such as 2 feet, to the DOT path made of DOT 796, DOT, 798, DOT 800, and DOT 802.

Figure 38:
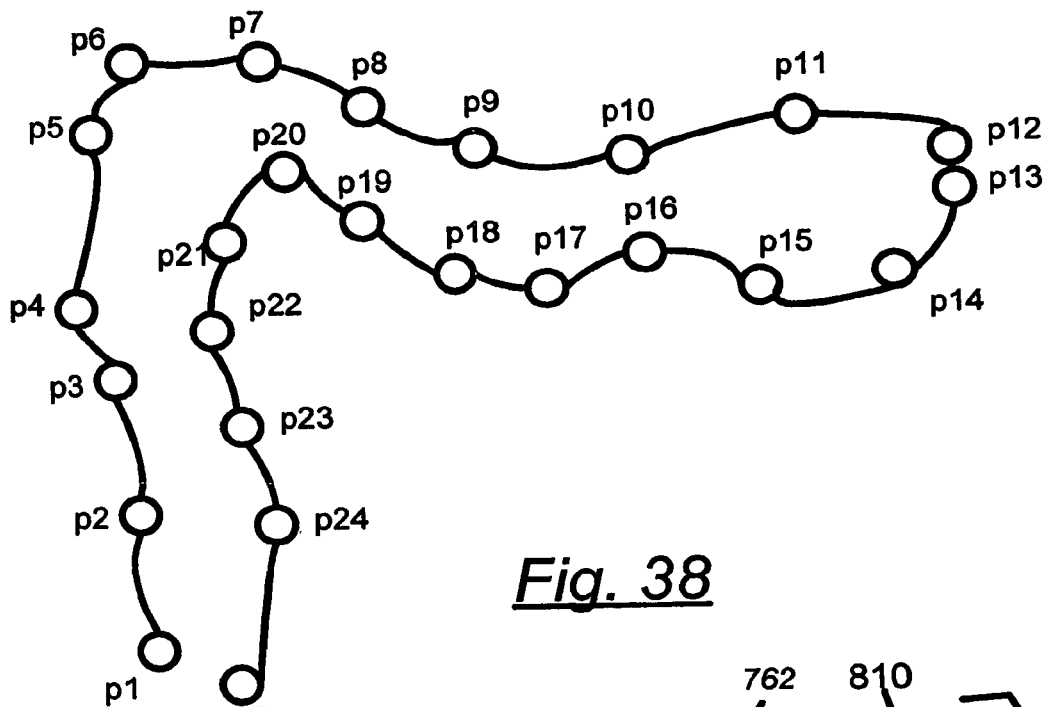
FIG. 38 is another block diagram depicting a series of points that produce Data Over a Time Span or DOT Path representing a Seeker's path.

In FIG. 38, the Seeker 999 initiates the usage of the TO-U 200 at DOT 1 or p1. This initiation creates a new session. A session ends when a Seeker 999 logs out, or the TO-U 200 meets predetermined conditions, such as a lack of usage over a duration of time. This lack of usage can be determined by the lack of interface entries made with GO-UI 199 on the TO-U 200 and/or by the lack of movement by the TO-U 200 as monitored by the tracking capabilities. For example if the TO-U 200 was set down, the tracking software could dictate that the unit was stationary and after a certain amount of time the current session would be timed out. In FIG. 38 the end of the session timed out at DOT 25, but typically would not get connected to DOT1 or p1.

Figure 39:
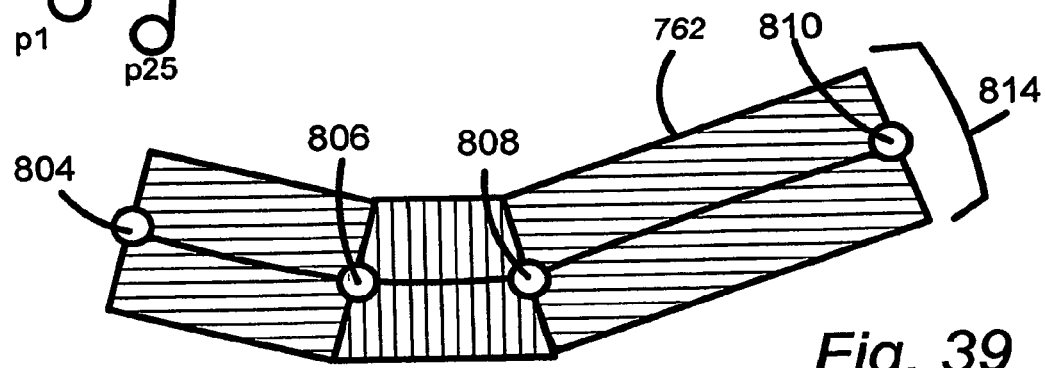
FIG. 39 is a block diagram depicting a series of points that produce Data Over a Time Span or DOT Path representing a Seeker's path with color-coding for certain conditions.
Figure 40:
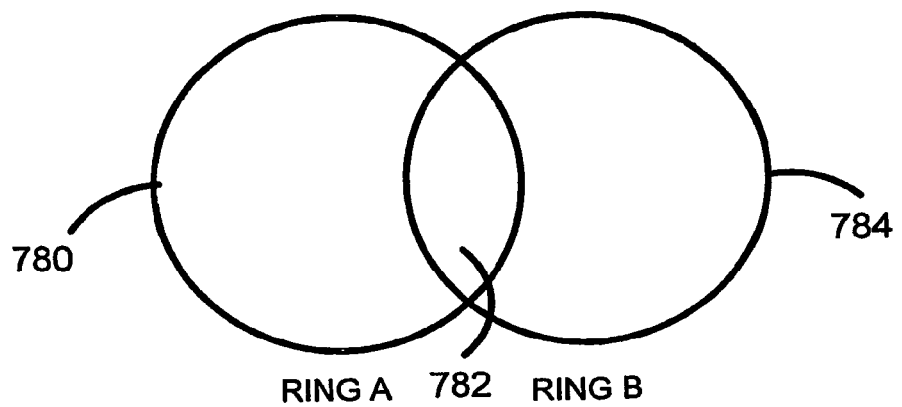
FIG. 40 is a block diagram depicting Boolean calculations with merged RINGS 182 shapes.

FIG. 39, shows a path made over time from DOT 804, DOT 806, DOT 808, and DOT 810, and with an assigned two foot width. Additional factors such as TO-U 200 usage or dwell times could be illustrated on the RING 182 with color codes, such as blue for the areas with the least dwell times relative to red areas where the Seeker 999 had the highest density of DOTs.

(Automated Computerized Sensors)

In addition Boolean operations can be performed between different types of RINGs 182. For example, RING A or RING 780 in FIG. 40 could represent the area for country music or the Country RING and RING B or RING 784 could represent a 20-foot radius around a Seeker 999. The intersection of these two RINGs creates an area 782 that defines the country music that is within 20 feet of the Seeker 999.

The Distribution Subsystem

The Distribution Subsystem allows Seekers 999 to interact with Content that has been targeted to the Seeker's 999 location by the COPP 1070 or that has been created locally. These locations are called CAPs (Content Access Providers) 1004.

Some location sites have local Content redistribution called Local CAPS and those that do not are called Remote CAPs 1004 or RCAPS. Within remote and local CAPs are two more distinctions, those that have strictly hardwired TO-U 200 access and those that also offer mobile TO-U 200 access. The two types of Local CAPs 1004 are:

1. A "MAP" or Mobile Access Provider 1020, FIG. 4, is a LCAP 1026 that provides mobile interactive access to the Content. Generally a MAP allows Seekers 999 to use mobile "TO-Us" or Transceiver Operating-Units via a distribution network of "TAPs" or Transceiver Access Points 1084 that are connected to a "LCS" 1136 or Local Content Server, but can also have stationary access in addition to mobile access. These MAPs 1020 can be public or residential, but typically are commercial.

2. A "SAP" or Stationary Access Provider, 1026, FIG. 4, is a LCAP 1026 that provides only stationary interactive access to the Content and no mobile access. Generally a SAP allows Seekers 999 to use stationary "TO-Us" or Transceiver Operating-Units that are hardwired 1014 connected to a "LCS"

1136 or Local Content Server. These SAPs can be public or residential, but typically are commercial.

The two types of Remote CAPs 1004 are:

1. A "MOC" or Mobile Online Connection 1022, FIG. 4, is a RCAP 1006 that provides mobile interactive access to the Content, but does not have a LCS 1136. These MOCs can be commercial, residential, or public sites.

2. A "ROC" or Remote Online Connection 1024, FIG. 4, is a RCAP 1006 that allows Seekers 999 to interact with Content through an online or network connection, but does not provide mobile access. These ROCs can be commercial, residential, or public sites.

Each MAP 1020 is comprised of two high-level components:

1. Local Content Server (LCS) 1136, FIG. 4, is the on-site Content source. The on-site Content is transmitted by the TAPs 1084 (Transceiver Access Points, see below) and thereby delivered to the Seeker's 999 TO-U 200. The LCS 1136 is usually connected to the TAPs 1084 through a wired network 1014, but nothing about the system demands that these server-to-transceiver links be wired. The MAP 1020 could be a PC-like Subsystem element into which the information database can be loaded and continually updated since sources of information can be either fixed, slowly evolving, or create and modified in real-time.

2. Transceiver Access Point (TAP) 1084, FIG. 4, is the information-distribution-Subsystem in a network of wireless-transceivers called TAPs 1084, each positioned and spaced appropriately throughout the facility or environment. In function, even if not in implementation, the TAPs 1084 are similar to the Access Points of an 802.11 wireless network system. The reception distance or range of the wireless communications 1144 between the TAPs and the Transceiver Operating-Unit 1084 is dependent upon the environment and the number of Seekers 999 anticipated in any given area, but is normally a minimum of a few feet, and a maximum of a few hundred feet.

Figure 41:
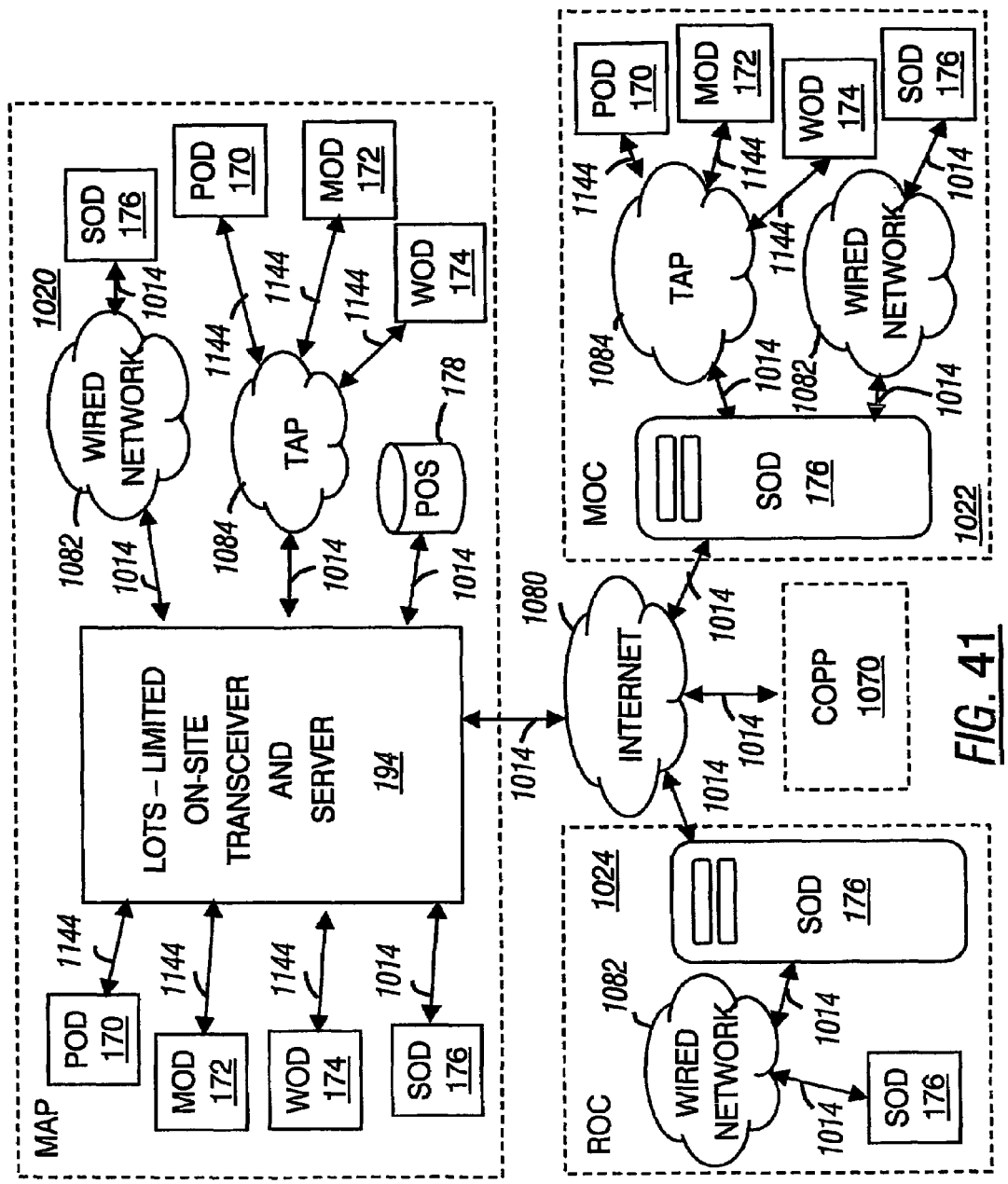
FIG. 41 is a block diagram depicting various levels of transceiver sub-systems.

FIG. 41 show that some MAPs 1020 contain "LOTS" or Limited On-site Transceiver and Server 194. This on-site server contains enough hardware to be an all-in-one source, distribution, monitoring system, and interaction system containing the MAP 1020, a SOD 176 or Stationery Operating Device (a type of TO-U 200, such as a computer), and a distribution transceiver. Additional distribution can be connected to LOTS 194 as needed.

The communication range of a TAP is intentionally limited to maximize bandwidth availability throughout the site. TAPs 1084 can distribute information to TO-Us 200 that are within service range. This range can create a RING 182 (as described earlier), but there can be several other defined RINGs 182 for PBI 180 on the system, and a TAP 1084 is not the same as a RING 182. Some TAPs 1084 could have their reception range vary depending on conditions within the environment, such as the number of Seekers 999 currently within a particular area, or the time of day.

The Interaction Subsystem

The Content Interaction Subsystem comprises of:

1. Hardware, the Transceiver Operating-Unit ("TO-U") 200 and

2. Software, the Graphical Operating-User Interface ("GO-UI") 199.

"TO-U"—the information Interaction Subsystem hardware element is the TO-U 200. Typically a TO-U 200 has an ability to input commands, retrieve Content in many forms, and interacts with Content via the Distribution Subsystem.

The TO-U 200 could be a stationary or mobile device. As a mobile device it could be worn or carried by the Seeker 999. It delivers 1) audio and visual outputs of Content and other information as provided by the distribution Subsystem, 2) a means for the Seeker 999 to input requests, and possibly setup up information profiles, and place commands through the TO-U 200, and 3) as a wireless device, a wireless communication means appropriate for communication with the distribution Subsystem. Some information read or played on the TO-U 200 can be replayed or repeated as often as needed, slowed down, rewound, or sped up. These TO-Us 200 can also store information for later use.

Unlike some wireless devices and/or applications that require an active connection to communicate or collect information, these TO-Us 200 can retrieve information on demand and as needed, while within a MAP 1020. Data transmission can be accomplished in bursts. These data bursts can update information on the TO-U 200 as requested, or totally transparent to the end-user/Seeker 999. If an end-user/Seeker 999 stays in the environment for an extended period of time, the TO-U 200 could be set to accept incremental changes as they occur, set to a particular time interval for updates, set to update only when requested, or as they move about the location.

These updates can be assigned to different level of information or conditions. For example, some updates such as price changes, may happen automatically. Some updates may only occur as the Seeker 999 moves into new locations. Some updates such as the popularity of a particular DVD within a video rental store may only be updated daily. Some Seekers 999 may request information based on previous conditions, such as the most popular DVD last week in this store location or based on the popularity at another store location or city.

TO-Us 200 will have a method of inputting a Seeker's 999 request for information. This could be through a graphical user interface with: 1) designated buttons and a touch screen or pen-based screen, 2) a thumb wheel or jog rocker type control for menu selections, 3) a number keypad, 4) a text keypad, 5) a mouse, 6) a track ball, 7) a joy-stick, 8) navigation pad, 9) voice commands, 10) barcode scanner, 11) RFID reader, 12) optical reader, 13) image recognition, and 14) any combination of the previous thirteen.

At a minimum the TO-U 200 would need at least one of the above input capability, such as a touch screen. In addition, the TO-U 200 would benefit from a built-in RF antenna, such as 80.11b, for mobility and portability. Even stationary TO-Us 200 could benefit from an RF antenna for less cabling or occasional location changes.

In addition the TO-U 200 would benefit from a barcode scanner and/or RFID reader. For mobile TO-Us 200, Seekers 999 can barcode scan a particular product for information specific to that product or to trigger certain events. Stationary TO-Us 200 would also benefit from a bar code scanner and/or RFID reader.

Seekers 999 with mobile TO-Us 200 who scan product information within the store are adding to the database. For example, as Seekers 999 scan a particular product, the Seeker's 999 location and the particular product requested are recorded in the database. If the product was missing a location coordinate as described earlier under RINGs 182, the database could store this new coordinate. As more Seekers 999 scan the product, the database could begin to approximate where the product is located within the store.

In addition, Seekers 999 could give feedback regarding information. If information is inaccurate or confusing, Seeker's 999 can leave feedback. This feedback could be as simple as telling an employee, to as sophisticated as, entering a detailed complaint or comment. Some information would provide simple emoticons for Seeker's 999 to leave their feedback. For example, after sampling a song on a CD, the Seeker 999 could select one of three emoticons regarding their level of interest in the song. Emoticons such as a smiley face for a "strong appreciation", a non-emotional face for "indifferent" or its "average", and a frown representing they "disliked" the song.

TO-Us 200 with barcode scanners can have functions or features prompted when images are scanned or when items with a RFID tag are read. This information and features can be combined with PBI 180 and RINGs 182 to create unique features also (see PBI 180 and RINGs 182).

The audio information received by the TO-U 200 can be played via speakers in the device, speakers in the environment, or through an earpiece. Some mobile TO-Us 200 will allow the Seeker 999 to also be able to place his handheld up to the ear and hear audio messages, similar to a telephone handset. Some advanced mobile TO-Us 200 could have built-in transmitters for sending a wireless signal to an earpiece, thus eliminating the need for a wire output. Some mobile TO-Us 200 could transmit their audio to another TO-U 200 or speaker system. If the speaker system was directional the audio could follow the Seeker 999 without annoying others in the environment.

There are four top-level types of TO-Us:

1. A "MOD" 172 or Mobile Operating Device is a TO-U 200 that interacts with the Distribution Subsystem via an enabled "non-proprietary mobile device". MODs 172 can operate outside a wireless network with the information that is stored local to the device, but for constant updates the device generally needs to be within range of a wireless local area network.

2. A "POD" 170 or Proprietary Operating Device is also a mobile TO-U 200 that interacts with the Distribution Subsystem via an enable "proprietary mobile device". PODs 170 can operate outside a wireless network with the information that is stored local to the device, but for constant updates the device generally needs to be within range of a wireless local area network.

3. A "WOD" 174 or Wireless Operating Device is a TO-U 200 that interacts with the Distribution Subsystem via a wireless local area network, but the hardware is stationary.

4. A "SOD" 176 or Stationary Operating Device is a TO-U 200 that interacts with the Distribution Subsystem via hard-wired-enabled hardware. Typically through a computer attached to a local area network. When a computer is acting as a SOD 176, the SOD 176 can have additional SODs 176 networked to it. When a wireless network is attached to the same computer acting as a SOD 176, the SOD 176 can have PODs 170, MODs 172, and WODs 174 networked to the original computer/SOD 176.

Figure 42:
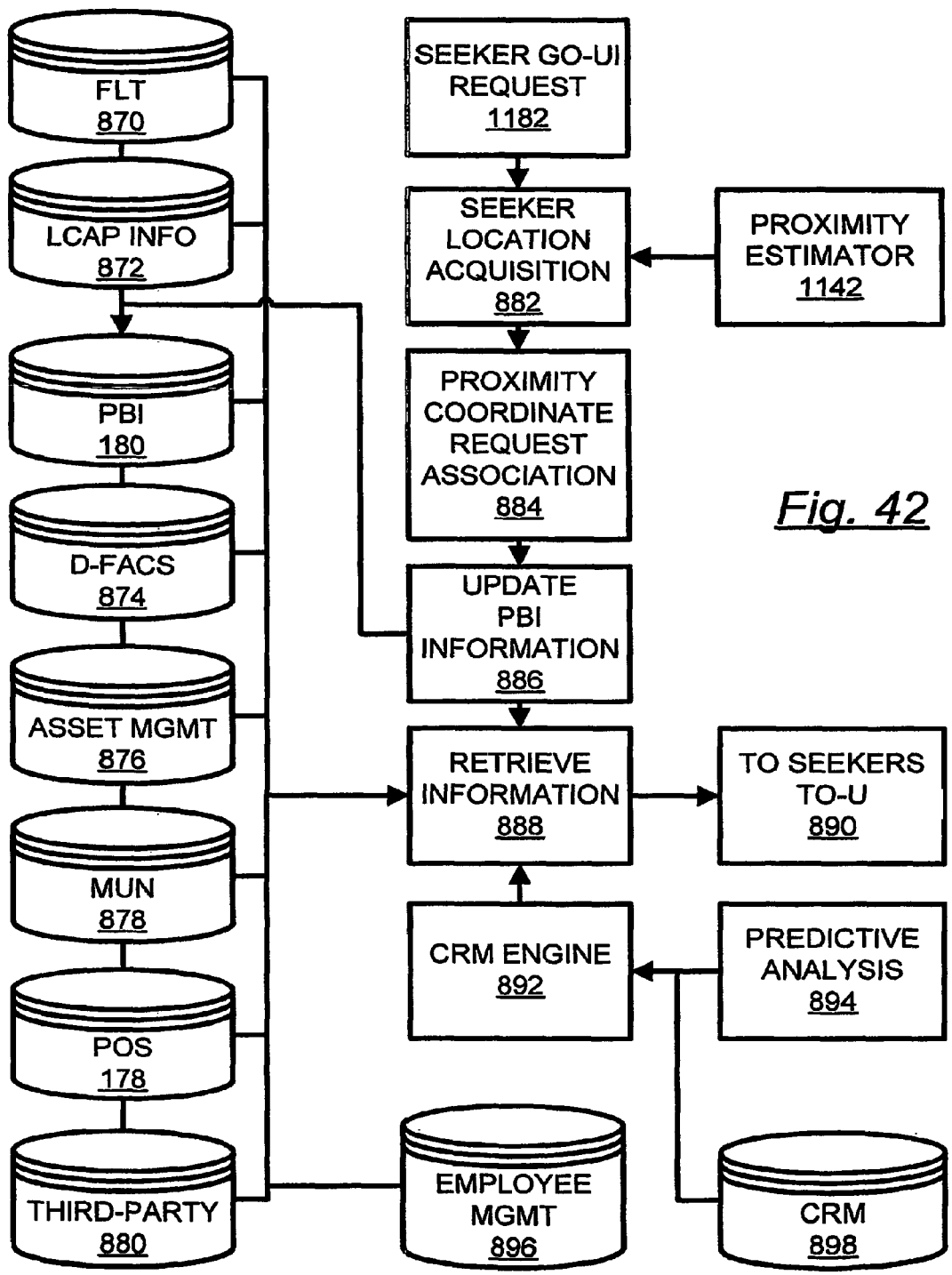
FIG. 42 is a flow chart depicting a Seeker 999 making a request on a TO-U 200 within an LCAP 1076.

FIG. 42 is a flowchart describing a Seeker 999 GO-UI 199 request 1182 within a CAP 1004. Such a request could be initiated when a Seeker 999 selects an item using the GO-UI 199 on a TO-U 200, such as scanning a product with a barcode reader, selecting a song track of a music CD, or any other request using GO-UI 199.

Figure 50:
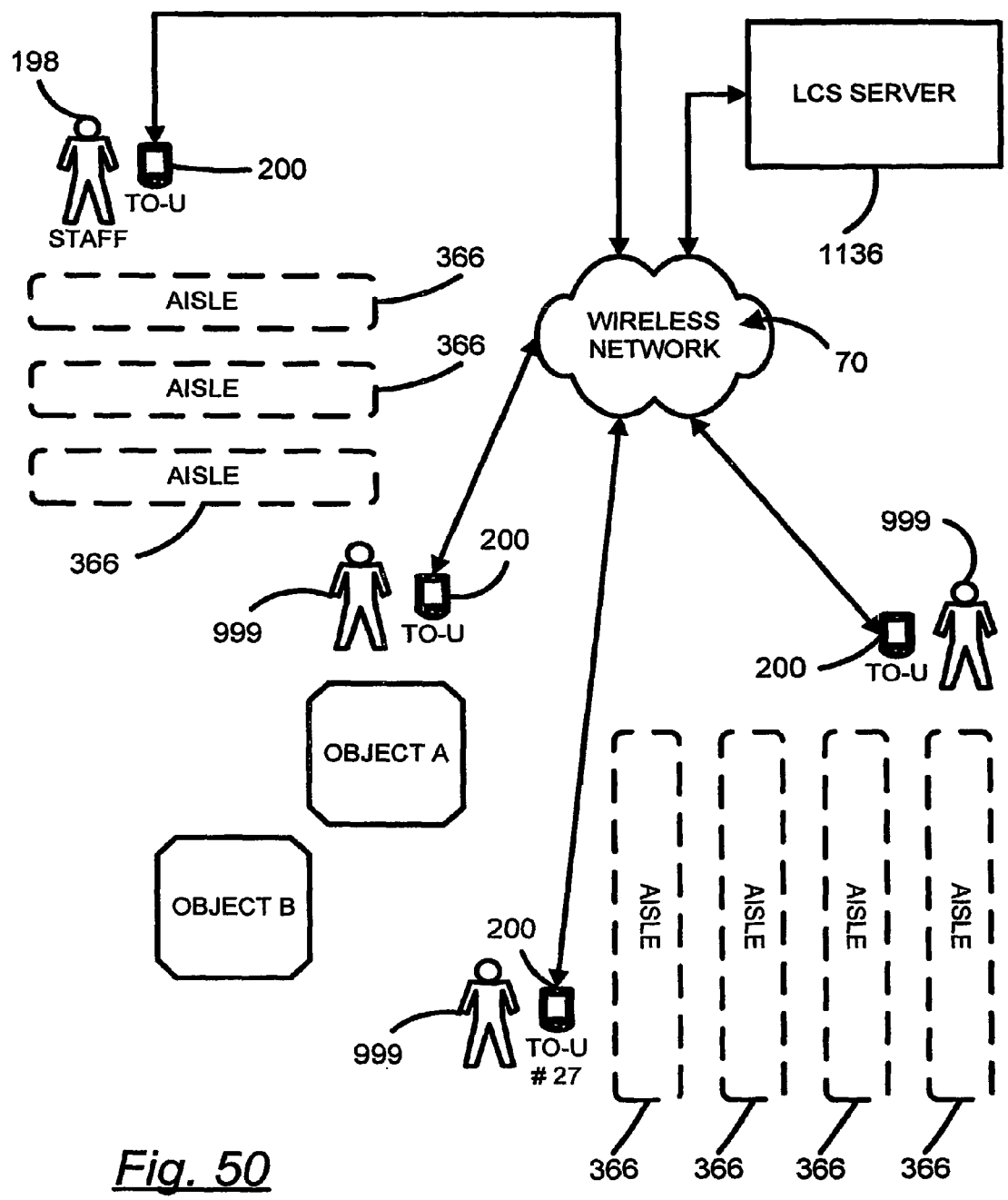
FIG. 50 is a block diagram depicting Staff 198 and Seekers 999 in a LCAP 1076 interacting with a LCS 1136 via a wireless TAPs 1084.

The Seeker 999 request 1182 uses a means to communicate with the LCS 1136, such as a wired or wireless network FIG. 50. This Seeker 999 request is time stamped and provided a location coordinate from the proximity estimator 1142 at the time of the request. This coordinate system could be a three dimensional (X, Y, and Z) coordinate that is stored in the LCS 1136 at step 882.

This multiple component identification of the item requested, the X, Y, and Z coordinate, and the time stamp data are then added to existing PBI 180 in step 884, such as the PBI 180 and numerous RINGs 182 that the particular item scanned associates. Incoming data associations increase the sampling rate of items that have been requested and in general, further increase the accuracy and the reliability of the PBI 180 as in step 886. This update step 886 is stored in the PBI database 180.

Step 888 retrieves the information requested using a number of databases that are connected to the LCS 1136, such as the FLT 870, PBI 180, D-FACS 874, MUN 878, Third Party 880, the Asset Management 876, the POS 178 (Point-of-Sale), the Employee Management 896 and the LCAP Info 872 databases. The LCAP Info 872 database ideally contains all the content not listed in the other databases that is required for the Seeker's 999 request 1182 within the location, such as in-store services and product information. The content on LCAP Info 872 database can be associated with the data and TACS 184 stored on the other databases (described later).

The retrieve information step 888 submits a query to the LCAP Info 872 database and uses any needed associates with the other databases to complete the request. The information relevant to the Seeker's 999 request is sent to the Seeker's 999 TO-U 200 using a wired or wireless connection.

Some LCAPs 1076 that may allow a Seeker 999 to request such information such as news, sports scores, expert opinions, etc, could store such information in a third party database 880. In addition this retrieved information can initiate a CRM Engine 892 or Customer Relations Management Engine connected to the CRM 898 database. The CRM engine 892 could process any needed personalization, that is associated with the Seeker's 999 request 1182. In addition, the CRM engine could pull demographics about the Seeker 999, if his identity is known, as with a customer loyalty login within the GO-UI 199.

The CRM data may associate with databases such as the FLT 870, PBI 180, D-FACS 874, MUN 878, Third Party 880, the Asset Management 876, the POS 178 (Point-of-Sale), the Employee Management 896, and the LCAP Info 872. In combination with demographics gathered from loyal Seekers 999 and anonymous Seekers 999, predictive analysis 894 prepares and selects information from the above mentioned databases attempting to anticipate the Seeker's 999 next GO-UI 199 request 1182. Such anticipation techniques can deliver future information to Seekers 999 and buffer this information on a TO-U 200, thus optimizing Seeker 999 queries against a LCS 1136.

The FLT 870 database typically stores foreign language translation information and TACs 184 related with the LCAP Info 872. The PBI 180 database typically stores proximity information and TACs 184 related to the LCAP Info 872. The D-FACS 874 database typically stores information or "Data-From Automated Computer Sensors" and TACs 184 related to the LCAP Info 872. The MUN 878 database typically stores match-up notifications (explained later) and TACs 184 that are related to the LCAP Info 872.

The Asset Management 876 and Employee Management 896 database is generally where information about objects, services, employees and other resources are stored. Various metrics about the data in this database can be accessed and related to the LCAP Info 872 database. For example, in retail environments the Asset Management 876 database could provide information about how many products are currently in stock, on order, and the estimated delivery time. It could also cross-reference the entire retail chain database for inventory at other locations.

The POS 178 database is generally where on-site pricing information about objects and services is stored. Various metrics about the data in this database can be accessed. Using Seekers A and B for example, where Seeker A purchased an item using the TO-U 200 or at the check out area of the store, the POS 178 database could be updated, so that the next Seeker 999, Seeker B would see an updated inventory within his GO-UI 199.

The Third Party 880 database typically stores and categorizes information from various third parties. Such third parties could provide product reviews, expert opinions, news feeds, sports, and entertainment. This information can be available on a TO-U 200 device within a CAP 1076 to the Seeker 999. The retailer and/or Seekers 999 could pay a fee for this service.

GO-UI 199

The "GO-UI" 199 or Graphical Operating-User Interface—is the end-user's or Seeker's 999 software to access and interact with the Content on enabled-devices (TO-Us 200). There can be several types of GO-UIs 199 users:

Random customers, who do not have to login to use the Content.

Loyal customers, who login and receive, added features.

Random employees, who do not have to login to use the Content.

Logged-in employees who receive added features.

Random third parties, such as management, consultants, manufacturers, advertisers, etc., who do not have to login to use the Content.

Logged-in above third parties who receive added features.

"GO-UI"—Graphical Operating-Unit Interface 199

Some TO-Us 200 will have additional features that allow users/Seekers 999 to submit, send, save, or forward information. For example, a Seeker 999 could forward information retrieved on the TO-U 200 to someone else's TO-U 200, or to a system such as an email address. Some GO-UI's 199 will have the ability to setup a Seeker's 999 personal interest profile. For example, the Seeker 999 could create a profile with a specific sports team or stock symbol, so that each time the Seeker 999 requests the latest sports score or current market price they do not have to wade through all other sports scores or stock prices. This profile could also be set to automatically show updates, based on predetermined changes in the score or price.

In addition, the Seeker 999 could request that the TO-U 200 set off a vibration alert if they are within the proximity of some predetermined information or another TO-U 200 Seeker 999 that fits a criteria. At a trade show for example, a Seeker/attendee may create a profile list of specific industry topics that they are interested in, such as plasma screen TVs'. Then the TO-U 200 would vibrate if they were near a booth displaying plasma screen TVs. The Seeker 999 could in turn play a message with corresponding information as to what is the product, where is the booth, and who is available currently to meet. This technology could be used for singles at a bar, job Seekers 999 at a job fair, or consultants at a trade show.

Some graphical user interface functionality and menus can be stored internally in the TO-U 200. In addition, some Content can be pre-loaded on the TO-U 200. This reduces the seek times and some information retrieval delays. It also provides a visual search menu for the Seeker 999 to start searching the local database of available information. At a trade show the Seeker 999 might see a list of trade show exhibitors, where as at a music store, the Seeker 999 may see a list of musical artists. All information or music would not have to be loaded on the TO-U 200 for the Seeker 999 to be able to search a product list (see Data Transmission below).

A retailer's sales staff 198 could have unique functions on their TO-U's 200 for things such as detailed product searches. Thus allowing staff 198 to locate a product by several means such as by product manufacturer, product category, price range, age in inventory, popularity, product specifications, and/or by product names. For example, a staff member could search for all SONY Playstation2 games that have come into inventory within the last 30 days that cost between 20 and 30 dollars. Then they could sort the results based on popularity criteria. FIG. 43 is a flow chart describing the process of applying popularity to a Seeker 999 request.

The GO-UI 199 would allow the staff member to look at search results product by product. Each product page would have further details available, such as the quantity in inventory, suggested accessories, other popular items purchased while purchasing this item, and a list of most frequently asked questions associated with this particular product. This information could be shared with the shopper verbally, or the information could be transmitted to the shoppers TO-U 200 for their own personal use.

The TO-Us 200 used by a retailer's staff could require the employee to log into the system. This login would retrieve information for that specific employee, such information as time and attendance, work duties, vacation time available, company policies, and communications. These communications could be text messages, voice messages, voice capabilities, or training material. For example, a manufacturer could create training material using the PCMS 1086 and distribute it to particular retailers for training purposes.

Retailers could have graphical user interfaces unique for different shoppers. At hardware stores for example, interfaces could be different for general customers versus contractors. At electronics stores, interfaces could be different based on peoples interests or demographic. Some features could be made available to loyal shoppers. For example, the ability to retrieve a previous purchased item could be made available to loyal shoppers. This previous shopping list could note the item name, so that one could retrieve the name and model number of a particular kind of computer printer ink, complete with where it is located in the store.

Guide Mode

Retailers could also highlight new products or items on sale that they often publish in their weekly circulars, but now they could adjust the sales price of those items that were featured store by store, hour by hour, or based on current demand.

Retailers could also provide guided tours within their stores. These guided tours on the TO-U 200 devices could be given by a number of sources, including industry experts, designers, celebrities, or friends and family. At a hardware store for example, the host of the TV show "This Old House" could give a guided tour of renovation projects for shoppers considering a remodeling project, complete with tools and products needed, the products location within the store, and installation requirements.

At an electronics store for example, parents could retrieve guided tours created by their children online at home that describes their Christmas wish list. Experts from consumer reports could point shoppers to award winning category winners throughout the store. In-store shoppers/Seekers 999 could send items of interest through the network and people online at home could review and respond later or in near real-time.

Tour Mode

As a Seeker 999, there are times when information will be delivered to a TO-U 200 without a Seeker 999 being involved in the information selection process. "Tour Mode" is a method to deliver information to a Seeker's 999 TO-U 200 that is proximity based. Information is distributed to a TO-U 200 device using proximity as the selection criteria based on a location where a Seeker 999 is currently "touring" a LCAP. One benefit of Tour Mode is that a Seeker 999 can be made aware of products based on a set of conditions such as the most popular products within a department.

Such a capability is accomplished by using existing tracking methods. FIG. 44, is a flow diagram that depicts the logical flow of information to the Seeker's 999 TO-U 200. When a Seeker 999 walks through various departments within LCAP 1076, the Seeker 999 would have an option within the GO-UI to enter Tour Mode. When Tour Mode begins, a tour mode explanation 303 screen will come up. Such a screen will allow Seekers 999 who never experienced Tour Mode to learn about it. In addition there will be an option to skip 303 such an explanation for those who are familiar with the Tour Mode concept.

A Tour Mode setting that pops-up with an explanation screen can also be configured in a Seeker's 999 profile for situations where a Seeker is a loyal shopper and has a login assigned to him. As the Seeker decides whether to skip a Tour Mode explanation 303 screen, pre-existing tracking software running at the LCAP 1076 calculates said Seeker's 999 proximity and collects a set of proximity data 303 Seeker's 999 TO-U 200.

As the information appears on Seeker's 999 GO-UI 199, the Seeker has a choice to, select the information appearing in the GO-UI 199 or interrupt Tour Mode with another operation such as bar code scanning. Once a product is scanned and information is retrieved via a wireless, such as an 802.11, or wired, such as Ethernet, network from a LCS 1136, the information is delivered to the TO-U 200. There can be proximity information 303 available for this scanned product. For example, a Seeker 999 can be purchasing a DVD player, proximity information about this DVD player may include location of cables for this player and a location of a stand for Seeker's 999 electronic equipment. Such proximity information 303 can be delivered to the TO-U 200 as well, benefiting a Seeker 999 by offering related information to the current product.

In Guide Mode for example, a Seeker 999 could listen to an audio clip regarding a lawnmower that describes the unique leaf collector attachment, followed by an audio description of other features. Unlike online shopping, the Seeker 999 can physically interact with the potential purchase to determine the ease of use and/or benefits of these features. In addition, as described in the audio, the Seeker can rewind the information and reuse it as needed and forward information to the Seeker's home email for later use.

Figure 45:
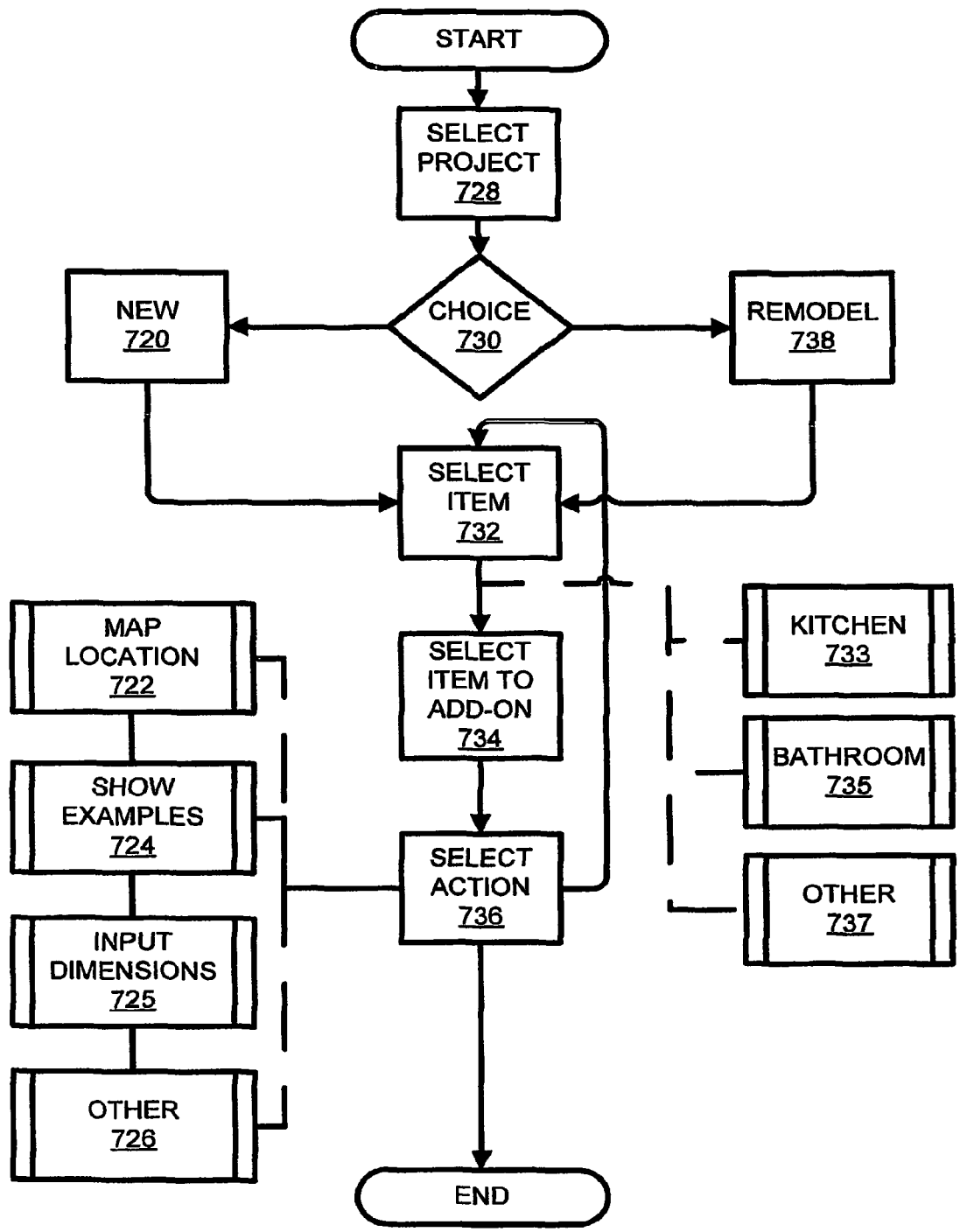
FIG. 45 is a flow chart depicting a Project Selection process.

FIG. 45 describes an example, where a Seeker is shopping in a hardware store. The Seeker could select a hardware project 728 using the GO-UI 199 on his TO-U 200. The GO-UI 199 could offer the Seeker 999 a range of selections, such as, is this a "New" 720 project or is this a "Remodel" 738 project?

The Seeker's 999 selection, "Remodel" 738 for this example. Next a list of potential remodeling projects appears in said Seeker's 999 GO-UI 199, such as "kitchen 733, bathroom 735, and other 737 (bedroom, living room, deck, garage, etc)". Once the Seeker 999 selected the appropriate selection, "kitchen" 733 for this example, then kitchen 733 would become the "Select Item" 732 or project.

Next the GO-UI 199 could give the Seeker 999 a potential list of items needed for the remodeling project, such as "sinks, countertops, windows, cub-boards, stove, refrigerator, microwave, dishwasher, flooring, lighting, and venting". The Seeker 999 could then either select or reject items needed from the list shown as "Select Item To Add-On" 734 in FIG. 45.

Once the item list was completed, the GO-UI 199 would offer the Seeker 999 another list of potential choices, such as how-to locate the items using "Map Location" 722 where the GO-UI 199 shows where each item is located, "Show Examples" 724 where the GO-UI 199 shows images of completed projects and/or plays audio clips of professional suggestions, "Input Dimensions" 725 where the Seeker 999 can input the actual dimensions of his kitchen for pricing and sizing purposes, and "Other" 726 for potential conditions that would fit a particular project such as the availability and cost for a local installer to complete the project.

In addition, if items are out of stock the GO-UI 199 could offer other store locations with the item in-stock and/or the option to order the item straight from the GO-UT 199 without any staff involvement. When a Seeker 999 selects items, such as a bathtub, the GO-UI 199 could show color choices, the most popular colors as selected by other Seekers, in-store designer suggestions, and a list of installations tips that could be forwarded to the Seeker's 999 home email account.

Data Transmission

Once the Seeker 999 selects a particular item, the database can use this selection to predict what the Seeker 999 is mostly likely to select next, based on other Seekers 999 who have requested that same material. If the Seeker 999 began examining some information or listening to a particular audio clip, the database could begin to transmit the data the Seeker 999 is most likely to request next totally transparent to the Seeker 999. When the Seeker 999 selects information that the network anticipated the Seeker 999 would request, this information is available on-request with little-to-no delay.

The amount of data sent to a Seeker's 999 TO-U 200 anticipating the Seeker's 999 next request would follow a number of conditions, such as the amount of memory available on the Seeker's 999 TO-U 200, the number of Seeker's 999 on the system, the current demand on the Seeker's 999 current TAP 1084 Information sent to the Seeker's 999 TO-U 200 could be tagged, monitored, saved, and/or removed. Information that was viewed the longest, for example, could have a priority in the TO-U's 200 memory over items that have been viewed less, down to items not viewed at all.

Depending on the Seeker's 999 usage, the TO-U 200 could delete unused or infrequently used items in the TO-Us 200 memory, so the Seeker's 999 experience is faster and more enjoyable. The TO-U 200 could retain a memory list of items viewed, so if the Seeker 999 requested an item viewed much earlier, the network could still retrieve that information from the database.

To-Do Lists

When a Seeker 999 locates information or an activity, the Seeker 999 can save that information to a "to-do list". For example, at a trade show a Seeker 999 could search for product demo times from a particular exhibitor. This Seeker 999 could select a convenient demo time and add it to their "to-do list". The TO-U 200 would notify the Seeker 999 of any schedule conflicts when saving the selected appointment. This "to-do list" can be recalled, saved and/or revised. In addition, the TO-U 200 could notify the Seeker 999 if the event, or exhibitor, cancels or re-schedules any items on the Seeker's 999 "to-do list".

The Monitoring Subsystem.

The Content monitoring-Subsystem is the "RMS" or Resource Management Software. RMS tracks system usage for both hardware and software.

For example, this software can track the number of TO-Us 200 currently being used by Seekers 999. If these Seekers 999 have unique identifications, such as shoppers, management, and staff, the software displays the numbers associated with each. This software also has sub-systems for "RTMI" or Real-Time Market Intelligence and "ISEQ" or In-store Employee Queuing (explained later).

In addition to creating more pervasive locations, this monitoring service provides visitors and locations with an ability to have interactive feedback. Locations will have an ability to have a "window" into how their services are effecting and benefiting the Seekers 999 in real-time. Seekers 999 new to the environment benefit from the feedback and usage data created by Seekers 999 who previously used the system.

Information Flow

The system is designed to allow a large flow of information from the provider to a multitude of Seekers 999 at any given time. But this information flow is not strictly one-way: provider to the Seeker 999. The provider can obtain valuable feedback and marketing data by asking the Seeker 999 questions or monitoring customer traffic flow patterns. This data returned to the provider from the Seeker 999 can be done without disclosing the Seeker's 999 personal identity, it can be stored on-site, linked to other sources, tabulated, monitored, and/or made immediately available.

The PBI 180 that is appropriate and available to any Seeker's 999 location is provided both on-demand and in some cases Content can be "rewound" as needed. Each Seeker 999 could have options on how information is retrieved. One option may be to pull information on demand, another option would be to pre-set a personal profile, allowing the network to participate in selecting information. Yet another option would be to let your location entirely dictate what information is currently available. Settings could allow for variations or combinations of these options.

In an airport for example, the Seeker 999 could request information about ground transportation that is available locally. From that list of options, the Seeker 999 could request all rental car companies within a certain proximity. Next, the Seeker 999 could let the TO-U 200 show promotions that are pushed to the TO-U 200. In addition, the Seeker 999 can store this information within the Seeker's wireless TO-U 200; they can replay this information over as needed, even outside the LCAP 1076. The prompt availability of global, local, and PBI 180 to meet each individual Seeker's 999 needs on his time schedule and pace is an important benefit of the system.

Seeker 999 Feedback and Usage Data

Besides PBI 180 information Seekers 999 can also obtain relevant local and global information. At a retail location for example, an information Seeker 999 could be a shopper, a sales clerk, management, vendor, or interested third party such as an advertising executive.

As a shopper, local information such as how to find products, departments, and staff help could be available on the TO-U 200. In addition, shoppers could receive information such as product specifications or sample music, movies, or video games. The popularity of these products could be displayed based on a number of methods including their popularity nationwide, their popularity among similar demographic profiles, similar geographic profiles, or temporal profiles. This data can also be collected, monitored, and utilized by the retail staff, management, and/or their product suppliers.

For example, the popularity of a particular video game could be based on Seekers' 999 requests for that the game and popularity results could be compared city versus city, store versus store, or time versus another time. This data creates new information that could be used globally throughout the network for other Seekers 999 and information monitors.

Seekers/Shoppers could provide retailers and manufacturers feedback regarding products, services, and employees. This feedback improves service and could also provide the Seeker/shopper with discounts. At a retail store for example, the Seeker 999 could register their feedback on a particular DVD movie (1—for outstanding, 2—for better than average, 3—for just okay, and 4—for below average). This Seeker 999 would then be able to receive back the data as to how other Seekers 999 have rated the same movie. If the Seeker 999 enjoyed the movie, he/she could also obtain suggestions for other movies from those who had a similar viewpoint, joining the video club., and/or purchase incentives.

Some Seeker 999 usage data is created even if the Seeker 999 does not request information. For example, the amount of time a Seeker 999 spends in a particular area can be tracked and measured against other Seekers 999. This data becomes even more sophisticated when you incorporate the Seeker's 999 actual information requested. For example, you may discover that Seekers 999 that request information regarding a particular video game also tend to spend time in front of the more expensive plasma TVs.

The exact location where information was requested also has powerful significance. For example, a retailer may discover that two stores with the exact same product display are receiving substantially different numbers of information requests from Seekers 999. In one store, the product displayed may be receiving many requests when located right next to the new DVD release section, but in the other store this same product display receives very few request placed only one aisle away from the new DVD release section.

If both product displays were thought to be located in approximately the same location, but they were still receiving substantially different Seeker 999 requests, further research may discover that one display is actually damaged or management may discover what works well for one store, may not work well in all others. Nuances such as where are the Seekers 999 standing relative to a product when the actual request for information is made (i.e. from the right, center, or the left of the product) can become very significant. This data can be monitored store-by-store, aisle-by-aisle, minute-by-minute, and in real-time.

Real-Time Feedback

At a restaurant enabled with the wireless service, patrons could use the TO-U 200 for a number of applications. People waiting for a table could be notified on their TO-U 200 that their table was ready. People waiting could listen to promotions within the community, play interactive games with others, or at some locations—hear and see the actual menu or nightly specials on their TO-U 200. Perhaps they cold even preorder reducing the time spent at the table and freeing up the resource for more revenue during peak periods.

The table's order could appear on the handheld complete with the running total. Diners/Seekers could notify the wait staff of any additional requests or they could flag an individual item listed on the TO-U 200 for a refill. Feedback on food and service quality could be entered and measured in real-time. This information is time-stamped and can be used later to determine which server or cook was on duty at that time. The information collected could be uploaded for franchises. These on-site services would allow management to be alerted in real-time about areas of concern.

In the past, a customer may have had to hand over their opinions to the person or persons they were being critical of. Since the system allows a customer's feedback to be observed instantaneously, perhaps a manager could remedy a negative situation before the Seeker/customer even leaves. If this feedback was done over the Internet, the restaurant manager or owner might not know which restaurant or store the Seeker/customer was in.

In another example, customers looking at a new digital camera could be asked to rank the importance of 1) digital resolution, 2) storage capacity, 3) cost, 4) size, and 5) ease of use. No one needs to walk up and bother the customer, and the customer is under no obligation to answer. Unlike most Web sites, the network does not force a customer to log in with their personal information.

Some applications would allow the Seeker 999 to not only provide feedback, but also order service. These requests for service could be for a wide range of needs, from requesting a waiter's help out at the swimming pool to ordering tickets for an event while standing in line. The TO-U 200 would allow Seekers 999 to explain why they are returning a retail item while still in the return line. They could also start to fill out any return form information, thus speeding up the return process.

At a trade show, exhibitors could use their handhelds to check off what services are active and which still need to be delivered or turned on at their booth. The exhibitor could review a checklist with such questions as:
  have their booth crates been delivered to their booth,
  has their booth been properly installed/setup,
  is their carpet installed,
  is their overhead signage installed,
  is their in-booth telephone service on or off,
  do they have or need an active Internet connection,
  do they have or need a badge scanner,
  do they plan to use models or audio in their booth, and/or
  is the information printed in the directory correct?

This information can then in turn be sent to a computer monitoring station, where the event sponsor and venue host can track those booth's needing attention. The sponsor or venue could also ask the exhibitor:
  if they have provided proof of insurance,
  do they wish to serve food or drinks from their booth,
  are they registered for next year's show, and/or
  are they a member of their trade organization?

Help Queuing

Figure 46:
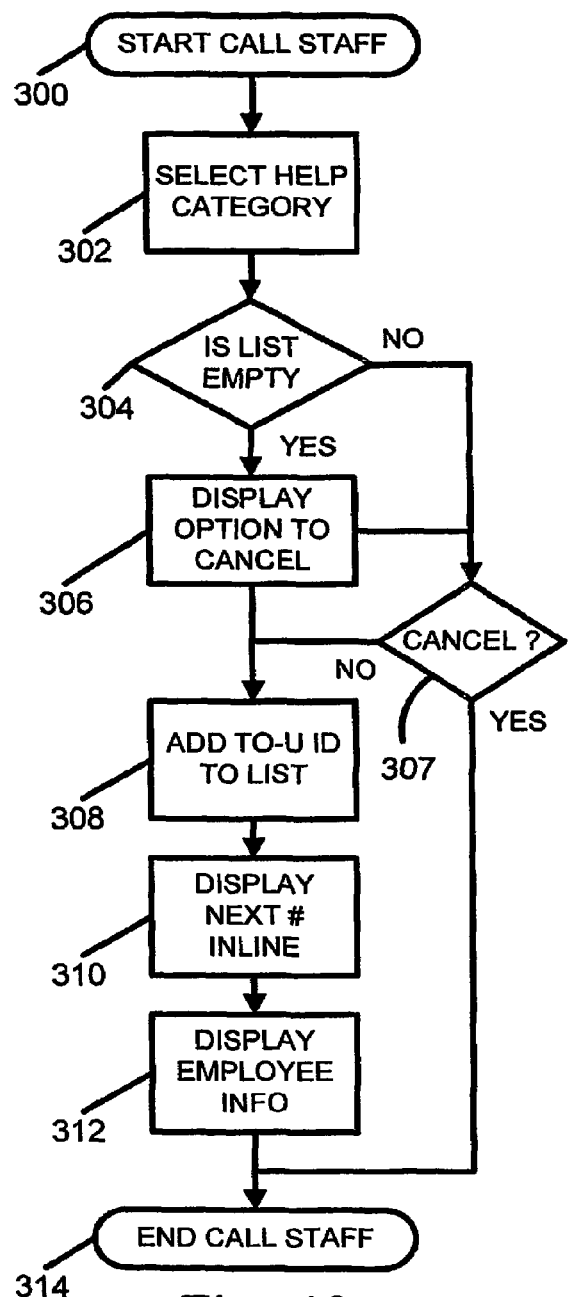
FIG. 46 is a flow chart depicting a Call Staff process within Help Queuing.

"Help Queuing" uses both hardware and software to provide a Seeker 999 the ability to request human assistance while within LCAP 1076, FIG. 46. During a shopping experience for example, a Seeker 999 realizes they require human assistance. FIG. 50 illustrates a map of a retail location where there are three Seekers 999 carrying mobile TO-Us 200 as well as an Employee 198 carrying a mobile TO-U 200. Generally it can be difficult to find the best on-site employee 460, FIG. 58, who can concisely and accurately answer the Seeker's question. When a Seeker 999 requests assistance using a TO-U 200, an employee 198 is either immediately or eventually assigned to that Seeker 999.

If the Seeker 999 requests an employee 198 with a particular expertise or condition, an employee who meets that condition will be assigned to that Seeker 999 if the employee is available. If all employees who meet the requested condition are busy, the Seeker 999 will be notified that a wait period is necessary. This wait period can be shown to the Seeker 999 as either temporal, by the quantity of Seekers 999 who proceed him, or a combination. Once an employee who meets the Seeker's 999 requested condition is available, the employee is notified to help this particular Seeker 999.

Help Queuing provides Seekers 999 the ability to request help anytime, as needed. If a particular expertise requires the Seeker 999 to wait, the Seeker is free to continue shopping/browsing for other needs during this period. Using tracking the particular employee the Seeker 999 requires will find the Seeker 999 when the employee becomes available. In many of today's retail environments for example, shoppers/seekers need to follow an employee along with a trail of other waiting shoppers/seekers, often only to find out that this particular employee does not have the proper expertise.

This locating-employees by capabilities is based on a range of conditions such as the employee's department, current location, skill level and/or availability. Other employees or management can also become Seekers 999 and use this locating feature. The application can identify the employee with a number of conditions, such as:
  1. staffs name 466.
  2. identification number.
  3. color codes,
  4. department code 452,
  5. expertise codes 476,
  6. availability codes 470,
  7. feedback rating codes 456,
  8. proximity codes,
  9. tenure codes 560,
  10. picture of staff 558, and/or
  11. a combination of the above.

Figure 54:
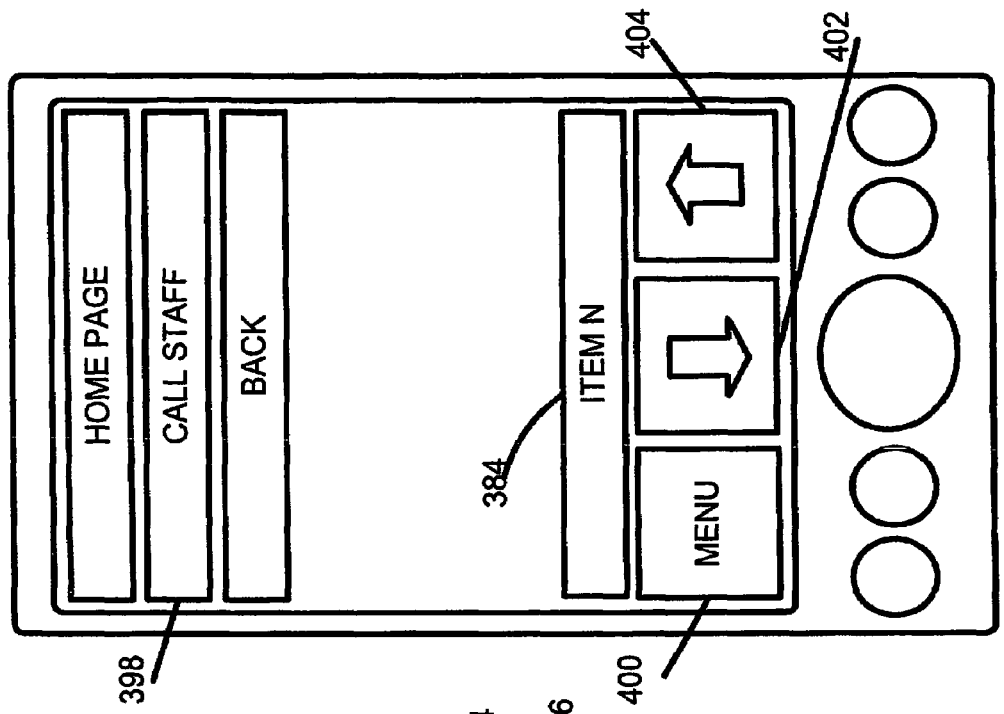
FIG. 54 is a block diagram depicting an employee's 198 TO-U 200 GO-UI 199 Call Staff button within Help Queuing.

"Help Queuing" can be launched by a Seeker's TO-U 200 GO-UI 199 using a button that is labeled "Call Staff" 398 FIG. 54. If Seeker 999 is placed in Queue, he is welcome to walk around and Staff will come find him when he is next for help.

Figure 58:
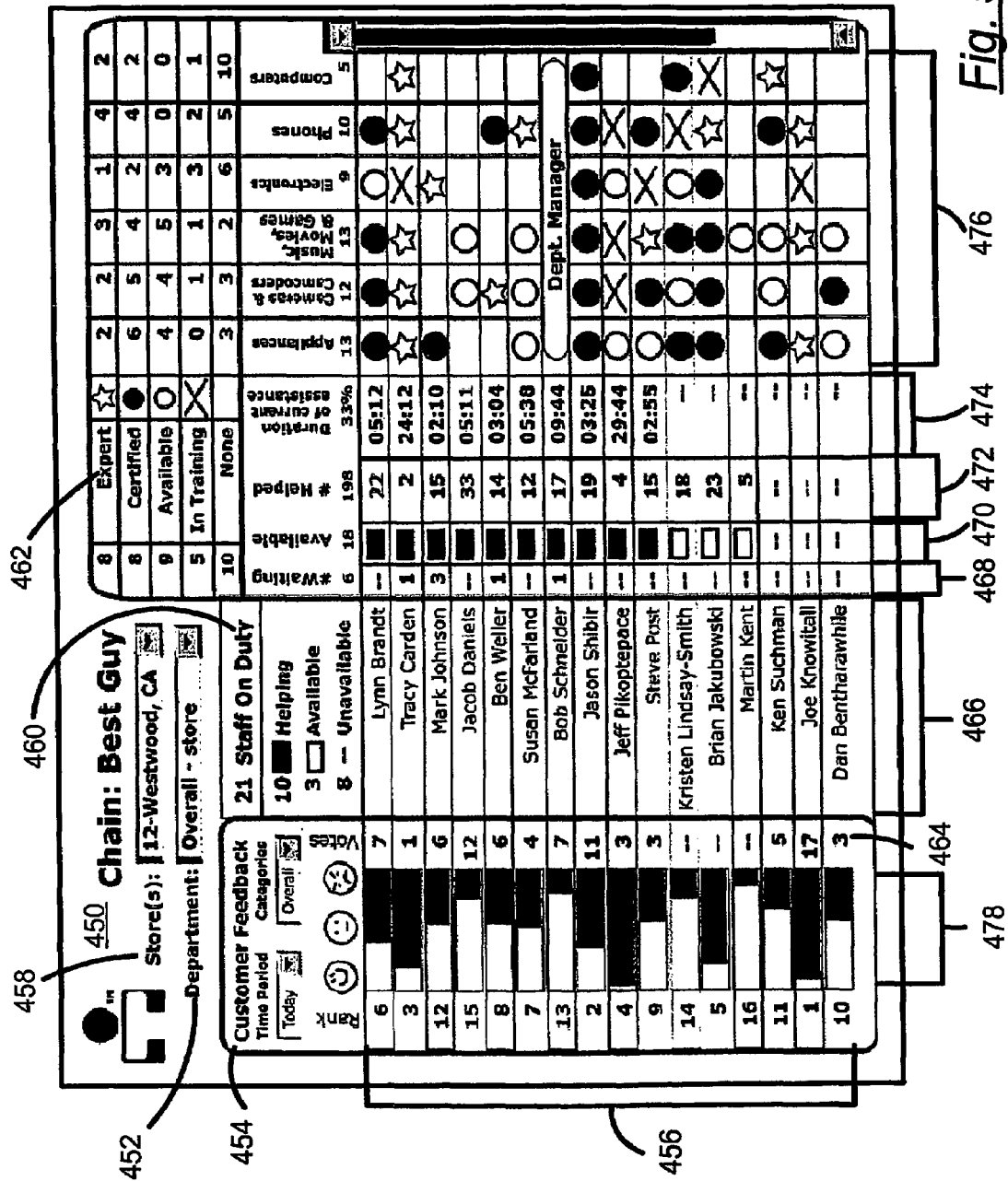
FIG. 58 is an illustration depicting TO-QM management screen.

There are four main components to "Help Queuing":

1. The Overall Queuing Module or "TO-QM"—This software runs on a desktop PC as shown in FIG. 58 that provides on-site managers the ability to monitor in real-time the number of employees currently helping customers, the number of Seekers 999 requesting help, the number of TO-Us 200 in use and by whom, and other historical data.

2. "Call Staff"—The Seeker's 999 ability to "Call Staff" or request help using the TO-U 200. The GO-UI 199 will also allow the Seeker 999 to score the employee on measurements such as: promptness, helpful, knowledgeable, courteous, etc.

3. Staff Scheduling and Prompting or "SSP"—FIG. 51 The employee's ability to know which Seeker/shopper requested help (by an assigned ID, code, or name), where the Seeker's 999 is currently located FIG. 52 (by tracking software that shows the location with a store map), and in certain cases, what help was requested FIG. 51 and FIG. 53 (using that particular Seeker's 999 "data-click history" or "location" of that Seeker 999 based on past Seekers 999) such as, Product Image 388, and Short Description 390.

4. Employee Queuing Reports or "EQR"—the TO-QM software will also allow managers to see feedback 454 left by Seekers 999 regarding the staff measurements mentioned under "Call Staff" above.

"TO-QM"—The Overall Queuing Module

TO-QM FIG. 58 keeps track of which employees are clocked-in and on-site to help Seekers 999. In a retail environment for example, it would separate those employees 466 that are assigned to help shoppers/Seekers on-the-floor from those employees who are not, such as employees that are strictly working the POS 178, the people in shipping and receiving, stocking, etc., unless they are also assigned to help Seekers/shoppers with questions.

The main idea behind the TO-QM is to give managers an overall view 450 of which staff members 470 are helping Seekers 999, what areas of expertise 476 are being most utilized and to recognize areas 462 of strength and weaknesses. Historical data can be retrieved to make improvements. Depending on the number of employees, much of the high level information can be viewed from a single screen 450 using a desktop PC.

The information is broken down first by a specific company, brand, or retailer, then geographically by territories or eventually by individual locations or stores. At the store level, it is broken down by department, and then by individual employees. On-site managers could have passwords that would allow them to login into information that has been assigned permissions, such as his or her specific location or store, and areas of control.

Information can also be tracked from managers online from a corporate headquarters. These managers could view information metrics based on:
  a nationwide basis,
  regional,
  store-by-store 458,
  employee-by-employee 460, and/or
  department by department 476,
  Or by other conditions, such as:
  the performance of a particular store or stores,
  the performance of a particular product or product category,
  the performance of a particular marketing campaign,
  levels of staff expertise 462,
  the amount of time Seeker spent in queue 383,
  the amount of information requested by Seeker,
  the amount of information requested by staff, etc.

The system tracks all available employees, their area of expertise 462, and those usage metrics the management selects from the list above. Employees are assigned a mobile TO-U 200. This employee's TO-U 200 device will have a login for when said employee comes on duty and a logout function for when said employee goes off duty. This login makes their name appear on TO-QM 450 screen as available to help Seekers 999, unless said employee logs-in on-duty, but unavailable.

For those employees who login as available to help Seekers 999, there is already information attached to their login profile regarding his or her areas of expertise, such as subjects where they possess:
  1. High-level "expertise" (i.e. at an electronics store: cell phone rate plans expert, and at a home improvement store: cabinet installation pricing expert),
  2. Areas 462 where they have been "certified" (i.e. at a home improvement store: plumbing, electrical, etc. and at an electronic store: digital camera, personal computers, etc.),
  3. "General" knowledge, so as to fill in when more experienced employees are not available,
  4. "In-training" to signify that they are not available for difficult questions, but they are currently in-training for that department, and
  5. "None" signifies that they have no experience in this department and are not currently in-training to acquire this knowledge.

In a retail store for example, each employee could have a photo id attached to his or her login record in the database. This photo 418 FIG. 57 could then come up on the shopping Seeker's mobile TO-U 200 GO-UI 199 along with the staff member's first name; so that the Seeker 999 knows what the employee assigned looks like who is coming to help the Seeker.

The database tracks temporal information on several items. It tracks when employees login as:
  1. On-duty and available to help Seekers 999,
  2. On-duty, but not available to help Seekers 999,
  3. Off-duty, on break, and
  4. Off-duty and signed out.

It also tracks the starting and ending time of each Seeker 999 said employee has helped. It tracks the amount of time Seekers 999 wait based on what department they requested help in, what day and what time of day the request was made. For example data might reflect that Seekers/shoppers who request an employee with plumbing expertise on a Saturday tend to wait 20 minutes before receiving help, compared to Tuesday's after 6 pm, where shoppers then to wait an average of 4 minutes.

The system then tracks the amount of time spent helping each Seeker 999 overall and the amount of time 474 each employee spends helping a Seeker 999. Running totals are kept on how many Seekers 999 were helped 472 per department 452, per employee 466, per area of expertise 476, per store 458, and per period of time.

This data provides new and unique metrics for monitoring employee efficiencies and areas for improvement. This usage data allows retailers to make store-by-store comparisons. For example, a retail regional manager may want to consider transferring an employee from a store that is overstocked with a certain expertise to another local store that lacks that expertise.

The retailer can assign color codes or symbols for specific areas of knowledge and expertise to the TO-QM software. This helps managers at a glance to see which departments are understaffed and overstaffed, not based purely on the quantity, but by the number of Seeker 999 requests for that area of expertise.

Figure 59:
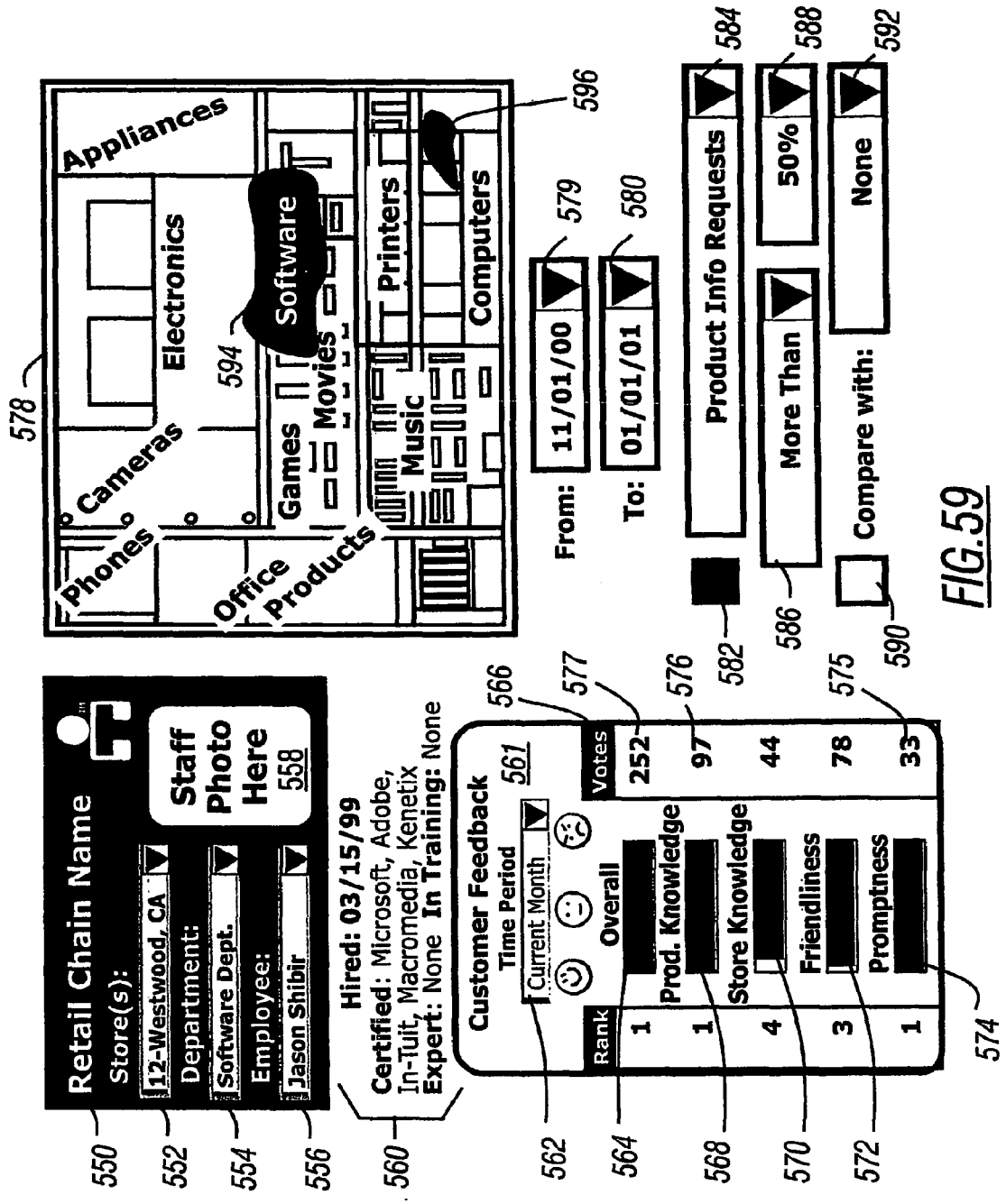
FIG. 59 is an illustration depicting TO-QM employee screen.

In FIG. 59 red dots (shown as black dots) are placed to the right of the employees name to signify when they are currently helping Seekers 999. Yellow dots (shown as dashes) indicate that an employee is on-duty, but unavailable to help Seekers 999. This could be due to the employee being temporarily re-assigned to another task, such as checkout, stocking, or security duty. Green dots (shown as white dots) indicate that the employee is on-duty and available to help a Seeker 999. The less areas of expertise and certification an employee has, the fewer Seekers 999 he or she is likely to help.

Seeker's 999 Ability to "Call Staff"

When Seekers 999 request help, they can request help in general 410 FIG. 55 or by a specific area of expertise 412, 414. A Seeker 999 requests help using their TO-U 200 (Transceiver Operating Unit). The GO-UI 199 (or TO-U GUI) may vary depending on the retailer. For this example, refer to the following FIGS. 46, 54 where a Seeker 999 presses the "Press for Menu" button that initiates a Call Staff procedure 300 found on the lower right of their TO-U 200 screen UI.

When a Seeker 999 selects "call staff help", they are given an option to select a help category 302 consisting of possible three options, such as one for requesting general staff assistance, a second for a staff with expertise associated with the department they are presently in (assuming device tracking capabilities) in this example the cellular phone aisle, or associated with the last item selected, and a third for selecting a staff member with expertise in another department. For example, FIG. 55 illustrates a screen a Seeker 999 could select General Staff Help 410 without anyone in-line, Cellular Phone Help 412 with 2 people in-line, or see List of Other Areas of Staff Expertise 414. Seeing there could be other Seekers in-line, the Seeker 999 could Cancel 307 Call Staff 300. On the other hand, if Seeker 999 proceeds to get in a Queue, the system will Add Seeker 999 to List 306, storing Seekers information in memory on the LCS 1136, then the system will display next number inline on Seeker's GO-UI 198 as well as display Employee's Information 312 the Seeker's 999 viewing. The above process will place Seeker 999 in the Queuing system, ending Seeker's Call Staff 314 request, and allowing Seeker 999 to continue shopping until Staff arrives 316.

Figure 47:
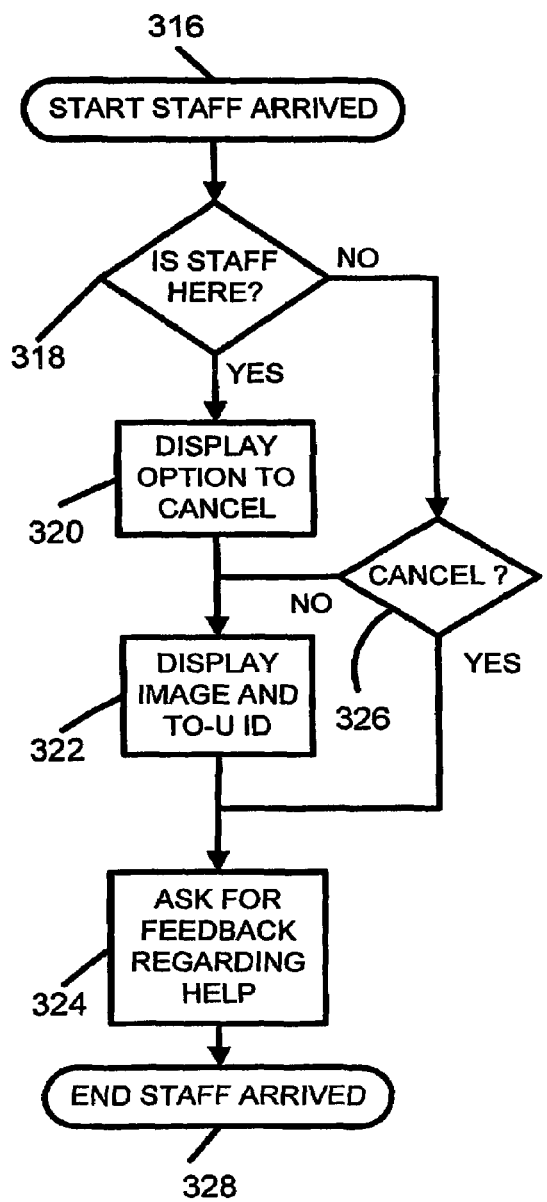
FIG. 47 is a flow chart depicting a process of Staff Arrival within Help Queuing.

FIG. 47 describes a possible process a Seeker 999 could go through when Staff arrives at Seeker's location. Is staff here 318 alerts Seeker 999 whether Employee 198 has arrived. At this point a choice could be made on the part of a Seeker 999 if to Cancel 326 or stay in-line. Choosing to Cancel 326 allows Seeker 999 to give Feedback 324 regarding said Seeker's 999 Staff Help session. Choosing to Cancel 326 help, would probably indicate that help is taking too long, in which case a Seeker 999 would not leave favorable feedback, if any at all. If Employee 198 arrives, Seeker 999 will get a chance to view Employee's 198 image 322, also 418 FIG. 57, and experience help. Before the end of help session 328 FIG. 47, Seeker 999 will get a chance to rate 324 his helper. Hopefully Seeker 999 was satisfied with assistance.

Figure 52:
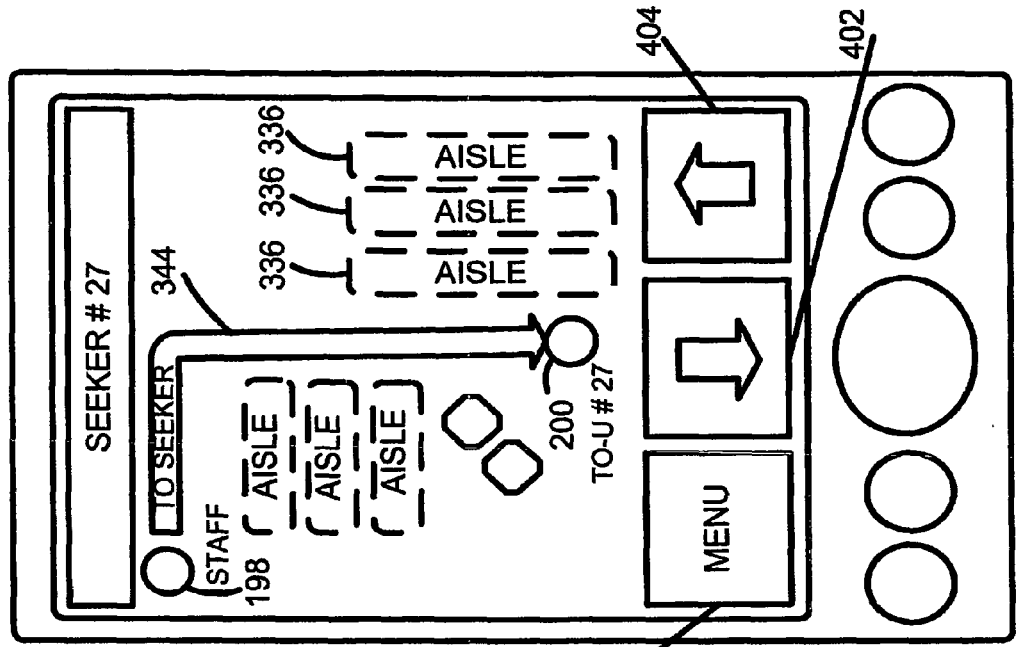
FIG. 52 is a block diagram depicting an employee's 198 TO-U 200 GO-UI 199 mapping a path to a Seeker 999 within Help Queuing.
Figure 53:
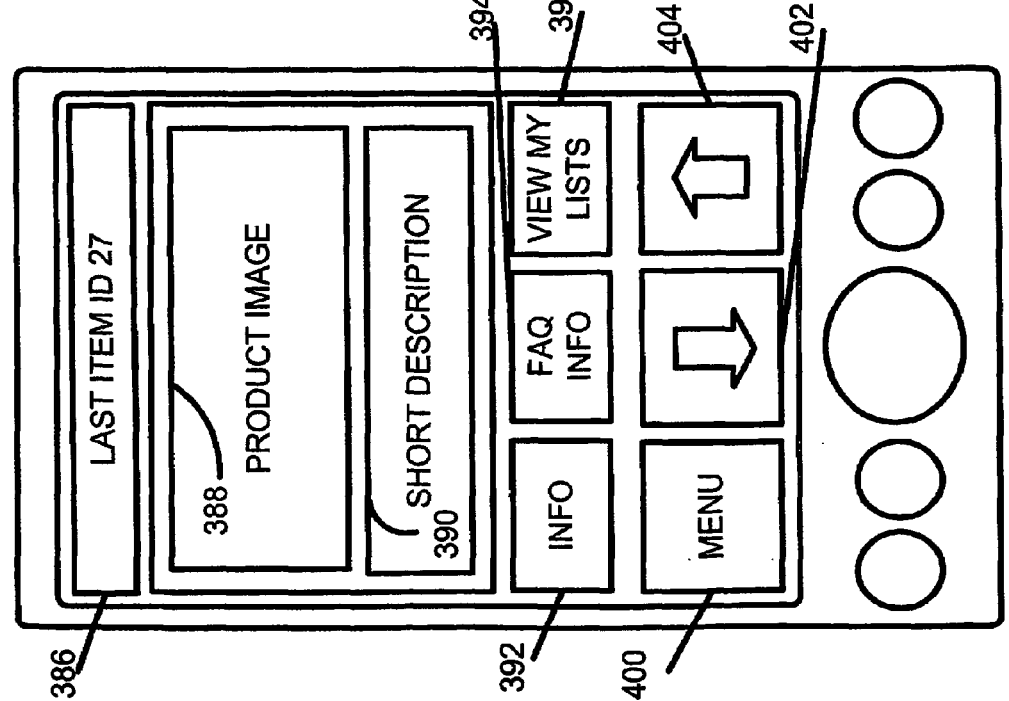
FIG. 53 is a block diagram depicting an employee's 198 TO-U 200 GO-UI 199 showing the last item request by a Seeker 999 was looking at prior to requesting Call Staff within Help Queuing.

While Seeker 999 is waiting for Employee 198 to show up, said Employee 198 has a chance to preview Seeker's information, such as Image of the Product 388 FIG. 53, short description 390, as well as where Seeker 999 is at this point in time FIG. 52. To seeker 344 path shows Employee 198 how to reach Seeker 999, as well as where said Seeker 999 is located.

Locating a Seeker 352 FIG. 49 is part of a process an Employee 198 has to go through when the Employee's TO-U 200 is notified with a Seeker's identification number requesting Help 346. A possible process could consist of an Employee 198 looking up next Seekers 999 TO-U 348 identification. FIG. 48 describes a flow while assigning TO-U 200 identifiers to Employees 198. Step 338 notifies the Employee 198 with Seeker's identification number, at which point the Employee 198 accepts 340 requests for help. Acceptance by an Employee 198 will cause Seeker 999 TO-U 200 to alert him, notifying the Seeker's TO-U 200 with Employees information 342.

Figure 51:
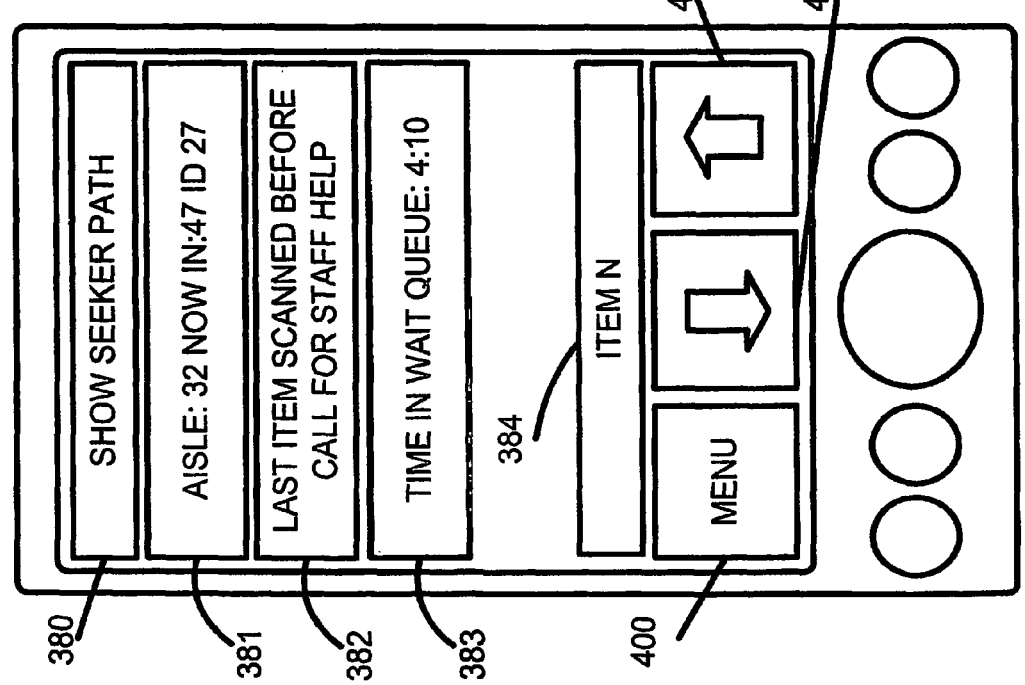
FIG. 51 is a block diagram depicting employee's 198 TO-U 200 GO-UI 199 while helping Seeker 999 within Help Queuing.

Once Employee 198 accepts request for help, the Employee 198 can lookup information 350 that a Seeker 999 is looking for. For example, such information could be Seeker's last item before asking for help. FIG. 51 illustrates a screen where an Employee 198 has a list of items he could find out about a Seeker 999 such as, Show Seeker path 380, Aisle locations 381, Last item looked at 382 before asking for help, and time in wait queue 383. Once Employee 198 Locates Seeker 352 FIG. 49, he will arrive 354 at Seeker's location and call out TO-U's identification number 356 and help seeker 359 with said Seeker's 999 question(s).

Here is an example, where a Seeker 999 is standing in the cellular phone section, the Seeker 999 could accept general help 410 FIG. 55 and take his chances that they are assigned someone with expertise in cellular phones, or he could request an employee with cellular phone expertise. The third option "Other Expertise—See List," 414 would allow the Seeker 999 to select from a list of expertise levels and associated wait times.

For another example, a seeker standing in the paint section, may wish to join the queue to have a new door key cut or at an electronic store they may wish to join the queue for color printer help while standing in the DVD movie section. Different conditions could be created that could restrain the number of queues a given Seeker 999 could join or enter simultaneously. For example an anonymous shopper will only be able to join one queue at a time, but certain shoppers such as loyal customers or special customers such as contractor, could be allowed to join multiple queues.

At any time, a shopper waiting in a queue can look up where their current wait position is 416 FIG. 56, by pressing the "menu" 400 button in the lower left. This brings up the overlay menu with their current position. In FIG. 56 the Seeker 999 is currently 2.sup.nd 416 in line.

Figure 57:
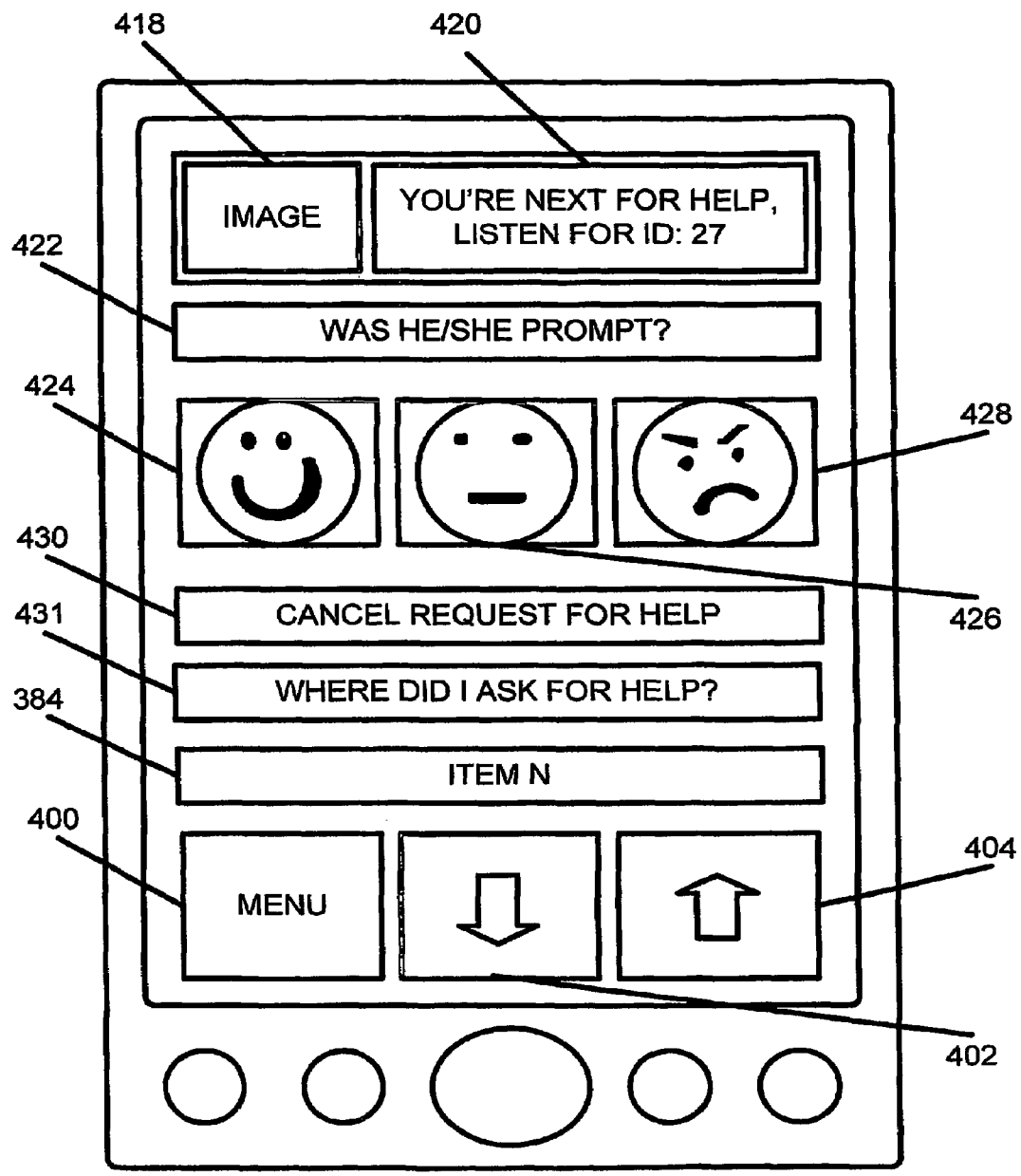
FIG. 57 is a block diagram depicting a seeker's TO-U 200 GO-UI 199 vote on an employee's performance.

When they are first in line, their device prompts them with the image 418 of the employee assigned to help them and the ID number 420 they have been assigned so that they may remain anonymous, in this example, number twenty-seven as showing in FIG. 57.

The employee's TO-U 200 tells the employee to go announce the identification number twenty-seven to help this particular shopper. With device tracking said shopper/seeker could request either that said employee come to their present location or that said employee will meet them at a designated location. If there's no tracking available in the location, the UI may request that the shopper meet said employee at a particular point within the store, such as at the front of aisle twenty-seven or in the sink section of the plumbing aisle.

When the employee arrives, the shopper will verify his arrival by indicating a response within GO-UI 199. Using the voting mechanism that the shopper can select from a list of emoticons as to how prompt the employee was or was not. See FIG. 57. This action starts the clock on this shopper's assistance time. The shopper will also be able to cancel a request for staff help 430 and the shopper has the ability to bring up the last item the shopper was looking at before the shopper requested help, in case the shopper needed to be reminded.

Shopper will also be able to give feedback on the level of help and courtesy the shopper received after the shopper has been helped.

FIG. 59 is an example of retrieving and monitoring information at the employee level using the TO-QM. The name of the venue 550 selected would appear in the upper left corner and the rest of data for this screen would correlate to this said venue. In this example the venue could be a retail chain.

This screen containing employee information might be retrieved and reviewed by a number of people, such as an in-store department manager, an in-store overall manager, district manager, and/or by someone at the headquarters of the retail chain 550 named. This information could be reviewed and study during the course of the day, during an employee's review, and/or for creating reports. This data could be seen in near-real time or historical.

For example, the in-store overall manager could use field 552 to select the particular store that he represented, such as "Store number 12 in Westwood, Calif.". Next the said manager could select a particular department 554 and the name of a particular employee 556 who works in that department. This would bring up an image of the particular employee 558 and other related information, such as when the said employee was hired, what products the said employee is certified in, an expert with, and those that said employee is currently in training with, as shown in section 560.

Section 561, shows the said employee's customer feedback scores over a selected time period 562, shown as the "current month" in this example. Below 562 is the said employee's combined scores or "Overall" 564 score for the time period 562 selected. The Overall 564 score combines the said employee's customer feedback scores for "Product Knowledge" 568, "Store Knowledge" 570, "Friendliness" 572 and "Promptness" 574.

These scores are typically collected from in-store Seekers who have selected and used "Staff Help" and/or when a Seeker leaves feedback regarding a specific employee. For example, when a Seeker uses the "Staff Help" function, said Seeker is notified that she is next for help. She can then vote as to how promptly the assigned employee appeared to help her. This shows up under "Promptness" 574. After an assigned employee has helped said Seeker with the Seeker's question, the Seeker can also score the assigned employee on such subjects as product knowledge, store knowledge, and friendliness.

The Seeker is typically not obligated to leave "Customer Feedback", but rather it is an option. In some cases, the Seeker may not leave any feedback, while some Seekers may only give feedback on certain questions. Thus the numbers under the "Votes" 566 column are not all the same amount. In the case of the number of "Promptness Votes" 575, there are only thirty-three Seekers votes' verses the number of "Product Knowledge Votes" 576 is ninety-seven votes. Field 577 shows two hundred fifty-two votes, this is the combined number of votes for the Overall 564 votes collected over the time period 562 selected.

In FIG. 59, the right upper corner of the screen has a map 578 showing the layout of the particular store 562 by said store's departments. Below map 578, a person logged into this module, such as the Westwood store 552 overall managers can select another time range to see a RING on the map 578 that relates to the particular employee in field 556. The manager would first select the time range using the "From" field 579 and the "To" field 580. After selecting this time range, the manager could select what type of information regarding the particular employee in field 556 the manager would like to view using field 584, for such selections as: Overall TO-U usage, "Product Information Requests", TO-U usage helping Seekers, and/or TO-U usage for training.

The results of time range and the selection in field 584 creates an overlay on the map 578 depicted in the color shown in box 582 and as seen on the map in areas 594 and 596. In this particular example, the manager filtered the information further using fields 586 and 588. In field 586 the manager places a condition of "More Than" and in field 588 another condition of "50%" usage to further filter the conditions listed in the above field 584. The results would be redrawn on the map 578 if the results were different.

Next, the manager could compare this data with historical data, such as against other time periods for the particular employee named in field 556, such as a week-to-week, month-to-month, or year-to-year comparison. Comparison could also be made against other employees with the same store, other stores, or by such conditions as when compared to the top employees with a district or department.

These said comparisons could be selected using field 592 that is currently set to "none". The results would appear as an overlay using the color code found in box 590. Using these comparison capabilities, managers could learn valuable patterns created by top performing employees that can then be shared with others within the department or retail chain.

For example, in FIG. 59, this particular employee named in field 556, works within the 'software department', yet the map 578 shows that there are two RINGs. One RING 594, shows heavy TO-U usage within the employee's assigned department, but RING 596 shows additional heavy usage outside the employee's department. The manager could ask this particular employee 556 who has a number one "Overall" 564 Customer Feedback 561 rating, why he has such heavy TO-U usage outside his department 554?

The answer could be that said employee 556 has found that Seekers who buy the more expensive computer within the computer department tend to buy the most computer software. Armed with this knowledge said employee 556 occasionally spends time in the computer department talking to Seekers regarding new software. Using his TO-U, he can request information regarding particular products on behalf of Seekers.

This information could be for what versions of a particular software package are currently in-stock. The manager of said employee 556, could then share this information and corresponding map 578 overlay with other managers within the chain. These managers could call up the overlay and compare with their own employees' within the same department.

The ability to compare conditional RINGs displayed or overlaid on a map can be applied to several subjects beyond employees. These RINGs could be stored and recalled as needed. For example, the database could be queried to create an overlay map of Seeker Usage during a time span that a suspected theft took place. Over time a large sampling of similar potential theft RINGs could be compared and analyzed that may reveal patterns that could be used to search historical data of similar patterns in the past and who was known to be in the store.

The system could be setup to recognize patterns that can predict a potential theft that can in-turn alert an employee within the area on their TO-U or a manager on their TO-U and/or the TO-QM. These localized alerts could also be created for predicting sales situations, such as a Seeker likely to need help, an accessory, a suggested item based on similar historical data. All of these predictive RINGs can be set to automatically notify the Seeker or Staff mostly to benefit from this information.

A variety of RINGs described earlier under "RINGs" could be compared using color codes. These color codes can create separate distinct areas of color or setup to allow colors to merge. Where for example blue overlapping yellow creates green. This merged color capability can be useful when comparing RINGs within similar locations.

For example, a buyer for kitchen faucets, could retrieve RINGs for Seeker requests for a particular faucet in two different stores. One store could be the number one performing store within the retailer's chain for that particular faucet verses another store. This comparison information gives the said buyer a visual to see where display problems may be occurring. The data could also compare peak periods of demand by Seekers. For example, said buyer could compare the day and time of the highest demand of Seekers of the number one performing store against another store to analyze the differences, if any.

Figure 60:
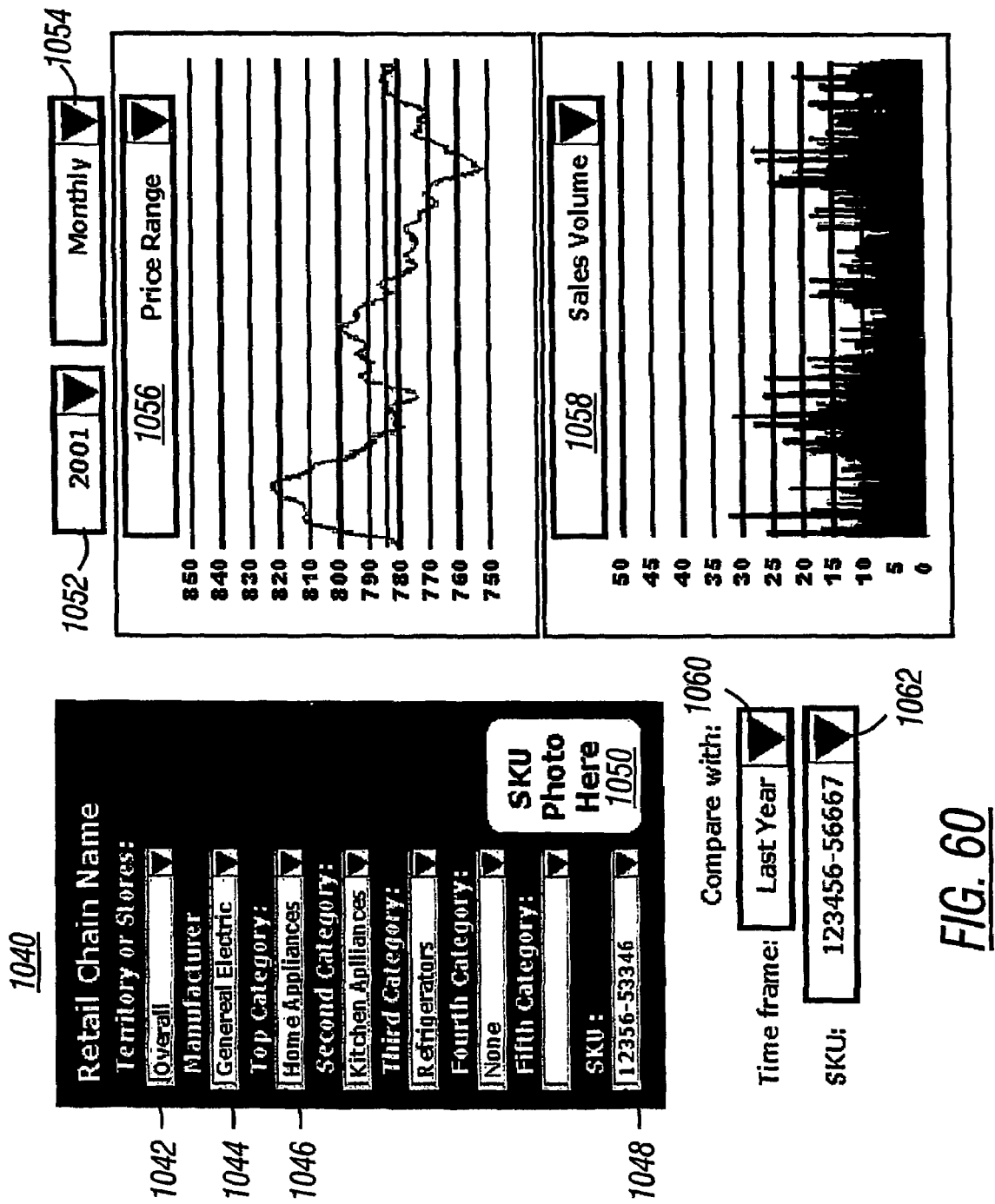
FIG. 60 is an illustration depicting the RTMI or Real-Time Market Intelligence reporting screen.

FIG. 60 is a screen example from the "RTMI" 1040 or Real-Time Market Intelligence reporting module. This module provides a view of both real-time and historical data of the system's usage. Access to this module can be conditionally restricted to parties that are granted permissions by the participating. LCAP 1076, the COPP 1070, and/or the participating RCS 1000.

For example, a retailer buyer within a retail chain's headquarters could login and view market data for stores or territories using the top left field 1042. Next, the buyer could select a particular manufacturer 1044 to selective view just said manufacturer's products or marketing campaigns. For this example, the buyer selects the manufacturer "General Electric":

The buyer could review this manufacturer's overall information covering a selected time-span or the buyer could further filter the data by selecting categories, starting with the top category 1046. For this example, the buyer could select "home appliances, kitchen appliances, and then refrigerators" until all categories were exhausted or as far as necessary for the report sought.

If the buyer wanted to isolate a particular SKU, she could select said SKU in field 1048. After selecting the SKU, said SKU's photo would appear in area 1050. Next, the buyer could select a time span or time block, such as a year, in field 1052. Then a sampling range can be selected in field 1054, such as "monthly".

In field 1056, the buyer selects a condition to create a graph. In this example, "price range" to see the fluctuation in said SKU's actual retail price. This data can incorporate such things as discounts, rebates, mark down allowances, returns, etc. This data can be compared to other historical data such as year-to-year, month-to-month or verses another SKU. This data can also be gauged against the manufacturer's suggested retail price and/or the competition, if that data is available.

In field 1058, the buyer can select other fields that fall under the same time spans as outlined in fields 1052 and 1054. In this example, the buyer selects "sales volume" to graph the sales volume a particular refrigerator on a monthly basis during the year 2001.

In field 1060, the buyer can compare the data used in both the "price range" 1056 graph and the "sales volume" 1058 graph against historical data. In field 1062, the buyer can compare against another SKU.

More on Content Source Subsystem

As explained earlier, information or Content that gets modified, aggregated, or tagged is called "TAC" 184 or Tagged and Aggregated Content. Besides PBI 180, TAC 184 can include other meta-tags for such things as D-FACS 874 or Data-From Automated Computer Sensors, "DID" or Designated Information for the Disabled, Foreign Language Translations ("FLT") 186 and/or "MUN" 878 or Match-up Notifications.

A LCS 1136 could receive information and synchronize data with such sources as airlines, baggage claim areas, rental cars, hotel booking systems, apartment rentals, sports, fantasy sports, stocks, weather, news, movie theaters, and ACS 188 (Automated Computer Sensors) on such things as mass transit vehicles, emergency exits, and/or fire detectors in buildings.

D-FACS 874—Data-From Automated Computer Sensors

Information from ACS 188 is D-FACS 874 or Data-From Automated Computer Sensors.

In an emergency evacuation of a building for example, ACS 188 on each floor in a fire-escape/stairwell could be sending a signal back to the LCAP 1076 that could in turn relay important information to people trying to evacuate. This ACS 188 information could also be sent back to the COPP 1070.

Using an instrument that measures heat levels, such as ceramic cones that melt only at certain temperatures could be installed in the stairwell on every floor. When the cone melts it would signal the LCS 1136 that that particular floor or area was no longer safe to pass through. If a cone on the 7th floor of a thirty story building melted, the Seeker 999 listening to the emergency evacuation channel would know that critical information before getting to the danger on the 7th floor and then having to backtrack to an alternate route.

Emergency and fire crews could also receive this critical information so that they would know where the fire was currently active. These emergency-crew members could communicate with the people inside the building by leaving updated messages for all to hear, versus everyone trying to talk over the same frequency at the same time.

"FLT" 186—Foreign Language Translations

For those locations that choose to offer foreign languages to their on-site Seekers 999, the system would allow Seekers 999 to select their language of choice on the TO-U 200. This language would appear in the TO-U's 200 menu and would be the language of choice when the Seeker 999 listens to audio messages or reads text.

Assuming English was the default language, the entire English version might be available in another language, such as Spanish, Japanese, French, German, Dutch, Chinese, Mandarin, Russian, Korean, Portuguese, Vietnamese, Hindi, Bengali, or Telugu. In some cases, only certain messages might be available in foreign languages. If a Seeker 999 requested that their messages be transmitted in Spanish for example, but not all the messages were available in Spanish, this Seeker 999 would be able to select between: "only show me Spanish messages" (heard in Spanish), or "show messages in English, if not available in Spanish".

Content such as television broadcasts or movies could have audio available in several languages besides English and Spanish at the COPP and some CAPs. This audio would be synchronized with the broadcast or theater feature, so Seekers 999 could hear this Content in the language of their choice. This capability could be used in the home through an Internet feed without using a mobile TO-U 200.

In a home where the native language is Chinese for example, this service could be installed through an Internet connection to a speaker near the television. For those television shows that offer this service, this family would be able to hear the audio in their native Chinese language.

This Content could also be made available using the mobile TO-Us 200 at such places as sports bars, hotels, college dorms, hospitals, trade shows, theme parks, vacation spots, cruise ships, mass transit, airports, and at movie theaters or concert halls. In addition, the system would be able to tabulate the number of people listening in each language and where these groups are concentrated. Content could then be focused in these areas in their native language. All Seekers 999 would have the ability to rate the service, the Content/programs, and participate in opinion polls.

Those hotels that best interact with the system would receive a symbol that appears next to their listing on the mobile TO-U 200, signifying their Content accuracy and reliability. This scoring system could be used for a wide variety of Content providers, such as airlines, car renters, theaters, movie renters, restaurants, sporting venues, cruise ships, and theme park rides.

Foreign Language Synchronized with Content.

Redistribute broadcaster content in many of the most popular languages. For example, a television broadcaster, could sell hardware, software, and a service to Seekers in their homes where said Seekers could listen to popular tv shows in said Seekers' native language. Today, this is often done in Spanish, but the system could play many languages and the Seeker in the home could listen to the audio through their speakers or through a wireless headset. In addition, separate advertisement could be create for the commercial breaks that either coincide with the tv commercial or that are unique for that audience.

"MUN" 878—Match-Up Notifications

A LCAP 1076 could have the ability to receive profile requests from a Seeker's mobile TO-U 200 when they enter a LCAP. A Seeker 999 can predefine their profile requests either by entering data into their mobile TO-U 200 or by downloading information from another source such as a hard-wired computer.

A bride could visit a participating department store's website for example, and create a wish list that they in turn e-mail to their guests. Guests who have a mobile TO-U 200 can download this list and go to the department store where their mobile TO-U 200 will alert them. This alert could either be where the items are located or an alert when they are within a certain proximity of a tagged item.

The tagged items selected by the couple could have audio messages from the manufacturers explaining the product's benefits, but they could also have personalized comments from the bride and groom, or others. These messages can be selectively sent to certain individuals.

Each handheld TO-U 200 is identified by its unique electronic serial number. In addition, the Seeker 999 can designate an ID that friends are likely to remember such as the Seeker's 999 phone number. Then by entering a guest's phone number, the bride and groom could assign individualized messages that could be retrieved by the guests as they are shopping. In addition, the network would notify these shoppers of which items have already been purchased. These guests could in turn leave messages for the bride and groom.

This selective message sending can also be used by advertisers for such things as discounts to frequent buyers or based on certain demographics. For example, a frequent purchaser of a particular item, may receive more advanced information then a Seeker 999 new to the system or location.

Dating Profile—Assigning Temporary Personal ID Numbers

For those Seekers 999 who chose to set up a dating profile, they can select their own four-digit user ID. This ID can be changed as needed and is used in place of a person's personal information which helps protect the individual's privacy.

Some TO-Us 200 can also accept voice commands, voice messages, and voice communications.

Group Messaging

At a trade show for example, a sales representative working at an exhibit booth could leave the following voicemail message: "This is Holly, it is 4:00 pm. I'm headed to my hotel room for the next hour. I will be back at the booth at 5:00 pm."

She enters this message by talking into her TO-U 200. After recording the message she can review it, re-record it, or send it. Her sending options could be to one person or many. In this example, she could be sending the message to a predefined group of co-workers who are at the trade show.

There are several benefits to this system. For one, she does not have to re-send the same message to multiple cell phones or units. Two, this message can be left without interrupting others. Three, her message can be quickly retrieved by just those who need to know it. Traditionally, one might notify a single person in charge of the booth staffing, but this person in charge is not always readily available.

In some cases, Holly may go and come back without anybody even noticing her temporary absence. If a booth visitor came looking for Holly and asked a fellow employee if she was around, this employee would be able to check for a voicemail from Holly on their own TO-U 200. Each voicemail would be sorted by the employee's name and stamped with the time that is was left. This would prevent another co-worker from having to listen to each and every voice message in the list. In this case, there would be a recent message time-stamped "4:00 pm from Holly". This co-worker could then replay the message where Holly explains that she will be back by 5:00 pm and said co-worker can then notify the booth visitor of this information.

Some employers/exhibitors might choose to make this capability mandatory amongst their staff. This information could be retrieved later for the manager or the employer to determine who has taken a break and the number of hours each individual has worked.

Group Messaging and Voice Mail

When someone leaves a Seeker a voice mail, this Seeker can scroll through a list of voice mail messages similar to someone scrolling through a list of data choices on a computer screen. Each entry could list who the original calling party was and/or their phone number, so rather then having to redial their phone number, one can simply hit "reply", similar to how email works. These voice mail messages can be stored and retrieved under different categories, such as by a user's name, the department of employment, and/or by the time of day or date the message was left.

Keypad Usage for Text Searches

TO-Us 200 with numeric keypads could be used by Seekers 999 to initiate a search. Using the letters associated with the numbers on the keypad, similar to a telephone keypad, the Seeker 999 can spell out a company and narrow in on that subject. At a trade show for example, a Seeker 999 might be trying to find Sony's™ trade show booth. Rather than search by text categories, or subjects, the Seeker 999 could press "locate" on the keypad, then select "booth", then press "7, 6, 6, 9", which spells out SONY with the numeric keypad. The search result would post all companies that start with either a (PQRS), have a second character of either (MNO), a third character of either (MNO) and a fourth character of either (WXYZ). If there were more than one company fitting this criteria, the Seeker 999 could choice between the remaining selections or keep entering keys. This would in turn provide the booth location information.

Roaming

Most audio or information is pre-recorded and retrieved on demand. For audio that is live, the mobile TO-Us 200 will allow the Seeker 999 to roam about the environment without losing their signal. The signal transfers from one TAP 1084 to another transparently, as the Seeker 999 moves through a building or campus or is on a larger _____ frequency.

Purchasing Options

The system would allow Seekers 999 the option to store their credit card information within the LCS 1136. This would allow the Seeker 999 the ability to purchase items described within their GO-UI 199, without having to wirelessly transmit their credit card information. They would instead enter a password that would be matched up with an electronic serial number for their TO-U 200 within the local database to complete the purchase. If the electronic serial number does not match the password, the database will not allow for the transaction. Several attempts may entirely disable the TO-U 200.

In addition, items within a retail LCAP could be labeled or scanned for similar purchasing capabilities. The Seeker's TO-U 200 could also be linked to a bank account and reflect their current available balance.

Polling Questions

Many websites offer visitors the ability to answer poll questions. The results are usually made available once they have participated. When on the system network, Seekers 999 could participate in a wide range of polls, from international questions, national issues, to local topics. For example, a traveler/seeker waiting at a CAP within an airport could see how their opinions stack up against other people in the world, the US, the city the traveler was in, that airport, or just others within that terminal.

One polling question could be, "Do you support increased funding for public schools?" While another question could be "On a scale of one to 10, how would you rank this airport in terms of your overall satisfaction?"

Other polls could be geared towards such things as job searches or dating. At a singles bar for example, a Seeker 999 could answer a list of questions, such as:

Do you smoke?
Do you have children?
Would you rather watch or play sports?
Are you a morning person, or do you like the nightlife?

Rush Limbaugh: love him, or hate him?

The Seeker's 999 poll results could then be matched up against other singles in the bar that have voted. These results would tell the Seeker 999 how many singles matched their answers and other interesting information. A four-digit number, opposed to any personal information could identify the other potential singles. The person participating could then start exchanging messages with individuals or leave audio hints on who they are, or what they look like. These poll results and/or messages could appear on a large screen for others to see.

Incentive Voting

In some locations the TO-U 200 would track the number of votes or polls the Seeker 999 has participated in. This information can be utilized for discounts or rewards. At a trade show for example, attendees could register their feedback regarding a speaker at a seminar, new products within exhibits, or their overall experience. The system would have the capability of recognizing those questions that have already been answered by a particular TO-U 200. This would reduce the likelihood of repeat voting on a single subject by the same TO-U 200 and increase the poll's integrity.

A married couple seeking to rent videos for example, could input their feedback on movies they have already seen. These opinions could be cross-referenced in the database to suggest other movies. This data could also be sent real-time to the rental store's headquarters to determine genre inventory needs per location.

The Seeker 999 would have the option to remain anonymous or they may request to have their personal preferences saved in the local server within the store/franchise. This information can be tied to the TO-U's 200 electronic serial number, not the individual. Consequently, the husband could take the mobile TO-U 200 with his wife's movie interests along with him, without her needing to go along. With this data already stored, the TO-U 200 can suggest movie titles that she might like. On the other hand, the husband could login to his specified frequencies.

From an enabled site, someone could send a message to someone else at another enabled site. While grocery shopping for example, someone from their home could send a message via the telephone, email, or their TO-U 200 to another family member who has gone to the grocery store with their own mobile TO-U 200. This message could be a personal message or it could be a change, correction, or an addition to the shopping list that was already created and stored on the mobile TO-U 200 that is now on its way to the store.

If the video rental store has real time video and DVD inventory available online, the Seeker 999 could make selections and store their preferences to their mobile TO-U 200. This would allow the Seeker 999 to send a third party to the video rental store with their TO-U 200 and preferences. This same premise could be used for a grocery store where one individual could create a grocery list and in turn send another shopper to the store with the mobile TO-U 200. If the grocery store's online site listed products with specific brands and sizes, the person doing the shopping with the mobile TO-U 200 would be able to make sure that items were an exact match. This would reduce the possibility of purchasing the wrong items, sizes, or forgetting items.

At a record store for example, instead of being tethered to a listening station, shoppers with a mobile TO-U 200 would be free to move about the store listening to new music. These shoppers could register their opinions about the music. Similar to the video store example, the database could make music suggestions. In addition, a recording artist could notify her fans when she'll be in town on her next concert tour or suggest that the listener visit her website. Updates to her message could be made in text and using text-to-speech, only that portion of her message would be changed. For example, when a city got added to the tour the text would get converted to speech and automatically added to the message.

At a bookstore for example, a shopper/Seeker could retrieve an audio message from their favorite author explaining the impetus behind his latest novel. This message could contain unique insights about the characters or alternate endings. Other messages recorded in the author's voice could list upcoming novels, his favorite books, or when he is going to be at that particular store for a book signing.

Saving Capabilities

Seekers 999 can save a wide variety of subjects or materials, from audio messages, text messages, to-do lists, addresses, personal profiles, and favorites. This information can be saved locally to their mobile TO-U 200, or archived on network servers. The ability to store additional information on network servers allows Seekers 999 to store valuable information without consuming memory on their mobile TO-U 200.

In addition to storage in the TO-U 200, Seeker's 999 can select where they want information stored. This stored information can be on a server at a particular location, the LCAP 1076, and/or the COPP 1070 (as long as there is a network connection), on removable storage mediums, or sent wirelessly to another storage device. This stored information could be about products a seeker has seen, services of interest, profiles, favorites, to-do lists, addresses, voicemail messages sent by others, or messages saved by said Seeker 999.

Store Your Own Messages

A shopping mall with a LCAP 1076 could offer their shoppers the option to store their parking location on their mobile TO-U 200. This location can be retrieved when needed and can be explained with an audio message, with a text description, and with a map diagram. The Seeker 999 could add his own audio message to the save file.

Accountability

LCAPs 1076 will have several ways to communicate with on-site Seekers, both employees and customers. This two-way communication not only provides the ability to communicate to the consumer, but it allows the consumer to register their feedback. This feedback can be on a wide variety of subjects, concerns, and opinions.

For TO-U's with keypads or applicable GO-UI's during any text operation, message playback, or subject level within an application, the Seeker 999 can note whether that function was helpful or not by pressing "yes" or "no" or some other designate key on their keypad. This channel would explain where the nearest restroom is located. For example, if the Seeker 999 found the information helpful they could press the key labeled "yes", if the information was poorly explained, they could press "no". This Seeker 999 is not obligated to give any feedback, but those that do participate, will further improve the quality of service for others. The database will store these responses and will alert the information manager of those messages receiving negative feedback, so that the information can be addressed or improved.

Another example of Seeker 999 interaction could be at a retail store, where the shopper in this case could register their feedback on any given employee. In this example, the employee might have a four-digit identification, or a nametag that one can simply retrieve from a list on their mobile TO-U 200. At that level, the shopper is prompted to leave a score between 0 and 10 as to how helpful that particular employee was (with zero meaning not helpful, 10 for very helpful).

Changeable Button Functions

Some TO-Us 200 could have the ability to change the labeled functions on all the individual keys. While voting for example, the keypad labels would reflect the number choices, whereas in the audio playback mode the keys would display a Seeker's 999 playing options. This is not a touch screen graphical user interface (GUI), but physical buttons with images that are fed to the key face relevant to the current application.

Changing Key Colors

For those TO-Us 200 that have physical keys that can change their labels with the associated application as noted above, these buttons can also light up in different colors. These colors could denote such things as new voicemails, changes in a stock price, or a profile match. These colors could be personalized to an individual's own preferences. For example, certain keys could illuminate in green if the Seeker's 999 stock is going up, or in red if it is going down.

In addition, these keys that light up could indicate a direction needed to travel for a particular trade show booth or product in a store. Lights flickering from left to right across the keypad might indicate that the Seeker 999 needs to head east.

Color-Coded Units

TO-Us 200 could be color coded to disseminate a variety of Seekers 999 or purposes. At a trade show for example, an orange POD 170 could denote that it is a rental unit, whereas a metallic finish could denote a purchased unit. A green unit could represent someone in the press core, while a blue unit could represent an exhibitor's POD 170. This color-coding would make it easier to police the return of the rentals and to set up different capabilities for each POD 170. For example, an exhibitor's POD 170 may be prohibited from participating in certain opinion polls.

Notifications

The system can be set to notify the Seeker 999 for a number of reasons. The Seeker 999 could be notified if they have a profile match, a voicemail message, or they could opt-in for certain information that would be sent to him, such as sports scores, or product specials. This feature could be modified or turned off as needed.

A wholesale-shopping store could notify their on-site customers/seekers about such things as when the seekers pictures were ready at the photo lab and/or the seeker's auto repairs were completed. The system could explain club benefits while seekers were shopping. Seeker 999s could learn how to purchase a new car or what are the current gasoline prices.

Live Microphones

Some venues could offer their Seekers/customers unique audio experiences, such as live audio from a sporting event. There could be a microphone mounted on a basketball backboard, a hockey net or penalty box, an umpire's mask, a racehorse's bridal, a football player's helmet, or a player's jersey or uniform.

Text-to-Speech

Some audio could come from text to speech software translations. This allows businesses and venues that are using the system to create text feeds that are in turn, converted to audio messages without having to create a live voice-over from the written script. In some cases the text updates might only be for a portion of a message, such as the temperature in an updated weather report or a changing stock price.

Playback Options

ACAP can offer the same audio or text message in varying degrees of detail. This allows the Seeker 999 to receive detailed or abbreviated instructions depending on their individual needs. In addition, some of the mobile TO-Us 200 would allow for variable speed playback and pitch leveling. Some locations could offer different dialects or varying tones to different age levels. This capability could be established in the set-up menu on the mobile TO-U 200 and changed by the Seeker 999 as needed. If the location did not have dialect or tone options the mobile TO-U 200 could revert to the default audio settings.

Help Menus and Usage Lessons.

LCAPS can provide both text and audio help at almost every level of the GO-UI. The Seeker 999 can request an audio explanation as what their options are at any point within the menu or they can read a text explanation for help.

Fantasy Sports

The system will be able to offer near real-time sports statistics over a wireless mobile TO-U 200. This information could show a list of fantasy players and the overall point totals. It could keep track of scoring changes, compare the Seeker's 999 score against competitors and show league standings.

Remote Content

Restaurants would be able to enter data with a passcode from the hostess station in a restaurant or the front desk of a hotel. From a landline, businesses could enter a passcode, then precede through a list of predefined questions for their location and the ability to add audio messages. These messages could time-stamp, if desired.

Voice Over IP or Internet Protocols

The system could provide two-way data or voice communications, using such methods as cellular, voice over Internet Protocols, SMS, or MMS.

Individualized Alerts

Seekers can store audio and text messages that can be sent as alerts at predetermined times to remind the Seeker of such things as appointments, to-do items, or names of people and their backgrounds.

Location Tracking Thru Mesh Networking

Peer-to-peer voice communications, voice messaging, and email.

Peer-to-peer gaming thru mesh networking. These peer-to-peer games could incorporate voice commands, voice controls, and/or voice interaction with other players.

Peer-to-peer discovery of potential game players thru mesh networking

With peer-to-peer mesh networks, Seekers could locate others potential Seekers with which the can compete or communicate with that are currently within range or logged onto the network remotely.

Peer-to-peer discovery of Seekers in an emergency situation thru mesh networking a possible application in an emergency situation could be the identification of all active nodes in the mesh network at the current or certain locations. An emergency crew would then be able to identify and find Seekers with a mobile TO-U in the event of an emergency by tracking the location of each TO-U as a node within the mesh network.

Universal Wireless Remote

A wireless remote could control the functions of a standard PDA or Personal Digital Assistant device. This remote would allow the Seeker to grow accustom to standard controls for any given PDA, such as a Palm, HPC, Sony, Casio, Toshiba, etc. or cell phone, without having to learn the nuances of that particular device. Furthermore, the Seeker could operate the PDA-like device without having to hold the relatively large unit in said Seeker's hand. Said Seeker could instead leave the PDA-like device or cell phone attached to said Seeker's hip and work the controls from the much smaller remote. This remote could control such things as the audio channel selected, the volume, the rewind, play, fast-forward, and it could display the current audio channel and time counter.

Device Retrieval

At the end of an event where numerous devices have been rented out to Seekers and said Seekers are now in need of returning said devices, a system GO-UI could allow for a one-button self-check-in, billing, system diagnostics and ID display. For example, a Seeker could walk up to an area designated for rental device returns. This are could have a sign telling said Seeker to hit the check-in button and wait for the number displayed on their device to be called for check-in.

The device would go through self-diagnostics, billing, and transmit this information to a designated access point for self-check outs. The access point and database server receiving this information, would in turn cross check the device's self-diagnostic test to see if there were any problems found, the amount of usage, any purchases made, the amount owed, any discounts for voting or other promotions, and charge the Seeker's credit card. Then this server and transmitter would send a verification number to the handheld device.

Even though the Seeker can perform this check out on their own, employees could assist said Seekers returning said devices. Employees could call out numbers generated on printed receipts that could then be exchanged for the handheld device displaying the correlating number. This allows Seekers other then the original renter/Seeker to return the device and for a much faster check-out. In addition to employees, there could be audio help menus for Seekers to tune to—if said Seekers had any questions or got stuck.

Biometrics Identification

The TO-U could employ a number of biometric identification methods. For example, a sensor such as one that could be made out of silicon could be embedded on the surface of the TO-U so that Seekers could swipe their finger over it for fingerprint recognition. This fingerprint recognition could then be used to identify said Seeker and in turn allow said Seeker to access personalized information that could be retrieved from a LCAP. This information could in turn, allow said Seeker to do many things that said Seeker could not have other wise done, such as make financial transactions.

The ability to retrieve one's personal information by simply swiping ones finger over the biometric sensor reduces the amount of keystrokes one would need to identify themselves. A pass code could be added for further security and safety. In addition, this functionality would allow Seekers to be able to use any given mobile opposed to a specific or pre-assigned TO-U where their personalized data is stored within the TO-U.

At a college campus for example, one student could borrow another student's mobile TO-U and by using a biometric identification such as fingerprint recognition, the Seeker could access their personal database. Their personal database could include their phone numbers, emails, addresses, personal profiles, and pre-arranged credit account for financial transactions. This avoids the problem one has when he does not have his personal cell phone or when the battery goes dead, and he cannot use someone else's phone because he does not know the number. It also allows another Seeker to borrow someone else's mobile TO-U without the lender being charged for the usage.

The mobile TO-U could be setup a number of ways, from requiring a biometric id for each transaction to maintaining the same id until a new id is established. A Seeker could customize their profile from an online computer to track their usage online and to report any suspect usage. This tracking would distinguish between usage on their own TO-U and usage on other TO-Us.

This Seeker could establish rules for logging on to other TO-Us, such as never, during certain times of the day, on certain TO-Us, and/or for certain periods of time. This individual Seeker can establish when logging on to a TO-U other than their "main" personal mobile unit, the TO-U should require a biometric id for each transaction or the TO-U would log said Seeker off after a certain period of time. This would help prevent others from being able to use someone else's personal information or bill transactions to someone else's account.

As an employee, the ability to use biometrics for identification allows the employee to retrieve personal information such as payroll information and personalized training information even if said employee forgot or lost their originally assigned mobile TO-U. The system would track the employee usage and note that the employee had logged on with a new TO-U. The system would also track the electronic serial number of the new TO-U. This information would create a record of when the originally assigned TO-U was first missing or replaced. This employee could be restricted from certain usage or said employee could still be able to use their existing system capabilities setup on the system, such as voice over IP, email, and group messaging.

This biometric identification capability could also provide a Seeker a method of entering locked doorways, vehicles, and entryways. For example, a mobile TO-Us could be used in place of smart cards or keys to enter hotel rooms, secured areas, or pass through tollbooths. This identification could improve traffic flow through areas with security checks or paid attendance such as airports, sporting venues, theme parks, and trade shows. For the Seeker with the mobile TO-U the Seeker would be able to identify themselves when requested by security and allow them much faster travel through secure areas.

This biometric identification would allow Seekers to make more secure peer-to-peer financial transactions between mobile TO-Us. Seekers could also perform wagering functions where it was legal. Wagering could be between the Seeker and an online gaming service, the Seeker and a casino where the Seeker is physically located, and/or between two Seekers.

In locations that rent or loan out mobile TO-Us to Seekers or employees, this biometric identification would reduce the need to re-enter ones personal preferences. At a retail store for example, a Seeker could save a list of products that said Seeker was interested in, or in other words a "wish list". On their next visit the Seeker would be able to recall this information from the LCAP by simply swiping their finger over the sensor on any of the available mobile TO-Us.

Even items that have been purchased before could come up on the screen. At a grocery store for example, instead of creating a shopping list with the same items each time, the TO-U could recall what a Seeker purchased and when said Seeker purchased the items. At a trade show, the TO-U could recall which booths a Seeker visited and where these booths have moved to for this year's event. The TO-U could list return policies and warranty information; arrange for rebates or extended warranty plans.

This biometric finger sensor can also be used to navigate the screen similar to the touch pad on the notebook computer. In addition, certain finger swipe directions could be programmed to perform functions such as increasing the volume, activating different programs, or scrolling different menus.

Mobile Returns

In locations that loan or rent mobile TO-Us, the software could have a pre-programmed logout function that not only determines the final charges to the Seeker's account, but it could also run a self-diagnostic program on the TO-U to check for existing or potential hardware and software damage. This capability could be as simple as a one-button logout function. It could be supplemented by a password or a biometric identification; such as voice recognition or a fingerprint.

Express Checkout

Seekers could use the biometric functions on the mobile TO-U for express check out at a retail store or for locations with m-commerce. This would expedite checkout lanes. Some locations could allow Seeker's to check inventory, request home delivery, or to have certain items collected from shelves and prepared for immediate purchase. At a furniture store for example, one could go through the show room and select different furniture of interest. The TO-U could explain the color and size options, whether the items were in stock, and how much it would cost for delivery. The Seeker could request the items be collected for them to purchase and take home at that time.

Personalized Appliance Interface and Controls

The mobile TO-U can access personalized information from a database to control TO-Us. For example, a Seeker could go online and setup an account. This account could include such things as what cable television company the Seeker traditionally uses, or it could simply pull up the information from an existing database based on the Seeker's home zip code. The mobile TO-U could also be used as a television remote control at home or on the road. On the road, the Seeker could identify the type of television and model number that the Seeker would like to use the mobile TO-U with.

At a participating hotel chains for example, the Seeker could simply identify themselves by using biometrics, a pass code, and/or a unique electronic serial number attached to the TO-U. This identification process can be entered by the Seeker or done automatically and completely transparent to the Seeker once said Seeker enter the location. After the identification is recognized by the onsite database, the Seeker can begin to use their mobile TO-U as a television remote in their room without having to enter any TV model number. This is more then just enabling the TO-U to interface with a television, it is maintaining the channel line-up that the Seeker is already accustomed at home.

If the Seeker were accustomed to finding CBS on channel 2 and CNBC on channel 55 in his hometown, by using this capability in this new location, this same Seeker would instead maintain these channel locations. Even though CBS may be on channel 11 and CNBC may be on channel 32 in this new community. For those channels that do not exist in the new location the remote could read "not available", and at the end of the list there could be those channels that are "unique to this location".

Hotel Door/Vending/Other

The mobile TO-U could also be programmed to open a Seeker's hotel door, or give you access to the building after hours. Seeker's TO-U could also be used to make purchases from vending machines, gain access to certain privileged areas such as weight rooms, saunas, etc.

Electric Outlet

Today there are many ways to make a transaction between man and machine, from the coin operated parking meter, to the smart cards which in turn operate washing machine, to the PDA with wireless interfaces to operate the soda vending machine. Some copying centers use key counters that customers plug in to copier machines that count the number of copies made. Many of these applications could be adapted so that the transaction of fees for services could take place on a mobile TO-U.

These legacy machines could be modified to accept wireless payments or the machines could be plugged into a TO-U that accepts wireless payments. This latter method would allow older TO-Us to facilitate wireless payment transaction without the high cost of hardware updates. Instead a universal AC outlet connector could be the interface between the legacy machine and the electrical current. To utilize the legacy machine one would need to make a wireless payment that would allow the TO-U access to electricity necessary to complete the given request or function.

If the Seeker did not make a wireless payment with their mobile TO-U, the legacy machine would not have access to sufficient power, and the Seeker could be notified via a number of methods. At a Laundromat for example, if one failed to enter their wireless payment prior to pressing the start button on the machine, this request for electricity to run the machine would go through the customized AC outlet connector. The lack of payment status in the AC outlet connector would cause the unit to either play some sort of sound alert for payment, or it could actually play an audio message requesting payment. Failure to pay could prevent the AC connector from providing sufficient power to complete the requested task. If on the other hand, the Seeker completed the payment transaction, the AC connector would then allow the machine sufficient power to complete the requested task.

This customized AC outlet connector could be attached to the outlet in such a way that the Seeker could not remove the plug without rendering the machine completely useless. In addition any tampering with the outlet connector, could notify security or be stored on the network as a file for review later. For example, all those Seekers who had used their mobile TO-U to purchase washing machine time would be noted in the database when the time that somebody tried to tamper with the AC outlet on the dryer.

At an outdoor tennis court for example, Seekers could use their mobile TO-U to purchase lighting for their evening tennis game without having recreational staff onsite: This has the added benefit of knowing who was there opposed to a coin operated service.

Different payment systems could be used for machines that don't require electricity such as parking meters, subway turnstiles, mass transit token/coin collector, and newspaper vending machines. These TO-Us could either be modified with battery-powered mechanisms that recognize wireless payments, said Seeker could have secondary wireless payment TO-Us, or said Seeker could be completely replaced by TO-Us that accept wireless payments.

With a parking meter for example, one could simply arrive at a parking location and instead of putting coins in the parking meter or using some sort of smartcard to make payment for the parking location, the TO-U with its location tracking capabilities could know that you are currently at a parking location. The display on the mobile TO-U could ask if you would like to pay for a certain amount of parking time. The Seeker could press an answer such as the "Yes" key and then be prompted as to whether said Seeker would like a certain amount of time or to keep the meter filled, as much as the local community law allows.

This parking payment and tracking system could also be utilized by the parking enforcement agents. If someone made payment with their mobile TO-U versus putting coins in the meter, the meter might still read expired, but the parking enforcement agent would have access to the same wireless network and database to verify payment. The benefit of using a TO-U with accurate tracking, avoids the necessity for the parking enforcement agent to have to enter the street location of where the vehicle is currently parked.

If the Seeker paid for the parking, the parking enforcement agent would be notified before writing the citation. In addition, the end user has a complete receipt record as to when, where, and for how long said Seeker had paid for parking. This receipt record is available to the end user and the city online and can be used more accurately for accounting purposes.

Car Rental

When renting a car, a Seeker with a mobile TO-U could gain access to either the car or the keys without any human intervention. By using biometric identification, this Seeker with a pre-arranged online car rental could simply go from the airport terminal directly to their car via audio or text instructions that are available to them personally onsite. These instructions would be personalized and could be stored for later retrieval by the Seeker.

With location tracking capabilities, this car rental transaction can be accurately time-stamped, and the transaction itself can be made available online for the Seeker. When the user drives off the lot, said Seeker can request a photographic image recorded of the vehicle for any damage status.

Car Diagnostics

Today many car manufacturers are developing automobiles with in-dash computers that communicate with mechanical sensors and can prompt the vehicle owner for needed repairs or scheduled maintenance. Built-in computers in cars could be replaced by a mobile TO-U, similar to how built-in cellular phones were replaced by mobile cellular phones. This would accomplish several things, for one the owner could maintain the data on several vehicles; two, the Seeker could transfer the data far easier to a desktop computer via a port, such as a USB; and third, the in dash computer is far more difficult to update with software and maintain when permanently installed in a vehicle. In addition vehicle owners that might not currently have an in-dash computer system, or that may not be able to afford one could use mobile TO-Us.

DESCRIPTION OF ALTERNATIVE EMBODIMENT FOR THE SYSTEM

Information Available

Information can be sorted for the Seeker's 999 retrieval in a number of manners, primarily by audio channels and text subject headings. This information can be accessed virtually anywhere there is an Internet connection, telephone line, or a computer server hosting the service. Seekers 999 can retrieve this information using a wireless handset device, a desktop computer, a notebook or laptop computer, or from other devices, such as cellular phones and PDAs. These devices can either be hard-wired to at least one of the computer servers, connected through the Internet 1080, or connected through a wireless means. The proprietary wireless "POD" 170 will be the receiving unit most often referred to below.

Figure 61:
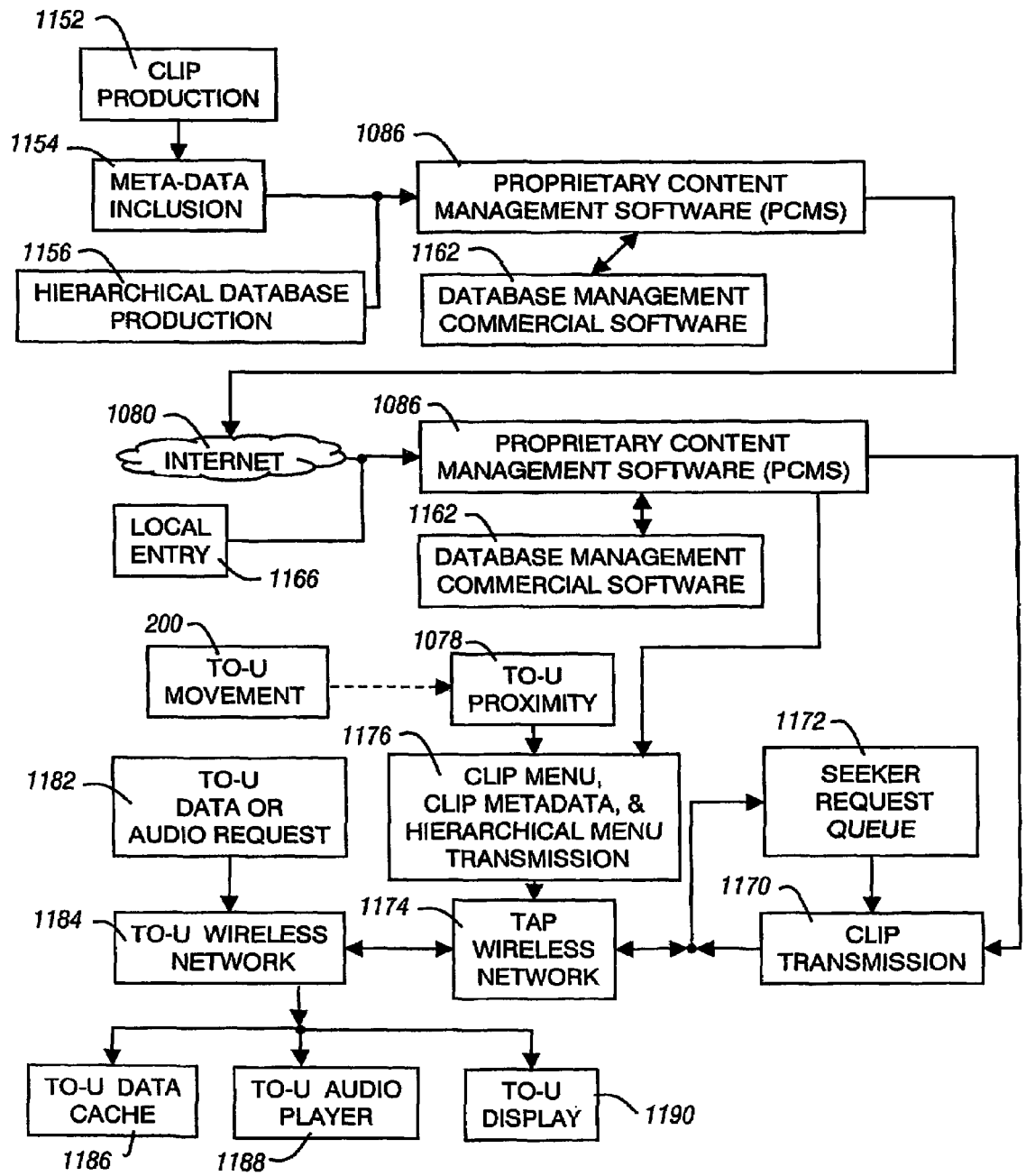
FIG. 61 is a block diagram depicting Clip Production.
Figure 62:
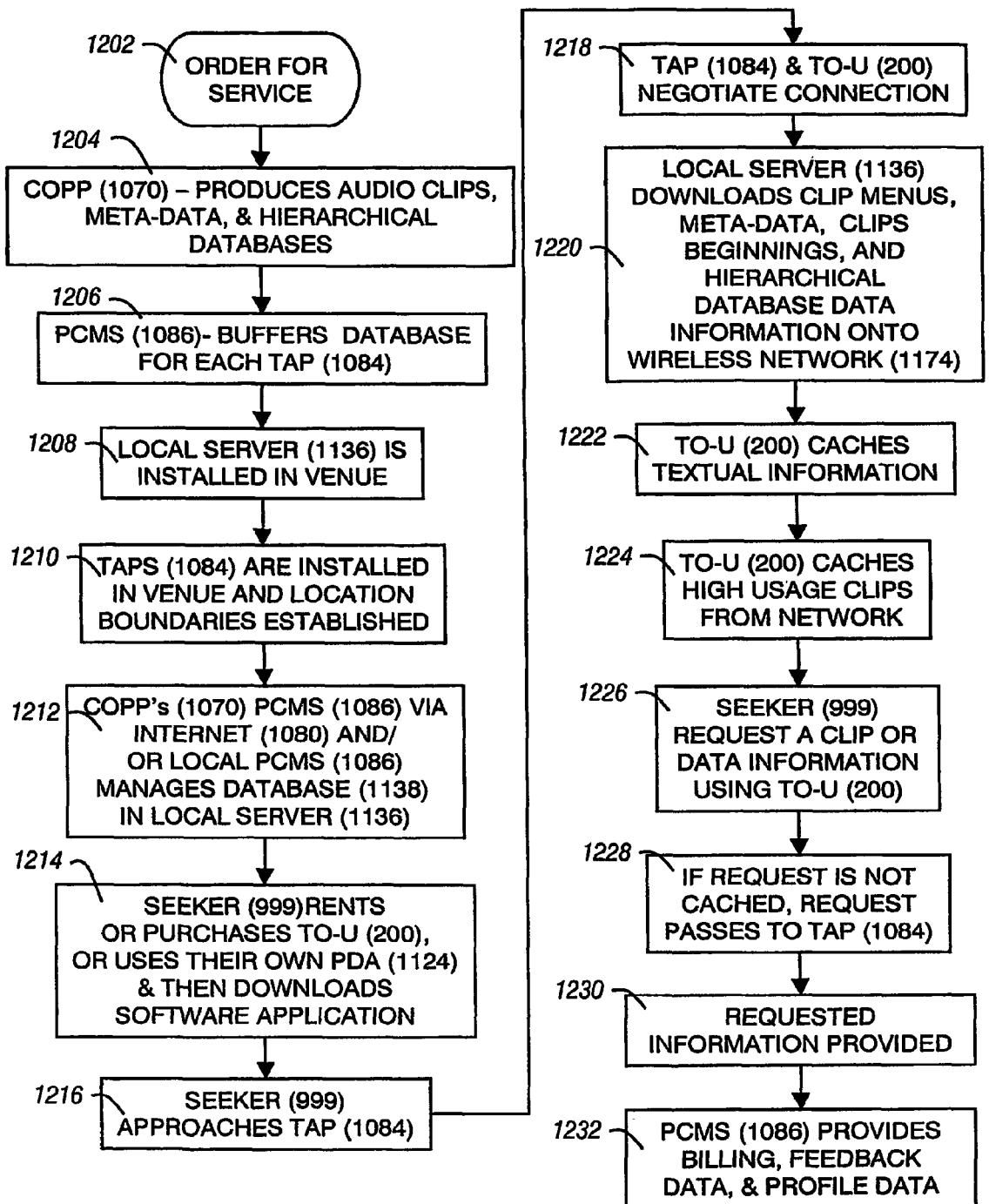
FIG. 62 is a flow chart depicting an Order for Service process.

FIG. 62 is a flow chart describes said another embodiment in which service could be implemented for a new LCAP 1076. Using a convention center as the new LCAP 1076 for this example, an Order for Service 1202 would be generated and sent to the COPP 1070. The COPP 1070 produces new Content such as Audio Clips, Meta-Data, and Hierarchical Databases 1204 as described in steps 1152, 1154, 1156, 1086, and 1186 of FIG. 61; for such items as booths, products, registration information, conference sessions, demo and session times.

This example assumes that a site map has been created that establishes a location and TAP 1084 identification has been created. This is generally done by establishing a cellular pattern across the environment to provide complete coverage over the environment and create zones of information as is shown in FIG. 2, as Local Wireless Access 1078, LCAP 1076.

Based on these unique TAP 1084 locations and each TAP's 1084 corresponding location identification, the PCMS 1086 then Buffers Content into the Database with a TAP 1084 Location ID. Consequently, location sensitive information can be distributed even without a third-party Proximity Estimation capabilities.

For example, when a Seeker 999 requests information with a POD, the request typically travels through the nearest TAP 1084 location. In LCAPs 1076 that and require a large number of TAPs 1084 to cover the environment, such as forty TAPs 1084 to cover a large convention center, location sensitive information such as where is the nearest food court area could be provided to the Seeker 999 relative to the TAP 1084.

For example in a venue with forty TAPs 1084 a Seeker 999 located in range of a specific TAP 1084, such as TAP thirty-nine shown as area 1078a, in FIG. 2, could request location sensitive information based on items and services located within range of the third-ninth TAP, as opposed to a Seeker 999 in range of different TAP 1084, shown as area 1078b in FIG. 2. Therefore each tap can have a database built for it.

So without the use of a third-party Proximity Estimator that would normally give the X, Y, and Z coordinates of the Seeker's 999 location within the environment, the system would at least know that the Seeker 999 was most likely near the TAP that the Seeker's 999 request came through. Then based on that said TAP's 1084 location the database could deliver the location of the food court closest to said TAP 1084. This location information could be an audio messages that said, "the nearest food court is located at the south end of Hall C by booth number 16038" verses "the nearest food court is located to the south of you (the Seeker 999)".

To store this Content at the LCAP 1076 a "Local Server Is Installed In the Venue" 1208. Next the "TAPs 1084 Are Installed In the Venue and Location Boundaries Established" 1210. The "COPP's PCMS via the Internet And/Or the Local PCMS Manages the Database in Local Server" 1212. The COPP's PCMS can handle all the Content updates, but more likely Content updates would also be done on-site via the LCAP's 1076 PCMS 1086.

A "Seeker can then Rent or Purchase a TO-U or Download Software To Run on Their own Device/PDA" 1124 or other compatible device. A "Seeker with their TO-U Approaches a TAP" 1216 or generally enters the range of said TAP. The "TAP and TO-U Negotiate a Connection" 1218. This connection can be set for several conditions depending on the Seeker's 999 preferences or conditions established by the LCAP 1076. For example, the connection between the Seeker's 999 TO-U 200 and a LCAP 1076 TAP might only happen when a Seeker 999 actually makes a request for information. This can reduce the Seeker-load on the network, but it could also require larger downloads per Seeker 999 request.

In another method of "negotiating a connection", the LCAP 1076, the COPP, and/or the Seeker 999 could establish a ping interval for the Seeker's 999 TO-U 200 to ping the network. This interval could be one ping every second, so that the TO-U 200 pings the nearest TAP with the ID of the TO-U 200. If the TO-U 200 needs an update message based on the Seeker's 999 usage patterns or current location, the network could automatically update the Seeker's 999 TO-U 200 with new Content and/or the new menuing hierarchy.

In addition, the most requested Content by other Seekers 999 could determine what audio clips or portions of audio clips are sent to the TO-U 200. This happens in step 1220 "Local Server Downloads Clip Menus, Meta-Data, Clip Beginnings, and Hierarchical Database Data Information Onto Wireless Network" that are wirelessly transmitted to the Seeker's 999 TO-U 200 in step 1222, which "Caches the Textual Information and step 1224" TO-U Caches High Usage Clips From Network."

In step 1226, a "Seeker Requests A Clip Or Data Information Using the TO-U". "If the Request Is Not Cached, the Request Passes To the TAP" in step 1228. In step 1230, the "Requested Information is Provided".

The Seeker's 999 TO-U 200 pings received at the nearest TAP 1084 can generate a density map of Seekers 999 per TAP 1084 within the LCAP 1076. The ping interval could change dynamically based on network loads. The number and types of Seeker 999 requests for information can be collected. The "PCMS Provides Billing, Feedback Data, & Profile Data" 1232 based on the Seekers' 999 usage. Some PCMS 1086 examples appear in FIGS. 21 and 22.

Wireless Headset/Earpiece

The audio received by the wireless mobile TO-U 200 can either be fed to an earpiece or a headset through a cable that is plugged into an audio out jack on the side of the TO-U 200. Some mobile TO-Us 200 will allow the Seeker 999 to also be able to place their mobile TO-U 200 up to their ear and hear audio messages, similar to a telephone handset. Some advanced POD 170 units could have built-in transmitters for sending a wireless signal to an earpiece, thus eliminating the need for a wire output.

Audio Messages

The system allows the Seeker 999 to request audio clips on-demand. These audio clips can be pre-recorded messages from such sources as voice-over professionals, business owners, vendors, advertising agencies, clients, tour guides, politicians, cooks, doctors, lawyers, accountants, engineers, analysts, brokers, consultants, professionals, critics, comedians, entertainers, columnists, parents, students, teachers, repair specialists, interpreters, employees, and/or inventors. Audio clips can also be from such sources as pre-recorded media, terrestrial radio, satellite radio, Internet radio, television, web-casts, movies, books-on-tape, music, speeches, concerts, sporting events, interviews, children's stories, how to guides, biographies, weather reports, police scanners, control towers, and/or wire feeds.

AN ALTERNATIVE GO-UI EMBODIMENT

The Audio Channel Subject Directory

The TO-U's 200 GO-UI 199 could be set up with audio channels. Each audio channel subject could be addressed with a letter and a number. Letters A to Z, and numbers zero to 9, or A0 to Z9 for 260 audio channel subjects. Subject headings can be predetermined and maintained between different venues to reduce Seeker 999 confusion as to where to find certain information. For example: (this has been modified as separate file)

A0: On-site Help
B0: The nearest Bathroom
C0: The nearest Cash Machine
A, B, C, (1-9): On-Site Channels
D0-D9: Disability Assistance
E0-E9: Emergency Assistance
Emergency Exits
Medical
CPR
Fire
Police
Security
Lost Children/Amber Alert
Lost and Found Items F0-F9: Foreign Language Assistance
G0-G9: Games and Trivia
H0-H9: Store Hours and Upcoming Events
I0-I9: How To Use the Device
J0-J9: Job Listings
K0-K9: Kids Education and Entertainment
L0-L9: Locater Help
M, N, O, P, R, & S (0-9): On-Site Channels
Q0-Q9: Frequently Asked Questions
T0-T9: Transportation Information
U0-U9: Local Community Information
V0-V9: How and What to Vote On
W0-W9: News, Talk, Health, Politics, and Finance
X0: Sports Channel Guide
X1-X9: Sports Channels
Y0: Music and Entertainment Guide
Y1: Entertainment News
Y2: Comedy
Y3-Y9: Music
Z0: WXYZ Channel Overview/Guide
Z1-Z9: Music Multiple Messages Listed Under a Single Channel Address Any one of these channel-headings listed above could have either a single audio message associated with it or it could have virtually an unlimited number of channel choices listed under its subject heading. If for example, channels E0 (E-zero) through E9 were channel headings designated for emergency assistance, the first channel—E0 would be the help menu that would list what is available on the other nine channels (E1 through E9). If channel "E5" was designated for medical emergencies, there could be several message choices listed under the "E5" heading, such as: 1) Treating cuts, (2) CPR if someone stops breathing, or (3) Treating someone who is choking." This method of having 260 audio subject headings, but unlimited choices under each, reduces the need to search through thousands of channels to find relevant material.

Live Audio

Live audio Content could come from news events, speeches, promotions, and from microphones on vehicles, equipment, and/or key individuals. This audio could be from on-site presentations or from events outside the immediate environment, such as sporting events.

Today there are venues that utilize unlicensed AM transmitters to emit radio frequencies to mobile TO-Us 200 over short distances. Seekers 999 of this system need to tune into the appropriate AM signal to receive the audio. The transmitters will have the ability to transmit audio to any given channel through a number of different frequency possibilities. This would allow the system to utilize the most efficient transmission mode for whatever the Content called for and without wasting the bandwidth needed in other spectrums.

For example, there could be a certain point within the day, where channel "X3" could be broadcasting a live sporting event over an AM signal. Later that day from the same location and transceiver, this same "X3" channel could be transmitting its radio frequency using the 2.4 GHz spectrum. Using the AM frequency in the first half of this example frees up bandwidth for other Seekers 999 to download messages on the 2.4 GHz spectrum and changing it to 2.4 GHz later that day, frees up the AM bandwidth used by that channel. This AM bandwidth could then be used in conjunction with a live event now on another channel. This changeover in frequency usage is totally transparent to the Seeker 999, who simply chooses the audio information they want from the appropriate channel menu. The AM channel used in one city and sent over channel X3 could be completely different than the AM channel used for X3 in another city. This change in AM frequency usage would be completely transparent to the Seeker 999. The Seeker 999 would simply dial into channel X3.

A "Go" Function

A "go" function would create a shortcut that allows the Seeker 999 to press one button to jump to an audio channel versus using the side tuners to dial it in. For example, if one were in the airport listening to a channel designated for ground transportation, the starting message on M0 could explain the overall choices:

"M1—Shuttle Buses,
M2—Taxis,
M3—Hotel Shuttles,
M4—Rental cars, and
M5—City Transit Buses."

Instead of the Seeker 999 having to dial in M4 with the side tuner, this Seeker 999 could simply press the "go" button at the point in the M0 message when the message refers to rental cars at channel M4. If the message moves beyond the information at M4 and goes into the information describing M5, said Seeker could jump to M4 by either playing the message again and pressing "go" at the appropriate time—or the Seeker could "rewind" the audio to M4's information and then press "go". This would bring up M4 in the display and would start playing the message without having to press the "play" button. The audio messages that would allow for this "go" shortcut function would contain assigned meta-tags.

The Text Database

Besides audio, a Seeker 999 can also search text databases. These text messages, Content, or information, may also have audio messages attached to them. Information in the text database is accessible through a hierarchy with subjects that can change for LCAP 1076 or need. LCAPS can setup their menus as said LCAP 1076 chooses, or said LCAP can simply use the pre-existing system defaults. An example of default subject headings might be the following:

1. Proximity/Where,
2. Time,
3. Cost,
4. Popularity/Top 5,
5. Specialties/Special
6. Categories/Subject, and/or
7. Alphabetical A-Z.

Information can be sorted by more than one of these headings listed above. For example, a traveler who is within range of the service capabilities could use the mobile TO-U 200 to access the network when looking for a hotel room late at night. Their search request could start with "proximity". The "proximity" choices could range from those within a few miles to those within the city limits, in this case the Seeker 999 might choose a 10-mile radius.

Once this search is complete, the results can be further filtered by "time". The time choices could be any given day in the future or currently available hotel rooms. The net results could then be filtered again by "cost" or in this example, by all hotels with rooms between $80 and $100 a night. Finally, these results could be prioritized based on their "popularity" among previous users of the system.

The ability to further filter a search result can be done in any order. For example, someone looking for restaurants that still deliver pizzas at 11:20 pm could start by searching under "categories". The category in this case could be "restaurants" followed by those that deliver pizza under "specialties". The net results could be then searched by "time", or those that still deliver at 11:20 pm. Finally, these results could be prioritized on "proximity", or those that are closest to the Seeker's 999 current location.

At any given time or level within the text database, the Seeker 999 can choose to listen to audio messages associated with the search results. In the previous example there could be three restaurants that deliver pizza after 11:20 pm that are all within a 5-mile range. If there was an attached audio promotion to any one of these three restaurants, the Seeker 999 could then choose to listen to that message. It is not necessary to listen to the audio message to get the relevant information for the restaurant, such as the phone number and address, but it could help explain specials, discounts, or what makes their food unique.

Some LCAPs can provide unique sorting capabilities or subjects. At a trade show for example, an attendee/Seeker might not know the name of a particular exhibitor. In this case, the venue could offer the Seeker 999 the ability to find the exhibitor using such information as the name of an employee, a product, or headquarter location. This capability would allow the Seeker 999 to find the product, then the manufacturer's name and the exhibitor's booth number.

In addition, the Seeker 999 could request to see all exhibitors who have distributors available in a certain city, or just display the exhibitors who produce Macintosh™ products that are within a certain range of the Seeker 999, such as two hundred feet.

Off-Site Contributors

Content sent to a Seeker's TO-U 200 from an on-site server does not have to originate from the LCAP 1076. This Content can be sent from the RCAP 1006, RCS 1000, or another LCAP 1076 through the COPP 1070. A Seeker 999 can sort available Content by On-site, Local, National, International, or Other Enabled Sites. On-site Content generally means information that comes from the immediate environment or LCAP 1076. Local Content, in this example, generally means information from the local community. National Content generally means information relevant to the local country. International Content generally means information found outside the local country.

Other Enabled Sites generally means Content that is considered "on-site" information at another LCAP 1076. Some site might allow Seeker's 999 from other LCAPS to download this information. A college student in Los Angeles, Calif., home from college for example, could download Content from her college in Hartford, Conn., if they allowed access to their Content outside the campus. This Content could be for such things as grades, upcoming activities, class schedules, or special events.

Information and entertainment databases containing both readable text and audio clips can be navigated using a software application that one can access either with a personal computer 1122, FIG. 3, connected to the Internet 1080 or on a mobile POD 170, FIG. 63-67, as shown in FIG. 3. With the handheld unit, the information is received via a wireless radio frequency 1144, FIG. 3. In this form, one can hear the audio through an earpiece 1140 or a speaker 1126 attached to the unit at a connector 1340, as shown in FIG. 3, and the text can be read from both a top display 1500, FIG. 65 and a front display 1600, FIG. 68.

DESCRIPTION OF ALTERNATIVE EMBODIMENT FOR THE POD 170

Wireless Hip Usage

Figure 63:
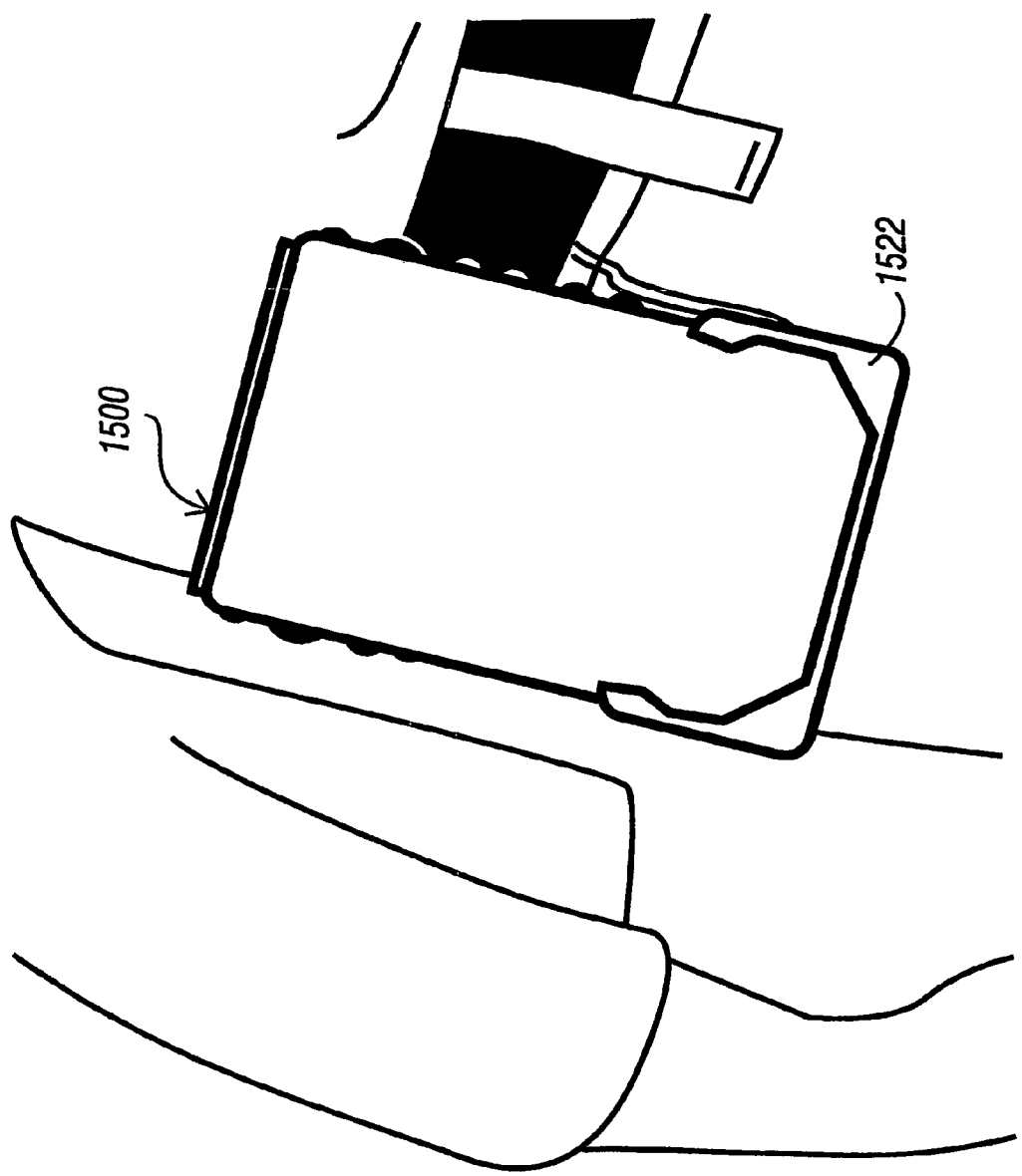
FIG. 63 illustrates a person carrying a POD 170 or the mobile TO-U 200 called a "Proprietary Operating Device"

The POD 170 unit may be worn in a hip holster 1522 as shown in FIG. 63. When the unit is in the hip holster, one can easily navigate the available audio clips in the database by using a top display. This top display 1500, is much smaller in size than said front display 1600, FIG. 64, but sufficient for audio clip scrolling (explained later).

Figure 64:
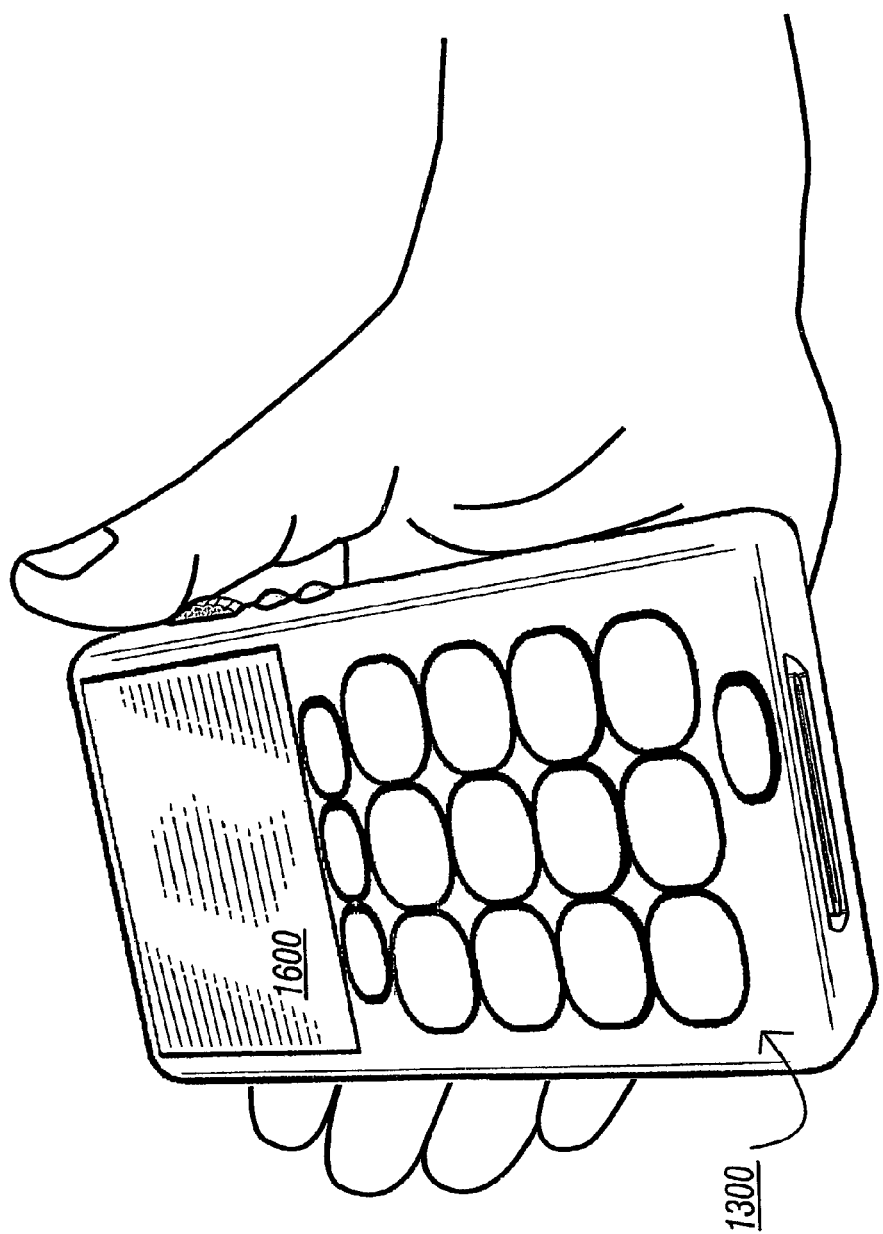
FIG. 64 illustrates a POD 170 front view.
Figure 65:
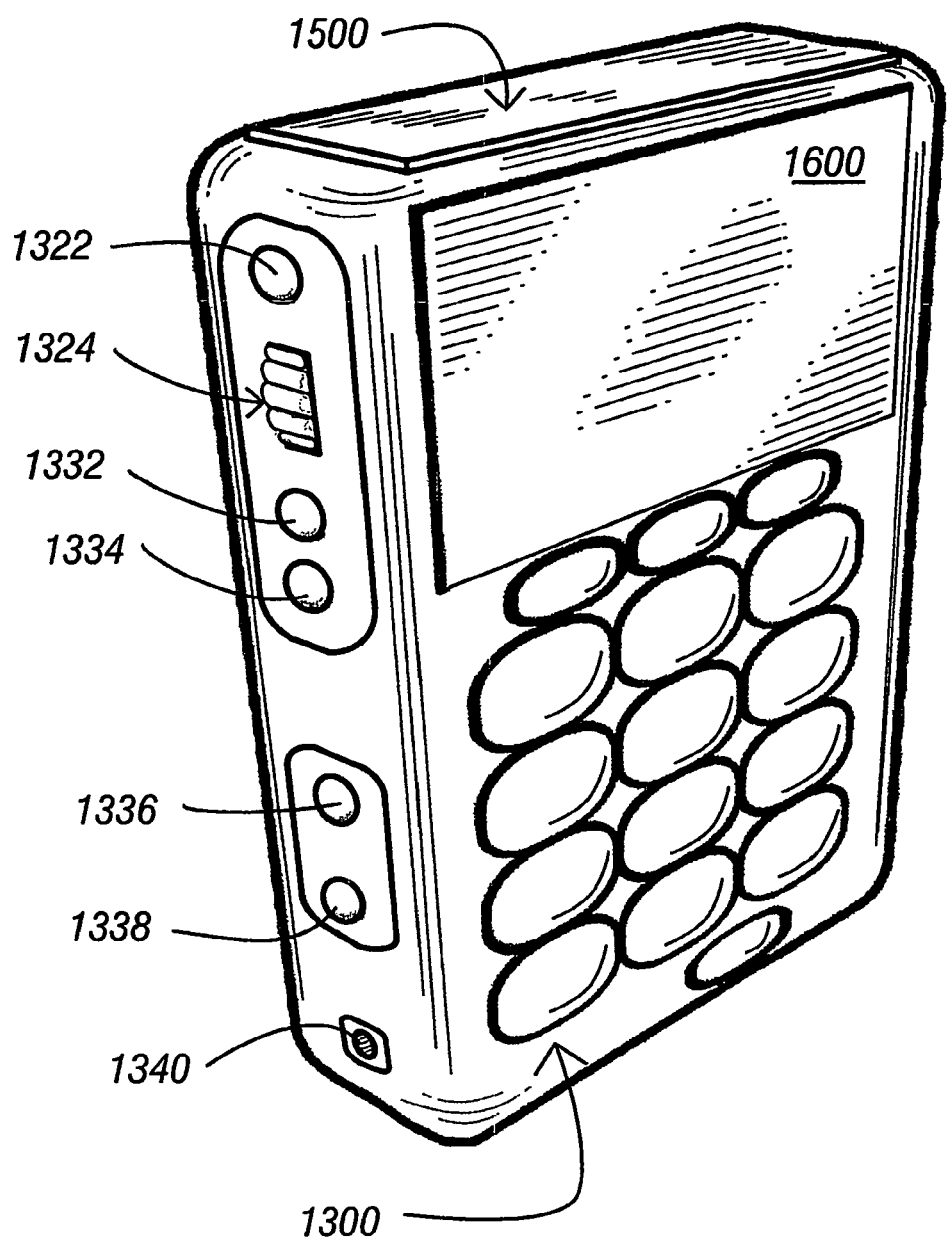
FIG. 65 is one side perspective view of the POD 170.
Figures 66, 67:
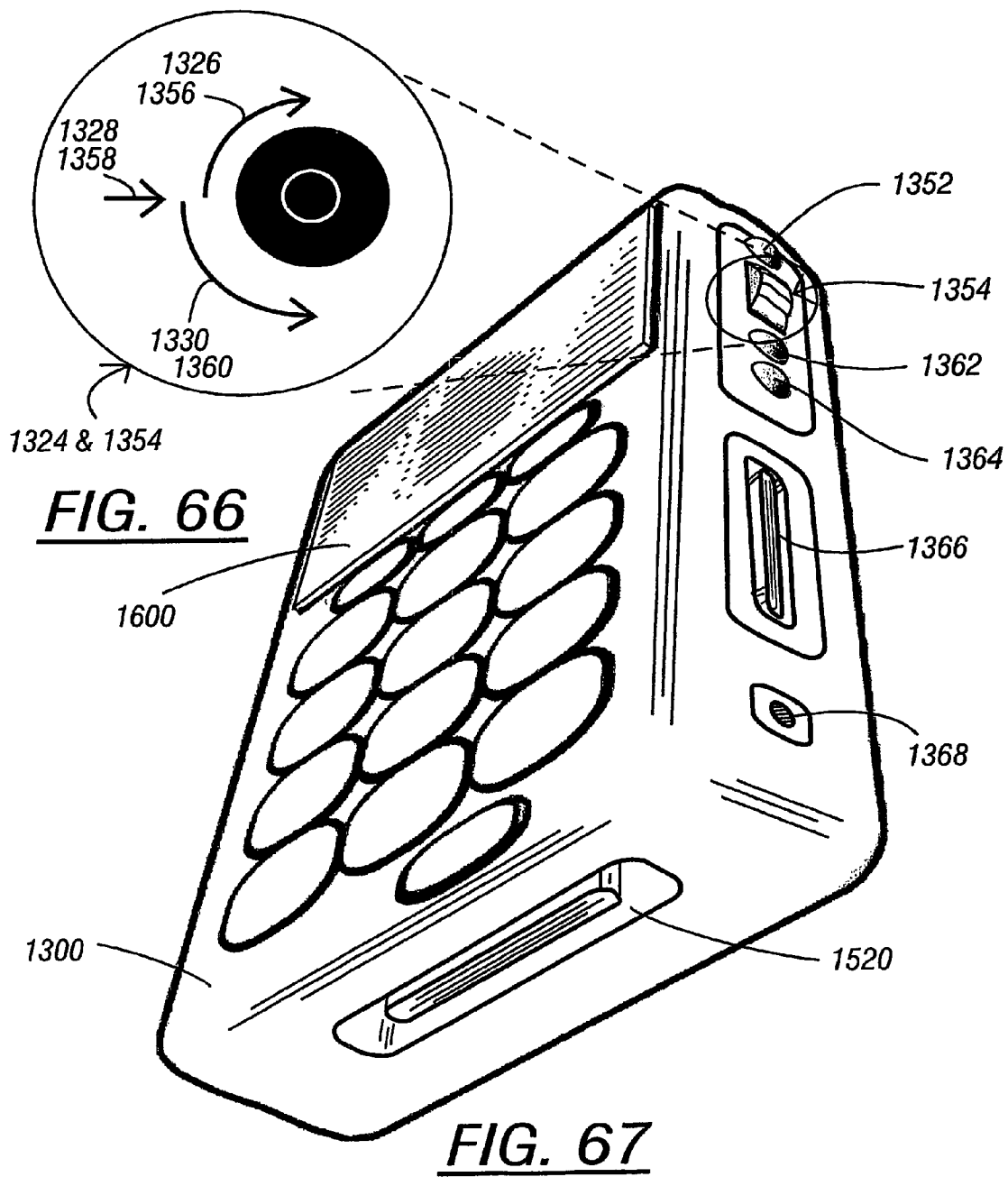
FIG. 66 is a functional view of the side trackwheel for the POD 170.
FIG. 67 is an alternative side perspective view of the POD 170.

The device can be setup for either right-handed or left-handed individuals using the setup function (explained later). In the right-handed mode, the hip holster is assumed to be on the right hip as shown in FIG. 63. The front display 1600 and the keypad 1300 as shown in FIGS. 64, 65, and 67, are then hidden inward. This protects the front keypad buttons 1300 from getting accidentally bumped or pressed.

Wireless Handheld Usage

Figure 69:
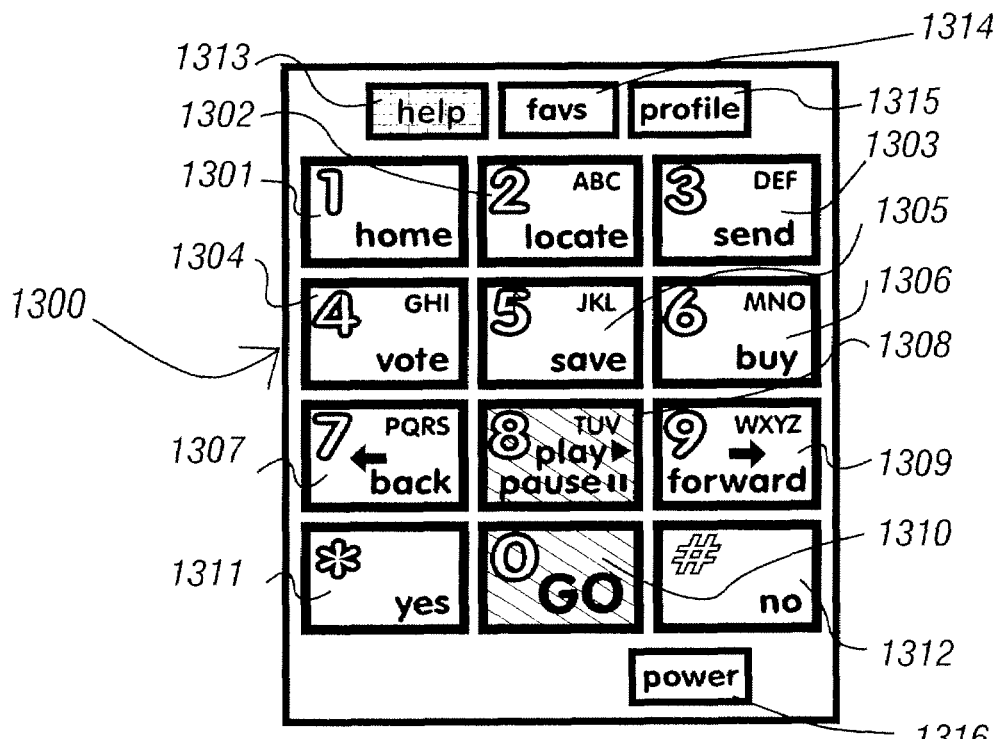
FIG. 69 is a front keypad of the handheld device.

When the unit is in one's hand it is designed so that both audio and text databases are easy to navigate in the front display 1600 as shown in FIG. 64. The audio controls found on the side of the unit, allow one to navigate the audio database as shown in FIG. 65 and the text controls found on the opposite side of the unit, allow one to navigate the text databases, as shown in FIGS. 66 and 67. The buttons on the front face 1300, as shown in FIGS. 65 and 69 provide navigation shortcuts to specific steps and additional functionality.

DESCRIPTION OF ALTERNATIVE EMBODIMENT FOR THE GO-UI 199

The Following Sections Describe Embodiment of the GO-UI that would be used with the Said Alternative POD Embodiment 170.

Start-Up Mode

Figure 68A:
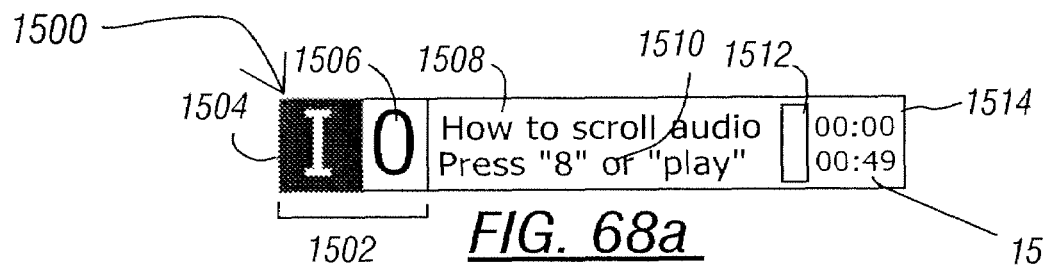
FIGS. 68(A) and (B) are graphical representation of the top display when the GO-UI 199 is scrolling audio clips.
Figure 68B:
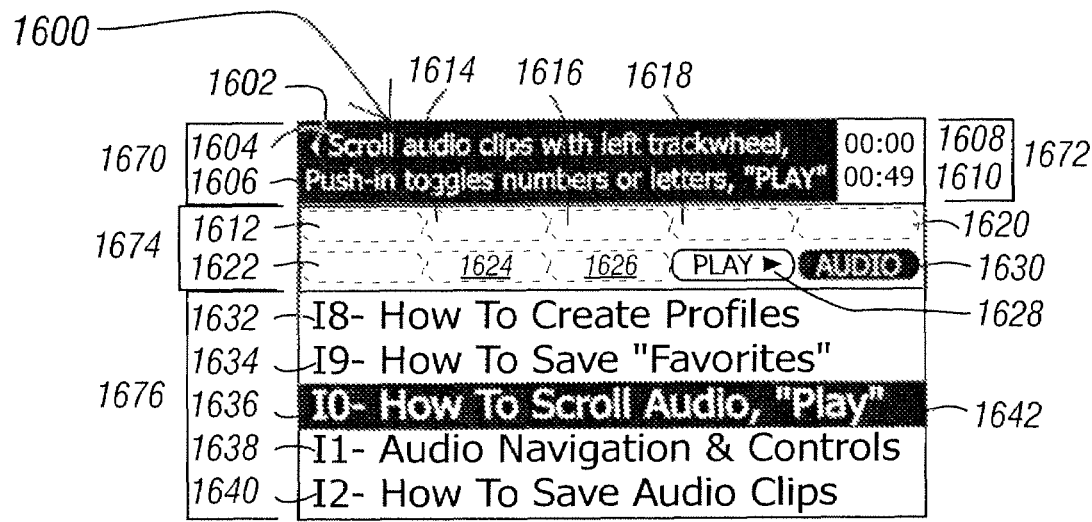

FIGS. 68*a*, 68*b*, and, show a unit's "start-up" mode or the default mode. A Key 1316, FIG. 69, performs power up and places the top and front displays in the mode that was last in use before the unit was turned off. If the device has had its defaults "reset" or is brand new the unit comes up in the "start-up" mode. In the "start-up" mode, an audio clip address "10" (the letter "I" as in India and the number "0" as in zero) appear in a display element 1502, FIG. 68*a* and at the beginning of a display element 1636, FIG. 68*b*.

The audio clip address is a combination of a single letter (A-Z) 1504 with a single number (0-9) 1506. An audio clip has a clip name "How To Scroll Audio" that appears in 1508. If the clip name takes more than one line to display, its name can carry over to a second line that is shown as a display element 1510. If the remaining space in 1510 allows, there can also be a clip description and/or an abbreviated user instruction.

In the "start-up" mode, display element 1510 reads "Press "8" or "play"". A display element 1604 and 1606 in FIG. 68*b* allow for two lines of text to create longer Seeker 999 instructions than can appear in 1510, FIG. 68*a*. In this "start-up" state, the unit has an audio clip buffered to explain to a new Seeker 999 how the device works when the Seeker presses either a play button 1308, found on the front keypad area 1300, FIG. 69, or a play button 1322, found on the side of the unit, FIG. 65.

Play/Pause Modes

Figure 70A:
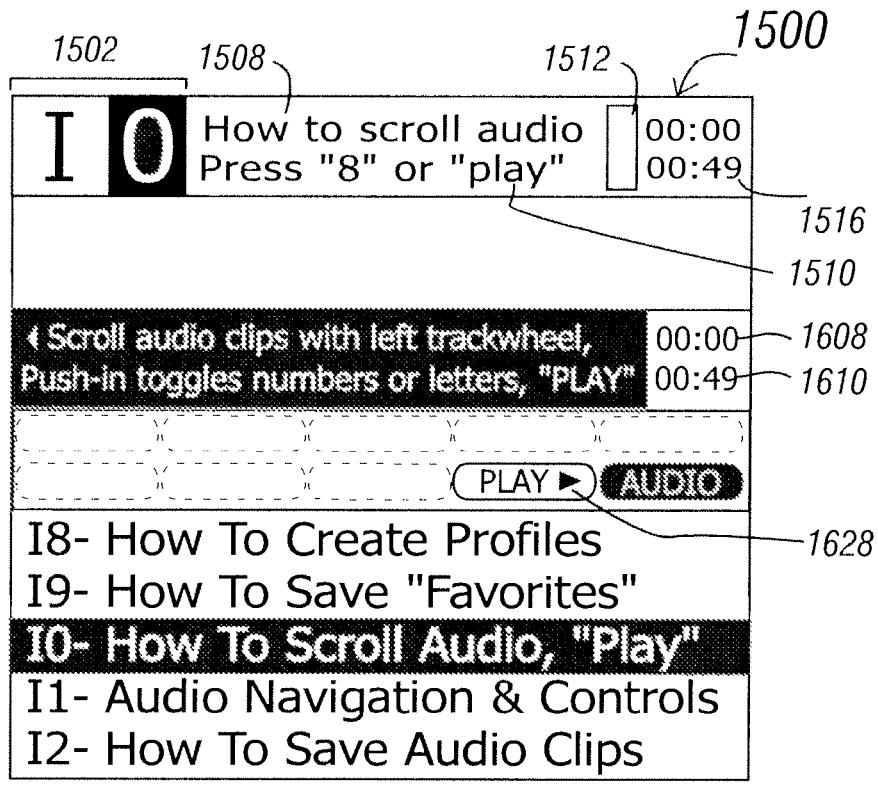
FIGS. 70(A), (B), (C), (D), (E), (F), (G), (H), (I), (J), (K) and (L) are graphical representations of a top and a front display when the GO-UI 199 is scrolling audio clips.
Figure 70B:
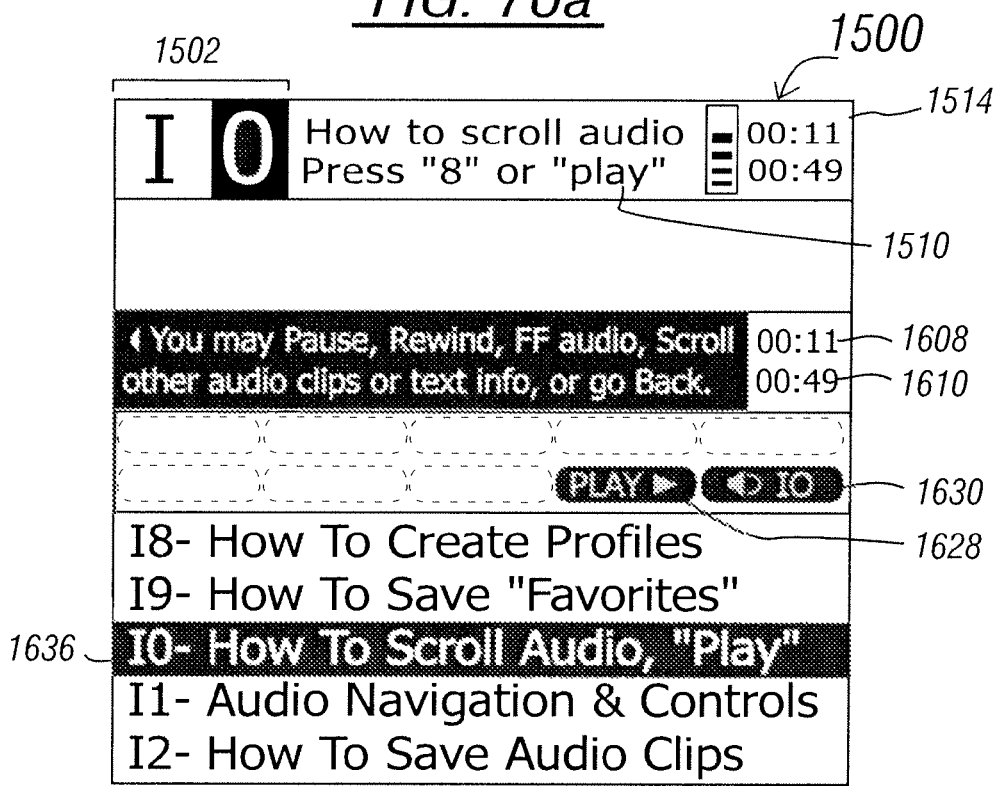

This Side Control 1322 in FIG. 65 performs a "play/pause" function and will play the buffered audio clip that has its address shown in FIG. 70*a* display element 1508, and reflected by a display element 1636 in FIG. 70*b*, Key 1308, in the front keypad as shown in FIG. 69 and labeled "8 play/pause" operates identically to the side panel "play/pause" key 1322, if the unit is not in a numeric entry mode. Numeric key mode and the different properties of a "display element" will be described later.

For experienced Seekers 999, a display element 1628 in FIG. 70*a*, that consists of an oval with a black outline and the text "play" inside of the outline, indicates that the unit is not in play, but that audio is available to be played. New Seekers 999 can learn this information by listening to the help messages that start at audio clip "I0" and go through "I9". In FIG. 70*b*, 1628 is a now a black oval with "play" inside. This indicates the unit is playing an audio clip.

A display element 1630 will display the word "audio" if there is an audio clip available for the Seeker 999 to hear. When audio is actually playing, this display element 1630 changes from the word "audio" to an audio symbol and the address of the playing clip, as shown in FIG. 70*b*. Audio clips can be clips found scrolling an audio database, MP3 audio, or an audio clip attached to a text file (these modes are explained later).

Volume Levels

In most cases, the audio clip that is currently playing or was last played has its address shown on the top display element 1502, FIG. 70*a*. If a clip is currently playing, a display element 1512 shows the displayed volume level by varying the number and size of bars shown within the box as in FIG. 70*b*. If the unit is not in the play mode, only the box outline is shown with no volume bars inside of it, as in FIG. 70*a*, 1512.

A Side Control 1336, FIG. 65, performs a "volume up" control and a side control 1338 performs a "volume down" control. The recorded volume of the audio data is carefully set for the average Seeker 999, but this control allows the volume of all clips to be adjusted. The number of volume bars shown in FIG. 70*a*, display element 1512 reflect the current volume setting. Every clip's volume is adjusted to match preset audio levels.

Play/Pause/Rewind/Fast-Forward

Figure 70C:
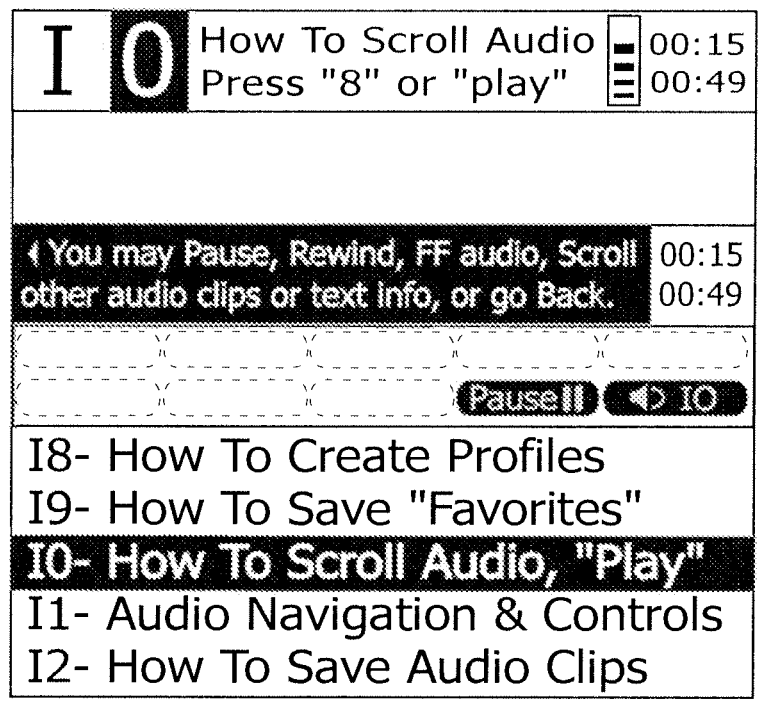
Figure 70D:
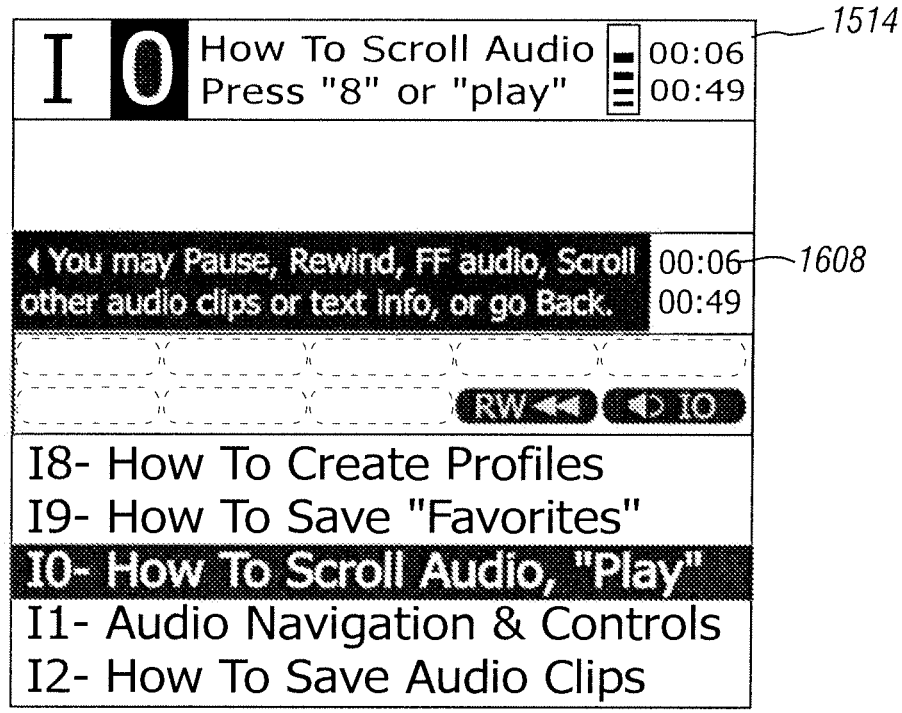
Figure 70E:
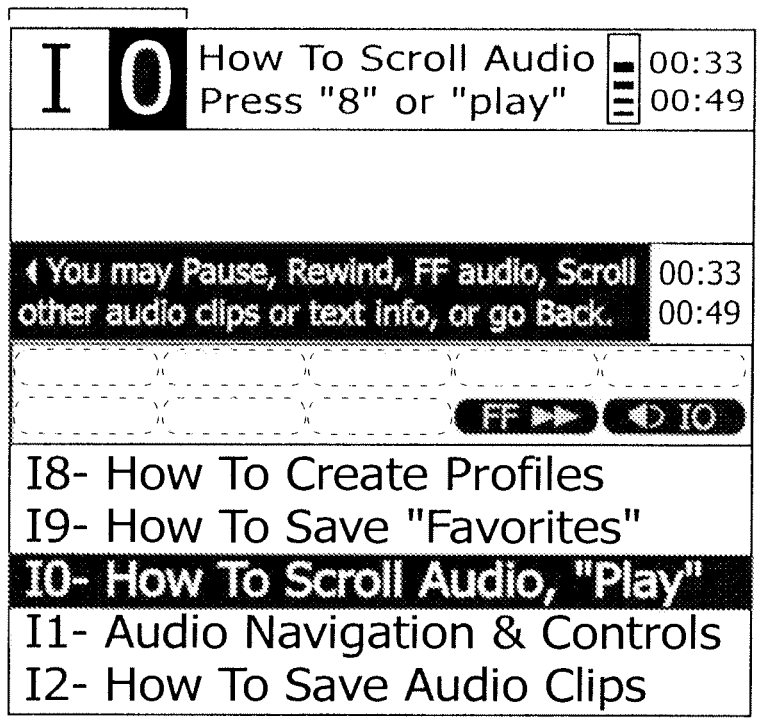
Figure 70F:

When the unit is only playing audio as in FIG. 70*b*, and not scrolling other databases (explained later) side control 1322 in FIG. 65, pauses audio as in FIG. 70*c*. Holding in a Side Control 1332, as shown in FIG. 65, performs an "audio-clip rewind" with the adjusted time displayed in 1514, FIG. 70*d*, 1608. A Seeker 999 hears a lowered volume of a synthesized sound that notifies him that the audio clip is actively being rewound. Similarly, holding in a Side control 1334, as shown in FIG. 65, performs an "audio-clip fast-forward" as shown in FIG. 70*e*, that can continue up to the end of a selected audio clip. One hears a lowered audio volume and the clip playing at two times the speed. Holding in on the play/pause side control 1322 for more than 5 seconds, causes the audio clip to stop and go back to time "00:00" as in FIG. 70*f*. Press the "play" control 1322 again will start to play the audio clip from the beginning.

Audio Time Displays

A time counter 1514 shows the running time of the audio clip that is currently playing as in FIG. 70*b* or shows "00:00" if no audio clip is playing as is shown in FIG. 70*a*. A display element 1608, FIG. 70*a* on the front display switches between showing the time of day, as in FIG. 71*a*, when no audio clip is queued or playing, and switches to showing the same time counter that appears in 1514 FIG. 70*b*, when an audio clip is queued or playing, see also FIG. 70*b*, 1608.

A display element 1516, FIG. 70*a*, shows the total length of the currently selected audio clip. A display element 1610, FIG. 70*a* on the front display switches between showing the current calendar date as in FIG. 71*a*, when no audio clip is queued or playing, and showing the same total audio clip time that appears in 1516 when an audio clip is queued or playing, see FIG. 70*b*, 1610.

Audio Scrolling

Figure 70G:

When the unit is in the audio-scrolling mode, front display element 1630, FIG. 70*g*, reads "audio" and a display element 1602, shows an arrow that points to the Seeker 999 to which the side of the unit the audio controls are located. In the right-handed mode (setup explained later), it points to the left.

A Trackwheel 1324, FIG. 65 is a compound control with three functions. The three functions are shown in FIG. 66, as a Side Control 1326 "Trackwheel Up", a Side Control 1328 "Trackwheel Pushed" and a Side Control 1330 "Trackwheel Down". A trackwheel is a rocker switch with a push-in mode that is used in the wireless handheld unit FIG. 65. To obtain the same functionality using a software application while connected to the Internet, the software interface requires three separate control buttons.

Audio scrolling is performed with the trackwheel 1324, FIG. 65. Any audio scrolling causes the implementation of the audio-scrolling mode. If the unit was previously in the text-scrolling mode FIG. 71d (explained later), the text-mode information is buffered within the unit's memory and any previously buffered audio-scrolling data is then restored in the unit's displays. This minimizes the need for additional screen space and allows the Seeker 999 to revert back to the place where said Seeker had previously left off while they were in the opposite scrolling mode.

Figure 75A:
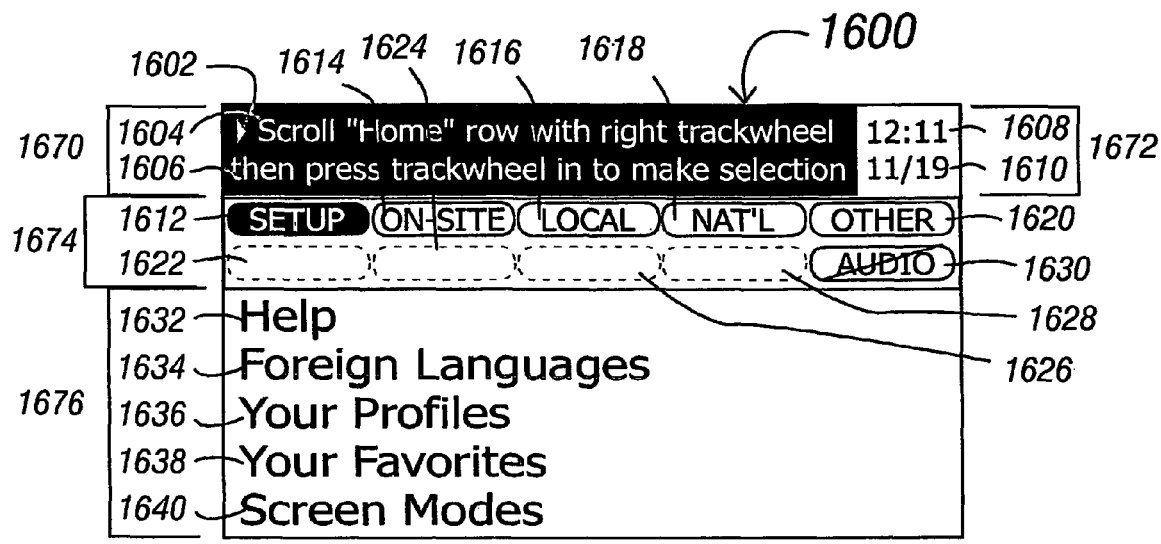
FIGS. 75(A), (B), (C), (D), (E), (F), (G), (H), (I), (J), (K), (L), (M), (N), (O), (P), (O) and (R) are graphical representations of the front display when the GO-UI 199 is setting up a user profile under the setup portion of the text capabilities.
Figure 75B:
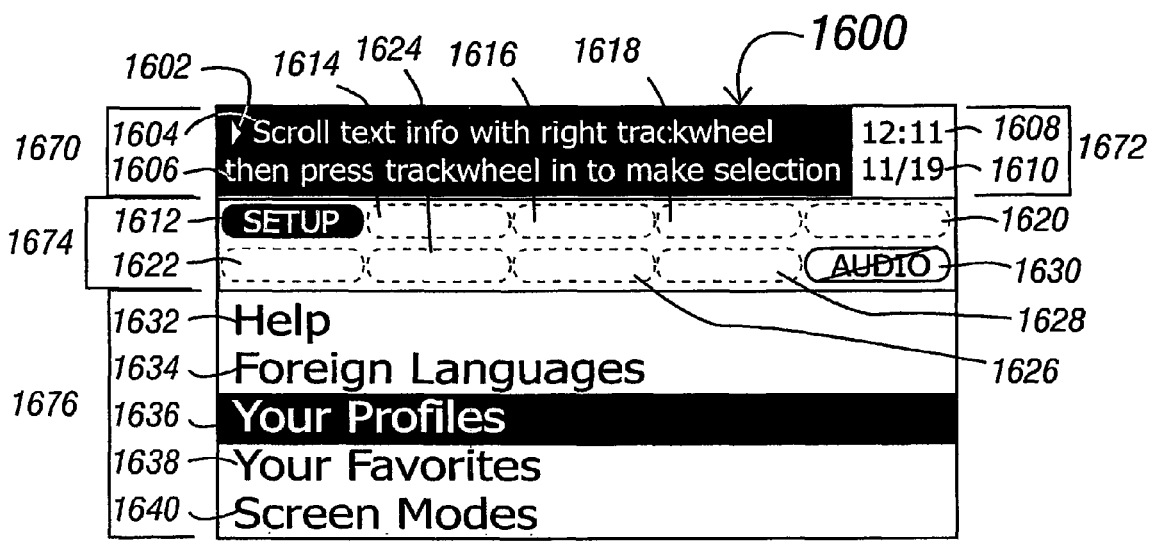
Figure 75C:
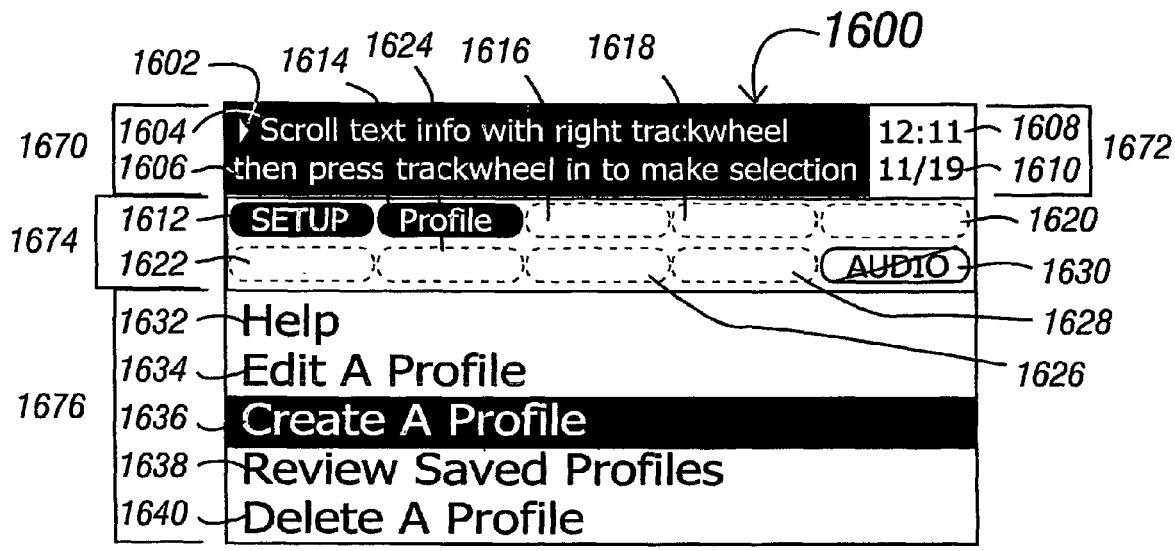
Figure 75D:
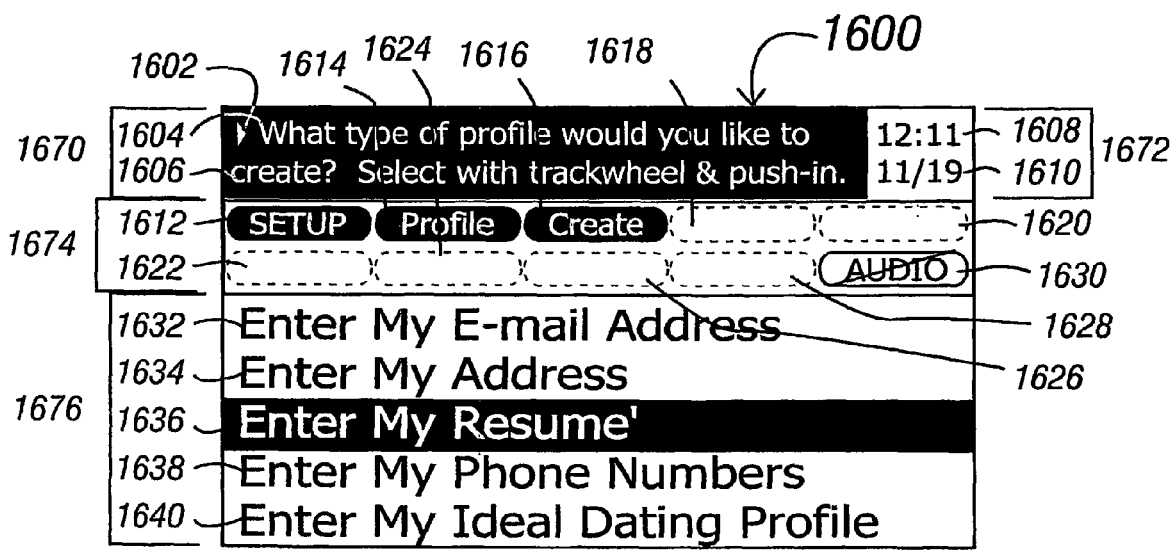
Figure 75E:
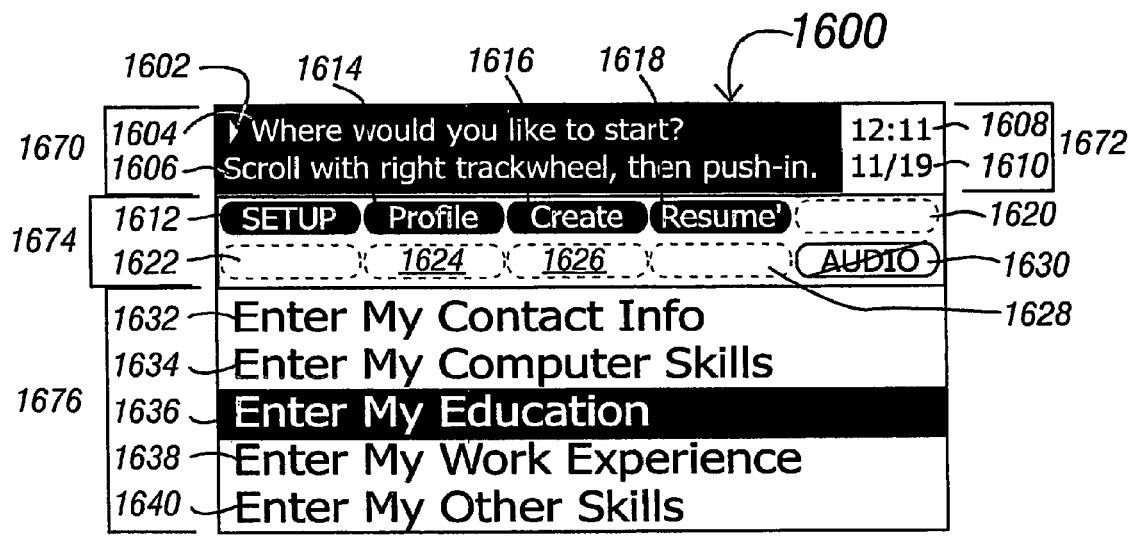
Figure 75F:
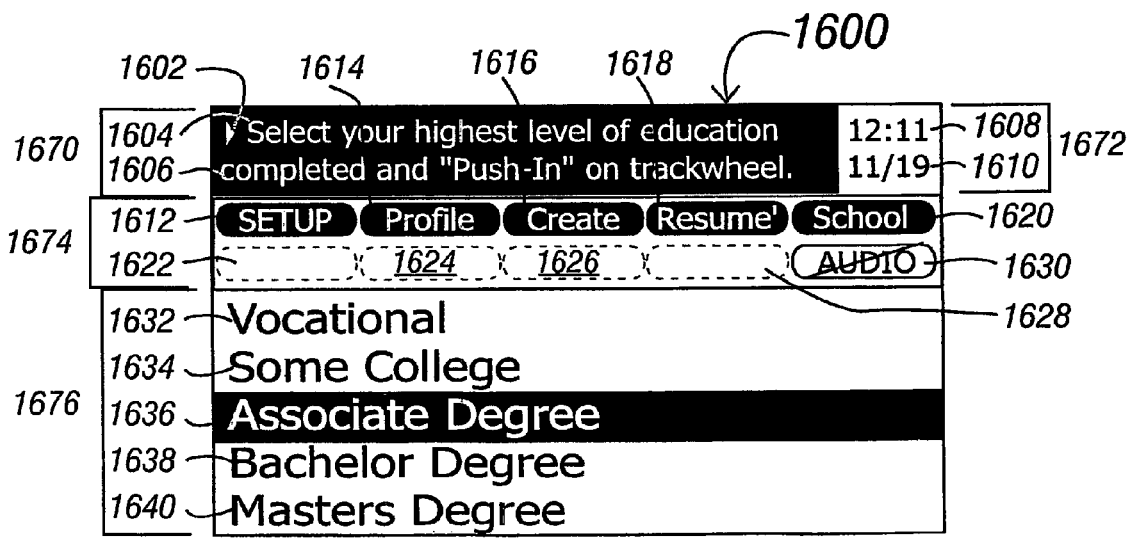

Scrolling area 1676 of FIG. 70g shows the scrolling status. The audio clip shown in display element 1636, represents the currently selectable audio clip, as is indicated by a display element 1642, with the white text in a black box. This audio clip's address, name, and abbreviated instructions are also displayed in the top display 1500, as 1508 and 1510 of FIG. 70f. Any "Home Row" or "Lower-Level" text shown as display elements 1612, 1614, 1616, 1618, 1620, 1622, 1624, or 1626, as shown in FIG. 75i, that had previously appeared during any text-scrolling (explained later) now disappears, since the unit is in the audio scrolling mode.

There can be different screen modes (explained later under setup) that affect the number of lines that appear in a scrolling area 1676, FIGS. 77e and 77f. By default the display area 1670, the "help screen" is on, as is shown in FIG. 70g and there are five lines available at the bottom of the front display for scrolling audio clips, display elements 1632, 1634, 1636, 1638, and 1640.

When audio scrolling, the side control 1326, FIG. 66, "Trackwheel Up", causes a display element 1632, FIG. 70h, to get replaced by the value previously appearing below it as a display element 1634, a display element 1634 is replaced by the value previously appearing as display element 1636, a display element 1636 is replaced by the value previously appearing as display element 1638, and a new value is retrieved from the database list for a display element 1640.

Similarly, FIG. 66, a Side Control 1330 "Trackwheel Down", causes the display element 1640 to be replaced with the value previously appearing above it as display element 1638, display element 1638 is replaced with the value previously appearing as display element 1636, display element 1636 is replaced with the value previously appearing as display element 1634, display element 1634 is replaced with the value previously appearing as display element 1632, and a new value is retrieved for display element 1632. This new value that is displayed, depends on whether the Seeker 999 is scrolling through the letters (A to Z) or through the numbers (0 to 9).

FIG. 66, a Side Control 1328, the "Trackwheel Pushed" function, toggles between the ability to scroll numbers or scroll letters. The active half of display, FIG. 70h is a display element 1506, as designated with white number on a black background and the non-active half of the address is white letter as is shown with display element 1504. The reverse is shown in FIG. 70j.

Scrolling Audio Address Numbers

Figure 70H:
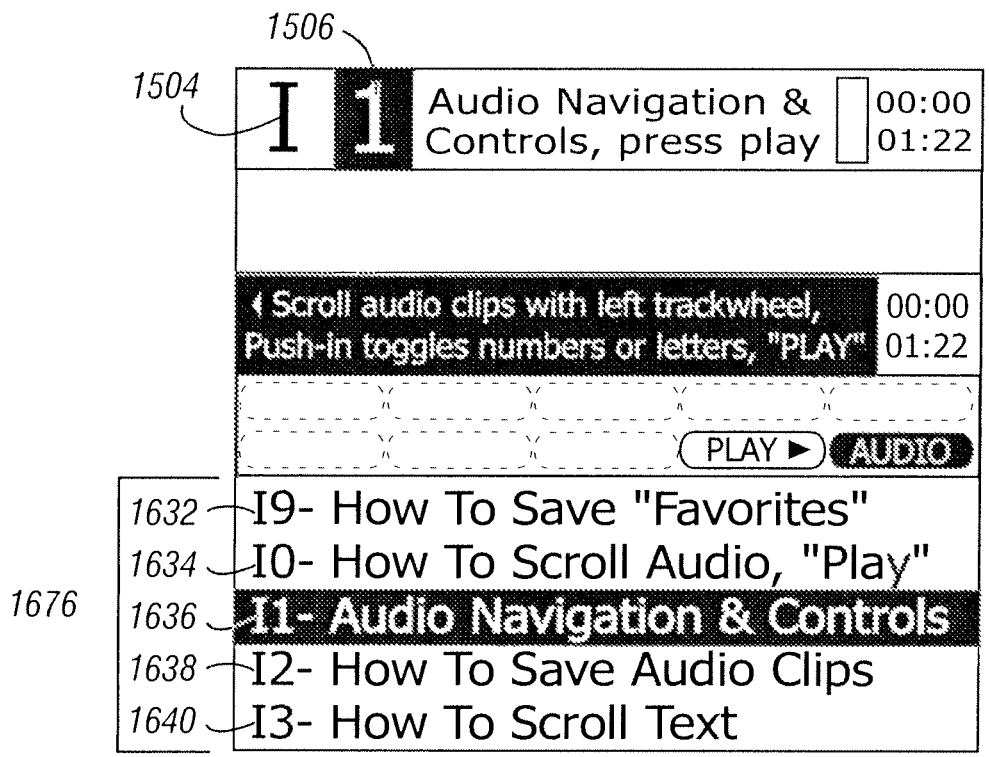
Figure 70I:
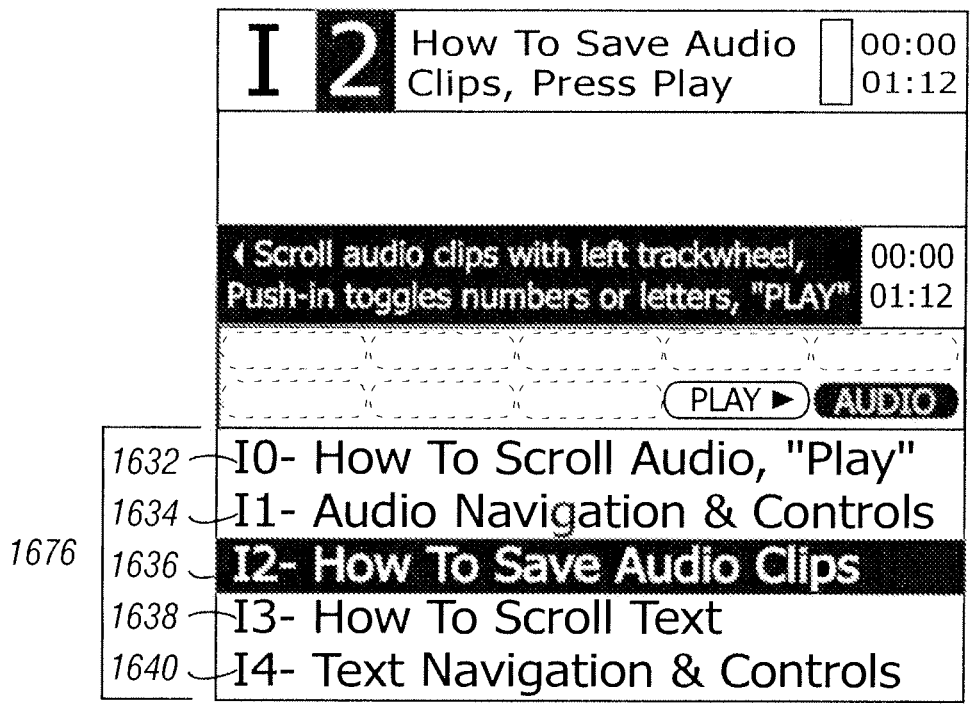
Figure 70J:

Scrolling the number portion of an audio address is shown in FIG. 70h. The clips (all starting with the letter "I" as in India) I9, I0, I1, I2, and I3 are shown in the scroll area 1676 of FIG. 70h. Pushing side control 1326, Trackwheel Up, causes the clip address to move up one position, as shown in Scroll Area 1676, FIG. 10i, clip I9, becomes clip I0, followed by I1, I2, I3, and I4. This assumes a clip 14 is available in the database. If only two clips are available in the "I" series then display element 1640 is blank, and if there is only one clip, it would appear by itself as display element 1636.

Scrolling Audio Address Letters

Figure 70K:
Figure 70L:

Scrolling the letter portion of an audio address (not to be confused with text scrolling) is shown in FIGS. 70j 70k, and 70l. The audio clip addresses G2 1632, H2 1634, I2 1636, J2 1638, and K2 1640 are shown in the scroll area 1676, FIG. 70j. If Trackwheel Up is pushed in, the clips F2 1632, G2 1634, H2 1636, I2 1638, and J2 1640 would be shown as in FIG. 70k. If audio clip F2 does not exist in the database, then the "E2" audio clip would be displayed at display element 1632, as shown in FIG. 70l.

FIGS. 63 Through 82

Text Databases

Figure 71A:
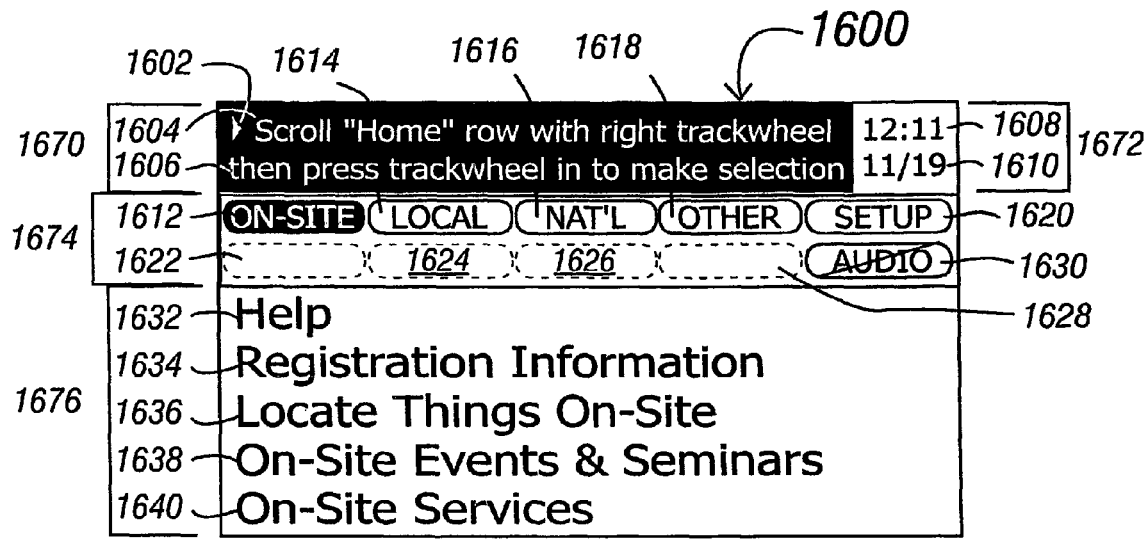
FIGS. 71(A), (B), (C), (D), (E), (F), (G), and (H) are graphical representations of the front display when the GO-UI 199 is scrolling the 'on-site' portion of the text database.

Besides audio clips, one can also navigate several text databases and setup capabilities. First, one must decide which location or operation one wants to search from the choices found at top level or "home" row of the front display. FIG. 71a shows this home row that consists of "ON-SITE" 1612, "LOCAL" 1614, "NATIONAL" 1616, "OTHER" 1618, and "SETUP" 1620. Each of these five choices provides the Seeker 999 selections shown in display area 1674 in FIGS. 71, 72, 73, 74, and 75. Similar to audio scrolling, area 1674 of FIG. 71a, shows the currently available choices for the next level of the text database. The rectangular display element 1634 reflects the current selection as shown in display element 1630.

Figure 71B:
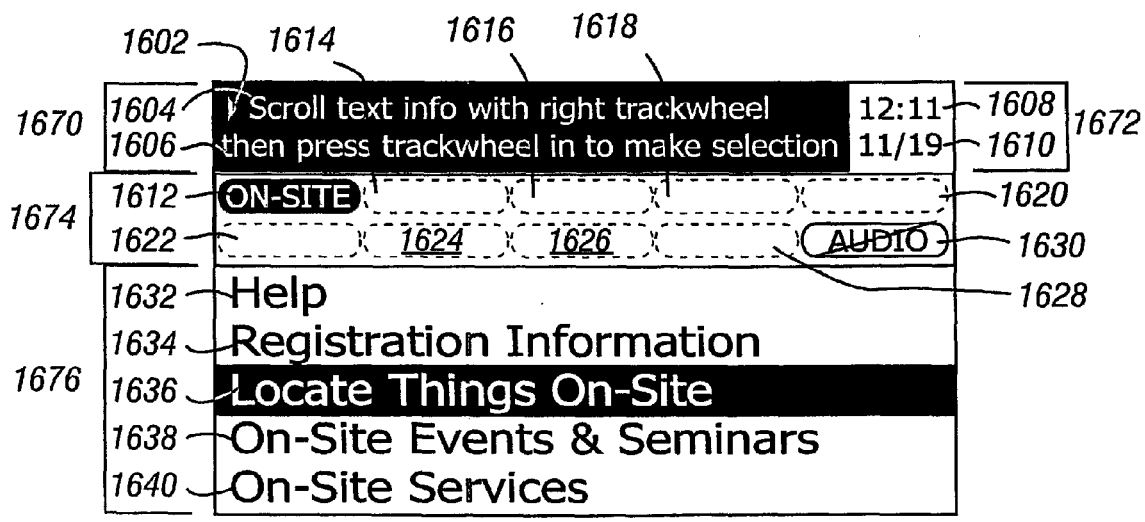
Figure 71C:
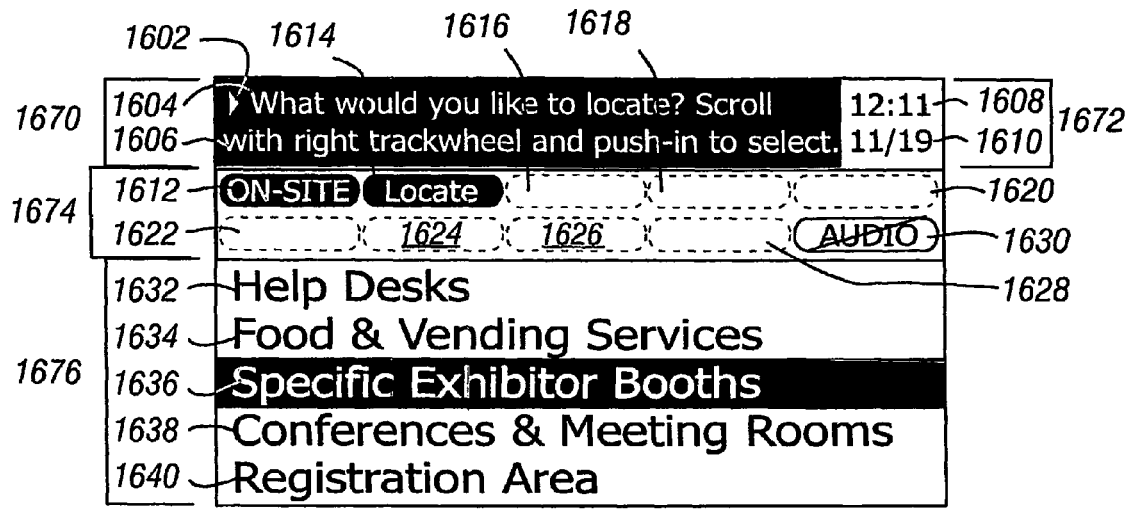

Side control 1352, FIGS. 66 and 67, performs a "home" function that returns the Seeker 999 to the top level of the five database choices. The scroll area 1674, FIG. 71a, contains the second level choices available to the Seeker 999. Trackwheel 1354, FIG. 67 is a compound key, similar to Trackwheel 1324, except this Trackwheel is used for navigation of text databases. Performing a "Trackwheel Push". selects the next level in the hierarchy of the database as shown in FIG. 71b, display element 1612, followed by the next entry that appears as display element 1614 through display element 1620. Five levels are visible at one time. When one moves past the fifth level, the information shown in display element 1612 rotates off the screen to the left.

A side control 1356, FIG. 66 moves up through the text database and side control 1360 moves down through the text database. A side control 1358 allows the Seeker 999 to advance one level down in the database. An Internet software version could use three separate button controls.

A side control 1362 performs a "back" function and a side control 1364 performs a "forward" function as shown in FIGS. 66 and 67. The back function moves one level backwards through the previously performed actions. The forward function allows one to return forward through the history stack.

FIG. 71.

ONE EMBODIMENT OF TEXT SCROLLING

FIG. 71a shows the top level subject heading options when a Seeker is scrolling text, shown as "On-site" 1612, "Local" 1614, "NAT'L" 1616 (National), "Other" 1618 and "Setup" 1620. Notice that Audio 1630 has a line through it, indicating to the Seeker that no audio is presently queued or being played. When a Seeker rotates the text trackwheel 1354, typically the available selections appear in area 1676 as in FIG. 71*b*, with the selection 1636 in reverse video. This indicates that the Seeker can press in 1358 with the trackwheel to advance to the selection in 1636, but the top level of text scrolling in this embodiment is a unique case where spinning the text trackwheel 1354 changes the selection across the top line of area 1674.

For example, rotating the trackwheel up would move "Local" 1614 in FIG. 71*a* to the current location of "On-site" 1614 and "On-site" 1614 would move over to where "Setup" 1620 is currently located". The selection that is in the queue for the Seeker to select is always in display position 1612. Display area 1676, in this FIG. 71*a*, changes as the Seeker moves through the top selections in display area 1674.

This information in display area 1674 will be the next selection said Seeker will need to make should said Seeker select "On-site" in this example. This ability to see the next selection in display area 1674, allows said Seeker to get an additional understanding what types of information can be found under a given heading without actually having to make the selection. In this example, said Seeker selects "On-site" 1612 to select information regarding the LCAP where said Seeker is currently located.

On-Site Options

Element 1676 of FIG. 71*b* depicts choices available after selecting "On-Site" 1612. Using the text trackwheel 1354, the Seeker selects "Locate Things On-Site" 1636 pushing in on the trackwheel taking him to the GO-UI on FIG. 71*c*. From this screen he can select from a range of options to locate on-site. The GO-UI builds an abbreviated history of the Seeker's selection or navigation path as shown as "On-Site" 1612 and "Locate" 1614 in FIG. 71*c*.

Figure 71D:
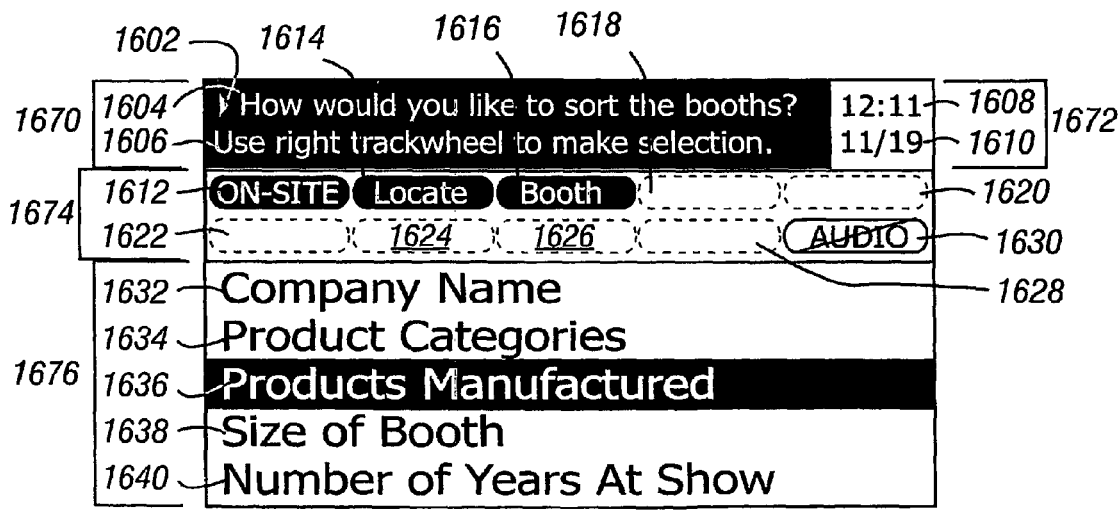

For this example, said Seeker selects "Specific Exhibitor Booths" 1636, this advances the GO-UI to the screen shown in FIG. 71*d*. From here said Seeker decides how he would like to categorize the exhibitors participating in the trade show. He could then select between the five options shown in FIG. 71*d*, to locate by "Company Name" 1632, Product Categories" 1634, "Products Manufactured" 1636, "Size of Booth" 1638 which would rank the exhibitors by the size of the booth, by the "Number of Years At Show" 1640; or said Seeker could rotate the trackwheel 1354 to see other locating options before these five on the screen in area 1676.

If these were the only five options available the option in 1632 would move up and replace option 1640, while 1640 moved up to 1638 and so on. The option that appears in 1636 is the one option that the Seeker can currently select.

In this example, the Seeker is trying to locate a product called a "Blackberry", but does not know who manufacturer's it. So the Seeker uses the "Products Manufactured" 1636 selection in FIG. 71*d* and area 1674 in FIG. 71*e* updates accordingly with "Products" 1618.

Figure 71E:
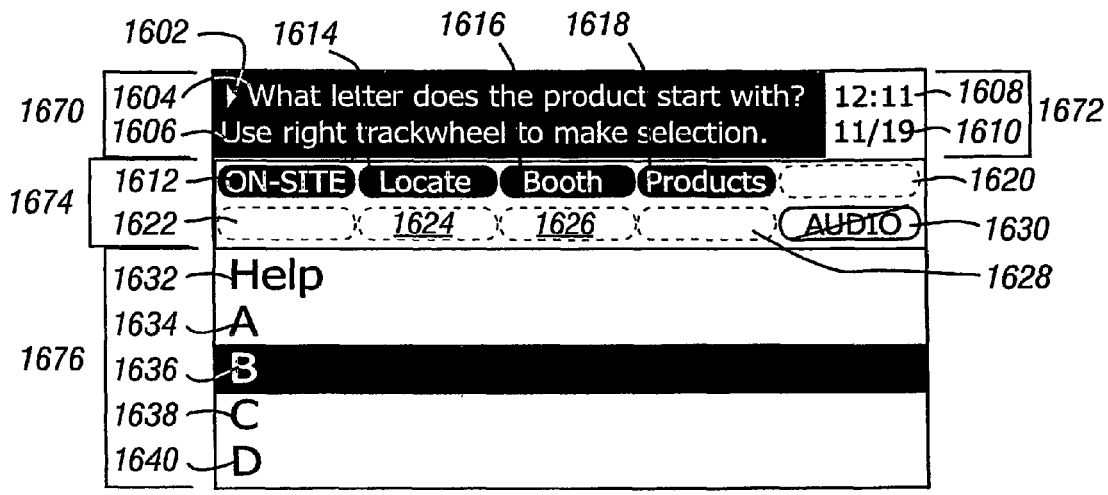

FIG. 71*e* displays an alphabet so the Seeker can select the first letter of a product, or in this example, said Seeker selects B 1636 for "Blackberry". The next screen that appears on the GO-UI appears in FIG. 71*f*, and the Seeker history adds another historical element "B" 1620 to section 1674.

Figure 71F:
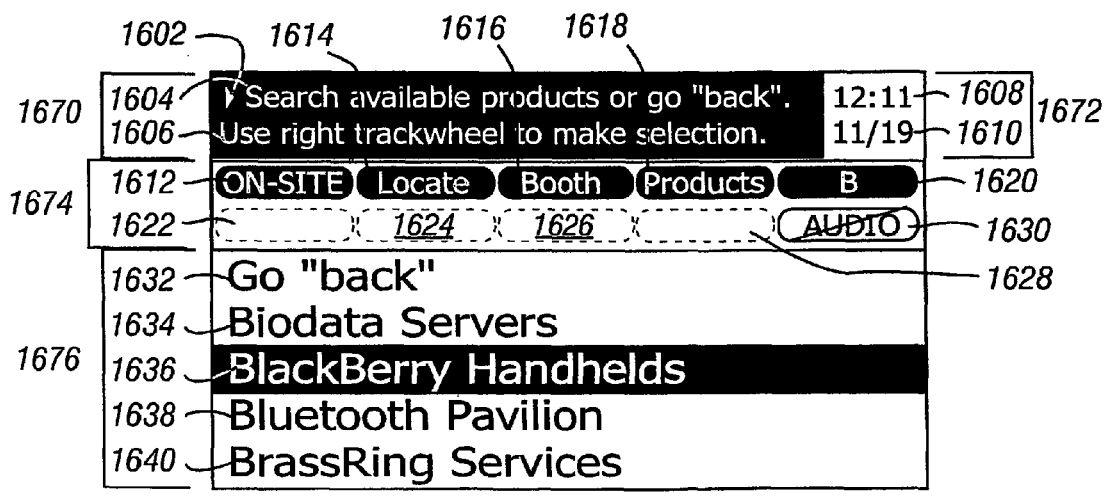

From FIG. 71*f*, said Seeker scrolls until "BlackBerry Handhelds" appears in the selection area 1636 and the Seeker presses in 1358 with the trackwheel 1354. The GO-UI then appears as the image in FIG. 71*g*, since there is more than one exhibitor show "BlackBerry Handhelds". Note that Seeker history adds another historical element "Visit" 1622 that gets added to line two to section 1674.

Figure 71G:
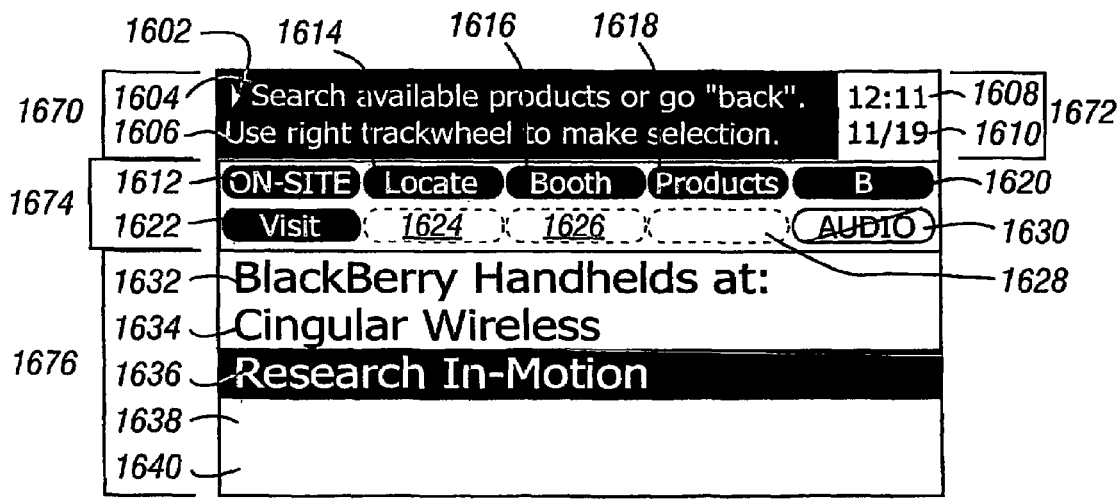
Figure 71H:
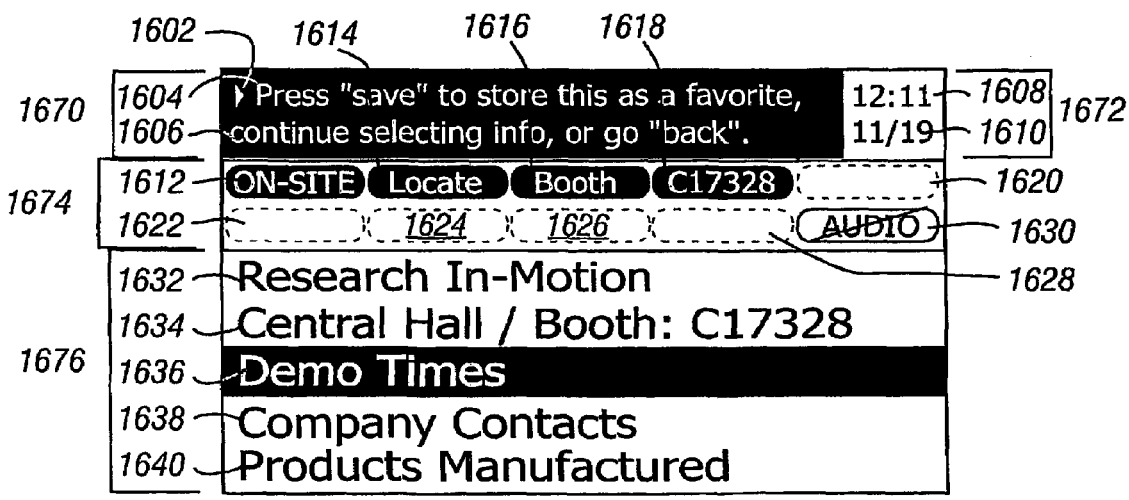

From FIG. 71*g*, said Seeker selects "Research In-Motion" as the exhibitor that the Seeker would like to locate and the GO-UI then appears as shown in FIG. 71*h*. From FIG. 71*h* the Seeker not only learns the booth location listed in line 1634 as "Central Hall/Booth: C17328", but the Seeker also discovers that he can select further options from this exhibitor, such as "Demo Times" 1636, "Company Contacts" 1638, "Products Manufactured" 1640, for a list of other products manufactured by "Research In-Motion" listed on the top line 1632.

These additional options could conform to a number of conditions, such as the selector 1636 could display the most popular choice made by other Seekers when using this screen within the hierarchy, the list of choices could be displayed in the order the exhibitor requests, and/or the selection list could change over time. For example, "Demo Times" 1636, could fall down the list if no more demos were schedule for that current day.

In FIG. 71*h*, note that the historical path in 1674 has been truncated to "On-site" 1612, "Locate" 1614, "Booth" 1616, and "C17328". This can occur during a number of conditions, such as when the history path moves into two lines the next request looks for the shortest path said Seeker could have obtained the same information. If the Seeker used the back button 1332, the Seeker would go back to the historical screen seen in section 1674 of FIG. 71*g*.

In this example, the Seeker selects "Demo Times" 1636 FIG. 71*h*. From this selection, not shown in the figures, the Seeker could select from a range of available demo time still available. If the Seeker's selection created a conflict with his existing schedule of events stored on the TO-U, the GO-UI could give the Seeker a range of options to change one of the two conflicts appointments. For example, if there was another BlackBerry Demo available at another time that did not conflict with the Seeker's schedule, the GO-UI could display the time options to the Seeker.

FIGS. 72*a*, 72*b*, 72*c*, 72*d* depicts an example where a Seeker chooses the "Local" field 1612 information verses "On-Site" field 1620. In this example, after said Seeker selects the Local field 1612 in FIG. 72*a*, the GO-UI shows what appears in FIG. 72*b*, where the Seeker can select from a range of selection that are local subjects in display 1676.

Figure 72A:
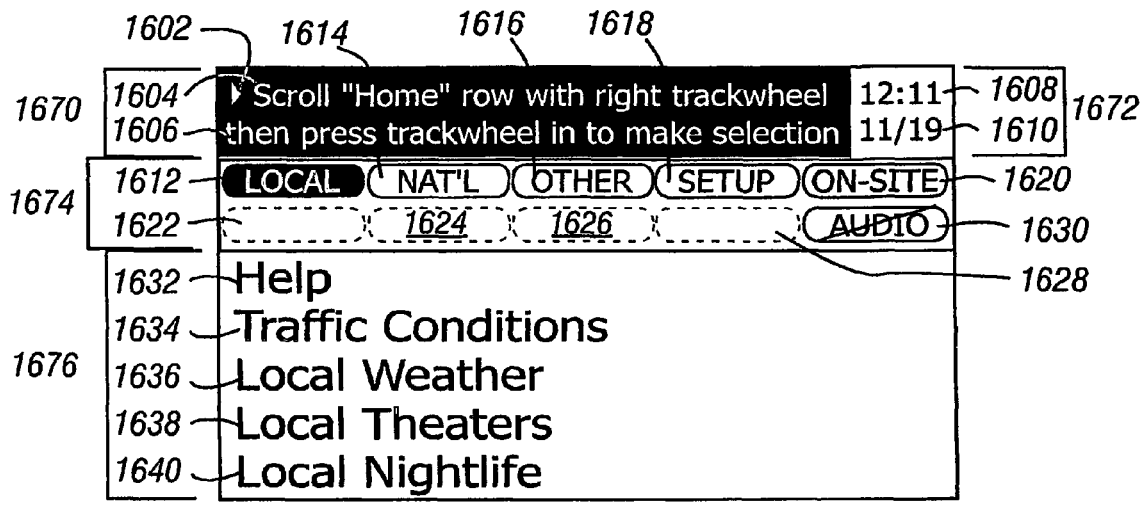
FIGS. 72(A), (B), (C), and (D) are graphical representations of the front display when the GO-UI 199 is scrolling the 'local' portion of the text database.
Figure 72B:
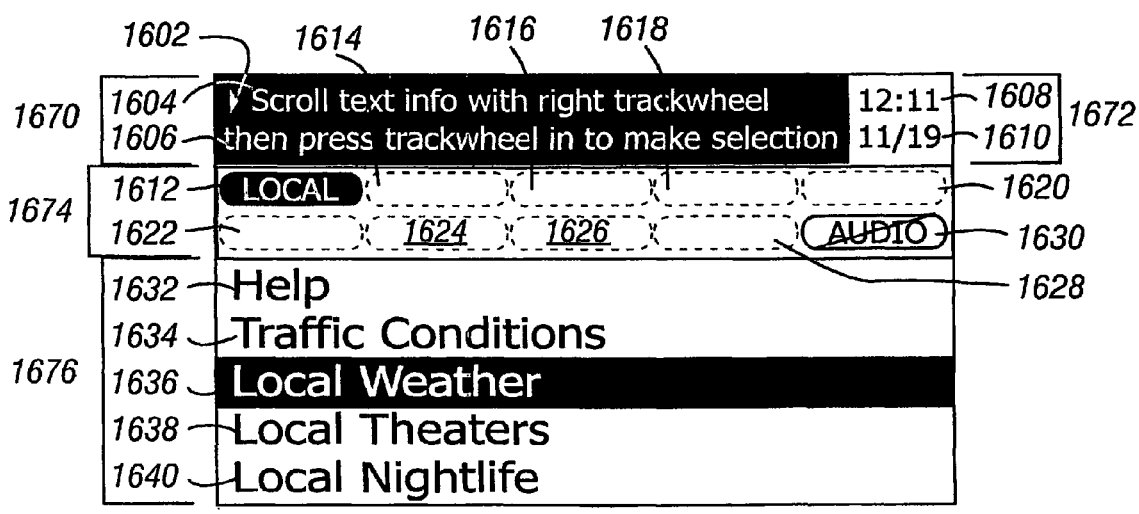
Figure 72C:
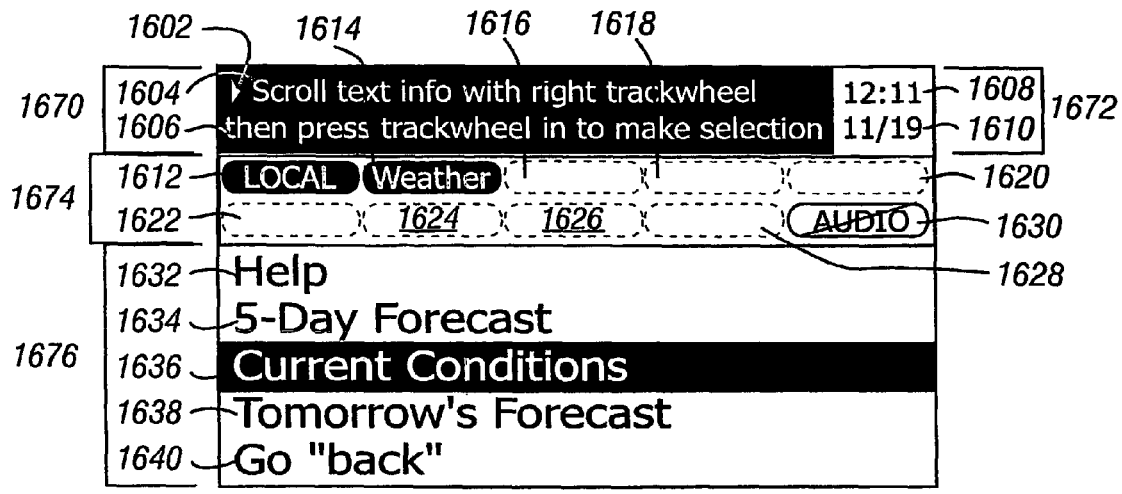
Figure 72D:
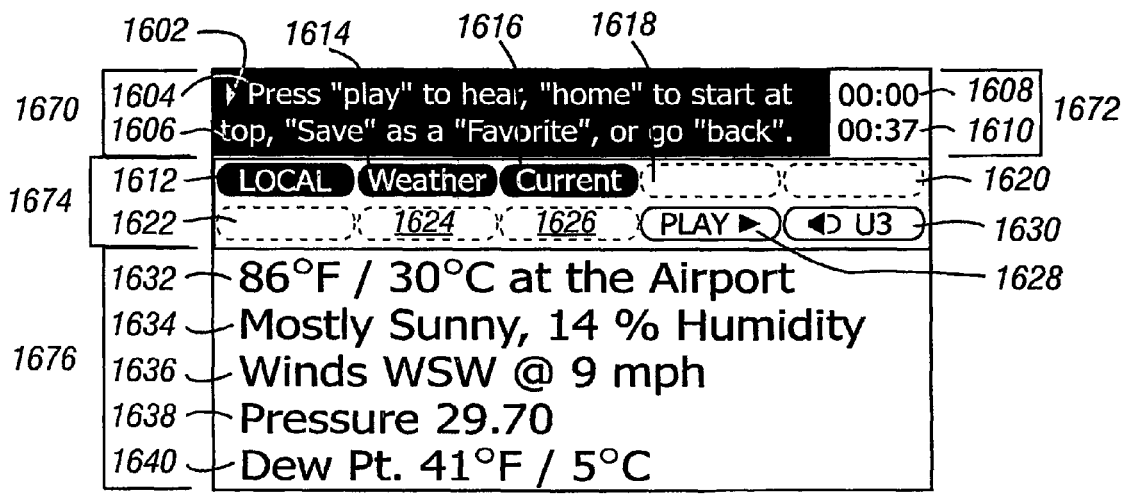

In this example, the Seeker wishes to lookup the "Local Weather" 1636, in FIG. 72*b*. This advances the GO-UI to the selections shown in FIG. 72*c*, where the Seeker could select "Current Conditions" 1636, in FIG. 72*c*. Notice that abbreviate history again appears in section 1674 in FIG. 72*d*. When Seeker gets to the screen in FIG. 72*d*, the Seeker has exhausted the list of choices. Consequently there is no reverse video as is normally the case for screen field 1636 as in FIG. 72*c*, but instead the screen is filled with information. This information could go beyond the five fields in 1676, FIG. 72*d* and the Seeker would rotate the trackwheel to see any additional fields of information.

Figure 73A:
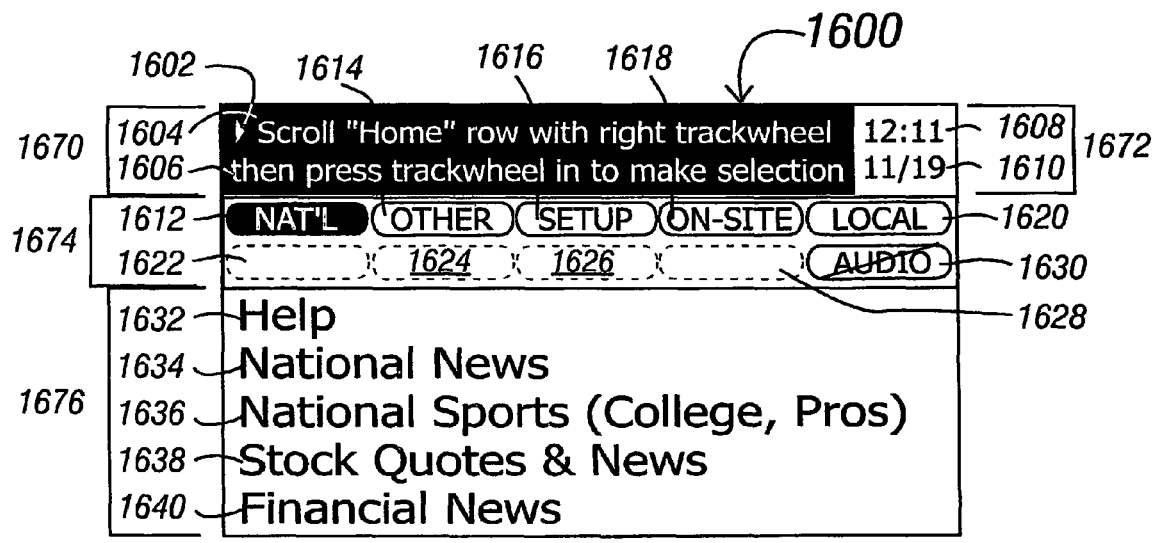
FIGS. 73(A), (B), (C), (D), (E), and (F) are graphical representations of the front display when the GO-UI 199 is scrolling the 'national' portion of the text database.

FIG. 73*a* depicts a Seeker looking up information on a National basis. In this example, the Seeker is trying to find the score for a Professional Football game between Oakland and San Francisco. FIG. 73*a* illustrates National choices as in the "Nat'l" field 1620.

Figure 73B:
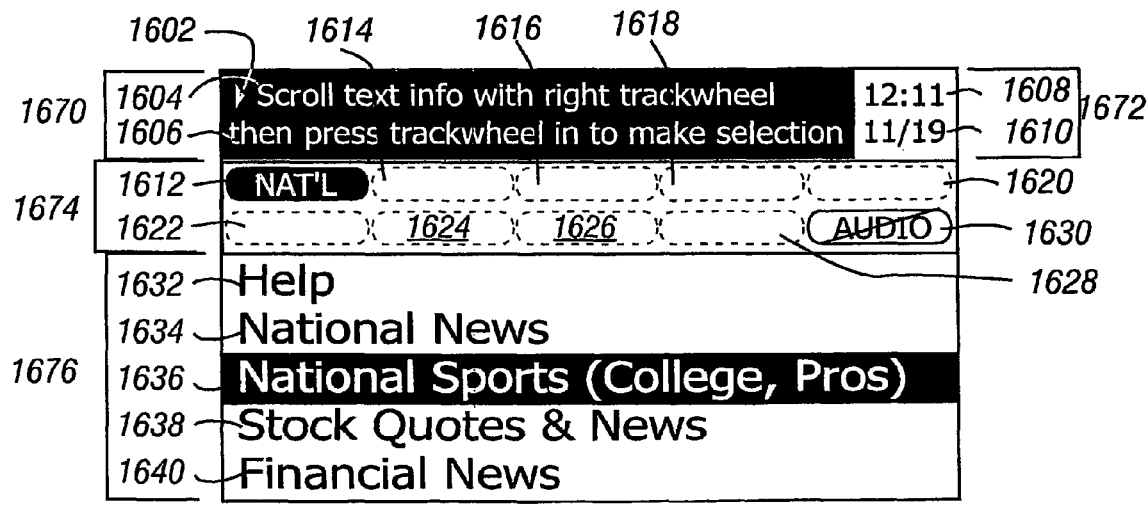

FIG. 73*b* shows a selection being made for National Sports (College, Pros) 1636.

Figure 73C:
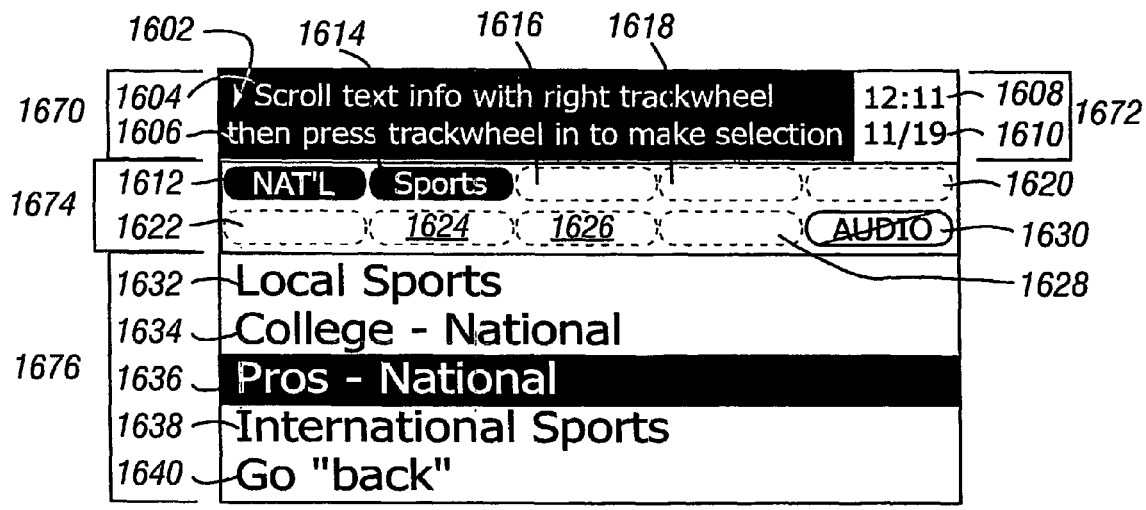
Figure 73D:
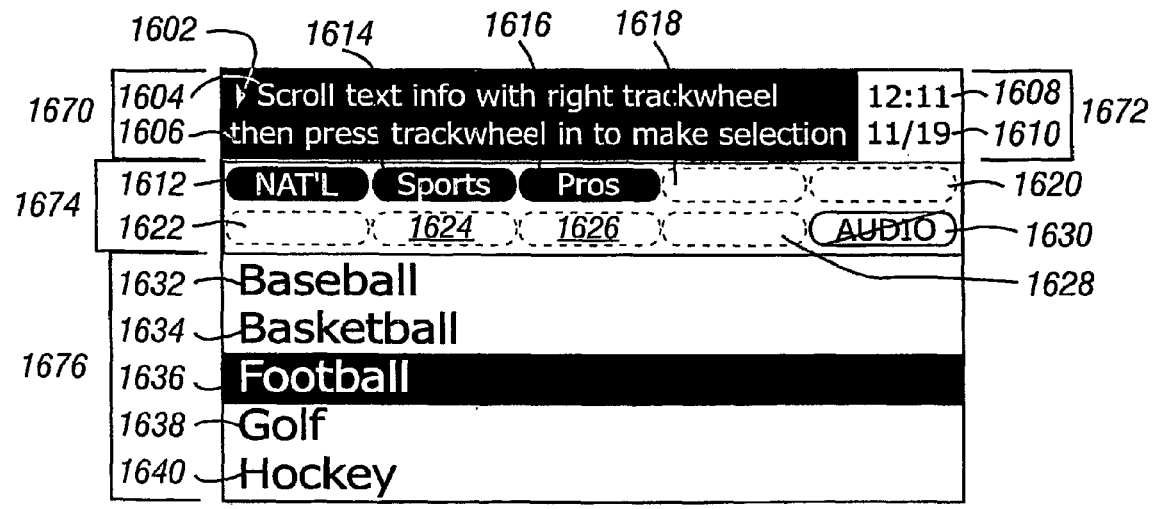
Figure 73E:
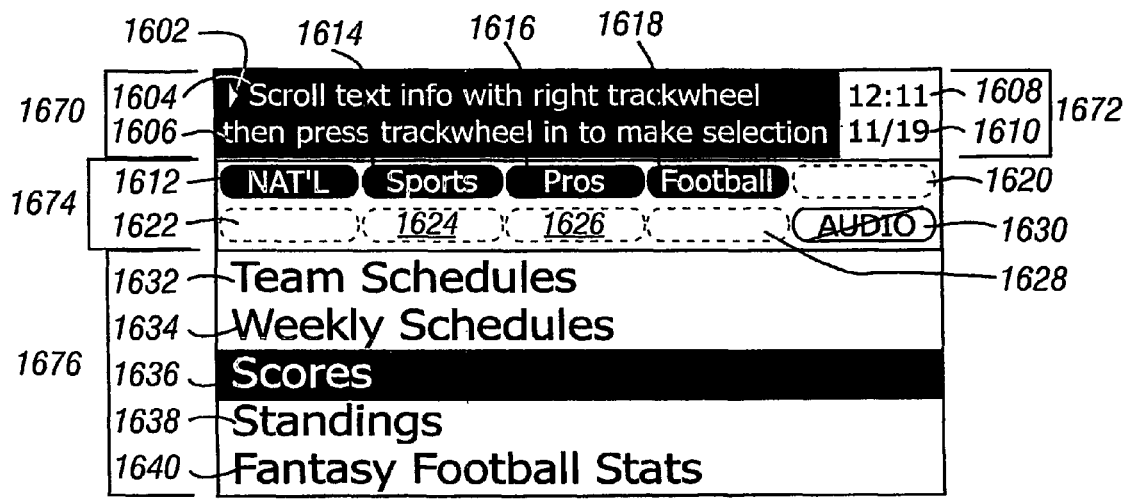
Figure 73F:
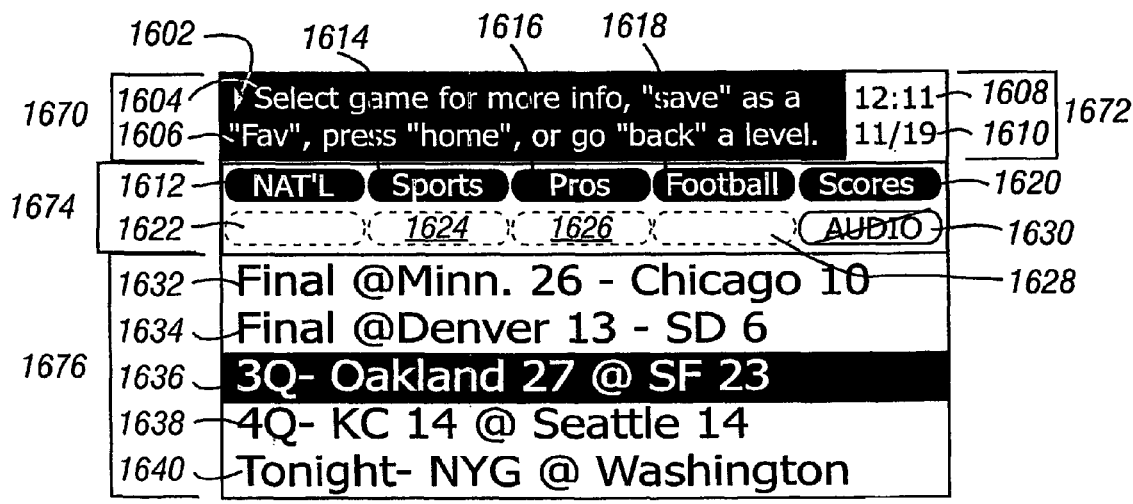

FIG. 73*c* shows Pros-National 1636 is selected and next Football 1636 FIG. 73*d*. FIG. 73*e* displays Scores as one of the options between Team Schedules 1632, Weekly Schedules 1634, Standings 1638, and Fantasy Football Stats 1640. FIG. 73*f* Section 1676 shows Seeker various scores on professional football games. At this level, the Seeker could choose to make this selection a favorite or a "FAV" (explained later), to avoid the number of menus required to navigate in the future.

Figure 74A:
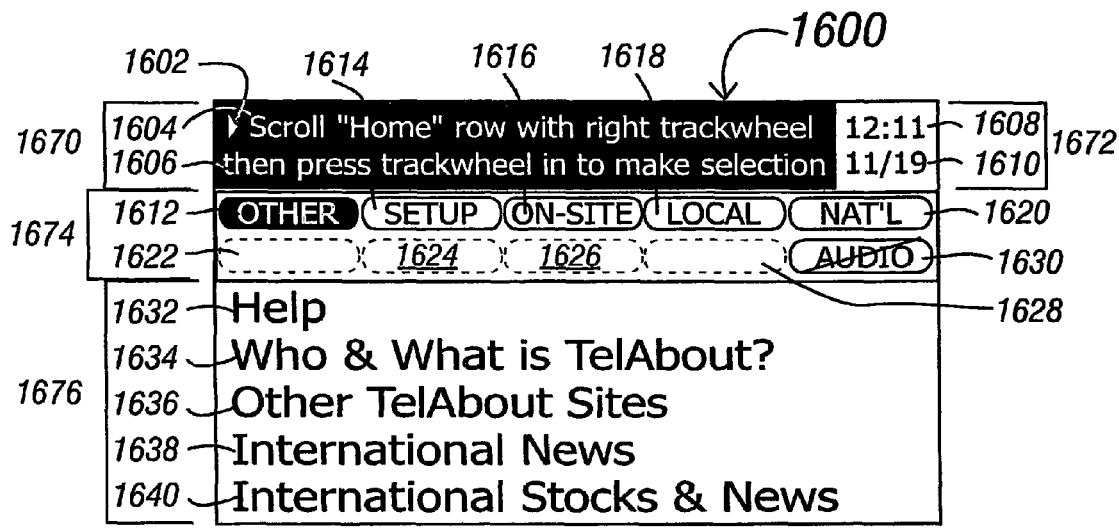
FIGS. 74(A), (B), (C), and (D) are graphical representations of the front display when the GO-UI 199 is scrolling the other portion of the text database.
Figure 74B:
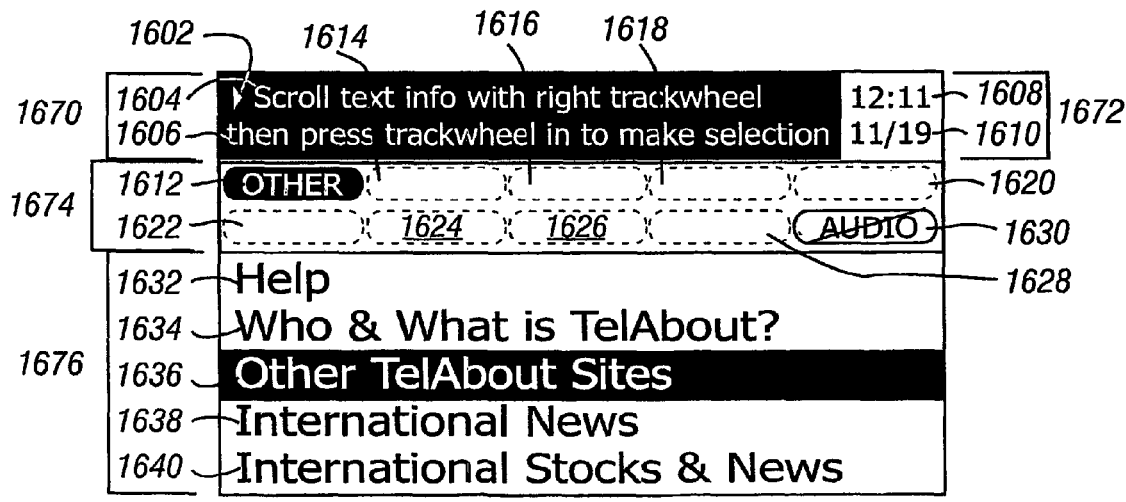
Figure 74C:
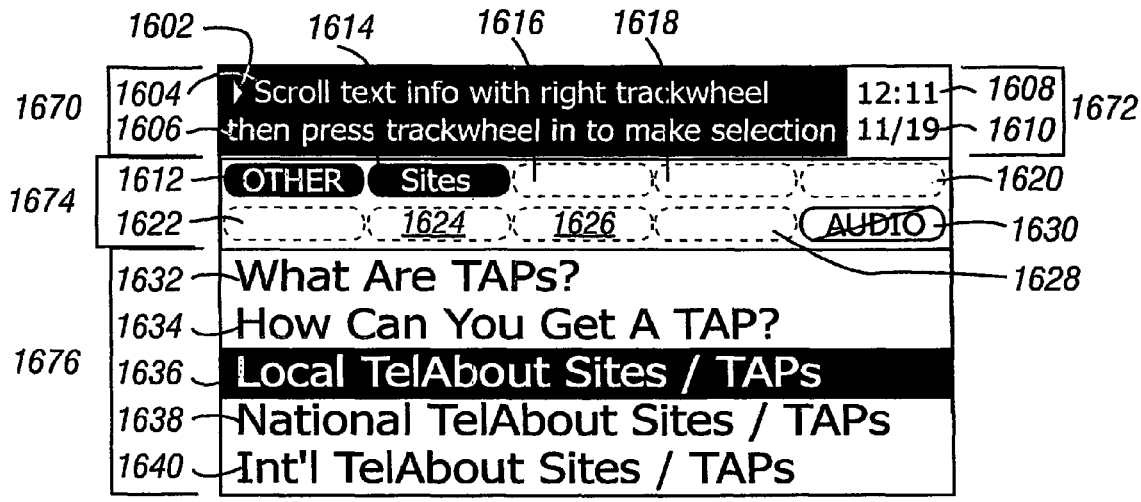

FIG. 74a demonstrations additional options a Seeker may find under the "Other" category field 1612. Selecting one of the choices in Section 1676 Seeker chooses 1636 of FIG. 74b for "Other TelAbout/Enabled Sites" 1636. This selection shows the Seeker a range of selections as depicted in FIG. 74c. By selecting "Local TelAbout/Enabled Sites/TAPs" 1636 in FIG. 74c, the Seeker advances to the GO-UI screen depicted in FIG. 74d.

Figure 74D:
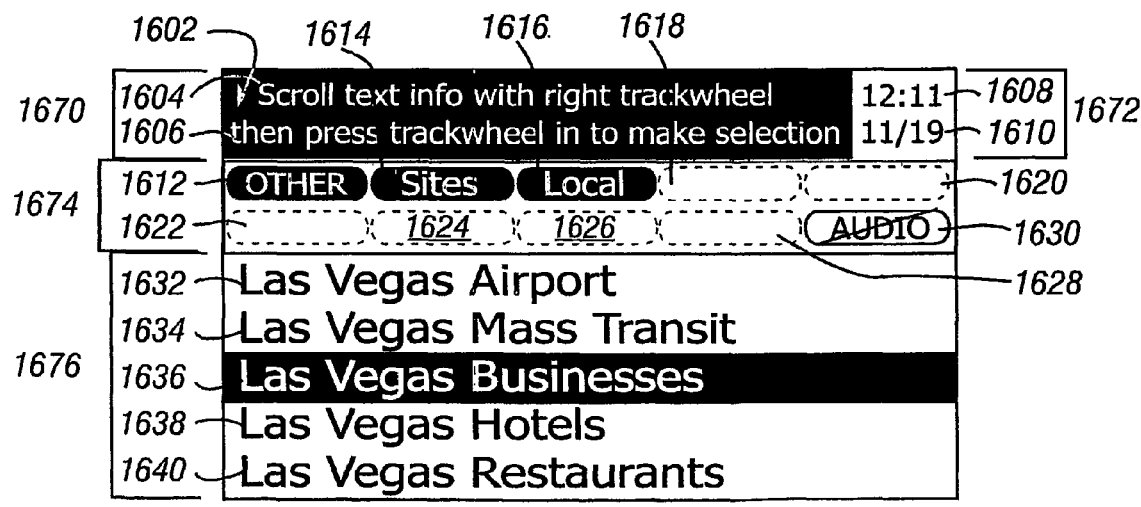

This selection list in display area 1676 of FIG. 74d is a list of other sites enabled with the service in the local area. From this list a Seeker can pull information and menus as though the Seeker was actually located within that particular LCAP. This would localized important information, so a Seeker could review and up-to-the-minute mass transit schedule, hotel vacancy, and/or make a restaurant reservation based on near-real-time conditions and based on permissions granted to specific Seekers.

FIG. 75 allows a Seeker to "Setup" or personalize his TO-U. FIG. 75a shows what a screen would look like if Setup 1612 was selected. The Seeker chooses "Your Profiles" 1636 of FIG. 75b, taking him to FIG. 75c, where section 1674 builds Seekers path and displays choices 1676. The Seeker selects "Create A Profile" 1636 which takes him to a screen in FIG. 75d, offering to "Enter My Resume" 1676.

The Seeker then proceeds to build a resume. Screen in FIG. 75e allows the Seeker to "Enter My Education" 1676 from a preset range of degree types, as shown in FIG. 75f. The Seeker selects the appropriate degree field 1676. While going continuing the selection process, section 1674 continues to create an abbreviated history, letting the Seeker know where he is in the navigation path.

Figure 75G:
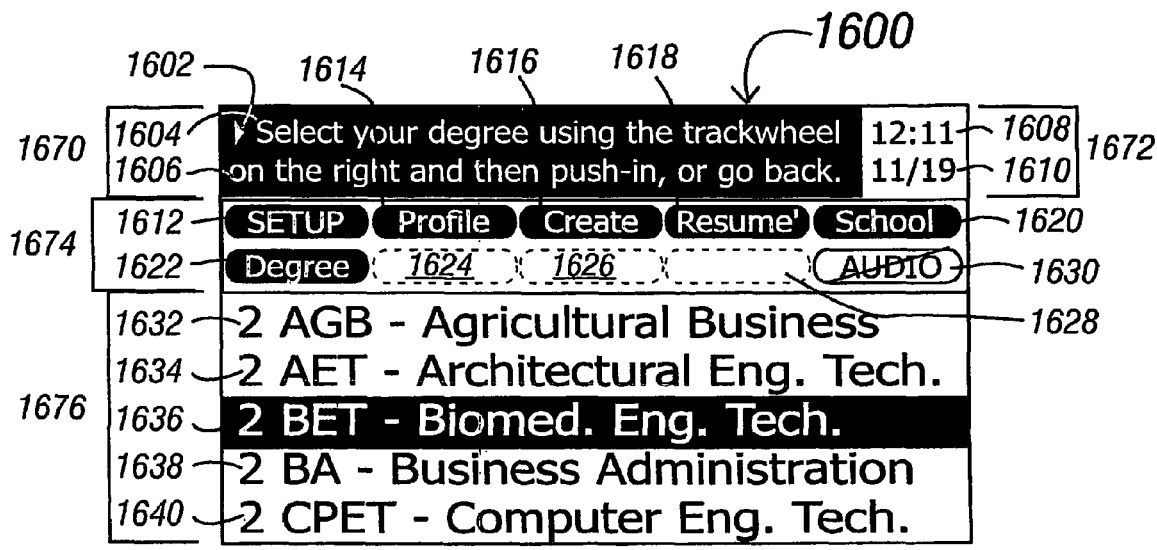
Figure 75H:
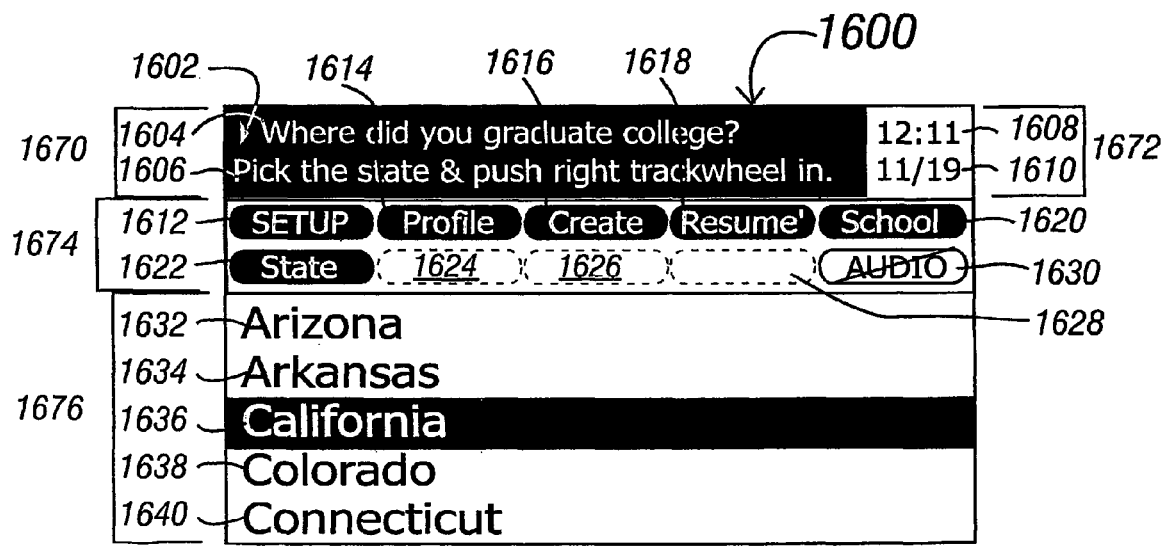
Figure 75I:
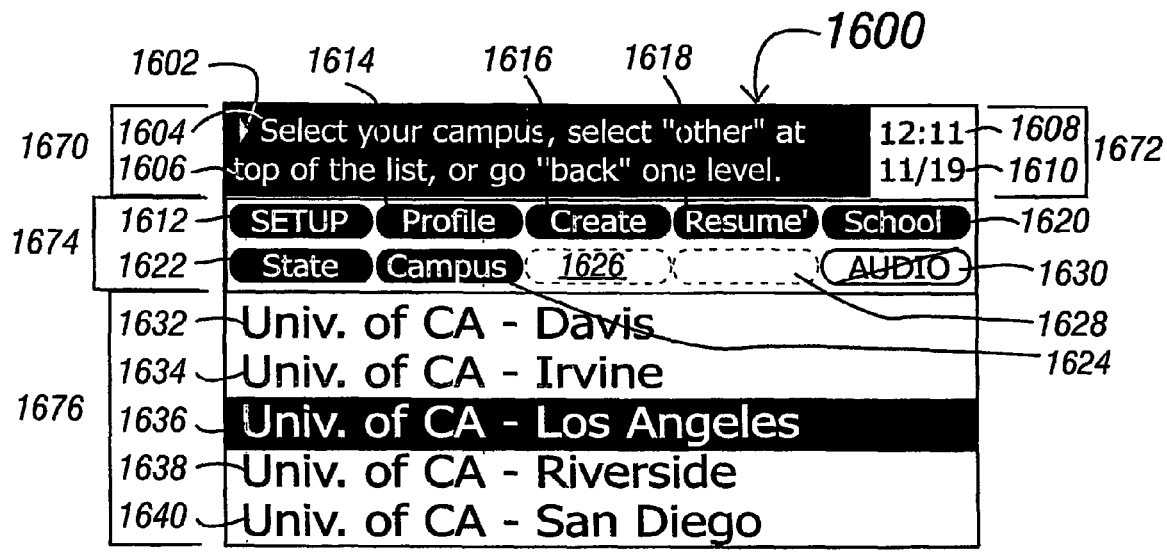
Figure 75J:
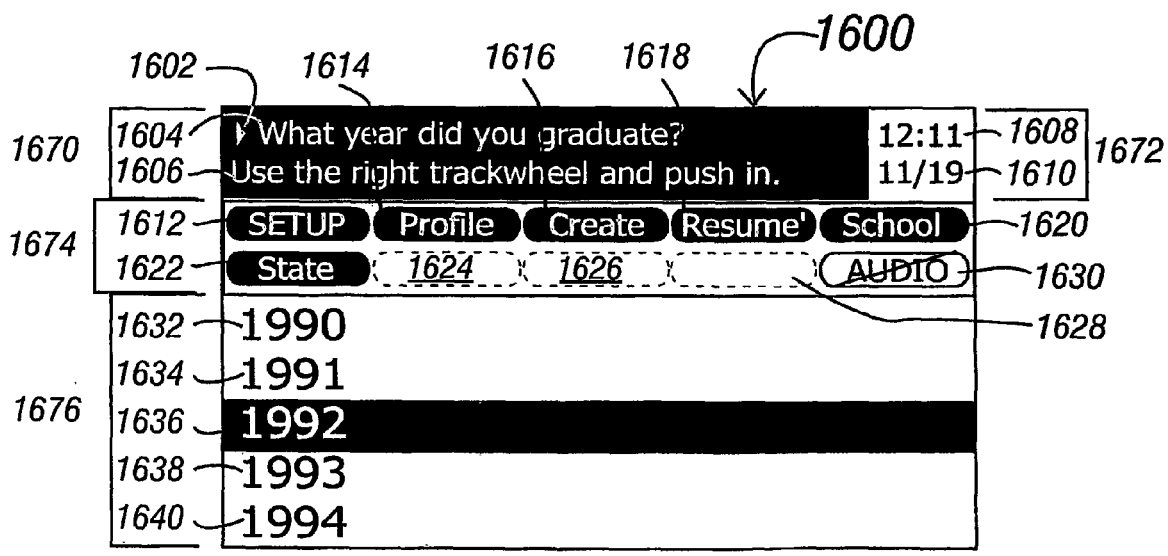
Figure 75K:
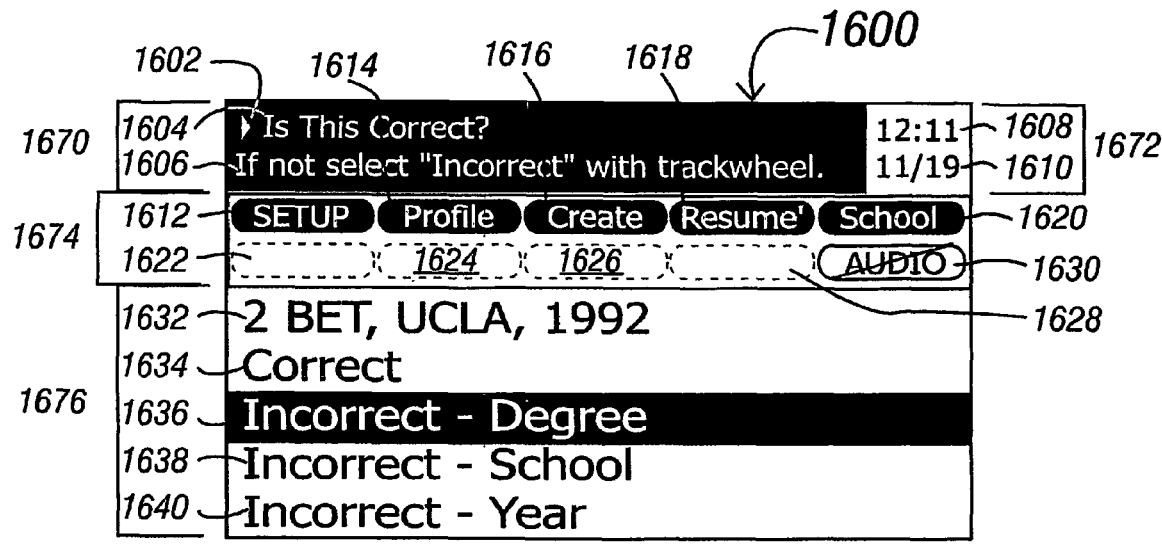
Figure 75L:
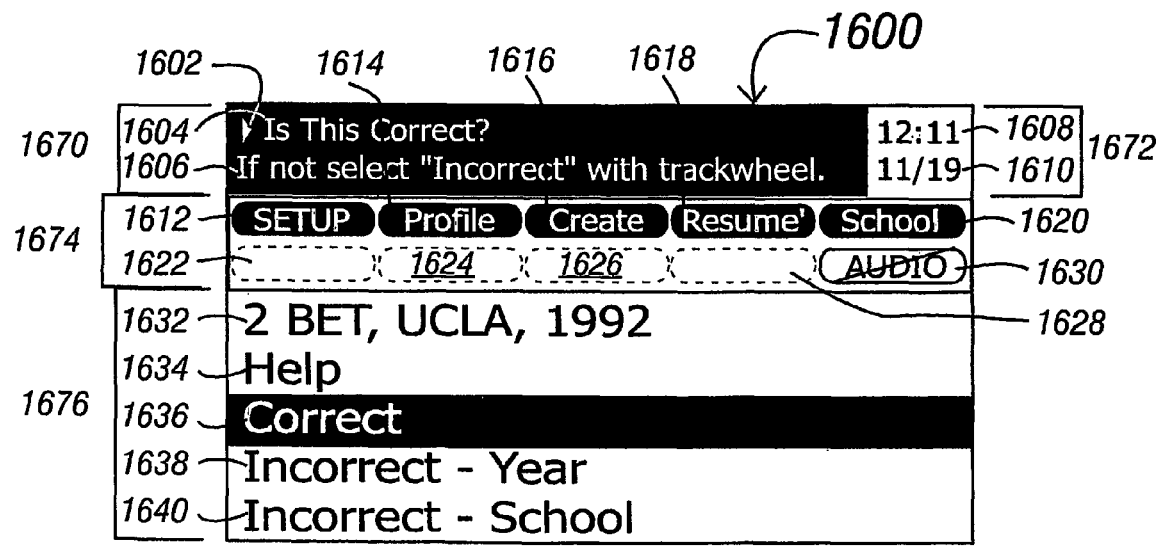
Figure 75M:
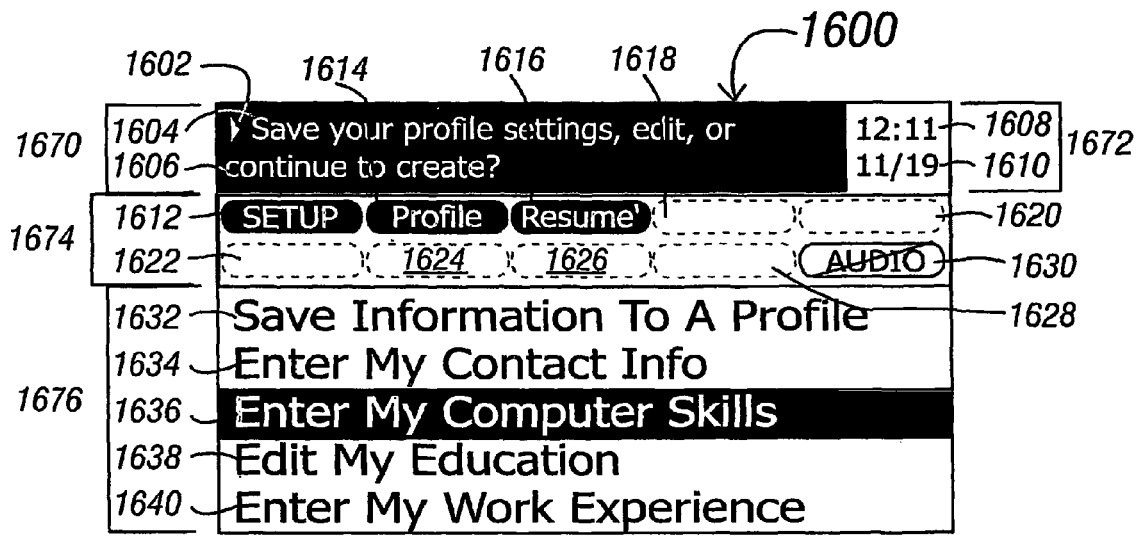
Figure 75N:
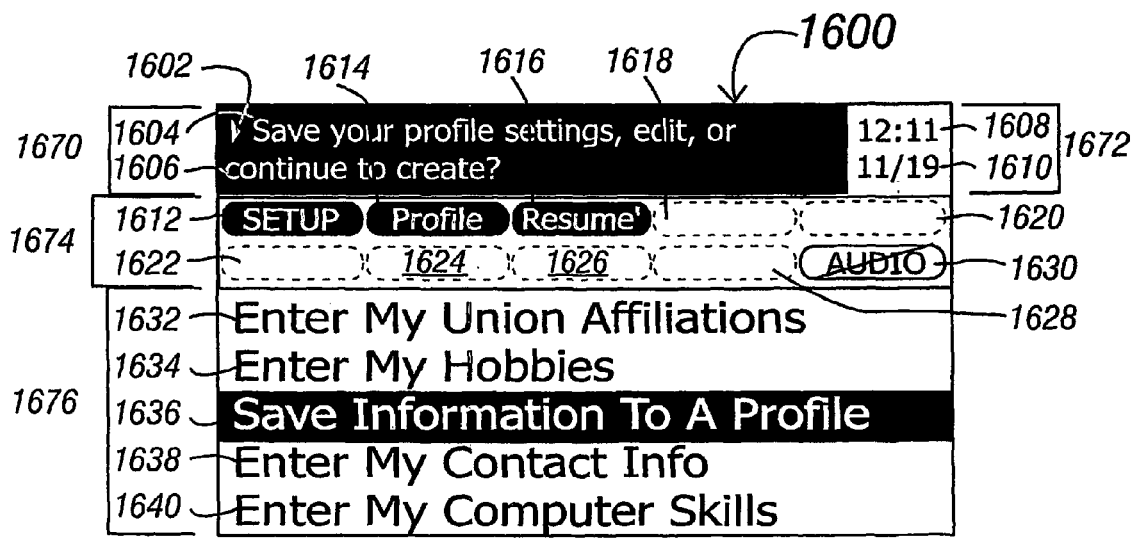
Figure 75O:
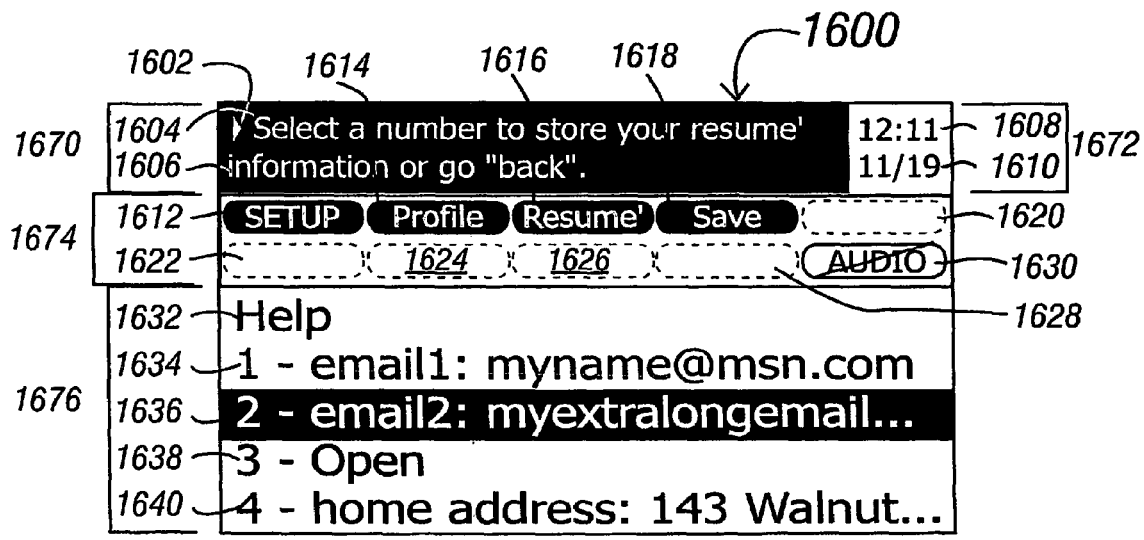
Figure 75P:
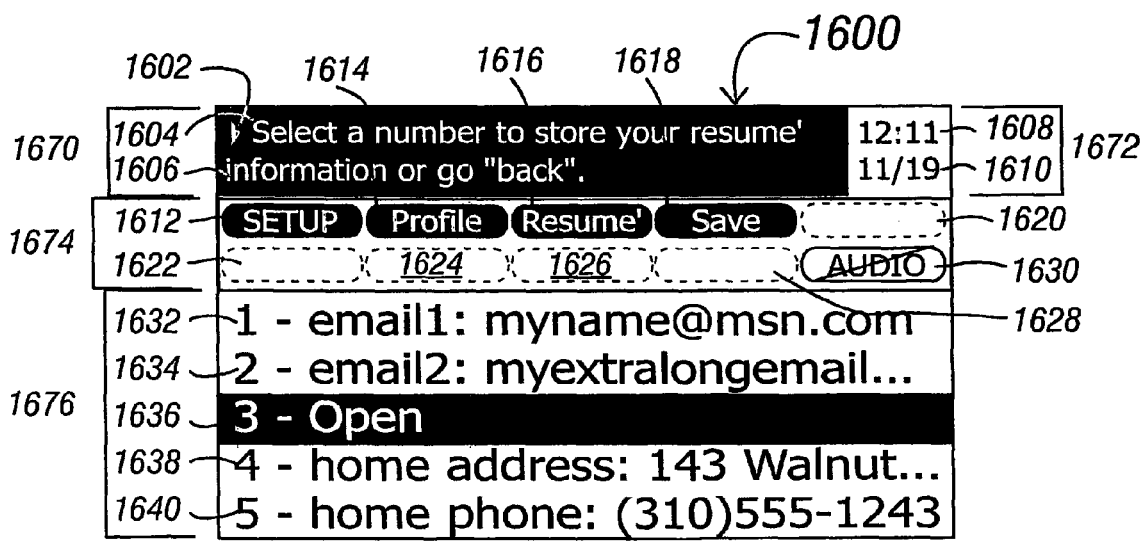
Figure 75Q:
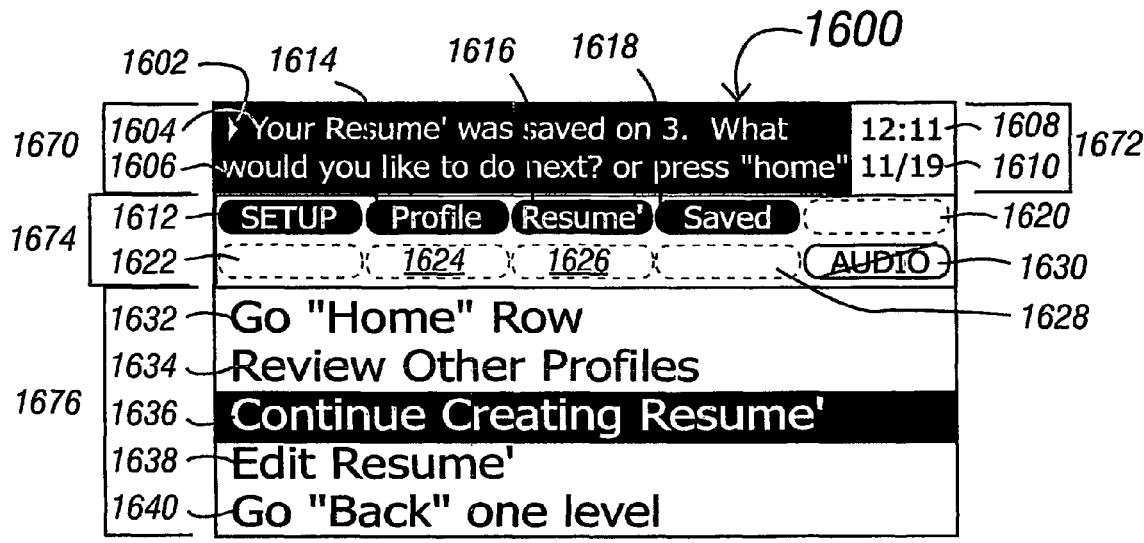
Figure 75R:
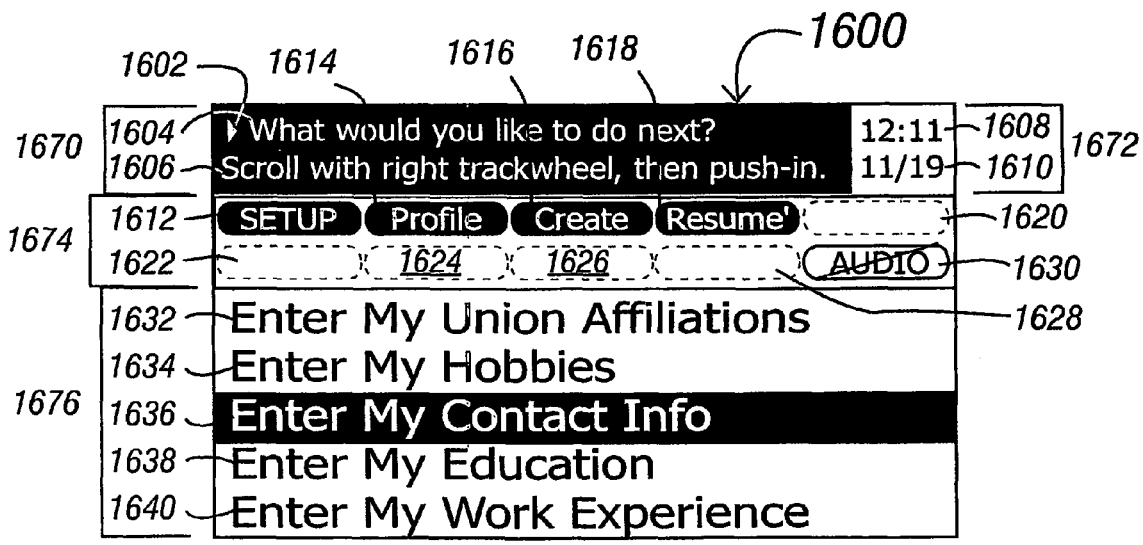

FIG. 75g display various degrees 1636, FIG. 75h offers Seeker an option to enter what state, and school 1636 is located in. FIG. 75j displays 1992 1636 as a selection, FIG. 75k and FIG. 75l asks the Seeker if any of the entries are correct or incorrect. In FIG. 75m seeker selects to Enter My Computer Skills 1636 and FIG. 75n would allow Seeker to Save Information To A Profile 1636. FIG. 75o allows the Seeker to select an email address 1636. FIG. 75q allows Seeker to Continue Creating Resume 1636 and FIG. 75r asks the Seeker to Enter My Contact Info 1636.

Figure 76A:
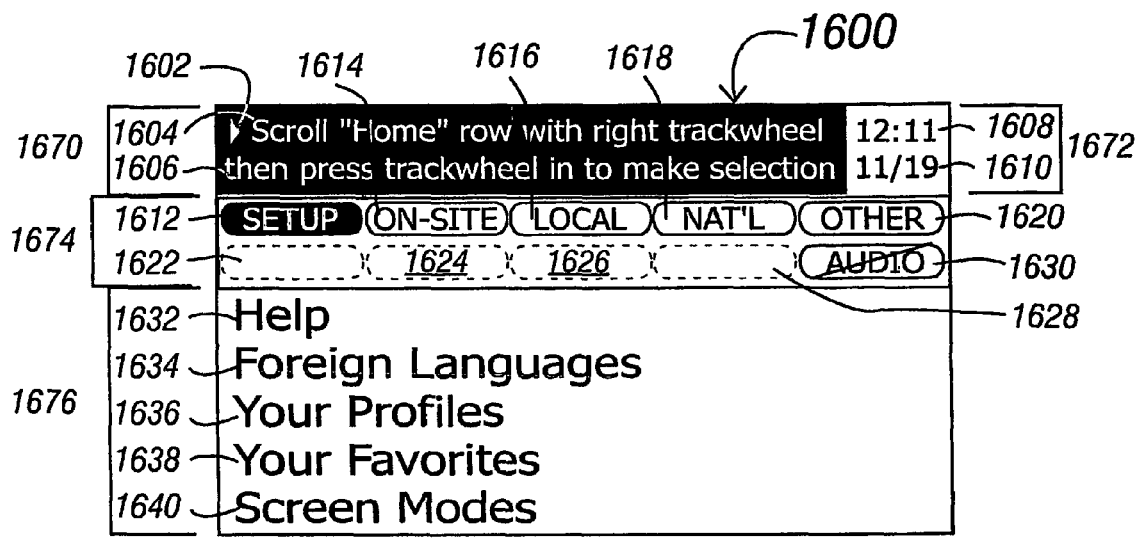
FIGS. 76(A), (B), (C), (D), (E), and (F) are graphical representations of the front display when the GO-UI 199 is reviewing the end-user's pre-defined locally-stored 'favorites'.
Figure 76B:
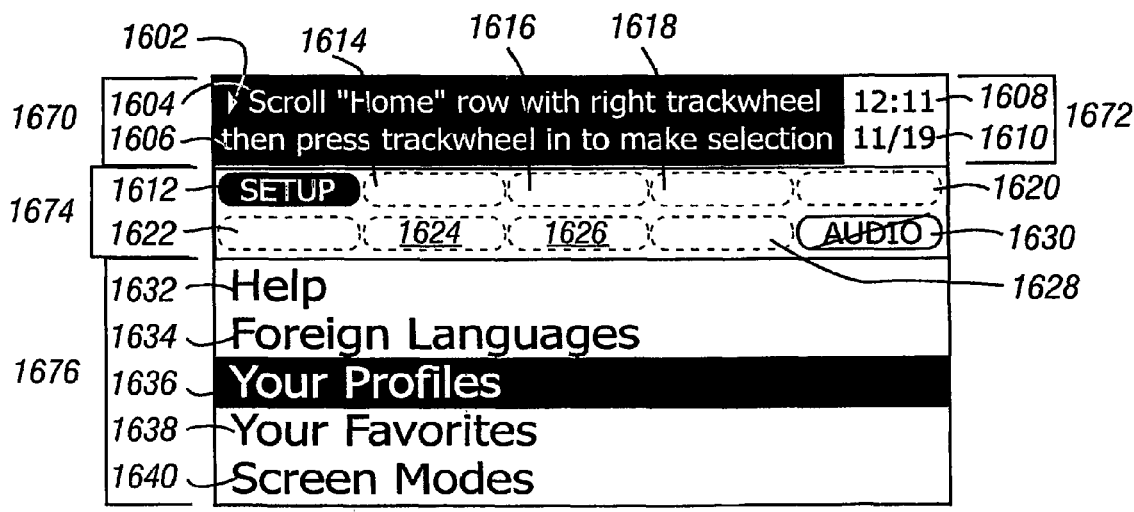
Figure 76C:
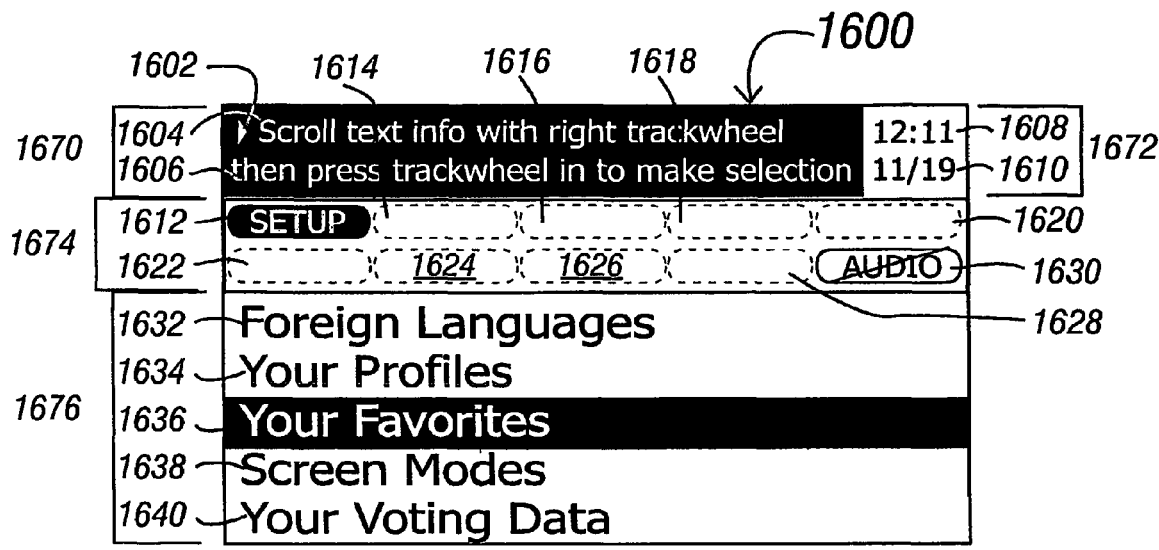
Figure 76D:
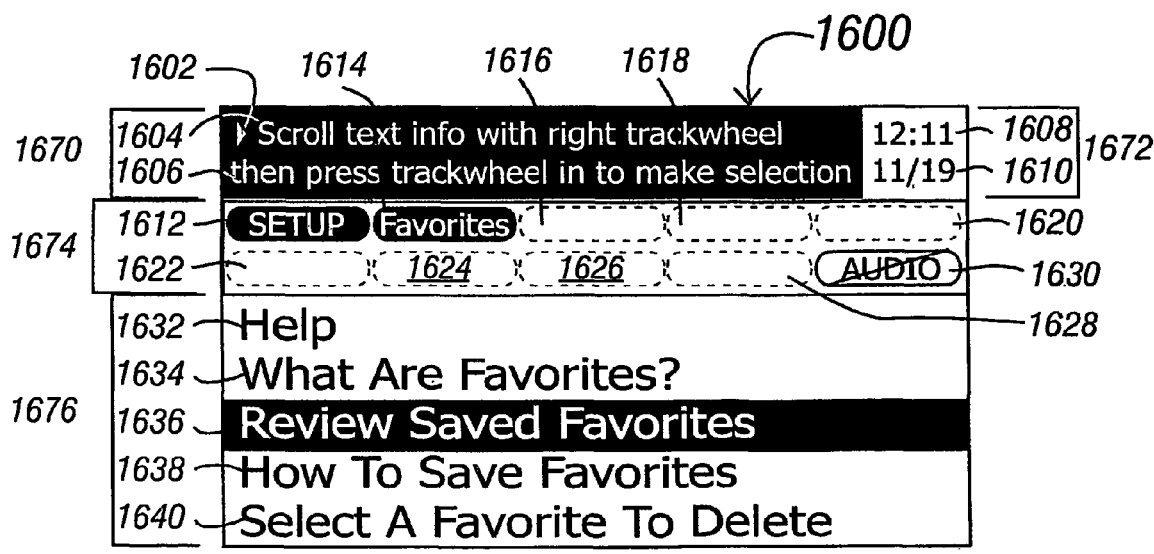
Figure 76E:
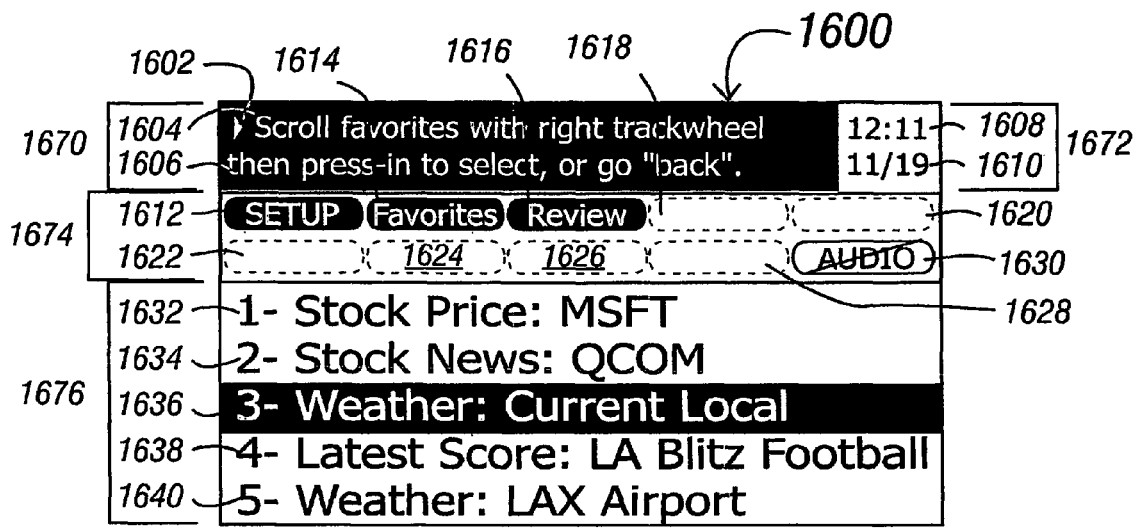
Figure 76F:
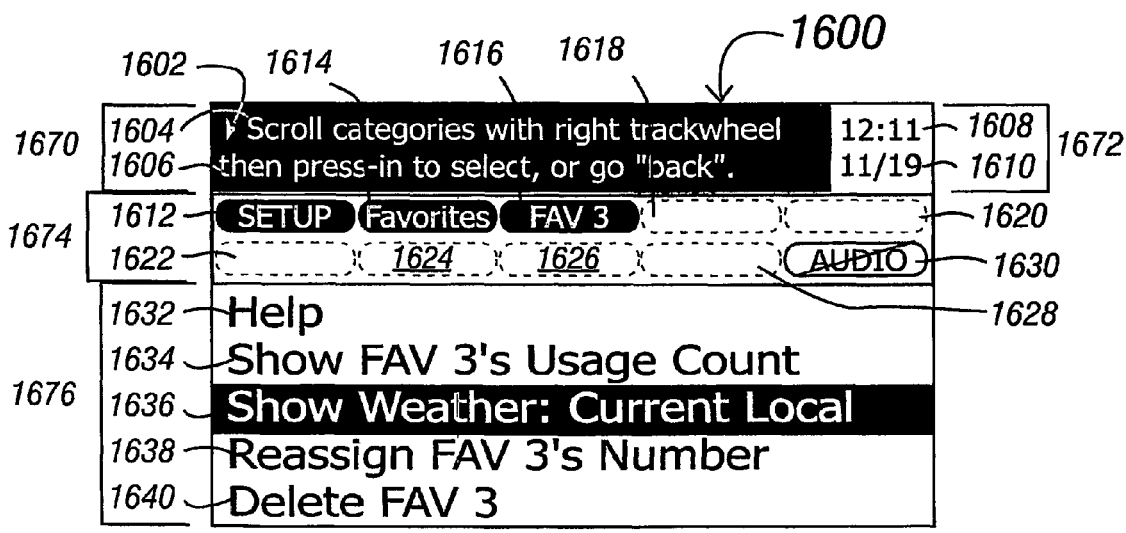

FIG. 76a shows another selection the Seeker could make while Setting up a Profile. The Seeker selects Your Profiles 1636 in FIG. 76a and FIG. 76b, which takes him to FIG. 76c Your Favorites 1636. FIG. 76d offers Seeker to Review Saved Favorites 1636. Navigating to Weather: Current Local 1636 FIG. 76e, Seeker can select this option and view various options 1676 specifically Show Weather: Current Local 1636 of FIG. 76f.

Figure 77A:
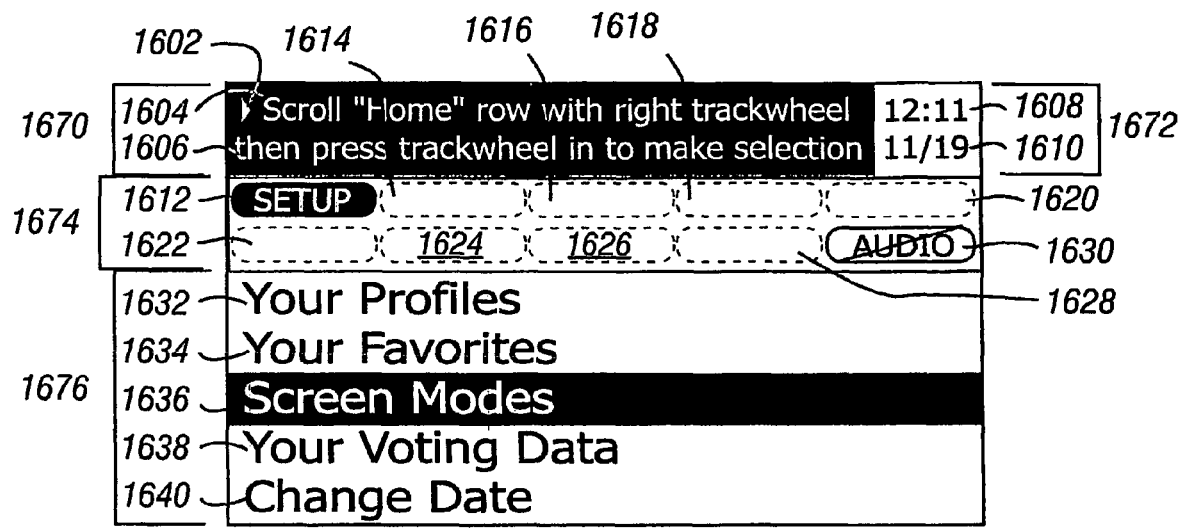
FIGS. 77(A), (B), (C), (D), (E) and (F) are graphical representations of the front display when the GO-UI 199 is scrolling through different screen display options under 'setup'.
Figure 77B:
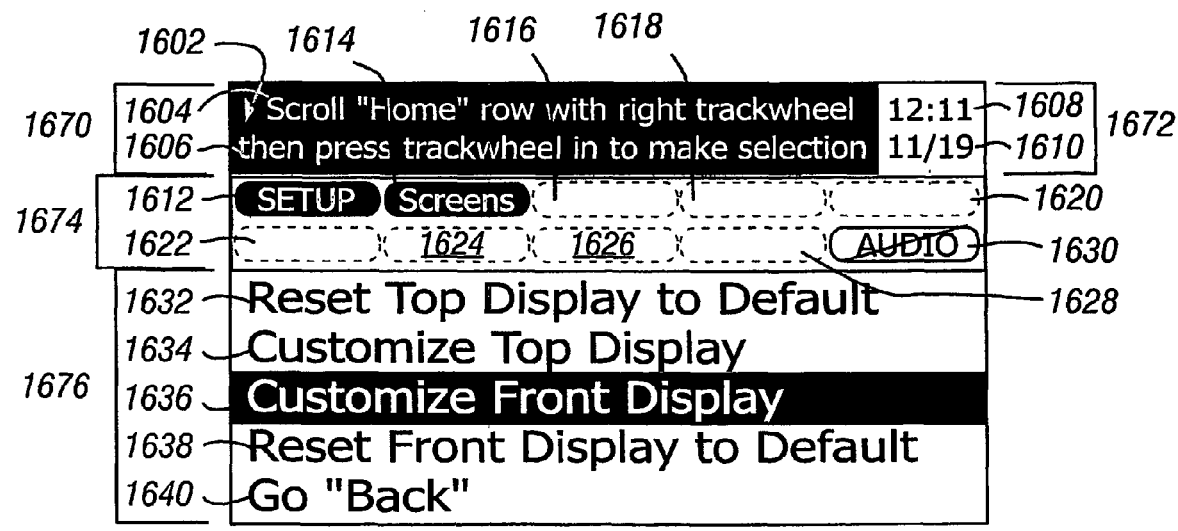
Figure 77C:
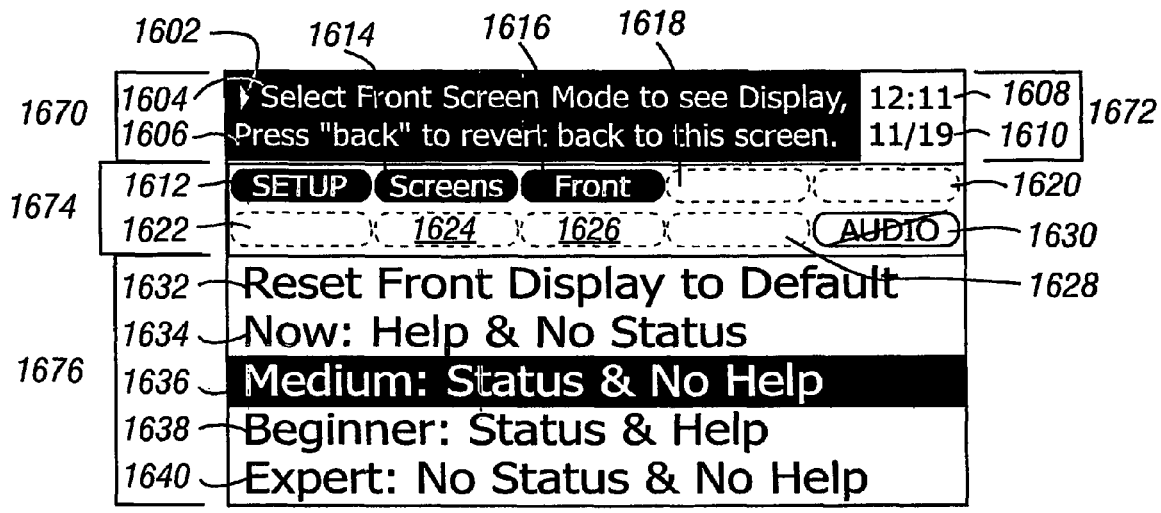
Figure 77D:
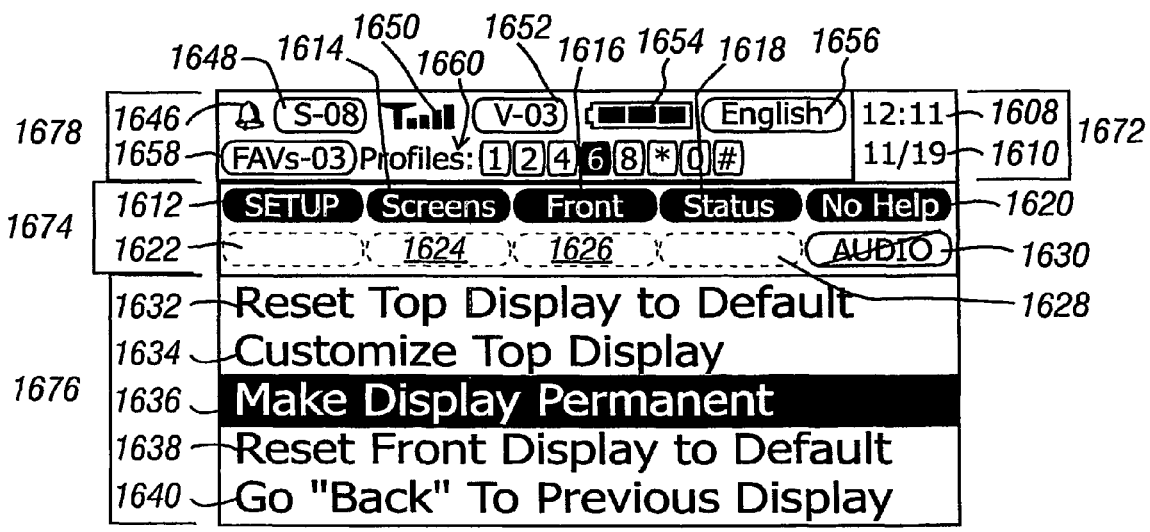
Figure 77E:
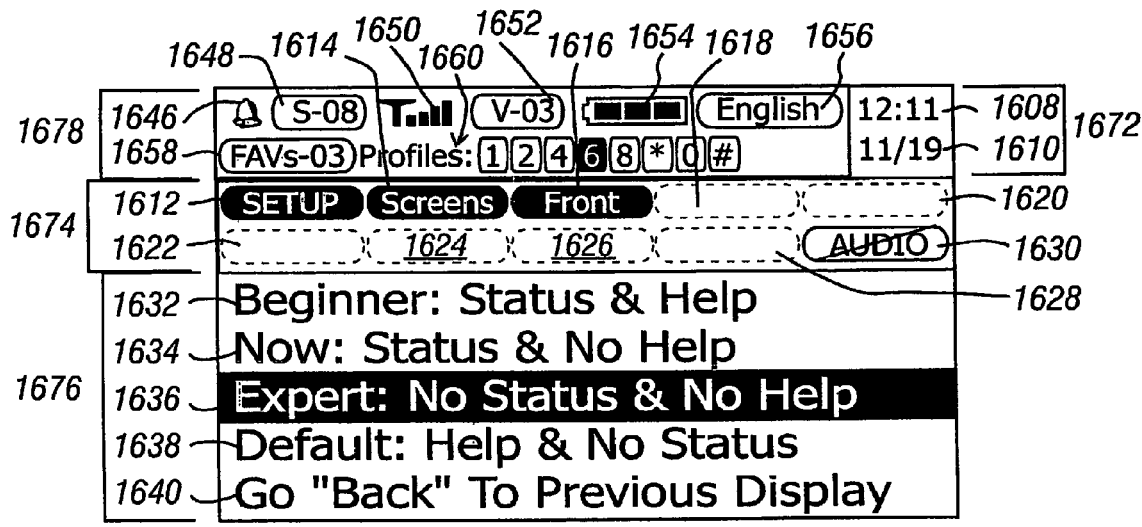
Figure 77F:
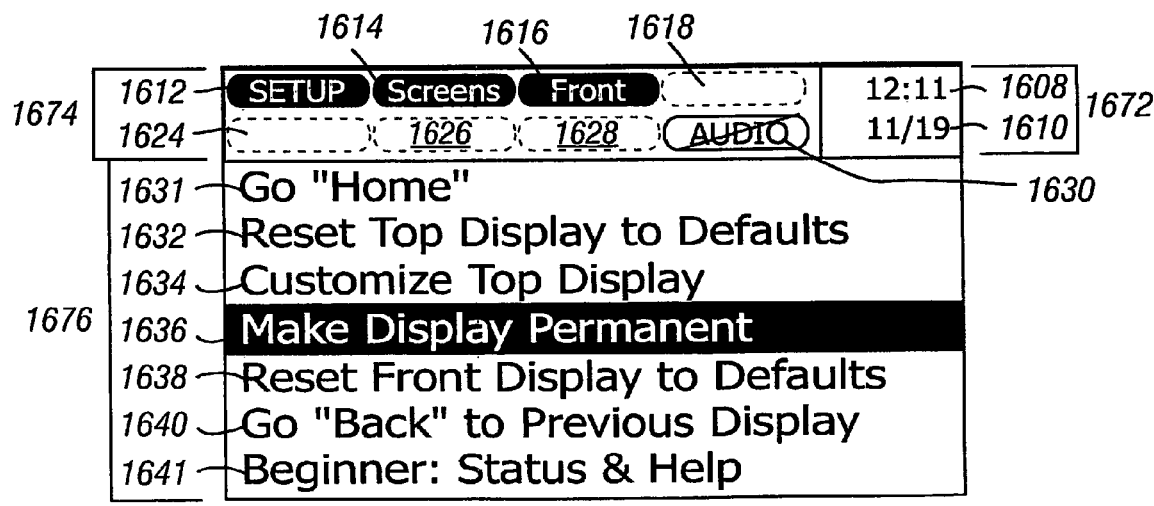

FIG. 77 allows Seeker to Customize Front Display 1636 FIG. 77b. FIG. 77c offers choices for different modes. Seeker selects Medium: Status & No Help 1636, This selection changes section 1678 FIG. 77d and asks Seeker to Make Display Permanent 1636. Screen 77e is another choice, where Seeker could be Expert: No Status & No Help 1636, also offering to Make Display Permanent 1636 in FIG. 77f.

AN ALTERNATIVE EMBODIMENT OF TEXT SCROLLING

Figure 78A:
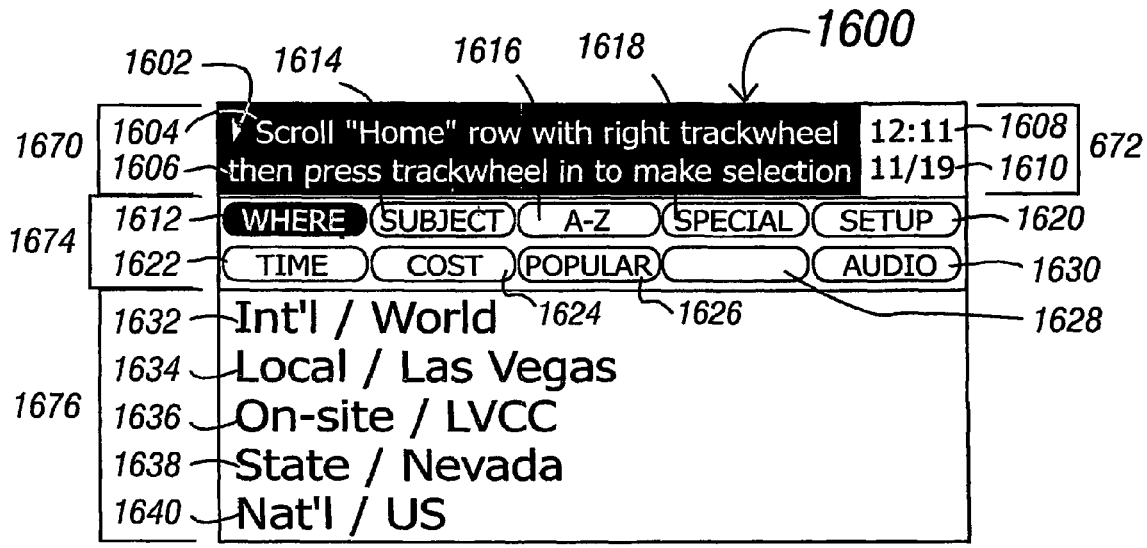
FIGS. 78(A) and (B) are graphical representations of an alternative embodiment of the GO-UI 199 while in text scrolling mode.
Figure 78B:
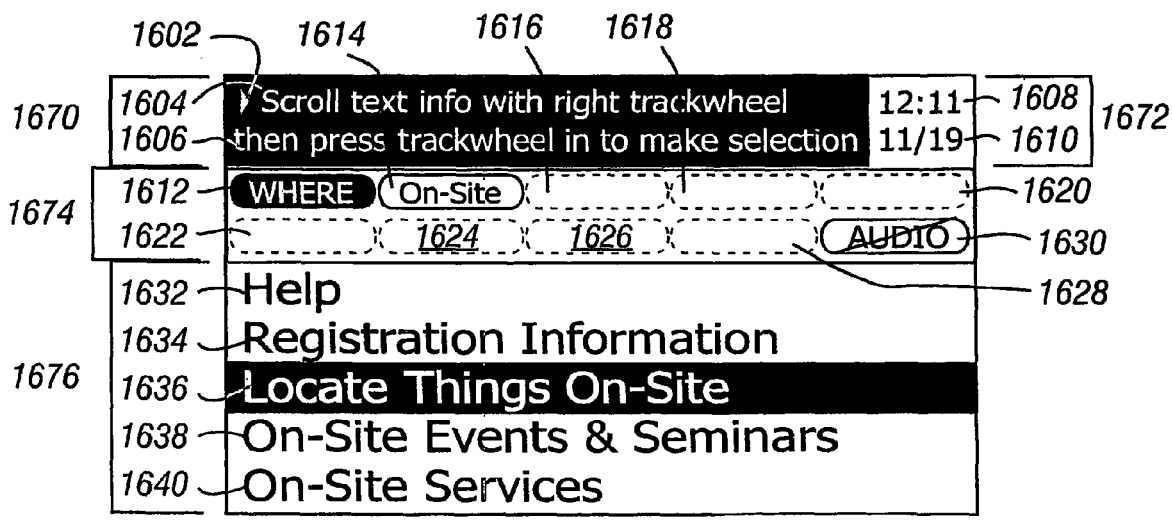

FIG. 78 is an alternative embodiment for GO-UI's information display on TO-U. In this embodiment Seeker is able to search for information based top level subjects as shown in FIG. 78a, of "Where" 1612, "Subject" 1614, "A-Z" 1616, "Special" 1618, "Setup" 1620, "Time" 1622, "Cost" 1624, "Popular" 1626, and "Audio" 1630. Audio 1630 would be the same. FIG. 78b shows that "On-Site" 1614 would now be a sub-level of a category called "Where" verses the top level of the hierarchy.

A key 1307, FIG. 69, functions the same as side control 1362 and a key 1309 functions the same as side control 1364 unless the device is in the numeric-entry mode, that is described later. The unit can also work as an MP3 player. As an MP3, key 1307 jumps back one song/track in the play list and key 1309 jumps ahead one song/track in the play list.

Connector 1366, FIG. 67, is a compact flash, expansion slot and connector 1368 is an output jack. "2 locate" a short cut key FIG. 69 key 1301 labeled "1-home" works just like key 1352 unless the numeric entry mode is enabled or if it has had all of its defaults reset under the "reset" function found in "setup".

While one is listening to an audio clip, they can simultaneously scroll other available audio clips in the audio database. This audio scrolling will not affect their ability to continue listening to the current audio selection. In these cases, the top-display, FIG. 68a, element 1502 and front display, FIG. 68b, display element 1676, change to reflect the audio addresses that the Seeker 999 is now scrolling through. If scrolling stops for more than 5 seconds and no audio clip is selected, the display elements 1502 and 1676 will revert back to the previously selected audio clip.

The Help Key 1313, FIG. 69 toggles between having the Help Menu on the Front Display, the status area, or neither. If a Seeker holds down the Help Key 1313 for more than 5 seconds, this launches a short cut back to the default starting point for beginner's help in FIG. 70a. Pushing and holding key 1313 down for 3 seconds brings up the A0 clip.

There is both an audio-database scrolling-mode and a text-database scrolling-mode. The use of the front and side controls as shown in FIGS. 65, 66, 67, and 68, effect what appears in the top display 1500, as shown in FIGS. 65, 68a, 70a, and 70b, and what appears in the front display 1600, as shown in FIGS. 65, 68b, 70, 71, 72, 73, 74, and 75.

When the unit is in one's hand, the front-face can be viewed and accessed to perform navigation as shown in FIG. 64. The front display as shown in FIG. 68b reflects whether the audio or text mode is active. The different types of audio and text displays are explained later. While navigating the text databases, the top display 1500, as shown in FIGS. 68a and 70a, maintains the audio clip address 1502, clip name and clip description 1508 and 1510. This allows one to know which audio channel is still active while navigating text databases, except when the Seeker 999 is actively scrolling other available audio clips as in FIG. 70d. When scrolling other audio clips, pressing side control 1322 will stop the audio that is currently playing and replace it with the newly selected audio clip that appears in display element 1502, FIG. 70e.

Text-to-Speech
Ability to Simultaneously Access Audio and Text Information

The system allows a Seeker 999 to simultaneously use both the audio and text databases. For example, a Seeker 999 could be listening to an audio clip from the audio database, while searching for text information such as a sports score, the weather, or a stock quote.

Retrieval and Synchronizing Through a Network

While a mobile TO-U 200 needs a connection to the network to download Content or receive updated messages, the TO-U 200 can still have many functions when it is not within range of a signal or connected by a wire. Audio and text messages, MP3 music and entertainment, games and trivia, or any other Content can be stored locally within the TO-U 200 and used later.

When a TO-U 200 enters an enabled site for the first time, the mobile TO-U 200 updates all the messages and menus for that site, transparent to the Seeker 999. A Seeker 999 can go into the "setup" function to turn this capability on or off. With this function on, the system determines how much memory is currently available within the Seeker's 999 handheld and transmits the appropriate menus for that site. If the TO-U 200 has sufficient memory left over, the on-site servers can also send the most frequently requested Content for that particular LCAP 1076.

The system can also predict the Seeker's 999 likely requests from their usage from their history. If for example, the Seeker 999 routinely requests the score of a particular basketball team, the server could send this information in advance of the Seeker's 999 request. The server could track more details about the usage. For example, as to when the Seeker 999 usually requests this information, such as only on the nights when this team plays, and only within an hour after the game ends.

This accomplishes a number of things. First, the current score could already be locally available in the Seeker's TO-U 200 eliminating any download time. Second, if the score needs updating, the Seeker 999 sees the last updated score, while the system downloads an update. If this were the first time the Seeker 999 requested the score, the Seeker 999 would not have any information available during this download. Third, the server can determine the likelihood of a Seeker's 999 request by his previous usage habits, but if bandwidth usage on the system becomes very high, the system could limit the amount of predicted Content it delivers or temporarily halt this capability.

Disability Assistance

High tech gadgets typically have high development costs and extremely short product lives. Consequently, many high-tech manufacturers do not spend adequate time or money to modify their products for those that are disabled. The FCC's Telecommunications Act has tried for years to encourage manufacturers to make all their products, not just one or two models, more user-friendly for the disabled. About 54 million Americans have disabilities ranging from vision and hearing problems to mobility and cognitive difficulties.

Since the system can provide step-by-step audio and text help, Seekers 999 will not have to overcome their fear of handheld gadget complexity to obtain valuable information quickly. Consequently, the POD 170 would not have to be modified to help millions of disabled individuals.

"DID"—Designated Information for the Disabled

Content designated for the disabled can have meta-tags (DID) associated with it, so that a Seeker 999 with a particular disability could sort Content accordingly. For example, a Seeker 999 with a hearing impairment could obtain Content designated for his needs, while a Seeker 999 with a vision impairment could select from Content designated for her needs.

Some units can be modified with the ability for voice inputs to navigate the menus or applications. In addition, the menus can be setup to give verbal feedback or help messages, such as a voice prompt that might say, "you are currently tuned to channel _____ (A4, for example)".

Street Signs

Street signs could be outfitted with voice prompts to assist the visually impaired. The mobile TO-U 200 would in turn provide these individuals with such knowledge as to what street corner they are currently at and when it is safe to cross the street.

Hearing Impaired

Some TO-Us 200 could have audio leveling capabilities, so the listener could preset a desired audio level and the TO-U 200 would maintain that level for all Content. Filtering capabilities could enhance sounds or background noises that might otherwise be difficult for certain people to hear.

Option/Defaults: Save Drill Down Defaults

After a Seeker 999 drills down a particular way, the server can save that method and use that as his new default. For example, if they selected "Baseball", under "Sports", and then "Pros", the Seeker's GO-UI 199 would then default to those three items. Each appearing in the Seeker's 999 selection indicator in center of their display window, opposed to having to re-search for those selections each time they re-entered that same level of the hierarchy.

This Seeker 999 would not lose the ability to choose other subjects; this just helps create a more convenient and speedier method for the Seeker 999. Otherwise, the selector in the display might default to "College" under "Baseball", and they would need to take the time to re-position the selector over to the "Pros" each time. Under this method, once a Seeker 999 chooses the "Pros" that becomes their default. "College" however, does not go away as a secondary choice.

Reduce Latency

When a Seeker 999 first enters a LCAP, a beginning portion of the most popular audio messages for a particular site could all be downloaded to their TO-U 200. This allows the Seeker 999 to quickly hear messages without waiting for them to be downloaded. The system instead, downloads the remainder of the message following the Seeker's 999 request. Then that audio clip is synchronized with the starting portion that was pre-downloaded to their TO-U 200 earlier.

Message Encryption

Message encryption is an add-on feature that allows businesses to send messages to designated people. Businesses can assign channels on their database that are only accessible through an employee's passcode. It can also allow employees to screen their calls from outsiders while the callers are leaving the voicemail messages in real time. This can be done hands-free while someone is roaming the office, hospital, or the manufacturing plant.

At shopping malls, retailers can use the message encrypting to inform employees of sales contests, how to process returns, entering credit card data, handling disgruntled customers, and for whom to call when shoplifting is suspected. Customers/Seekers, on the other hand, could hear about store sales, increased holiday store hours, how to apply for a store credit card, who to contact when registering a complaint, and the store's return policy, for example.

Special Event Usage or "ESN"

The POD's 170 ID "ESN" or electronic serial number allows the POD 170 to be pre-programmed with certain advanced capabilities or to have its flash RAM within the unit upgraded permanently or temporarily at certain events. At a Nascar racing event for example, event sponsors could charge visitors for the privilege to hear certain racing pit crews. The racing fan could have their receiver's ESN upgraded wirelessly for that event. The next day, the event sponsor could charge for the upgrade premium service again.

Local Insertions

The LCAP 1076 can allow businesses the ability to insert advertising or news at their site. Most forms of media already allow for local advertising insertion. For example, instead of buying an ad to air on MTV™ nationwide, an advertiser could buy ad time for just Los Angeles or even just a portion of Los Angeles. With this system however, a vendor or promoter can place an ad in a single store or in just one vertical market. For example, someone looking to advertise a new power tool might buy advertising just in Home Depots™. Conversely, a local contractor may choose to pay for advertising in only his home town Home Depot™.

A car dealership for example, could sell advertisements on the system to a local car insurance agency. At a grocery store for example, the system could offer local area news. This news could be anything from food recipes to radio-type programs created by area high school students.

Message Retransmission or Rebroadcasting

The system could allow sites to insert their own commercials or Content during commercial breaks of a live broadcast. At a health club for example, Seekers/club members could use their mobile TO-U 200 to hear the audio signal of a television broadcast of the news, sports, or entertainment. When the commercial comes on, instead of hearing the audio from the television advertisement, the club member might hear a promotion for the club regarding such things as:

how to become a gold member,
group exercise classes available,
diet programs and their associated benefits,
discounts or specials available in the pro shop, or
a list of upcoming club activities.

Recovery Information

The system could designate audio channels for helping a parent find a lost child or missing purse. Instead of trying to listen to every distorted message coming over the mall's paging system, this individual could tune to a designated channel to hear lost child information. Another designated channel could list lost and found items and explain where to go to recover these items.

Track/Locate

If a Seeker 999 turns on his profile function before putting his POD 170 into something such as his briefcase, the system could help track or find the briefcase, if it were lost or stolen. A briefcase stolen at an airport for example, might be located if the Seeker's 999 handheld is inside and still on. This Seeker 999 could call the COPP, and/or the management of the LCAP could in turn notify the on-site security as to the ESN of that unit. On-site security could then establish the proximity of the briefcase or monitor its movement within the enabled environment to help determine the culprit.

It is important to note that the system can be set to track the usage of a mobile TO-U 200 not necessarily the usage of a particular person. When a Seeker 999 requests audio on-demand, that request is tabulated into that message's popularity, and how often it is requested by that TO-U 200, but that data is not then necessarily tied to an individual's personal identity. In the case of the stolen briefcase, the Seeker 999 is calling to identify himself and a particular POD 170 that can then be located using the POD's 170 ESN and using the occasional pings emitted from that particular POD 170.

Defaults

At any given level in a text-database, graphic-database, or an audio-database search there is a pre-determined default selection that appears in the display of the Seeker's mobile TO-U 200. The default shown at any level of a hierarchy or menu can change over time due to usage statistics or it can be preset to change with certain conditions.

At a trade show for example, a Seeker 999 who presses the "locate" button on their mobile TO-U 200 would get a list of subjects from which they could make their selection. By default the selection might be "locate on-site registration", because it is the first day of the event, or the database could show the most requested item among current Seekers 999 at this particular level.

The database could be set up to give way to popularity over time, so that the selection "locate on-site registration" might give way to the preferred or more popular selection "locate an exhibitor's booth". In this case, the LCS would adjust a Seeker's 999 future menuing structure to reflect this change. The next time the Seeker 999 requested information "locate an exhibitor's booth" appears as the default.

These defaults can also be adjusted by the length of time the mobile TO-U had been in use. If it was during the last day of the trade show, and "locate an exhibitor's booth" was the most popular request at this particular level in the hierarchy, but the mobile TO-U 200 had just been rented or the Seeker 999 had just entered the LCAP for the first time, "locate on-site registration", could still remain the default for this first-time attendee. The other selections, such as "locate an exhibitor's booth", would still be an available selection choice, but it would require the Seeker 999 to make an extra step using such controls as the buttons or side tuner to select it.

Another factor for creating a default is the prior usage of the Seeker 999. If the Seeker 999 has already used "locate on-site registration", than even though it is still the first day of the show or event, the default could change to "locate an exhibitor's booth" immediately or at some point later in that day, for example.

Audio Favs (Favorites)

Seekers 999 can either tag audio channels or messages as favorites or tag audio channels and messages to be removed from their available selection list. For example, someone who does like listening to sports, could tune to the sports audio heading at S-zero and press the "Favs" button. From there they can start to create a list of favorite channels or remove certain channels.

If this Seeker 999 instead liked sports, but wanted to remove a specific category under sports they could move to that channel and just tag that individual folder or file for removal. This allows the Seeker 999 to personalize their menus and speed up the search process. This favorite setting can be stored under a keypad number for use later. This allows the Seeker 999 to switch between different settings, the original defaults (all channels available) and a number of saved favorites settings as needed.

Favs that Change with Database Adjustments

If the main database switched the location of information that was part of a Seeker's 999 favorites, the system would be able update the Seeker's 999 favorites within the Seekers GO-UI 199 without the Seeker 999 having to make the changes. For example, some television's today have the ability to create a text label for each channel using the remote. This label may appear as a short text message on the screen while the Seeker 999 surf through the channels. That way the seeker has the name of the channel to references as she tries to find her selection. A problem arises when the local cable provider changes the channel line-up and these labels said Seeker 999 has assigned are no longer accurate.

With the system, the Seeker's 999 favorites could have a time-stamped header associated with each favorite the Seeker saves. When the Seeker's TO-U 200 enters LCAP with updated or changed channels, the Seekers GO-UI favorites could be updated automatically without the Seeker 999 even knowing the Seeker's GO-UI could prompt the Seeker 999 for the approval to make the update before completing the change.

Seeker 999 Feedback

Besides being able to vote with the numeric keypad, Seekers 999 could use the side tuner to show their level of support for a particular subject. During a presentation for example, a Seeker 999 could push the jog-rocker or trackwheel up if they supported the position of the presenter or they could push the jog-rocker or trackwheel down if they disapproved of the presenter's current position. This feedback could change over time and change in degree. This feedback could be shown as a graphic within the Seeker's own mobile TO-U 200. The more the Seeker agreed or disagreed the more the Seeker would turn the jog-rocker or trackwheel, or until it peaked out. This information could then be synchronized up with the presentation to analyze the Seeker's 999 feedback, to compare with a larger group, or to combine with a larger sampling. This collective group feedback could be feed to a database for use later, shown in real-time behind the presenter, or shown on selected TO-Us 200.

Narrowing the Field with User Feedback

A group of Seekers 999 could be polled on a variety of subjects to create a consensus. For example, the first question put to the group could ask them to rank ten items from one to ten in their importance (ten being the most important). Then those results could eliminate the bottom five choices and then the group could vote again to create a single solution, narrow the field again, or a group of solutions.

Sharing Information

When a Seeker 999 finds information on the system that he wants to share with others, he can do a number of things with that information. He could save the message within his mobile TO-U's 200 memory and play it for the intended-other-party later or he could request that said information be sent to another Seeker 999:

within that same LCAP or event, in another location using the system network, via IP as an email, text message, or voice message using the system or another source, via other modes such as: telephone landlines, cellular, radio frequencies, infrared, Internet, or satellite.

In addition, these messages could be tagged with the first Seeker's 999 personal comments or opinions, in text or verbal, so the other party knows who sent the information and to what it references.

This information could also be stamped with a number of other tags such as: the time it was retrieved by the first Seeker 999, the location, the venue found at, who is the speaker of the information, who paid for placing the information, how much the advertising placer paid to place it, how long the information has been posted, when it was last updated, if there is a URL link, how popular the information is relevant to other information at that site or for that speaker, and other metrics such as how many other have requested that same information. Once the information has been sent to the other party, the first Seeker 999 could then be notified as to when it was received, where it was received, and any feedback, in text or verbal, from the other party.

Inventory Availability

The COPP can be updated with inventory availability for a number of items, such as retail items, manufacturing items, hotel rooms, exhibitor booths for future shows, hospital beds, airline seats, classes on a college campus, or tables in a restaurant. This inventory can be updated and revised from a number of sources, including a mobile TO-U 200 used by employees such as a sales person, stock clerk, desk clerk, trade show director, admissions clerk, ticket agent, school administrator, or restaurant host.

While shopping a Seeker's mobile TO-U 200 could allow him to select a form of payment and delivery. The TO-U could list such things as delivery methods, the amount of time needed, and the associated costs of each. This Seeker 999 could also see a list of available delivery days to the Seeker's neighborhood, city, or area.

Advertisers

Advertisers and promoters can create advertising messages that fall in a wide range of categories for a wide range of potential customers. This would allow a Seeker 999 to select the level and amount of detail the seeker wanted in the Seeker's advertising information, such as: highly technical, cost savings, ease-of-use, lifestyle benefits, environmental friendly issues, etc. Advertisements can be billed by a number of methods, such as the amount of requests made by the Seekers 999 for selecting a particular promotion, the number of overall Seekers 999 on the system, by the actual sales volume, or by the percentage of sales increased with the system on verses off.

ID Time Stamping

The system can be setup with user IDs for tracking employee usage and time stamping their workflow. In a manufacturing environment for example, the management could monitor the time the employee started by simply referencing the system usage on the database. In addition, the system could track information about the employee such as what they requested, when they took breaks, and when they stopped working. This usage metering could also show areas where the employee needs training or it could monitor their progress by noting what help messages they requested and how that requested help has reduced over time.

Remote Content Contributors

Virtually anyone with Internet access can contribute or update Content on the system from anywhere in the world. Information can also be updated with on-site computers, handheld wireless TO-Us 200, and by telephones. Some channels or sections of information will require a password to be able to contribute or update. Some Content will go through a human screening process and/or a software screening process. This software will screen the text and audio messages for such things as poor grammar, spelling errors, trade names, people's names, and any offensive language or insults.

LCAPS would be free to have uncensored Content within their controllable environments. If they choice to release unfiltered material, the LCAPS would need to be responsible for its Content and the effect it has on its business.

Not all Content has to be sent over the Internet or typed in on a keyboard. The software will allow Content providers to contribute and update information via such things as telephones. A hotel desk clerk for example, could call a designated phone number and enter their current room availability by answering questions with the keypad on their telephone.

In some cases, the computerized system could call the hotel and automatically request a password and go through a short series of questions to update their room inventory. The system would score how well the different hotels kept this information up-to-date, and could remove motels that abuse or fail to maintain accurate inventory data on the system. Ideally these hotels would have computerized systems that would be kept in synchronization with the COPP.

Content—Spam/Porn

The ability for anyone to contribute Content to the Internet can be both bad and good. Many applications have made attempt to filter such Content as pornography or spam, but this is very difficult to perfect. Since the service is transmitted locally from those businesses or LCAPS that utilize the system, the LCAPS are held accountable for the Content.

Similar to the Internet, virtually anyone can contribute Content to the network. But unlike the Internet, the software allows the CAPS to censor the Content they deliver. If the LCAP does not want to transmit certain material, they can deselect it from the list of information available to their Seekers 999 at said LCAPS site or said LCAP can restrict the time of day that it is available.

At a school for example, the system may not offer any music, sports, entertainment or game channels during school hours. Certain channels might only be available to teachers or only in certain areas. If necessary, the system could be completely shut off, for such times as during finals.

DESCRIPTION OF ANOTHER EMBODIMENT FOR THE DISTRIBUTION SUBSYSTEM

Infrared Transceivers and User Location Tracking

Some information could be transmitted to a wireless mobile TO-U 200 using infrared transceivers. Compared to radio frequencies, infrared signal transmission can be limited by line-of-sight, but this can be beneficial when trying to place a multitude of transceivers in a limited area. At a trade show for example, two transceivers transmitting information on the same frequency or channel could be located relatively close to one another without interfering. These two transmitters could even be located in the same exhibitor's booth. Each transceiver would have the ability to determine which Seekers 999 were within its range. This capability helps track Seeker 999 locations and the density of Seekers 999. This locating ability through signal strength measurements or triangulation methods helps the system provide the Seeker 999 information more relevant to their location, without forcing the Seeker 999 to physically enter their present location into their mobile TO-U 200 or without employing third-party tracking.

These infrared transceivers transmission could co-exist in an environment with radio frequency transmitters. By overlaying radio frequencies, the enabled site could add channels that have a wider range. This would allow Seekers 999 to have channels that change from display to display, while also having channels of information that would be maintained as they moved throughout a large environment or venue.

The Seeker 999 could setup their mobile TO-U 200 to always accept the strongest transmission signal. This would allow the Seeker 999 to move about LCAP without having to manually switch channels as they move about, yet they would still be able to constantly obtain new information relevant to the new location(s) similar to Tour Mode. This information could be transmitted to the Seeker's 999 mobile TO-U in a number of manners, including: transmitted, buffered for requested playback, or automatically streamed and played; or it could be a live signal that they join in progress. With speech commands these messages could be requested hands free or the Seeker 999 could be prompted with such things as voice messages, vibrations, flashing lights, tones, or text that a particular message or certain information is available and if the Seeker wants to use it now or save it.

What is claimed is:

1. A method for providing information to a user comprising:
    generating a tagged content for a remote content and storing the tagged content and the remote content on a remote database;
    generating a local content based in part on local relevance at a unique physical location and storing the local content in a local database;
    interconnecting said remote and local databases to a server through which the remote database updates the content in the local database and vice versa;
    providing access to the server to a transceiver;
    providing access to said remote and local content, including a selector on said transceiver for selecting the remote and local content;
    creating a second tagged content associated with a unique identifier;
    sending the second tagged content and at least a portion of the display content to the local server; and
    sending the second tagged content and at least a portion of the display content to the remote server;
    wherein the transceiver is comprised of a hand held device that has the unique identifier associated with it; and
    wherein the tagged content and the second tagged content are comprised of metadata.

2. A method, comprising:
    accessing a tagged content created for a remote content, said tagged content and said remote content being stored on a remote database accessed by a remote server;
    accessing a local content based in part on local relevance at a unique physical location, said local content being stored on a local database accessed by a local server;
    combining the remote content, the tagged content and the local content on a central server;
    providing access to the central server to a transceiver;
    providing a display content for the transceiver based at least in part upon a content selector and the tagged content;
    creating a second tagged content associated with a unique identifier;
    sending the second tagged content and at least a portion of the display content to the local server; and
    sending the second tagged content and at least a portion of the display content to the remote server;
    wherein the transceiver is comprised of a hand held device that has the unique identifier associated with it;
    wherein the tagged content and the second tagged content are comprised of metadata;
    wherein the display content is comprised of a selected content obtained from the remote content and the local content; and
    wherein the unique physical location is an establishment and not simply an addressable location for accessing electronic storage media.

3. The method of claim 2, wherein the central server is selected from the group consisting of the remote server and the local server.

4. The method of claim 2, wherein the second tagged content includes data related to an actual physical location of the hand held device within the unique physical location.

5. The method of claim 4, wherein the display content is determined at least in part based upon the second tagged content.

6. The method of claim 2, comprising the further steps of:
    updating the local database based upon the remote content; and
    updating the remote database based upon the local content.

7. The method of claim 2, wherein the display content is generated by a graphical user interface program which provides a user of the transceiver an ability to customize the display content.

8. The method of claim 7, comprising the further steps of:
    providing a local party with a local ability to change the local content included in the display content; and
    providing a remote party with a remote ability to change the remote content included in the display content.

9. The method of claim 8, wherein the display content includes information about a stock keeping unit offered for sale at the unique physical location.

10. The method of claim 9, comprising the further step of:
providing access to point of sale information for the stock keeping unit within the unique physical location to the remote server through the central server.

11. The method of claim 10, comprising the further step of updating the local content and the remote content based upon point of sale information.

12. A method, comprising:
generating a remotely-tagged content from a first content and a remote interaction and storing the remotely-tagged content on a first database;
generating a proximity-based tagged content from a second content and a proximity-based interaction and storing the proximity-based tagged content on a second database;
interconnecting the first database and the second database to a server through which the server updates and generates an aggregate content partially based on the remotely-tagged content and the proximity-based tagged content;
providing access to the server to a transceiver;
using the aggregated content to determine the first content and the second content that is accessed by the transceiver through the server
creating a second tagged content associated with a unique identifier;
sending the second tagged content and at least a portion of the aggregated content to the local server; and
sending the second tagged content and at least a portion of the aggregated content to the remote server;
wherein the transceiver is comprised of a hand held device that has the unique identifier associated with it; and
wherein the tagged content and the second tagged content are comprised of metadata.

13. The method of claim 12, wherein the first database is a remote database and the second database is a local database.

14. The method of claim 12, wherein the proximity-based interaction includes a profile based at least in part upon a user action.

15. The method of claim 14, wherein the user action is based upon at least one input selected from the group consisting of a user proximity measurement or a user input.

16. The method of claim 15, wherein the user input comprises a content request.

17. The method of claim 16, wherein the content request is at least partially based upon the second content and a unique physical location of the second content.

* * * * *